United States Patent
De Francesco et al.

(10) Patent No.: US 12,465,590 B2
(45) Date of Patent: Nov. 11, 2025

(54) OXALAMIDO-SUBSTITUTED TRICYCLIC INHIBITORS OF HEPATITIS B VIRUS

(71) Applicant: Antios Therapeutics, Inc., Mendham, NJ (US)

(72) Inventors: Raffaele De Francesco, Milan (IT); Lorena Donnici, Milan (IT); Luca Guidotti, Milan (IT); Matteo Iannacone, Milan (IT); Romano Di Fabio, Pomezia (IT); Vincenzo Summa, Pomezia (IT); Adolfo Prandi, Milan (IT); Pietro Randazzo, Milan (IT); Leda Ivanova Bencheva, Milan (IT); Marilenia De Matteo, Milan (IT); Luca Ferrante, Milan (IT); Davide Gornati, Milan (IT); Alessandro Grillo, Milan (IT)

(73) Assignees: OSPEDALE SAN RAFFAELE S.R.L., Milan (IT); IRBM S.P.A., Pomezia (IT); ISTITUTO NAZIONALE DI GENETICA MOLECOLARE—INGM, Milan (IT)

( * ) Notice: Subject to any disclaimer, the term of this patent is extended or adjusted under 35 U.S.C. 154(b) by 910 days.

(21) Appl. No.: 17/611,777

(22) PCT Filed: May 25, 2020

(86) PCT No.: PCT/EP2020/064424
§ 371 (c)(1),
(2) Date: Nov. 16, 2021

(87) PCT Pub. No.: WO2020/234483
PCT Pub. Date: Nov. 26, 2020

(65) Prior Publication Data
US 2022/0241241 A1    Aug. 4, 2022

(30) Foreign Application Priority Data

May 23, 2019 (EP) .................................... 19176238
Nov. 25, 2019 (EP) .................................... 19211249

(51) Int. Cl.

| | |
|---|---|
| C07D 513/14 | (2006.01) |
| A61K 31/407 | (2006.01) |
| A61K 31/437 | (2006.01) |
| A61K 31/445 | (2006.01) |
| A61K 31/506 | (2006.01) |
| A61K 31/513 | (2006.01) |
| A61K 31/522 | (2006.01) |
| A61K 31/675 | (2006.01) |
| A61K 31/7072 | (2006.01) |
| A61K 31/7084 | (2006.01) |
| A61K 38/21 | (2006.01) |

(Continued)

(52) U.S. Cl.
CPC .......... *A61K 31/407* (2013.01); *A61K 31/437* (2013.01); *A61K 31/445* (2013.01); *A61K 31/506* (2013.01); *A61K 31/513* (2013.01); *A61K 31/522* (2013.01); *A61K 31/675* (2013.01); *A61K 31/7072* (2013.01); *A61K 31/7084* (2013.01); *A61K 38/212* (2013.01); *A61K 39/292* (2013.01); *A61K 39/3955* (2013.01); *A61P 31/20* (2018.01); *C07D 513/14* (2013.01); *C07D 515/14* (2013.01)

(58) Field of Classification Search
CPC .......................... C07D 513/14; C07D 515/14
See application file for complete search history.

(56) References Cited

FOREIGN PATENT DOCUMENTS

| | | |
|---|---|---|
| WO | 2015/059212 A1 | 4/2015 |
| WO | 2017/001655 A1 | 1/2017 |

OTHER PUBLICATIONS

Geng Ca et al, "Small-molecule inhibitors for the treatment of hepatitis B virus documented in patents", Mini Reviews in Medicinal Chemi, Bentham Science Publ, NL, vol. 13, No. 5, Apr. 1, 2013 (Apr. 1, 2013), p. 749-776.

(Continued)

*Primary Examiner* — Brian E McDowell
(74) *Attorney, Agent, or Firm* — Taft Stettinius & Hollister LLP

(57) ABSTRACT

The present invention relates to compounds that are inhibitors of hepatitis B virus (HBV). Compounds of this invention are useful alone or in combination with other agents for treating, ameliorating, preventing or curing HBV infection and related conditions. The present invention also relates to pharmaceutical compositions containing the compounds. A compound of Formula (I) is exemplary:

7 Claims, No Drawings
Specification includes a Sequence Listing.

(51) Int. Cl.
*A61K 39/29* (2006.01)
*A61K 39/395* (2006.01)
*A61P 31/20* (2006.01)
*C07D 515/14* (2006.01)

(56) References Cited

OTHER PUBLICATIONS

ISA/EP, "PCT International Search Report and Written Opinion", issued in connection with PCT International Application No. PCT/EP2020/064424, which was mailed Aug. 12, 2020 (11 pages).

SEQUENCE LISTING

<160> NUMBER OF SEQ ID NOS: 4

<210> SEQ ID NO 1
<211> LENGTH: 22
<212> TYPE: DNA
<213> ORGANISM: Artificial Sequence
<220> FEATURE:
<223> OTHER INFORMATION: synthetic primer

<400> SEQUENCE: 1
atttgttcag tggttcgtag gg        22

<210> SEQ ID NO 2
<211> LENGTH: 22
<212> TYPE: DNA
<213> ORGANISM: Artificial Sequence
<220> FEATURE:
<223> OTHER INFORMATION: synthetic primer

<400> SEQUENCE: 2
cggtaaaaag ggactcaaga tg        22

<210> SEQ ID NO 3
<211> LENGTH: 22
<212> TYPE: DNA
<213> ORGANISM: Artificial Sequence
<220> FEATURE:
<223> OTHER INFORMATION: synthetic primer

<400> SEQUENCE: 3
aactccgccc cattgacgca aa        22

```
<210> SEQ ID NO 4
<211> LENGTH: 22
<212> TYPE: DNA
<213> ORGANISM: Artificial Sequence
<220> FEATURE:
<223> OTHER INFORMATION: synthetic primer

<400> SEQUENCE: 4
aaagccaccc aaggcacagc tt                                              22
```

OXALAMIDO-SUBSTITUTED TRICYCLIC INHIBITORS OF HEPATITIS B VIRUS

CROSS-REFERENCE TO RELATED APPLICATIONS

This application is a 371 of PCT/EP2020/064424, filed May 25, 2020, which claims the benefit of European Patent Application Nos. 19176238.4, filed May 23, 2019 and 19211249.8, filed Nov. 25, 2019.

TECHNICAL FIELD

Reference to a Sequence Listing Submitted Electronically Via EFS-WEB

The content of the electronically submitted sequence listing, file name: 128-1252_SeqListing.txt; size: 1,541 bytes; and date of creation: Nov. 15, 2021, filed herewith, is incorporated herein by reference in its entirety.

FIELD OF THE INVENTION

The present invention relates to compounds that are inhibitors of hepatitis B virus (HBV). Compounds of this invention are useful alone or in combination with other agents for treating, ameliorating, preventing or curing HBV infection and related conditions. The present invention also relates to pharmaceutical compositions containing said compounds.

BACKGROUND OF THE INVENTION

The Hepatitis B virus (HBV) is an enveloped, partially double-stranded DNA (dsDNA) virus of the hepadnaviridae family that is spread by contact with infected blood and body fluids and causes acute and chronic necroinflammatory liver diseases of varying severity (Guidotti L G, Chisari F V. Annu Rev Pathol. 2006; 1:23-61). The HBV lipid envelope contains 3 in-frame viral envelope proteins (large, middle and small), each of which possesses the hepatitis B virus surface antigen (HBsAg) determinant (Seeger C, Mason W S. Virology. 2015 May; 479-480:672-86). This envelope encloses a protein shell, or capsid, that is composed of 240 monomers of the core protein and each monomer possesses the hepatitis B virus core antigen (HBcAg or Cp) determinant. The capsid in turn encloses a partially double-stranded, relaxed circular DNA (rcDNA) form of the viral genome as well as a molecule of the viral polymerase. Upon entry into susceptible cells (i.e. the hepatocytes) via the interaction of the large envelope protein with specific receptors on the hepatocellular membrane, the capsid is released into the cytoplasm and transported at the nuclear membrane. The rcDNA is then released into the nucleus and repaired by cellular polymerases into an episomal "minichromosome", termed covalently closed circular DNA (cccDNA), which represents the viral transcriptional template. The minus strand of the viral DNA encodes 3.5, 2.4, 2.1 and 0.7 kb mRNA species that are translated into structural (envelope and core) and nonstructural (polymerase, precore and X) proteins of the virus. Following transport into the cytoplasm, one of the 3.5 kb RNAs (termed pregenomic RNA) is selectively packaged into a nascent capsid by interacting with the core and polymerase proteins that have been translated from their respective mRNAs. Within these capsids, the viral polymerase reverse transcribes the pregenomic RNA into a single minus (−) strand DNA molecule that serves as template for the viral polymerase-mediated DNA plus (+) strand synthesis and the cohesive structure of the linear DNA intermediates converts them into a relaxed circular double stranded molecule. A fraction of these HBV DNA-containing "mature" capsids are transported back to the nucleus where second strand synthesis is completed and the ends of both strands are ligated, leading to amplification of the pool of cccDNA. Another fraction of the capsids binds to viral envelope proteins that have been independently translated and translocated to membranes of endoplasmic reticulum (ER)-like structures. Following binding, the enveloped capsids bud into the lumen of the ER and exit the cell as infectious virions to initiate new cycles of infection.

Thus, the HBV core protein and the related capsids are essential components and regulators of the HBV life cycle. The full-length core protein Cp183, or its N-terminal domain Cp149, predominantly assembles into a T=4 icosahedral capsids. Due to its critical roles in capsid assembly, pregenomic RNA packaging, and cccDNA maintenance, it is not surprising that the HBV core protein and the related capsids have been widely recognized as attractive antiviral targets (Durantel D, Zoulim F; J Hepatol. 2016 April; 64(1 Suppl):S117-S131).

According to World Health Organization (WHO) statistics, HBV infection is one of the major medical scourges of our time. As a sexually transmitted disease that is also transferred by intravenous drug abuse and from mother to infant at birth, over one third of the world's population has been infected by HBV at some point in their lives (Burns G S, Thompson A J; Cold Spring Harb Perspect Med. 2014 Oct. 30; 4(12)). While most of these people have successfully cleared the virus, more than 250 million people remain persistently infected and almost 900,000 of these individuals die annually from the complications of chronic infection (i.e. cirrhosis and/or hepatocellular carcinoma). HBV infection is highly endemic in sub-Saharan Africa, the Pacific, and particularly Asia. Regions with high rates of chronic HBV infection also include the Middle East, the Indian subcontinent, areas of South and Central America, and the southern parts of Eastern and Central Europe. In recent years the number of chronic carriers has increased steadily in the western world as well, mostly because of the influx of immigrants from endemic areas. Additionally, HBV acts as a helper virus to hepatitis delta virus (HDV) and it should be noted that the more than 15 million people co-infected with HBV and HDV have an increased risk of rapid progression to cirrhosis and hepatic decompensation (Hughes, S. A. et al. Lancet 2011, 378, 73-85).

Well-tolerated vaccines that elicit neutralizing antibodies to HBsAg efficiently prevent de novo HBV infection, but have no therapeutic potential for the millions of people that are already persistently infected (Zoulim, Durantel D; Cold Spring Harb Perspect Med. 2015 Apr. 1; 5(4)). Therapy for these individuals mainly relies on direct acting antiviral (DAA) drugs (e.g. tenofovir, lamivudine, adefovir, entecavir or telbivudine) that suppress virus production but do not eradicate HBV from the liver, requiring lifelong treatment. Cohorts of patients still receive a therapy based on pegylated interferon-α (PEG-IFN-α), which has the advantages of limited treatment duration and higher rates of HBsAg seroconversion but the relevant disadvantage of greater adverse effects. As such, the number of patients receiving PEG-IFN-α is progressively decreasing.

Different chemical classes of inhibitors targeting the encapsidation process of HBV (also termed capsid assembly modulators or CAMs) are under development, and they include heteroaryldihydropyrimidines (HAPs) and sulfamoylbenzamides (SBAs). For instance, Novira Therapeutics recently utilized a humanized mouse model of HBV infection to show that a combination of CAM and PEG-IFN-α has higher antiviral activity than that previously observed with DAAs. NVR3-778, the first member of this class of CAM, in Phase 1b proof-of-concept clinical studies showed both significant reduction in HBV DNA and serum HBV RNA. This compound was recently discontinued. The compound JNJ-56136379 (or JNJ-6379), developed by Janssen, has recently demonstrated potent antiviral activity and is now entering into Phase 2 clinical trial.

WO2013/006394, published on Jan. 10, 2013, relates to a subclass of sulfamoyl-arylamides having general formula A, useful for the treatment of Hepatitis B virus (HBV) infection:

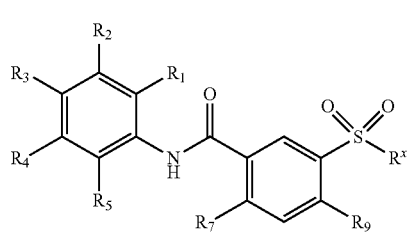

(A)

WO2013/096744, published on Jun. 26, 2013 relates to sulfamoyl-arylamides of formula B active against HBV:

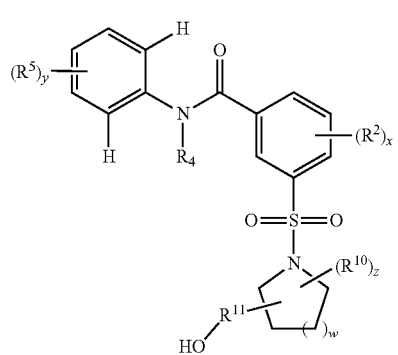

(B)

WO2014/106019, published on Jul. 3, 2014, relates to compounds of formula C, useful as nucleocapsid assembly inhibitors for the treatment of viruses, especially but not exclusively, including pregenomic RNA encapsidation inhibitors of HBV for the treatment of Hepatitis B virus (HBV) infection and related conditions:

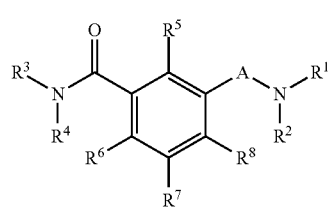

(C)

WO2014/165128, published on Oct. 9, 2014, WO2015/109130 published on Jul. 23, 2015, US2015274652, published on Oct. 1, 2015, all relate to sulfamoyl-arylamides compounds active against HBV.

WO2015/120178, published on Aug. 13, 2015, relates to sulfamoyl-arylamides compounds used in combination therapy with peginterferon alfa-2a, or another interferon analog for the treatment of HBV infection.

WO2016/089990, published on Jun. 9, 2016, relates to sulfide alkyl and pyridyl reverse sulphonamide compounds for HBV treatment.

US2016185748, published on Jun. 30, 2016, relates to pyridyl reverse sulfonamides for HBV treatment.

US2016151375, published on Jun. 2, 2016 relates to sulfide alkyl compounds for HBV treatment. WO2017/001655A1, published on Jan. 5, 2017, relates to cyclized sulfamoylarylamide derivatives having structure:

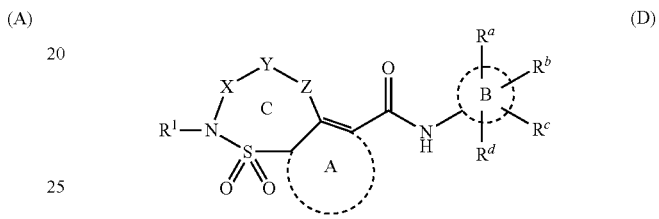

(D)

Amongst the problems which HBV direct antivirals may encounter are toxicity, mutagenicity, lack of selectivity, poor efficacy, poor bioavailability, low solubility and/or off-target activity, and to date no compounds in any of the structural classes identified above have been approved as drugs for the treatment of HBV patients.

There is a need for additional HBV inhibitors that may overcome at least one of these disadvantages or that have additional advantages such as increased potency, increased bioavailability or an increased safety window.

SUMMARY OF THE INVENTION

The present invention provides small molecule drugs obtained through chemical modification of the known sulfamoyl arylamides derivatives. In particular the compounds of the invention are characterized by a fused tricyclic core structure comprising a pyrrole ring, bearing an oxalamide substituent on a specific position of the fused tricyclic core. The chemotype discovered in the present invention results in extremely potent HBV inhibitors with improved pharmacokinetic properties, good kinetic solubility, stability in mouse and human hepatocytes, low in vivo clearance and positive liver-to-plasma concentration. Given the liver's key role in metabolic regulation and the fact that it is the principal tissue affected by hepatitis B disease, designing HBV inhibitors with hepatoselective distribution profiles is an important strategy in developing safe drug candidates (Tu M. et al., Current Topics in Medicinal Chemistry, 2013, 13, 857-866). The compounds of the invention are further endowed by pan-genotypic activity thus showing minimal variation in anti-HBV activity across genotypes A-E and are active against wild-type HBV and against several variants that may be resistant to other CAMs.

DETAILED DESCRIPTION OF THE INVENTION

The compounds of this invention are inhibitors of hepatitis B virus (HBV).

It is therefore an object of the present invention a compound of general formula (I):

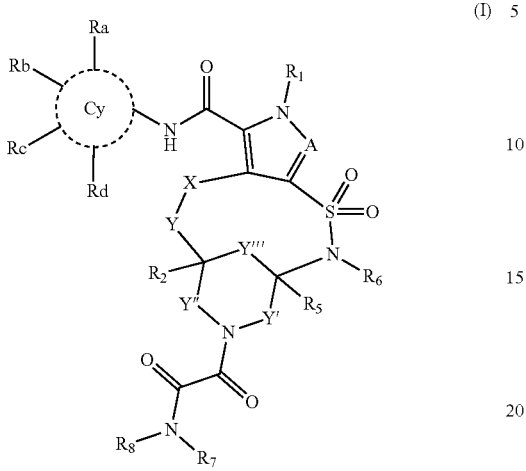

(I)

wherein:
Cy is aryl or heteroaryl;
A is C—$R_3$ or N;
X is O, S, NH, SO, $SO_2$ or a single bond;
Y, Y', Y" and Y'" are each independently $C_{1-6}$alkanediyl or $C_{2-7}$alkenediyl, each optionally substituted with one or more $R_4$, or a single bond;
$R_1$ is H or $C_{1-6}$alkyl;
$R_2$ is selected from H, OH, halogen and $C_{1-6}$alkyl;
$R_3$ is selected from H, $C_{1-6}$alkyl, $C_{3-8}$cycloalkyl, halo$C_{1-6}$alkyl and halogen;
$R_4$ is selected from H, OH, $C_{1-6}$alkyl, $C_{3-8}$cycloalkyl and halogen or two geminal $R_4$ form together with the atom to which they are attached a spiro-$C_{3-8}$cycloalkyl or a spiro-$C_{3-8}$heterocycloalkyl;
$R_5$ is H or $C_{1-6}$alkyl;
or $R_2$ and $R_5$ taken together form a $C_{1-6}$alkanediyl bridge;
$R_6$ is selected from H, $C_{1-6}$alkyl, $C_{3-8}$cycloalkyl, $C_{3-8}$heterocycloalkyl, $C_{1-6}$alkylaryl, $C_{1-6}$alkylheteroaryl and $C_{1-6}$alkyl-$C_{3-8}$cycloalkyl wherein each of said $C_{1-6}$alkyl, $C_{3-8}$cycloalkyl, $C_{3-8}$heterocycloalkyl, $C_{1-6}$alkylaryl, $C_{1-6}$alkylheteroaryl or $C_{1-6}$alkyl-$C_{3-8}$cycloalkyl is optionally substituted with one or more substituents each independently selected from: OH, halogen, halo$C_{1-6}$alkyl, cyano and $NH_2$;
each of $R_7$ and $R_8$ are independently selected from:
hydrogen;
$C_{1-12}$alkyl optionally substituted with one or more substituents each independently selected from the group consisting of: OH, halogen, CN, $NH_2$, $NH(R_9)$, $N(R_9)_2$, halo$C_{1-6}$alkyl, aryl, heteroaryl, 3-7 membered saturated ring and 5-7 membered partially saturated ring, each of said saturated or partially saturated ring optionally containing one or more heteroatoms selected from the group consisting of O, N and S and each of said aryl, heteroaryl, 3-7 membered saturated ring or 5-7 membered partially saturated ring being optionally substituted with one or more substituents each independently selected from: OH, halogen, $C_{1-6}$alkyl, halo$C_{1-6}$alkyl, CN, halo$C_{1-6}$alkoxy and $C_{1-6}$alkoxy;
aryl or heteroaryl, each of said aryl or heteroaryl being optionally substituted with one or more substituents each independently selected from: OH, halogen, halo$C_{1-6}$alkyl, CN, halo$C_{1-6}$alkoxy and $C_{1-6}$alkoxy; and
a 3-8 membered saturated or partially saturated cyclic or bicyclic ring optionally containing one or more heteroatoms each independently selected from the group consisting of: O, S and N, the 3-8 membered saturated or partially saturated cyclic or bicyclic ring being optionally substituted with one, two or more substituents each independently selected from the group consisting of: OH, halogen, CN, $C_{1-6}$alkyl, hydroxy$C_{1-6}$alkyl, C(O)O$R_9$, C(O)$R_9$, halo$C_{1-6}$alkyl, halo$C_{1-6}$alkoxy and $C_{1-6}$alkoxy;
or $R_7$ and $R_8$ form together with the nitrogen atom to which they are attached a cyclic amine selected from: aziridine, azetidine, pyrrolidine, piperidine, azepane, morpholine, thiomorpholine and piperazine each of said cyclic amine being optionally substituted with one or more substituents each independently selected from the group consisting of: OH, halogen, CN, $C_{1-6}$alkyl, hydroxy$C_{1-6}$alkyl, halo$C_{1-6}$alkyl, halo$C_{1-6}$alkoxy and $C_{1-6}$alkoxy;
Ra, Rb, Rc and Rd are each independently selected from the group consisting of: hydrogen, halogen, CN, $C_{1-6}$alkyl, $C_{1-6}$alkoxy, halo$C_{1-6}$alkoxy, C(O)O$R_9$, C(O)$R_9$, $NH_2$, $NH(R_9)$, $N(R_9)_2$, C(O)N$(R_9)_2$, $SO_2N(R_9)_2$, NHCON$(R_9)_2$;
each $R_9$ is independently selected from H, $C_{1-6}$alkyl, $C_{1-6}$alkylaryl, $C_{1-6}$alkylheteroaryl and $C_{1-6}$alkyl-$C_{3-8}$cycloalkyl;
or a pharmaceutically acceptable salt, tautomer, solvate or stereoisomer thereof.

In a particular embodiment, $R_2$ is selected from H, OH and $C_{1-6}$alkyl; Ra, Rb, Rc and Rd are each independently selected from the group consisting of: hydrogen, halogen, CN, $C_{1-6}$alkyl, $C_{1-6}$alkoxy, halo$C_{1-6}$alkoxy, C(O)O$R_9$, C(O)$R_9$, $NH_2$, $NH(R_9)$ and $N(R_9)_2$; and each $R_9$ is independently selected from $C_{1-6}$alkyl, $C_{1-6}$alkylaryl, $C_{1-6}$alkylheteroaryl and $C_{1-6}$alkyl-$C_{3-8}$cycloalkyl.

Preferably, Cy is aryl. Preferably, X is O or S. Preferably, Y is methanediyl, Y' and Y" are methanediyl or ethanediyl and Y'" is a single bond.

Preferably, $R_2$ is H, $C_{1-6}$alkyl or OH and $R_3$ is H or $C_{1-6}$alkyl or halogen.

In one embodiment, the invention relates to compounds of Formula (I-A):

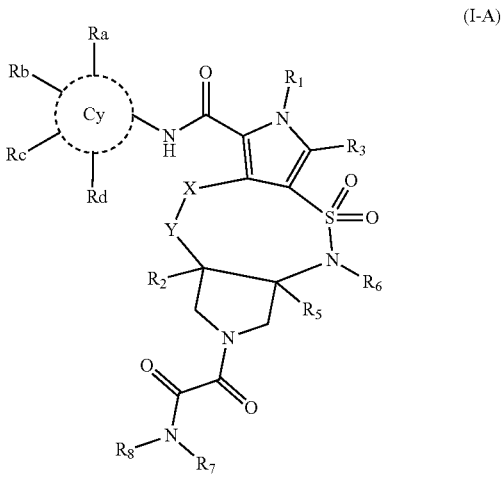

(I-A)

or Formula (I-B):

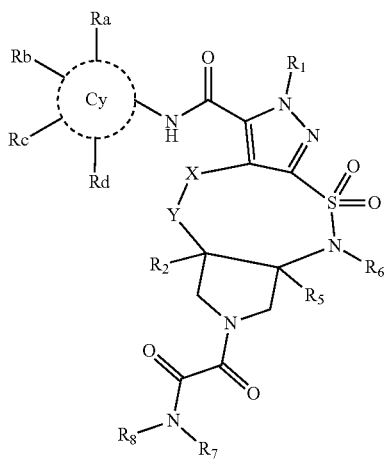
(I-B)

or a pharmaceutically acceptable salt, tautomer, solvate or stereoisomer thereof. In particular, in Formula I-A, $R_2$ is H or $C_{1-6}$alkyl; $R_3$ is H, $C_{1-6}$alkyl or halogen and the remaining substituents are as defined above.

In a preferred embodiment, compounds of the invention have Formula (II-A), (III-A) or (III-B):

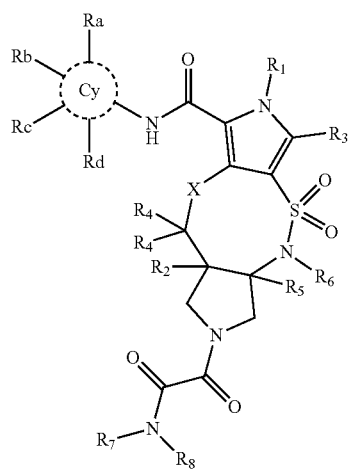
(II-A)

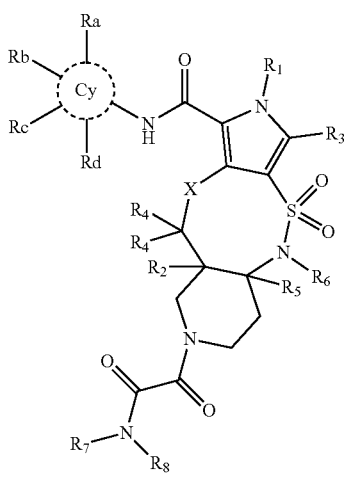
(III-A)

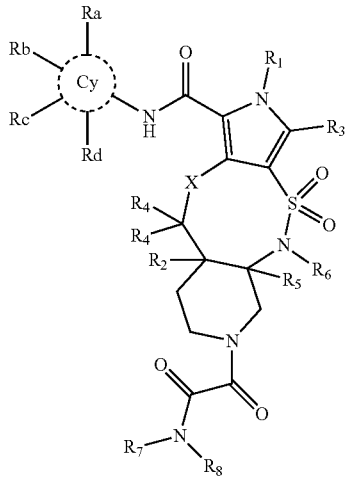
(III-B)

wherein:
X is O, S, NH, SO, $SO_2$;
$R_2$ is H, $C_{1-6}$alkyl or OH;
$R_3$ is H, $C_{1-6}$alkyl or halogen;
each $R_4$ is independently selected from H, OH, $C_{1-6}$alkyl, $C_{3-8}$cycloalkyl and halogen or two $R_4$ form together with the atom to which they are attached a spiro-$C_{3-8}$cycloalkyl or a spiro-$C_{3-8}$heterocycloalkyl;
the remaining substituents being as defined above;
or a pharmaceutically acceptable salt, tautomer, solvate or stereoisomer thereof.

An additional embodiment of the present invention relates to compounds of Formula (II-B):

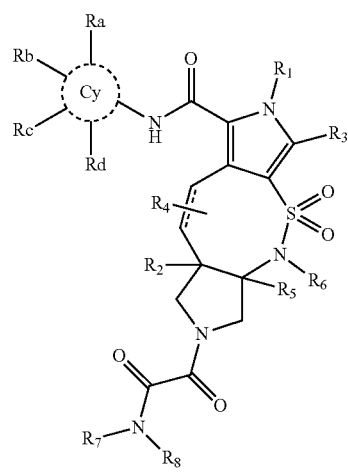
(II-B)

wherein:
===== represents a single or double bond;
$R_2$ is H or $C_{1-6}$alkyl;
$R_3$ is H, $C_{1-6}$alkyl or halogen;
or a pharmaceutically acceptable salt, tautomer, solvate or stereoisomer thereof.

In a further preferred embodiment in the compounds of Formula (I), Formula (I-A), Formula (I-B), Formula (II-A), Formula (II-B), Formula (III-A), Formula (III-B), or in the pharmaceutically acceptable salts, tautomers, solvates or stereoisomers thereof, Cy is phenyl, $R_1$ is $CH_3$, $R_3$ is H, methyl, chlorine or bromine, $R_5$ is hydrogen or methyl and $R_6$ is hydrogen.

Another embodiment of the present invention relates to those compounds of Formula (I), Formula (I-A), Formula (I-B), Formula (II-A), Formula (II-B), Formula (III-A), Formula (III-B), or to the pharmaceutically acceptable salts, tautomers, solvates or stereoisomers thereof, wherein:

$R_7$ is selected from the group consisting of hydrogen, methyl, ethyl, isopropyl, tert-butyl, cyclopropyl, cyclobutyl,

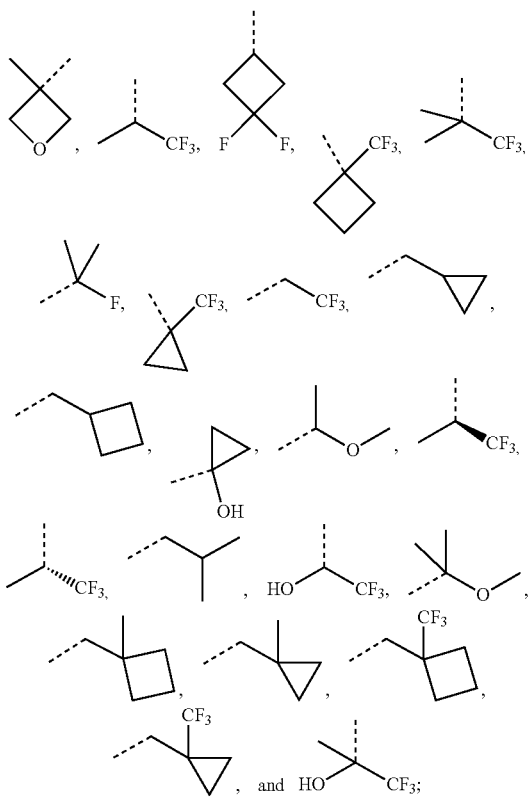

and/or $R_8$ is selected from the group consisting of hydrogen, methyl, ethyl, isopropyl, tert-butyl, cyclopropyl, cyclobutyl

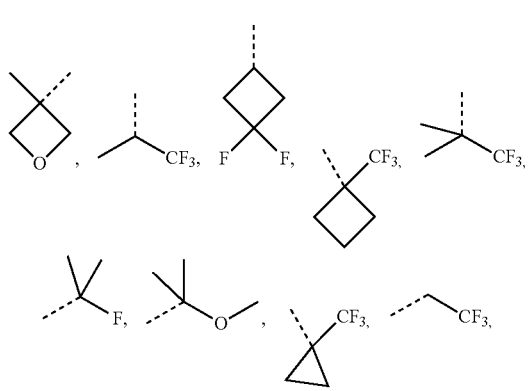

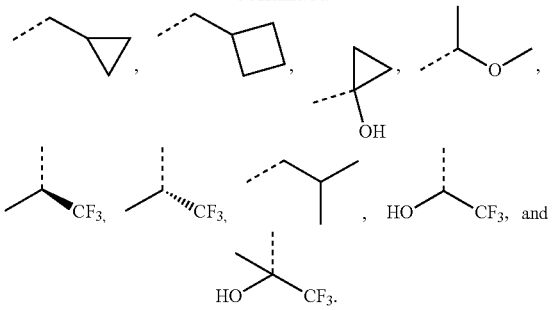

Preferably, in any of the compounds of formula (I), (I-A), (I-B), (II-A), (II-B), (III-A) or (III-B), or in the pharmaceutically acceptable salts, tautomers, solvates or stereoisomers thereof as defined above, Cy is aryl (in particular phenyl).

Preferably, in any of the compounds of formula (I), or in the pharmaceutically acceptable salts, tautomers, solvates or stereoisomers thereof as defined above, A is C—$R_3$.

Preferably, in any of the compounds of formula (I), (I-A), (I-B), (II-A), (III-A) or (III-B) or in the pharmaceutically acceptable salts, tautomers, solvates or stereoisomers thereof as defined above X is O or S.

Preferably, in any of the compounds of formula (I), (I-A) or (I-B), or in the pharmaceutically acceptable salts, tautomers, solvates or stereoisomers thereof as defined above Y is $C_{1-6}$alkanediyl (in particular methanediyl).

Preferably, in any of the compounds of formula (I) or in the pharmaceutically acceptable salts, tautomers, solvates or stereoisomers thereof as defined above Y' and/or Y" is $C_{1-6}$alkanediyl (in particular methanediyl).

Preferably, in any of the compounds of formula (I) or in the pharmaceutically acceptable salts, tautomers, solvates or stereoisomers thereof as defined above Y''' is a single bond.

Preferably, in any of the compounds of formula (I), or in the pharmaceutically acceptable salts, tautomers, solvates or stereoisomers thereof as defined above Y, Y', Y" are $C_{1-6}$alkanediyl (in particular methanediyl) and Y''' is a single bond.

Preferably, in any of the compounds of formula (I), (I-A), (I-B), (II-A), (II-B), (III-A) or (III-B) or in the pharmaceutically acceptable salts, tautomers, solvates or stereoisomers thereof as defined above, $R_1$ is $C_{1-6}$alkyl (in particular methyl).

Preferably, in any of the compounds of formula (I), (I-A), (I-B), (II-A), (II-B), (III-A) or (III-B) or in the pharmaceutically acceptable salts, tautomers, solvates or stereoisomers thereof as defined above, $R_2$ is H or $C_{1-6}$alkyl (in particular methyl).

Preferably, in any of the compounds of formula (I), (I-A), (II-A), (II-B), (III-A) or (III-B) or in the pharmaceutically acceptable salts, tautomers, solvates or stereoisomers thereof as defined above $R_3$ is H, methyl, bromine, fluorine or chlorine, more preferably $R_3$ is H, methyl or chlorine.

Preferably, in any of the compounds of formula (I), (I-A), (II-A), (II-B), (III-A) or (III-B) or in the pharmaceutically acceptable salts, tautomers, solvates or stereoisomers thereof as defined above $R_5$ is H or $C_{1-6}$alkyl (in particular methyl);

Preferably, in any of the compounds of formula (I), (I-A), (II-A), (II-B), (III-A) or (III-B) or in the pharmaceutically acceptable salts, tautomers, solvates or stereoisomers thereof as defined above $R_6$ is H.

Preferably, in any of the compounds of formula (I), (I-A), (II-A), (II-B), (III-A) or (III-B) or in the pharmaceutically acceptable salts, tautomers, solvates or stereoisomers thereof as defined above R$_7$ and R$_8$ are independently selected from:
hydrogen,
- C$_{1-12}$alkyl (in particular C$_{1-4}$alkyl, preferably methyl, ethyl, i-propyl, t-butyl or i-butyl) optionally substituted with one or more substituents each independently selected from: halogen (in particular fluorine), haloC$_{1-6}$alkyl (in particular trifluoromethyl) and 3-7 membered saturated ring optionally containing an oxygen atom (in particular oxetanyl, cyclopropyl or cyclobutyl), and
- 3-8 membered saturated or partially unsaturated cyclic or bicyclic ring optionally containing an oxygen atom (in particular oxetanyl, cyclopropyl or cyclobutyl) optionally substituted with one or more substituents each independently selected from: C$_{1-6}$alkyl (in particular methyl), halogen (in particular fluorine) and haloC$_{1-6}$alkyl (in particular trifluoromethyl), or R$_7$ and R$_8$ form together with the nitrogen atom to which they are attached an azetidine optionally substituted with one or more halogens (in particular fluorine).

Preferably, in any of the compounds, pharmaceutically acceptable salts, tautomers, solvates or stereoisomers thereof as defined above, Ra, Rb, Rc, and Rd are each independently selected from the group consisting of: hydrogen, halogen (in particular fluorine or chlorine), C$_{1-6}$alkyl (in particular methyl) and CN.

In a preferred embodiment, the present invention provides a compound of general formula (I) as defined above, wherein:
Cy is aryl (in particular phenyl);
A is C—R$_3$;
X is O or S;
Y, Y', Y'' are C$_{1-6}$alkanediyl (in particular methanediyl);
Y''' is a single bond;
R$_1$ is C$_{1-6}$alkyl (in particular methyl);
R$_2$ is H or C$_{1-6}$alkyl (in particular methyl);
R$_3$ is H, methyl or chlorine;
R$_5$ is H or C$_{1-6}$alkyl (in particular methyl);
R$_6$ is H;
R$_7$ and R$_8$ are independently selected from:
hydrogen,
- C$_{1-12}$alkyl (in particular C$_{1-4}$alkyl, preferably methyl, ethyl, i-propyl, t-butyl or i-butyl) optionally substituted with one or more substituents each independently selected from: halogen (in particular fluorine), haloC$_{1-6}$alkyl (in particular trifluoromethyl) and 3-7 membered saturated ring optionally containing an oxygen atom (in particular oxetanyl, cyclopropyl or cyclobutyl), and
- 3-8 membered saturated or partially unsaturated cyclic or bicyclic ring optionally containing an oxygen atom (in particular oxetanyl, cyclopropyl or cyclobutyl) optionally substituted with one or more substituents each independently selected from: C$_{1-6}$alkyl (in particular methyl), halogen (in particular fluorine) and haloC$_{1-6}$alkyl (in particular trifluoromethyl), or R$_7$ and R$_8$ form together with the nitrogen atom to which they are attached an azetidine optionally substituted with one or more halogens (in particular fluorine);
Ra, Rb, Rc, and Rd are each independently selected from the group consisting of: hydrogen, halogen (in particular fluorine or chlorine), C$_{1-6}$alkyl (in particular methyl), haloC$_{1-6}$alkyl (in particular CF$_3$ or CHF$_2$) and CN.

Still preferably the compounds of the invention are selected from the group consisting of:
cis-2-(2-(dimethylamino)-2-oxoacetyl)-7-methyl-N-(3,4,5-trifluorophenyl)-2,3,3a,4,10,10a-hexahydro-1H,7H-dipyrrolo[3,4-b:3',4'-f][1,4,5]oxathiazocine-8-carboxamide 5,5-dioxide;

cis-N-(4-fluoro-3-methylphenyl)-7-methyl-2-(2-((3-methyloxetan-3-yl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-7-methyl-2-(2-((3-methyloxetan-3-yl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-7-methyl-2-(2-((3-methyloxetan-3-yl)amino)-2-oxoacetyl)-N-(3,4,5-trifluorophenyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(3-chloro-4-fluorophenyl)-7-methyl-2-(2-((3-methyloxetan-3-yl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(3-cyano-4-fluorophenyl)-7-methyl-2-(2-((3-methyloxetan-3-yl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-2-(2-(tert-butylamino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-2-(2-(cyclopropylamino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

cis N-(4-fluoro-3-methylphenyl)-7-methyl-2-(2-(methylamino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide;

cis-2-(2-amino-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide;

cis-7-methyl-2-(2-(methylamino)-2-oxoacetyl)-N-(3,4,5-trifluorophenyl)-2,3,3a,4,10,10a-hexahydro-1H,7H-dipyrrolo[3,4-b:3',4'-f][1,4,5]oxathiazocine-8-carboxamide 5,5-dioxide;

cis-2-(2-amino-2-oxoacetyl)-7-methyl-N-(3,4,5-trifluorophenyl)-2,3,3a,4,10,10a-hexahydro-1H,7H-dipyrrolo[3,4-b:3',4'-f][1,4,5]oxathiazocine-8-carb oxamide 5,5-dioxide;

(3aR,10aR)-2-(2-((3,3-difluorocyclobutyl)amino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-7-methyl-2-(2-oxo-2-(((S)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-2-(2-(isobutylamino)-2-oxoacetyl)-7-methyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-7-methyl-2-(2-oxo-2-((2,2,2-trifluoroethyl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-7-methyl-2-(2-((1-methylcyclopropyl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-7-methyl-2-(2-oxo-2-((1-(trifluoromethyl)cyclopropyl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-2-(2-((cyclopropylmethyl)amino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-2-(2-(isopropylamino)-2-oxoacetyl)-7-methyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-2-(2-(cyclobutylamino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-2-(2-(cyclopropylamino)-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide;

(3aR,10aR)—N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-c:3',4'-g][1,6,2]dithiazocine-8-carboxamide 5,5-dioxide;

cis-2-(2-(cyclopropylamino)-2-oxoacetyl)-N-(4-fluoro-3-methylphenyl)-7,10a-dimethyl-2,3,3a,4,10,10a-hexahydro-1H,7H-dipyrrolo[3,4-b:3',4'-f][1,4,5]oxathiazocine-8-carboxamide 5,5-dioxide;

cis-N-(4-fluoro-3-methylphenyl)-7,10a-dimethyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

cis-N-(4-fluoro-3-methylphenyl)-3a,7-dimethyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

cis-2-(2-(cyclopropylamino)-2-oxoacetyl)-N-(4-fluoro-3-methylphenyl)-3a,7-dimethyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-2-(2-(3,3-difluoroazetidin-1-yl)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide;

Trans-N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

Trans-2-(2-(cyclopropylamino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-7-methyl-2-(2-oxo-2-((1,1,1-trifluoro-2-methylpropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-7-methyl-2-(2-oxo-2-((1-(trifluoromethyl)cyclobutyl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-2-(2-amino-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide;

(3aR,10aR)—N-(4-fluoro-3-methylphenyl)-7-methyl-2-(2-(methylamino)-2-oxoacetyl)-2,3,3a,4,10,10a-hexahydro-1H,7H-dipyrrolo[3,4-c:3',4'-g][1,6,2]dithiazocine-8-carboxamide 5,5-dioxide;

(3aR,10aR)-2-(2-(3,3-difluoroazetidin-1-yl)-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide;

(3aR,10aR)—N-(4-fluoro-3-methylphenyl)-7-methyl-2-(2-oxo-2-(((S)-1,1,1-trifluoropropan-2-yl)amino)acetyl)-2,3,3a,4,10,10a-hexahydro-1H,7H-dipyrrolo[3,4-c:3',4'-g][1,6,2]dithiazocine-8-carboxamide 5,5-dioxide;

(3aR,10aR)—N-(4-fluoro-3-methylphenyl)-7-methyl-2-(2-oxo-2-((2,2,2-trifluoroethyl)amino)acetyl)-2,3,3a,4,10,10a-hexahydro-1H,7H-dipyrrolo[3,4-c:3',4'-g][1,6,2]dithiazocine-8-carboxamide 5,5-dioxide;

(3aR,10aR)-2-(2-((cyclopropylmethyl)amino)-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide;

(3aR,10aR)—N-(4-fluoro-3-methylphenyl)-7-methyl-2-(2-((1-methylcyclopropyl)amino)-2-oxoacetyl)-2,3,3a,4,10,10a-hexahydro-1H,7H-dipyrrolo[3,4-c:3',4'-g][1,6,2]dithiazocine-8-carboxamide 5,5-dioxide;

(3aR,10aR)-2-(2-((3,3-difluorocyclobutyl)amino)-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide;

(3aR,10aR)—N-(4-fluoro-3-methylphenyl)-7-methyl-2-(2-((3-methyloxetan-3-yl)amino)-2-oxoacetyl)-2,3,3a,4,10,10a-hexahydro-1H,7H-dipyrrolo[3,4-c:3',4'-g][1,6,2]dithiazocine-8-carboxamide 5,5-dioxide;

(3aR,10aR)—N-(3-chloro-4-fluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(3,4-difluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3%4'-f][1,4,5]oxathiazocine-8-carboxamide 5,5-dioxide;

(3aR,10aR)—N-(3-(difluoromethyl)-4-fluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-(trifluoromethyl)phenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-6-chloro-N-(3-chloro-4-fluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-6-chloro-N-(3,4-difluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-6-chloro-N-(3-(difluoromethyl)-4-fluorophenyl)-7-methyl-2-(2-oxo-2-(((R)-1,1,1-trifluoropropan-2- yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-6-chloro-N-(4-fluoro-3-(trifluoromethyl)phenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-6-chloro-N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-6-bromo-N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-6,7-dimethyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

trans-8-(2-(cyclopropylamino)-2-oxoacetyl)-N-(4-fluoro-3-methylphenyl)-2-methyl-5,5a,6,7,8,9,9a,10-octahydro-2H-pyrido[4,3-f]pyrrolo[3,4-b][1,4,5]oxathiazocine-1-carboxamide 4,4-dioxide;

trans-8-(2-(3,3-difluoroazetidin-1-yl)-2-oxoacetyl)-N-(4-fluoro-3-methylphenyl)-2-methyl-5,5a,6,7,8,9,9a,10-octahydro-2H-pyrido[4,3-f]pyrrolo[3,4-b][1,4,5]oxathiazocine-1-carboxamide 4,4-dioxide;

trans-N-(4-fluoro-3-methylphenyl)-2-methyl-8-(2-oxo-2-(((S)-1,1,1-trifluoropropan-2-yl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide;

trans-N-(4-fluoro-3-methylphenyl)-2-methyl-8-(2-oxo-2-((2,2,2-trifluoroethyl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide;

trans-N-(4-fluoro-3-methylphenyl)-2-methyl-8-(2-oxo-2-((1,1,1-trifluoro-2-methylpropan-2-yl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide;

trans-N-(4-fluoro-3-methylphenyl)-2-methyl-8-(2-oxo-2-(((R)-1,1,1-trifluoropropan-2-yl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide;

cis-N-(4-fluoro-3-methylphenyl)-2-methyl-7-(2-oxo-2-(((R)-1,1,1-trifluoropropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide;

cis-N-(4-fluoro-3-methylphenyl)-2-methyl-7-(2-oxo-2-((2,2,2-trifluoroethyl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide;

cis-N-(4-fluoro-3-methylphenyl)-2-methyl-7-(2-oxo-2-((1,1,1-trifluoro-2-methylpropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide;

cis-7-(2-(3,3-difluoroazetidin-1-yl)-2-oxoacetyl)-N-(4-fluoro-3-methylphenyl)-2-methyl-5,5a,6,7,8,9,9a,10-octahydro-2H-pyrido[3,4-f]pyrrolo[3,4-b][1,4,5]oxathiazocine-1-carboxamide 4,4-dioxide;

cis-7-(2-(cyclopropylamino)-2-oxoacetyl)-N-(4-fluoro-3-methylphenyl)-2-methyl-5,5a,6,7,8,9,9a,10-octahydro-2H-pyrido[3,4-f]pyrrolo[3,4-b][1,4,5]oxathiazocine-1-carboxamide 4,4-dioxide;

cis-N-(4-fluoro-3-methylphenyl)-2-methyl-7-(2-oxo-2-(((S)-1,1,1-trifluoropropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide;

trans-N-(4-fluoro-3-methylphenyl)-2-methyl-7-(2-oxo-2-(((R)-1,1,1-trifluoropropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide;

trans-7-(2-(cyclopropylamino)-2-oxoacetyl)-N-(4-fluoro-3-methylphenyl)-2-methyl-5,5a,6,7,8,9,9a,10-octahydro-2H-pyrido[3,4-f]pyrrolo[3,4-b][1,4,5]oxathiazocine-1-carboxamide 4,4-dioxide;

trans-N-(4-fluoro-3-methylphenyl)-2-methyl-7-(2-oxo-2-((2,2,2-trifluoroethyl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide;

trans-N-(4-fluoro-3-methylphenyl)-2-methyl-7-(2-oxo-2-((1,1,1-trifluoro-2-methylpropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide;

trans-7-(2-(3,3-difluoroazetidin-1-yl)-2-oxoacetyl)-N-(4-fluoro-3-methylphenyl)-2-methyl-5,5a,6,7,8,9,9a,10-octahydro-2H-pyrido[3,4-f]pyrrolo[3,4-b][1,4,5]oxathiazocine-1-carboxamide 4,4-dioxide;

trans-N-(4-fluoro-3-methylphenyl)-2-methyl-7-(2-oxo-2-(((S)-1,1,1-trifluoropropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide;

cis-N-(4-fluoro-3-methylphenyl)-2-methyl-8-(2-oxo-2-(((R)-1,1,1-trifluoropropan-2-yl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide;

cis-N-(4-fluoro-3-methylphenyl)-2-methyl-8-(2-oxo-2-((2,2,2-trifluoroethyl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide;

(3aR,10aR)—N-(4-fluoro-3-methylphenyl)-7,10a-dimethyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide; and (3aS,10aS)—N-(4-fluoro-3-methylphenyl)-10a-hydroxy-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

or a pharmaceutically acceptable salt, tautomer, solvate or stereoisomer thereof.

Preferably, the compound or the pharmaceutically acceptable salt, tautomer, solvate, or stereoisomer thereof as defined above is for medical use. Still preferably, the compound or the pharmaceutically acceptable salt, tautomer, solvate, or stereoisomer thereof as defined above is for use in the treatment and/or prevention of an HBV infection and/or a condition related to an HBV infection. Preferably, said condition related to an HBV infection is selected from the group consisting of: chronic hepatitis B, HBV/HDV co-infection, HBV/HCV co-infection, HBV/HIV co-infection, inflammation, necrosis, cirrhosis, hepatocellular carcinoma, hepatic decompensation and hepatic injury from an HBV infection.

Even more preferably, the compound or the pharmaceutically acceptable salt, tautomer, solvate, or stereoisomer thereof as defined above is for use in treating, eradicating, reducing, slowing or inhibiting an HBV infection in an individual in need thereof, and/or in reducing the viral load associated with an HBV infection in an individual in need thereof, and/or in reducing reoccurrence of an HBV infection in an individual in need thereof, and/or in inducing remission of hepatic injury from an HBV infection in an individual in need thereof, and/or in prophylactically treating an HBV infection in an individual afflicted with a latent HBV infection.

Preferably, said HBV infection and/or condition related to an HBV infection is caused by HBV of any genotype, including genotype A, B, C, D or E, and/or said HBV infection or condition is caused by a drug-resistant HBV mutant or variant.

Preferred compounds exhibit an HBV inhibition greater than 50% at the test concentration (ranging from 1.0 micromolar to 0.1 micromolar) and/or an $EC_{50}$, as defined hereinafter, lower than 0.5 micromolar. HBV inhibition indicates inhibition of HBV expression and replication. The inhibition activity of the compounds of the invention can be measured as described hereinafter.

Preferably, the compounds of the invention target the HBV core protein and misdirect capsid assembly thus acting as capsid assembly modulators/inhibitors (CAMs) and causing the suppression of HBV replication and virion production.

Preferably, the compound or the pharmaceutically acceptable salt, tautomer, solvate, or stereoisomer thereof as defined above is for use in combination with at least one further therapeutic agent. Preferably, said use in combination comprises the administration of at least one further therapeutic agent.

It is an object of the invention a pharmaceutical composition comprising the compound or the pharmaceutically acceptable salt, tautomer, solvate, or stereoisomer thereof as defined above, alone or in combination with at least one further therapeutic agent, and at least one pharmaceutically acceptable excipient.

Preferably, the at least one further therapeutic agent is selected from the group consisting of: a therapeutic vaccine; an RNA interference therapeutic/anti sense oligonucleotide; an immunomodulator; a STING agonist; a RIG-I modulator; a NKT modulator; an IL agonist; an interleukin or another immune acting protein; a therapeutic and prophylactic vaccine; an immune checkpoint modulator/inhibitor; an HBV entry inhibitor; a cccDNA modulator; an inhibitor of HBV protein expression; an agent targeting HBV RNA; a capsid assembly inhibitor/modulator; a core or X protein targeting agent; a nucleotide analogue; a nucleoside analogue; an interferon or a modified interferon; an HBV antiviral of distinct or unknown mechanism; a cyclophilin inhibitor; a sAg release inhibitor; an HBV polymerase inhibitor; a dinucleotide; a SMAC inhibitor; a HDV targeting agent; a viral maturation inhibitor; a reverse transcriptase inhibitor; an HBV RNA destabilizer or another small-molecule inhibitor of HBV protein expression or a combination thereof.

Preferably, the therapeutic vaccine is selected from: HBsAG-HBIG, HB-Vac, ABX203, NASVAC, GS-4774, GX-110 (HB-110E), CVI-HBV-002, RG7944 (INO-1800), TG-1050, FP-02 (Hepsyn-B), AIC649, VGX-6200, KW-2, TomegaVax-HBV, ISA-204, NU-500, INX-102-00557, HBV MVA and PepTcell.

Preferably, the RNA interference therapeutic is a siRNA, a ddRNA or a shRNA. Preferably, the RNA interference therapeutic is selected from: TKM-HBV (ARB-1467), ARB-1740, ARC-520, ARC-521, BB—HB-331, REP-2139, ALN-HBV, ALN-PDL, LUNAR-HBV, GS3228836 and GS3389404.

Preferably, the immunomodulator is a TLR agonist. Preferably the TLR agonist is a TLR7, TLR8 or TLR9 agonist.

Preferably, the TLR7, TLR8 or TLR9 agonist is selected from: RG7795 (RO-6864018), GS-9620, SM360320 (9-benzyl-8-hydroxy-2-(2-methoxy-ethoxy)adenine), AZD 8848 (methyl [3-({[3-(6-amino-2-butoxy-8-oxo-7,8-dihydro-9H-pyrin-9-yl)propyl][3-(4-morpholinyl)propyl]amino}methyl)phenyl]acetate) and ARB-1598.

Preferably, the RIG-I modulator is SB-9200. Preferably, the IL agonist or other immune acting protein is INO-9112 or recombinant IL12. Preferably, the immune checkpoint modulator/inhibitor is BMS-936558 (Opdivo (nivolumab)) or pembrolizumab. Preferably, the HBV entry inhibitor is Myrcludex B, IVIG-Tonrol or GC-1102.

Preferably, the cccDNA modulator is selected from: a direct cccDNA inhibitor, an inhibitor of cccDNA formation or maintenance, a cccDNA epigenetic modifier and an inhibitor of cccDNA transcription.

Preferably, the capsid assembly inhibitor/modulator (CAM), core or X protein targeting agent, direct cccDNA inhibitor, inhibitor of cccDNA formation or maintenance, or cccDNA epigenetic modifier is selected from: BAY 41-4109, NVR 3-778, GLS-4, NZ-4 (W28F), Y101, ARB-423, ARB-199, ARB-596, AB-506, JNJ-56136379, ASMB-101 (AB-V102), ASMB-103, CHR-101, CC-31326, AT-130, EP-027367 and RO7049389.

Preferably, the interferon or modified interferon is selected from: interferon alpha (IFN-α), pegylated interferon alpha (PEG-IFN-α), interferon alpha-2a, recombinant interferon alpha-2a, peginterferon alpha-2a (Pegasys), interferon alpha-2b (Intron A), recombinant interferon alpha-2b, interferon alpha-2b XL, peginterferon alpha-2b, glycosylated interferon alpha-2b, interferon alpha-2c, recombinant interferon alpha-2c, interferon beta, interferon beta-1a, peginterferon beta-1a, interferon delta, interferon lambda (IFN-λ), peginterferon lambda-1, interferon omega, interferon tau, interferon gamma (IFN-γ), interferon alfacon-1, interferon alpha-n1, interferon alpha-n3, albinterferon alpha-2b, BLX-883, DA-3021, PI 101 (also known as AOP2014), PEG-infergen, Belerofon, INTEFEN-IFN, albumin/interferon alpha 2a fusion protein, rHSA-IFN alpha 2a, rHSA-IFN alpha 2b, PEG-IFN-SA and interferon alpha biobetter. Particularly preferred are: peginterferon alpha-2a, peginterferon alpha-2b, glycosylated interferon alpha-2b, peginterferon beta-1a, and peginterferon lambda-1. More particularly preferred is peginterferon alpha-2a.

Preferably, the HBV antiviral of distinct or unknown mechanism is selected from: AT-61 ((E)-N-(1-chloro-3-oxo-1-phenyl-3-(piperidin-1-yl)prop-1-en-2-yl)benzamide), AT130 ((E)-N-(1-bromo-1-(2-methoxyphenyl)-3-oxo-3-(piperidin-1-yl)prop-1-en-2-yl)-4-nitrobenzamide), analogues thereof, REP-9AC (REP-2055), REP-9AC' (REP-2139), REP-2165 and HBV-0259. Preferably, the cyclophilin inhibitor is selected from: OCB-030 (NVP-018), SCY-635, SCY-575 and CPI-431-32.

Preferably, said HBV polymerase inhibitor is selected from: entecavir (Baraclude, Entavir), lamivudine (3TC, Zeffix, Heptovir, Epivir, and Epivir-HBV), telbivudine (Tyzeka, Sebivo), clevudine, besifovir, adefovir (hepsera), tenofovir. Preferably, tenofovir is in a salt form.

Preferably, tenofovir is in a salt form selected from: tenofovir disoproxil fumarate (Viread), tenofovir alafenamide fumarate (TAF), tenofovir disoproxil orotate (DA-2802), tenofovir disopropxil aspartate (CKD-390), AGX-1009, and CMX157.

Preferably, the dinucleotide is SB9200. Preferably, the SMAC inhibitor is Birinapant. Preferably, the HDV targeting agent is Lonafamib.

Preferably, the HBV RNA destabilizer or other small-molecule inhibitor of HBV protein expression is RG7834 or AB-452.

Preferably, the at least one further therapeutic agent is an agent useful in the treatment and prevention of hepatitis B. Preferably, the at least one further therapeutic agent is an anti-HDV agent, an anti-HCV agent and/or an anti-HIV agent.

Preferably, the at least one further therapeutic agent is selected from the group consisting of: HBV polymerase inhibitor, interferon, viral entry inhibitor, BAY 41-4109, reverse transcriptase inhibitor, a TLR-agonist, AT-61 ((E)-N-(1-chloro-3-oxo-1-phenyl-3-(piperidin-1-yl)prop-1-en-2-yl)benzamide), AT-130 ((E)-N-(1-bromo-1-(2-methoxyphenyl)-3-oxo-3-(piperidin-1-yl)prop-1-en-2-yl)-4-nitrobenzamide), and a combination thereof, wherein the HBV polymerase inhibitor is preferably at least one of Lamivudine, Entecavir, Tenofovir, Adefovir, Telbivudine, Clevudine; and wherein the TLR agonist is preferably selected from the group consisting of SM360320 (9-benzyl-8-hydroxy-2-(2-methoxy-ethoxy)adenine), AZD 8848 (methyl [3-({[3-(6-amino-2-butoxy-8-oxo-7,8-dihydro-9H-purin-9-yl)propyl][3-(4-morpholinyl)propyl]amino}methyl)phenyl]acetate) and a combination thereof.

Any combination of the above mentioned further therapeutic agents is contemplated for use in the present invention.

Preferably, the compound of the invention is for use in combination with one, two or more further therapeutic agent(s) as defined above.

Preferably, the pharmaceutical composition of the invention comprises one, two or more further therapeutic agent(s) as defined above.

Preferably, said pharmaceutical composition is for use in the treatment and/or prevention of an HBV infection and/or a condition related to an HBV infection, said condition related to an HBV infection being preferably selected from the group consisting of: chronic hepatitis B, HBV/HDV co-infection, HBV/HCV co-infection, HBV/HIV co-infection, inflammation, necrosis, cirrhosis, hepatocellular carcinoma, hepatic decompensation and hepatic injury from an HBV infection. Even more preferably, said pharmaceutical composition is for use in treating, eradicating, reducing, slowing or inhibiting an HBV infection in an individual in need thereof, and/or in reducing the viral load associated with an HBV infection in an individual in need thereof, and/or in reducing reoccurrence of an HBV infection in an individual in need thereof, and/or in inducing remission of hepatic injury from an HBV infection in an individual in need thereof, and/or in prophylactically treating an HBV infection in an individual afflicted with a latent HBV infection. Preferably, in the pharmaceutical composition for use as defined above, said HBV infection and/or condition related to an HBV infection is caused by HBV of any genotype, including genotype A, B, C, D or E, and/or said HBV infection or condition is caused by a drug-resistant HBV mutant or variant.

In an embodiment, the invention provides a kit comprising at least one pharmaceutically acceptable vial or container containing one or more doses of a compound of the invention or of a pharmaceutical composition of the invention and optionally a) instructions for use thereof in mammals and/or b) an infusion bag or container containing a pharmaceutically acceptable diluent.

It is a further object of the invention a process for the synthesis of a compound of general formula (I), (I-A), (I-B), (II-A), (II-B), (III-A) or (III-B) according to the synthetic Schemes included in the description of the invention. In particular, the present invention provides a process for the synthesis of the compound of formula I or the pharmaceutically acceptable salt, tautomer, solvate or stereoisomer thereof as defined above, wherein A is C—$R_3$, Y' and Y" are both methanediyl, Y''' is a single bond, $R_1$ is methyl, $R_6$ is H, and Cy, X, Y, $R_2$, $R_5$, $R_7$, $R_8$, Ra, Rb, Rc and Rd are as defined above, said process comprising at least one of the following steps:

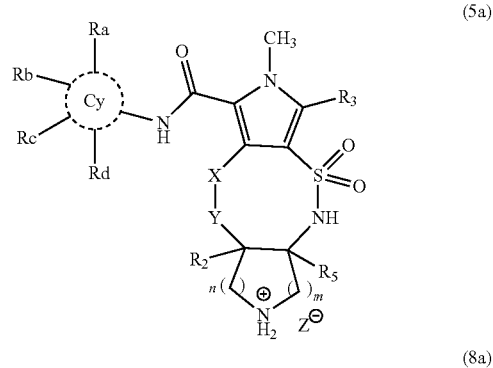

(5a)

(8a)

(8b)

reacting a compound of formula (5a), wherein m and n are each independently 1 or 2, with a compound of formula (8a) or with a compound of formula (8b);

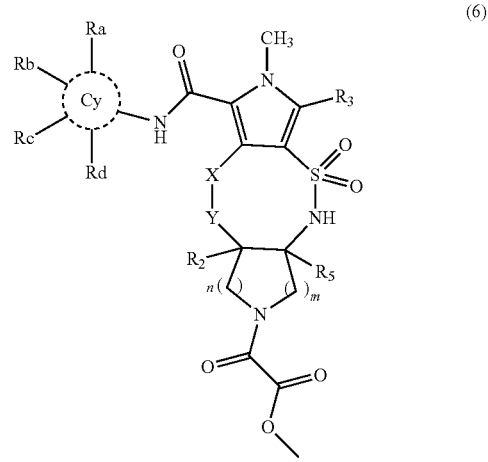

(6)

reacting a compound of formula (6), wherein m and n are each independently 1 or 2, with an amine of formula $NHR_7R_8$;

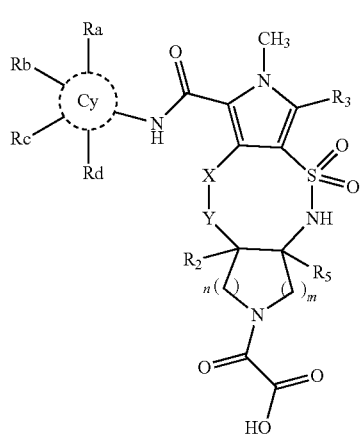

(7)

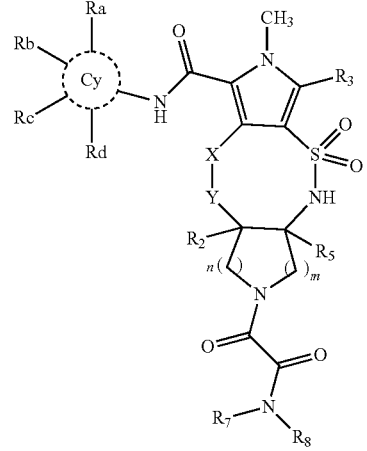

(9)

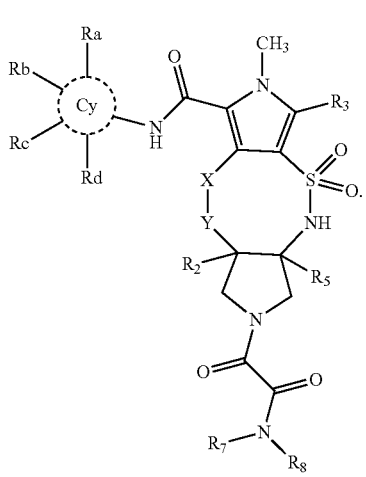

(9')

reacting a compound of formula (7), wherein m and n are each independently 1 or 2, with an amine of formula NHR$_7$R$_8$;

said process optionally further comprising at least one of the following steps:

reacting a compound of formula (5a) with methyl 2-chloro-2-oxoacetate to obtain a compound of formula (6);

hydrolyzing a compound of formula (6) in the presence of a base to obtain a compound of formula (7);

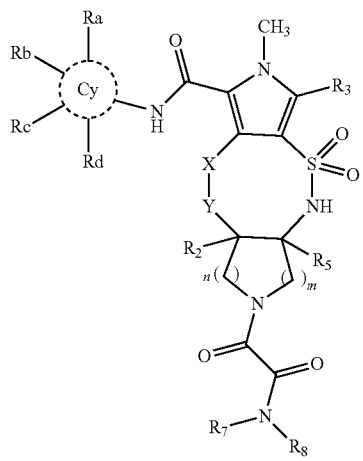

(9)

reacting a compound of formula (9) wherein m and n are each independently 1 or 2 and R$_3$=H with sulfuryl dichloride in a solvent like dichloromethane to afford a compound of formula (9) wherein R$_3$=Cl;

reacting a compound of formula (9) wherein m and n are each independently 1 or 2 and R$_3$=H with N-bromosuccinimide in a solvent like chloroform to afford a compound of formula (9) wherein R$_3$=Br.

Then, the present invention also provides a compound of formula (9), formula (9') or a pharmaceutically acceptable salt, tautomer, solvate or stereoisomer thereof, wherein all substituents are as defined above:

In a preferred embodiment the process for the synthesis of the compounds of the invention comprises at least one of the following steps:

reacting a compound of formula (5b) wherein Ra is selected from the group consisting of Cl, F, CHF$_2$, CF$_3$ and CH$_3$, with methyl (R)-2-oxo-2-((1,1,1-trifluoropropan-2-yl)amino)acetate in the presence of an amine as 2,3,4,6,7,8,9,10-octahydropyrimido[1,2-a]azepine and in a solvent as ethanol to afford a compound of formula (9a):

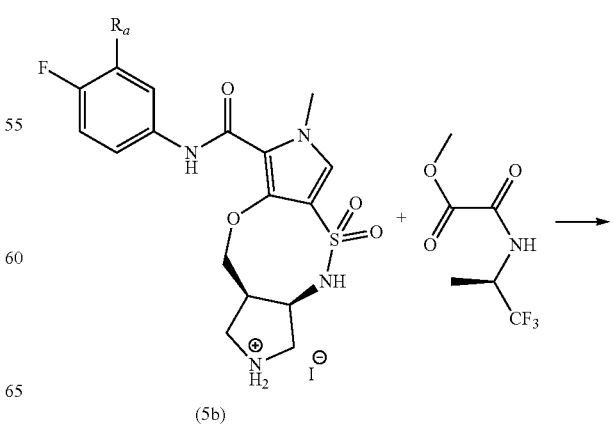

(5b)

-continued

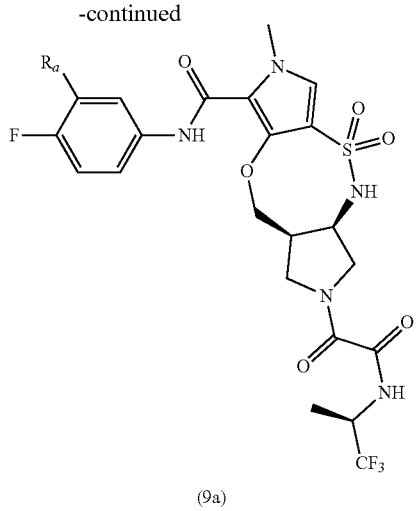

(9a)

reacting a compound of formula (9a) wherein R₃ is H and Ra is selected from the group consisting of Cl, F, CHF₂, CF₃ and CH₃ with sulfuryl dichloride in a solvent like dichloromethane to afford a compound of formula (9b):

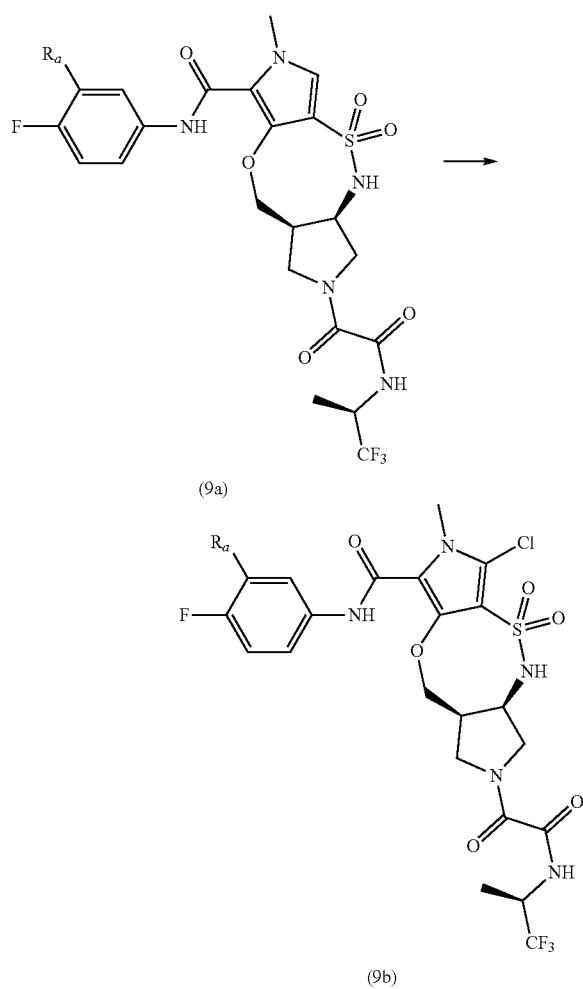

It is a further object of the invention a pharmaceutical composition comprising an effective amount of one or more compounds as defined above or a pharmaceutically acceptable prodrug thereof, alone or in combination with other active compounds, and at least one pharmaceutically acceptable excipient.

In a preferred embodiment, the invention relates to compounds of formula (I) wherein Cy is phenyl. Still preferably, the invention relates to compounds of formula (I) wherein X is O or S.

The present invention includes within its scope prodrugs of the compounds of Formula (I), Formula (I-A), Formula (I-B), Formula (II-A) or Formula (II-B) above. In general, such prodrugs will be functional derivatives of the compounds of Formula (I), Formula (I-A), Formula (I-B), Formula (II-A) or Formula (II-B), which are readily convertible in vivo into the required compound of formula (I), (I-A), (I-B), (II-A) or (II-B). Conventional procedures for the selection and preparation of suitable prodrug derivatives are described, for example, in "Design of Prodrugs", ed. H. Bundgaard, Elsevier, 1985.

A prodrug may be a pharmacologically inactive derivative of a biologically active substance (the "parent drug" or "parent molecule") that requires transformation within the body in order to release the active drug, and that has improved delivery properties over the parent drug molecule. The transformation in vivo may be, for example, as the result of some metabolic process, such as chemical or enzymatic hydrolysis of a carboxylic, phosphoric or sulphate ester, or reduction or oxidation of a susceptible functionality.

The invention also includes all suitable isotopic variations of a compound of the disclosure. Examples of isotopes that can be incorporated into compounds of the disclosure include isotopes such as $^{2}H$, $^{3}H$, $^{13}C$, $^{14}C$, $^{15}N$, $^{17}O$, $^{18}O$, $^{31}P$, $^{32}P$, $^{35}S$, $^{18}F$ and $^{36}Cl$, respectively. Certain isotopic variations of the disclosure, for example, those in which a radioactive isotope such as $^{3}H$ or $^{14}C$ is incorporated, are useful in drug and/or substrate tissue distribution studies. Further, substitution with isotopes such as deuterium $^{2}H$, may afford certain therapeutic advantages resulting from greater metabolic stability. Isotopic variations of the compounds of the disclosure can generally be prepared by conventional procedures such as by the illustrative methods or by the preparations described in the examples hereafter using appropriate isotopic variations of suitable reagents.

The present invention includes within its scope solvates of the compounds of Formula (I), Formula (I-A), Formula (I-B), Formula (II-A) or Formula (II-B) or of the relative salts, for example, hydrates, alcoholates and the like.

In addition, the compounds disclosed herein may exist as tautomers and all tautomeric forms are intended to be encompassed by the scope of the invention, even though only one tautomeric structure is depicted.

The compounds may exist in different isomeric forms, all of which are encompassed by the present invention. For example, specific compounds of the invention may exist as cis and trans geometric isomers, and all are encompassed by the invention.

The compounds of the present invention may have asymmetric centers, chiral axes, and chiral planes (as described in: E. L. Eliel and S. H. Wilen, *Stereochemistry of Carbon Compounds*, John Wiley & Sons, New York, 1994, pages 1119-1190), and occur as racemates, racemic mixtures, and as individual diastereomers, with all possible isomers and mixtures thereof, including optical isomers, all such stereoisomers being included in the present invention.

Pure stereoisomeric forms of the compounds and intermediates of this invention may be obtained by the application of art-known procedures and are intended to be encompassed by the scope of the invention. In particular, "pure stereoisomeric form" or "stereoisomerically pure" indicate a compound having stereoisomeric excess of at least 80%, preferably of at least 85%. For instance, enantiomers may be separated from each other by the selective crystallization of their diastereomeric salts or by chromatographic techniques using chiral stationary phases. Pure stereochemically isomeric forms may also be derived from the corresponding pure stereochemically isomeric forms of the appropriate starting materials, provided that the reaction occurs stereospecifically. The term "enantiomerically pure" shall be interpreted in a similar way, having regard to the enantiomeric ratio.

When any variable (e.g. $R_1$ and $R_2$, etc.) occurs more than one time in any constituent, its definition on each occurrence is independent at every other occurrence. Also, combinations of substituents and variables are permissible only if such combinations result in stable compounds. Lines drawn into the ring systems from substituents represent that the indicated bond may be attached to any of the substitutable ring atoms. If the ring system is polycyclic, it is intended that the bond be attached to any of the suitable carbon atoms on the proximal ring only.

It is understood that substituents and substitution patterns on the compounds of the instant invention can be selected by one of ordinary skill in the art to provide compounds that are chemically stable and that can be readily synthesized by techniques known in the art, as well as those methods set forth below, from readily available starting materials. If a substituent is itself substituted with more than one group, it is understood that these multiple groups may be on the same carbon or on different carbons, so long as a stable structure results. The phrase "optionally substituted" should be taken to be equivalent to the phrase "unsubstituted or substituted with one or more substituents" and in such cases the preferred embodiment will have from zero to three substituents. More particularly, there are zero to two substituents.

The expressions "one or more substituents" and "one, two or more substituents" refer to in particular to 1, 2, 3, 4 or more substituents, in particular to 1, 2, 3 or 4 substituents, more in particular 1, 2 or 3 substituents.

As used herein "Y is a single bond" indicates that, in the general Formula (I), Formula (I-A) and Formula (I-B), X is directly linked via a single bond to the carbon atom bearing $R_2$; "Y' is a single bond" indicates that, in the general Formula (I), the carbon atom bearing $R_5$ is directly linked via a single bond to N; "Y" is a single bond" indicates that, in the general Formula (I), N is directly linked via a single bond to the carbon atom bearing $R_2$; "Y''' is a single bond" indicates that the carbon atom bearing $R_5$, in the general Formula (I), is directly linked via a single bond to the carbon atom bearing $R_2$. As used herein "X is a single bond" indicates that in general Formula (I), Y is directly linked via a single bond to the pyrrole or pyrazole.

As used herein, "alkyl" is intended to include both branched and straight-chain saturated aliphatic hydrocarbon groups having the specified number of carbon atoms. For example, "$C_{1-12}$alkyl" is defined to include groups having 1, 2, 3, 4, 5, 6, 7, 8, 9, 10, 11 or 12 carbons in a linear or branched arrangement and specifically includes methyl, ethyl, n-propyl, i-propyl, n-butyl, t-butyl, i-butyl, pentyl, hexyl, and so on. As another example, "$C_{1-6}$alkyl" is defined to include groups having 1, 2, 3, 4, 5 or 6 carbons in a linear or branched arrangement and specifically includes methyl, ethyl, n-propyl, i-propyl, n-butyl, t-butyl, i-butyl, pentyl, hexyl, and so on. Preferably, "$C_{1-12}$alkyl" and "$C_{1-6}$alkyl" refer to "$C_{1-4}$alkyl" or "$C_{1-3}$alkyl". "$C_{1-4}$alkyl" is defined to include groups having 1, 2, 3 or 4 carbons in a linear or branched arrangement. For example, "$C_{1-4}$ alkyl" specifically includes methyl, ethyl, n-propyl, i-propyl, n-butyl, t-butyl, i-butyl, and so on. "$C_{1-3}$alkyl" is defined to include groups having 1, 2, or 3 carbons in a linear or branched arrangement. For example, "$C_{1-3}$ alkyl" specifically includes methyl, ethyl, n-propyl, i-propyl, and so on. Preferred alkyl groups are methyl, ethyl, i-propyl, t-butyl or i-butyl.

As used herein, "alkoxy" represents an alkyl group of indicated number of carbon atoms attached through an oxygen bridge. "Alkoxy" therefore encompasses the definitions of alkyl above. $C_{1-6}$ alkoxy group is preferably a linear or branched $C_{1-4}$ alkoxy group, more preferably a $C_{1-3}$alkoxy group, still more preferably a $C_{1-2}$ alkoxy group. Examples of suitable alkoxy groups include, but are not limited to methoxy, ethoxy, n-propoxy, i-propoxy, n-butoxy, s-butoxy or t-butoxy. preferred alkoxy groups include methoxy, ethoxy and t-butoxy.

As used herein, the terms "halo$C_{1-6}$alkyl" and "halo$C_{1-6}$alkoxy" mean a $C_{1-6}$alkyl or $C_{1-6}$alkoxy group in which one or more (in particular, 1 to 3) hydrogen atoms have been replaced by halogen atoms, especially fluorine or chlorine atoms. Halo$C_{1-6}$alkoxy group is preferably a linear or branched halo$C_{1-4}$alkoxy group, more preferably a halo$C_{1-3}$alkoxy group, still more preferably a halo$C_{1-2}$alkoxy group, for example $OCF_3$, $OCHF_2$, $OCH_2F$, $OCH_2CH_2F$, $OCH_2CHF_2$ or $OCH_2CF_3$, and most especially $OCF_3$ or $OCHF_2$. Halo$C_{1-6}$alkyl group is preferably a linear or branched halo$C_{1-3}$alkyl group, more preferably a halo$C_{1-2}$alkyl group for example, $CF_3$, $CHF_2$, $CH_2F$, $CH_2CH_2F$, $CH_2CHF_2$, $CH_2CF_3$ or $CH(CH_3)CF_3$, and most especially $CF_3$, $CHF_2$ or $CH(CH_3)CF_3$.

As used herein, the term "hydroxy$C_{1-6}$alkyl" means a $C_{1-6}$alkyl group in which one or more (in particular, 1 to 3) hydrogen atoms have been replaced by hydroxy groups. Similarly, the term "hydroxy$C_{1-4}$alkyl" means a $C_{1-4}$alkyl group in which one or more (in particular, 1 to 2) hydrogen atoms have been replaced by hydroxy groups. Illustrative examples include, but are not limited to $CH_2OH$, $CH_2CH_2OH$, $CH(CH_3)OH$ and $CHOHCH_2OH$.

As used herein, the term "aryl" means a monocyclic or polycyclic aromatic ring comprising carbon atoms and hydrogen atoms. If indicated, such aromatic ring may include one or more heteroatoms, then also referred to as "heteroaryl", preferably, 1 to 3 heteroatoms, independently selected from nitrogen, oxygen, and sulfur, preferably nitrogen. As is well known to those skilled in the art, heteroaryl rings have less aromatic character than their all-carbon counter parts. Thus, for the purposes of the present invention, a heteroaryl group need only have some degree of aromatic character. Illustrative examples of aryl groups are optionally substituted phenyl. Illustrative examples of heteroaryl groups according to the invention include optionally substituted thiophene, oxazole, thiazole, thiadiazole, imidazole, pyrazole, pyrimidine, pyrazine and pyridine. Thus, examples of monocyclic aryl optionally containing one or more heteroatoms, for example one or two heteroatoms, are a 5- or 6-membered aryl or heteroaryl group such as, but not limited to, phenyl, pyridyl, pyrimidinyl, pyrazinyl, pyridazinyl, pyrrolyl, thienyl, thiazolyl, thiadiazolyl, pyrazolyl, imidazolyl, triazolyl, tetrazolyl, furyl, isoxazolyl, oxadiazolyl and oxazolyl. Examples of polycyclic aromatic ring, optionally containing one or more heteroatoms, for example one or two heteroatoms, are a 8-10 membered aryl or heteroaryl group such as, but not limited to, benzimidazolyl, benzofurandionyl, benzofuranyl, benzofurazanyl, benzopyrazolyl, benzotriazolyl, benzothienyl, benzoxazolyl, benzoxazolonyl, benzothiazolyl, benzothiadiazolyl, benzodioxolyl, benzoxadiazolyl, benzoisoxazolyl, benzoisothiazolyl, indolyl, indolizinyl, isoindolinyl, indazolyl, isobenzofuranyl, isoindolyl, isoquinolyl, quinazolinyl, quinolyl, quinoxalinyl, quinolizinyl, naphtyl, naphthyridinyl and phthalazinyl. A preferred aryl according to the present invention is phenyl. A preferred heteroaryl according to the present invention is pyridyl.

Heterocycle, heterocyclic compound or ring structure or heterocycloalkyl is a cyclic compound that has atoms of at least two different elements as members of its ring(s).

A substituent on a saturated, partially saturated or unsaturated heterocycle can be attached at any substitutable position.

As used herein, the term "$C_{1-6}$ alkanediyl" as group or part of a group defines bivalent straight or branched chained saturated hydrocarbon radicals having from 1 to 6 carbon atoms. $C_{1-6}$ alkanediyl group, is preferably a $C_{1-4}$ alkanediyl group, a $C_{1-3}$ alkanediyl or more preferably a $C_{1-2}$ alkanediyl.

Examples include, but are not limited to methanediyl, ethanediyl, propanediyl, butanediyl, pentanediyl and hexanediyl. Preferred are methanediyl, ethanediyl and propanediyl.

As used herein, the term "$C_{2-7}$alkenediyl" as group or as part of a group defines bivalent straight or branched (carbon number limitation permitting) chained unsaturated hydrocarbon radicals having from 2 to 7 carbon atoms. Non limiting examples of $C_{2-7}$alkenediyl are: —C═CH—, —CH═C(CH$_3$)CH$_2$—, —CH═CH—CH$_2$—.

As used herein, the term "$C_{3-8}$cycloalkyl" or the term "3-8 membered saturated ring" means saturated cyclic hydrocarbon (cycloalkyl) with 3, 4, 5, 6, 7 or 8 carbon atoms and is generic to cyclopropyl, cyclobutyl, cyclopentyl, cyclohexyl, cycloheptyl or cyclooctyl. Depending on the dimension of the ring, it can be also of bicyclic structure, such as a bicycle[3.1.0]hexane, bicycle[4.1.0]heptane, octahydropentalene and the like. In a particular embodiment of the invention, the 3-8 membered saturated ring" is restricted to a "3-7 membered saturated ring". Said saturated ring optionally contains one or more heteroatoms (also referred to as heterocyclyl or heterocyclic ring or heterocycloalkyl, such that at least one carbon atom is replaced by a heteroatom selected from N, O and S, in particular from N and O. In a particular embodiment, the term "$C_{3-8}$heterocycloalkyl" is a saturated or partially saturated non aromatic monocyclic or bicyclic ring system, of 3 to 8 members which contains one or more heteroatoms selected from N, O or S. Examples include, but are not limited to oxetanyl, azetidinyl, tetrahydro-2H-pyranyl, piperazinyl, piperidinyl, tetrahydrofuranyl, morpholinyl, thiomorpholinyl, thiazolidinyl, thiolane 1,1-dioxide, pyrrolidinyl, azepanyl, diazepanyl, oxazepanyl, thiazepanyl, azocanyl, oxazocanyl and the hexahydrofuro[2,3-b]furan system. Preferred are saturated cyclic hydrocarbons with 3 or 4 or 5 carbon atoms and 1 oxygen or 1 nitrogen atom. Examples include oxetanyl, tetrahydrofuranyl, tetrahydro-2H-pyranyl, piperidinyl or pyrrolidinyl. Preferred 3-7 membered saturated rings are oxetanyl, cyclopropyl and cyclobutyl.

As used herein, the expression "3-8 membered partially saturated ring" indicates a ring containing 3 to 8 carbon atoms and at least one double bond. Depending on the dimension of the ring, it can be of a cyclic or bicyclic structure. In a particular embodiment of the invention, the 3-8 membered partially saturated ring" is restricted to a "5-7 membered partially saturated ring". Each of the above rings may optionally contain one or more heteroatoms, such that at least one carbon is replaced by a heteroatom selected from N, O and S, in particular from N and O. Examples include, but are not limited to cyclopentenyl, cyclohexenyl, cyclohexa-1,3-dienyl, cyclohexa-1,4-dienyl, cycloheptenyl, cyclohepta-1,4-dienyl, dihydrofuranyl, dihydropyrrole, dihydropyranyl, hexahydro-1H-cyclopenta[c]furanyl and the like.

It should be noted that different isomers of the various heterocycles may exist within the definitions as used throughout the specification. For example, pyrrolyl may be 1H-pyrrolyl or 2H-pyrrolyl.

It should also be noted that the radical positions on any molecular moiety used in the definitions may be anywhere on such moiety as long as it is chemically stable. For example, pyridyl includes 2-pyridyl, 3-pyridyl, 4-pyridyl.

As used herein, the term "halogen" includes fluorine, chlorine, bromine and iodine, of which fluorine, chlorine and bromine are preferred.

The term "heteroatom" refers to an atom other than carbon or hydrogen in a ring structure or a saturated backbone as defined herein. Typical heteroatoms include N(H), O, S.

The term "$C_{1-6}$alkylaryl" as used herein indicates one or more aryl groups appended to a $C_{1-6}$alkyl radical. As used herein, the term "$C_{1-6}$alkylheteroaryl" indicates one or more heteroaryl groups appended to a $C_{1-6}$alkyl radical. As used herein, the term "$C_{1-6}$alkyl-$C_{3-8}$cycloalkyl" indicates one or more $C_{3-8}$cycloalkyl groups appended to a $C_{1-6}$alkyl radical.

The terms "spiro-$C_{3-8}$cycloalkyl" or "spiro-$C_{3-8}$heterocloalkyl" indicate respectively a $C_{3-8}$cycloalkyl or a $C_{3-8}$heterocycloalkyl forming a bicyclic organic compound with rings connected through just one atom. The rings can be different in nature or identical. The connecting atom is also called the spiroatom, most often a quaternary carbon ("spiro carbon").

Included in the instant invention is the free base of compounds of formula (I), (I-A), (I-B), (II-A) or (II-B) as well as the pharmaceutically acceptable salts and stereoisomers thereof. Some of the specific compounds exemplified herein are the protonated salts of amine compounds. Compounds of formula (I), (I-A), (I-B), (II-A) or (II-B) containing one or more N atoms may be protonated on any one, some or all of the N atoms. The term "free base" refers to the amine compounds in non-salt form. The encompassed pharmaceutically acceptable salts not only include the salts exemplified for the specific compounds described herein, but also all the typical pharmaceutically acceptable salts of the free form of compounds of formula (I), (I-A), (I-B), (II-A) or (II-B). The free form of the specific salt compounds described may be isolated using techniques known in the art. For example, the free form may be regenerated by treating the salt with a suitable dilute aqueous base solution such as dilute aqueous NaOH, potassium carbonate, ammonia and sodium bicarbonate. The free forms may differ from their respective salt forms somewhat in certain physical properties, such as solubility in polar solvents, but the acid and base salts are otherwise pharmaceutically equivalent to their respective free forms for purposes of the invention.

The pharmaceutically acceptable salts of the instant compounds can be synthesized from the compounds of this invention which contain a basic or acidic moiety by conventional chemical methods. Generally, the salts of the basic compounds are prepared either by ion exchange chromatography or by reacting the free base with stoichiometric amounts or with an excess of the desired salt-forming inorganic or organic acid in a suitable solvent or various combinations of solvents. Similarly, the salts of the acidic compounds are formed by reactions with the appropriate inorganic or organic base. In a preferred embodiment, the compounds of the invention have at least one acidic proton and the corresponding sodium or potassium salt can be formed, for example, by reaction with the appropriate base.

Thus, pharmaceutically acceptable salts of the compounds of this invention include the conventional non-toxic salts of the compounds of this invention as formed by reacting a basic instant compound with an inorganic or organic acid or an acid compound with an inorganic or organic base. For example, conventional non-toxic salts include those derived from inorganic acids such as hydrochloric, hydrobromic, sulfuric, sulfamic, phosphoric, nitric and the like, as well as salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxy-benzoic, fumaric, toluenesulfonic, methanesulfonic, ethane disulfonic, oxalic, isethionic, trifluoroacetic and the like. Conventional non-toxic salts further include those derived from an inorganic base, such as potassium, sodium hydroxide, magnesium or calcium hydroxide, as well as salts prepared from organic bases, such as ethylene diamine, lysine, tromethamine, meglumine and the like. Preferably, a pharmaceutically acceptable salt of this invention contains one equivalent of a compound of formula (I), (I-A), (I-B), (II-A) or (II-B) and 1, 2 or 3 equivalent of an inorganic or organic acid or base. More particularly, pharmaceutically acceptable salts of this invention are the tartrate, trifluoroacetate or the chloride salts.

When the compound of the present invention is acidic, suitable "pharmaceutically acceptable salts" refers to salts prepared from pharmaceutically acceptable non-toxic bases including inorganic bases and organic bases. Salts derived from inorganic bases include aluminum, ammonium, calcium, copper, ferric, ferrous, lithium, magnesium, manganic salts, manganous, potassium, sodium, zinc and the like. Particularly preferred are the ammonium, calcium, magnesium, potassium and sodium salts. Salts derived from pharmaceutically acceptable organic non-toxic bases include salts of primary, secondary and tertiary amines, substituted amines including naturally occurring substituted amines, cyclic amines and basic ion exchange resins, such as arginine, betaine caffeine, choline, N,N'-dibenzylethylenediamine, diethylamine, 2-diethylaminoethanol, 2-dimethylaminoethanol, ethanolamine, ethylenediamine, N-ethylmorpholine, N-ethylpiperidine, glucamine, glucosamine, histidine, hydrabamine, isopropylamine, lysine, methylglucamine, morpholine, piperazine, piperidine, polyamine resins, procaine, purines, theobromine, triethylamine, trimethylamine tripropylamine, tromethamine and the like.

The preparation of the pharmaceutically acceptable salts described above and other typical pharmaceutically acceptable salts is more fully described by Berg et al., "Pharmaceutical Salts," *J. Pharm. Sci.*, 1977:66:1-19.

It will also be noted that the compounds of the present invention are potentially internal salts or zwitterions, since under physiological conditions a deprotonated acidic moiety in the compound, such as a carboxyl group, may be anionic, and this electronic charge might then be balanced off internally against the cationic charge of a protonated or alkylated basic moiety, such as a quaternary nitrogen atom.

The compounds of the present invention find use in a variety of applications for human and animal health. The compounds of the present invention are inhibitors of hepatitis B virus (HBV).

In the context of the present invention, HBV may be any known isolate, genotype, strain, etc. of HBV.

In particular, the hepatitis B virus has been classified into eight main genotypes (designated A-H), and two additional genotypes (I and J) were tentatively proposed. HBV genotypes have been further separated into several subgenotypes that differ by 4.0 to 7.5% in the whole nucleotide sequence. HBV genotypes differ substantially in many virological and probably some clinical parameters; however, the precise role of HBV genotypes in the evolution of the infection remains controversial. Due to geographical distribution, only two or three HBV genotypes co-circulate in most regions of the world, thereby limiting genotype comparisons.

The compounds of the present invention are inhibitors of hepatitis B virus (HBV) useful for the treatment and/or prevention of an HBV infection. In particular the compounds of the present invention are inhibitors of hepatitis B virus (HBV) core (HBc) protein useful for the treatment and/or prevention of an HBV infection.

The compounds, compositions and methods provided herein are particularly deemed useful for treating, ameliorating or preventing HBV infection and related conditions, including chronic hepatitis B, HBV/HDV co-infection, HBV/HCV co-infection, HBV/HIV co-infection, inflammation, necrosis, cirrhosis, hepatocellular carcinoma, hepatic decompensation and hepatic injury from an HBV infection.

In the present invention, the expression "HBV infection" comprises any and all conditions deriving from infection with HBV, including but not limited to hepatitis B, preferably chronic hepatitis B, HBV/HDV co-infection, HBV/HCV coinfection, HBV/HIV coinfection.

HBV infection leads to a wide spectrum of hepatic complications, all of these are intended as conditions related to an HBV infection. As used herein, "condition related to an HBV infection" is preferably selected from the group consisting of: chronic hepatitis B, HBV/HDV co-infection, HBV/HCV co-infection, HBV/HIV co-infection, inflammation, necrosis, cirrhosis, hepatocellular carcinoma, hepatic decompensation and hepatic injury from an HBV infection.

Expressions like "treating, eradicating, reducing, slowing or inhibiting an HBV infection" are used to indicate the application or administration of a therapeutic agent, i.e., a compound of the invention (alone or in combination with another pharmaceutical agent), to a patient or application or administration of a therapeutic agent to an isolated tissue or cell line from a patient (e.g., for diagnosis or ex vivo applications), who has an HBV infection, a symptom of HBV infection or the potential to develop an HBV infection, with the purpose to cure, heal, alleviate, relieve, alter, remedy, ameliorate, improve or affect the HBV infection, the symptoms of HBV infection, or the potential to develop an HBV infection. Such treatments may be specifically tailored or modified, based on knowledge obtained from the field of pharmacogenomics.

Efficacy of treatment may be determined using quantification of viral load or other evidence of infection, such as through measurement of HBeAg, HBsAg, HBV DNA levels, ALT activity levels, serum HBV levels, and the like, thereby allowing adjustment of treatment dose, treatment frequency, and treatment length.

HBeAg stands for hepatitis B e-antigen. This antigen is a protein from the hepatitis B virus that circulates in infected blood when the virus is actively replicating.

ALT stands for Alanine Transaminase and is an enzyme involved in the transfer of an amino group from the amino-acid alanine to alpha-ketoglutaric acid to produce glutamate and pyruvate. ALT is located primarily in liver and kidney, with lesser amounts in heart and skeletal muscle. ALT is commonly measured clinically as part of liver function tests.

The compounds of the invention can reduce viral load in an individual suffering from an HBV infection. In a non limiting embodiment, the compounds of the invention result in viral load reduction during therapy in an individual in need thereof from a minimum of one- or two-log decrease to a maximum of about eight-log decrease.

As used herein, the expression "remission of hepatic injury from an HBV infection" means that the chronic necroinflammatory liver disease has been halted by the fact that the viral antigens have disappeared from the organ (and the immune system no longer attacks the liver cells).

As used herein, the term "prophylactically treating" means no disorder or disease development if none had occurred, or no further disorder or disease development if there had already been development of the disorder or disease. Also considered is the ability to prevent some or all of the symptoms associated with the disorder or disease. An example of prophylactic treatment might also indicate the necessity of reducing the risk of infecting a liver graft (in case of liver transplant in chronically infected patients) or infecting newborns (in case of chronically infected mothers that pass the virus at time of delivery).

As used herein, "reducing reoccurrence of an HBV infection" indicates that patients may have reactivation of HBV replication and exacerbation of a condition related to an HBV infection, e.g. hepatitis, after years of quiescence. These patients may still be at risk of developing a condition related to an HBV infection, e.g. hepatocellular carcinoma development. Antiviral therapy is also recommended as prophylaxis for patients who are HBsAg-positive as well as patients who are HBsAg-negative and hepatitis B core antibody-positive who require treatment with immunosuppressive therapies that are predicted to have a moderate to high risk of HBV reactivation.

The compounds of this invention may be administered to mammals, preferably humans, either alone or in combination with pharmaceutically acceptable carriers, excipients or diluents, in a pharmaceutical composition, according to standard pharmaceutical practice. In one embodiment, the compounds of this invention may be administered to animals. The compounds can be administered orally or parenterally, including the intravenous, intramuscular, intraperitoneal, subcutaneous, rectal and topical routes of administration.

The invention also provides pharmaceutical compositions comprising one or more compounds of this invention and a pharmaceutically acceptable carrier. The pharmaceutical compositions containing the active ingredient may be in a form suitable for oral use, for example, as tablets, troches, lozenges, aqueous or oily suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide pharmaceutically elegant and palatable preparations. Tablets contain the active ingredient in admixture with non-toxic pharmaceutically acceptable excipients which are suitable for the manufacture of tablets. These excipients may be for example, inert diluents, such as calcium carbonate, sodium carbonate, lactose, calcium phosphate or sodium phosphate; granulating and disintegrating agents, for example, microcrystalline cellulose, sodium crosscarmellose, corn starch, or alginic acid; binding agents, for example starch, gelatin, polyvinyl-pyrrolidone or acacia, and lubricating agents, for example, magnesium stearate, stearic acid or talc. The tablets may be uncoated or they may be coated by known techniques to mask the unpleasant taste of the drug or delay disintegration and absorption in the gastrointestinal tract and thereby provide a sustained action over a longer period. For example, a water soluble taste masking material such as hydroxypropyl-methylcellulose or hydroxypropylcellulose, or a time delay material such as ethyl cellulose, cellulose acetate butyrate may be employed.

Formulations for oral use may also be presented as hard gelatin capsules wherein the active ingredient is mixed with an inert solid diluent, for example, calcium carbonate, calcium phosphate or kaolin, or as soft gelatin capsules wherein the active ingredient is mixed with water soluble carrier such as polyethyleneglycol or an oil medium, for example peanut oil, liquid paraffin, or olive oil.

Aqueous suspensions contain the active material in admixture with excipients suitable for the manufacture of aqueous suspensions. Such excipients are suspending agents, for example sodium carboxymethylcellulose, methylcellulose, hydroxypropylmethyl-cellulose, sodium alginate, polyvinyl-pyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxycetanol, or condensation products of ethylene oxide with partial esters derived from fatty acids and a hexitol such as polyoxyethylene sorbitol monooleate, or condensation products of ethylene oxide with partial esters derived from fatty acids and hexitol anhydrides, for example polyethylene sorbitan monooleate. The aqueous suspensions may also contain one or more preservatives, for example ethyl, or n-propyl p-hydroxybenzoate, one or more coloring agents, one or more flavoring agents, and one or more sweetening agents, such as sucrose, saccharin or aspartame.

Oily suspensions may be formulated by suspending the active ingredient in a vegetable oil, for example arachis oil, olive oil, sesame oil or coconut oil, or in mineral oil such as liquid paraffin. The oily suspensions may contain a thickening agent, for example beeswax, hard paraffin or cetyl alcohol. Sweetening agents such as those set forth above, and flavoring agents may be added to provide a palatable oral preparation. These compositions may be preserved by the addition of an anti-oxidant such as butylated hydroxyanisol or alpha-tocopherol.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example sweetening, flavoring and coloring agents, may also be present. These compositions may be preserved by the addition of an anti-oxidant such as ascorbic acid.

The pharmaceutical compositions of the invention may also be in the form of an oil-in-water emulsions. The oily phase may be a vegetable oil, for example olive oil or arachis oil, or a mineral oil, for example liquid paraffin or mixtures of these. Suitable emulsifying agents may be naturally occurring phosphatides, for example soy bean lecithin, and esters or partial esters derived from fatty acids and hexitol anhydrides, for example sorbitan monooleate, and condensation products of the said partial esters with ethylene oxide, for example polyoxyethylene sorbitan monooleate. The emulsions may also contain sweetening, flavoring agents, preservatives and antioxidants. Syrups and elixirs may be formulated with sweetening agents, for example glycerol, propylene glycol, sorbitol or sucrose. Such formulations may also contain a demulcent, a preservative, flavoring and coloring agents and antioxidant.

The pharmaceutical compositions may be in the form of a sterile injectable aqueous solutions. Among the acceptable vehicles and solvents that may be employed are water, Ringer's solution and isotonic sodium chloride solution.

The sterile injectable preparation may also be a sterile injectable oil-in-water microemulsion where the active ingredient is dissolved in the oily phase. For example, the active ingredient may be first dissolved in a mixture of soybean oil and lecithin. The oil solution then introduced into a water and glycerol mixture and processed to form a microemulsion.

The injectable solutions or microemulsions may be introduced into a patient's blood stream by local bolus injection. Alternatively, it may be advantageous to administer the solution or microemulsion in such a way as to maintain a constant circulating concentration of the instant compound. In order to maintain such a constant concentration, a continuous intravenous delivery device may be utilized. An example of such a device is the Deltec CADD-PLUS™ model 5400 intravenous pump.

The pharmaceutical compositions may be in the form of a sterile injectable aqueous or oleagenous suspension for intramuscular and subcutaneous administration. This suspension may be formulated according to the known art using those suitable dispersing or wetting agents and suspending agents which have been mentioned above. The sterile injectable preparation may also be a sterile injectable solution or suspension in a non-toxic parenterally acceptable diluent or solvent, for example as a solution in 1,3-butanediol. In addition, sterile, fixed oils are conventionally employed as a solvent or suspending medium. For this purpose any bland fixed oil may be employed including synthetic mono- or diglycerides. In addition, fatty acids such as oleic acid find use in the preparation of injectables.

Compounds of the invention may also be administered in the form of suppositories for rectal administration of the drug. These compositions can be prepared by mixing the drug with a suitable non-irritating excipient which is solid at ordinary temperatures but liquid at the rectal temperature and will therefore melt in the rectum to release the drug. Such materials include cocoa butter, glycerinated gelatin, hydrogenated vegetable oils, mixtures of polyethylene glycols of various molecular weights and fatty acid esters of polyethylene glycol.

For topical use, creams, ointments, jellies, solutions or suspensions, etc., containing the compound(s) of the invention are employed. (For purposes of this application, topical application shall include mouth washes and gargles.)

The compounds for the present invention can be administered in intranasal form via topical use of suitable intranasal vehicles and delivery devices, or via transdermal routes, using those forms of transdermal skin patches well known to those of ordinary skill in the art. To be administered in the form of a transdermal delivery system, the dosage administration will, of course, be continuous rather than intermittent throughout the dosage regimen. Compounds of the present invention may also be delivered as a suppository employing bases such as cocoa butter, glycerinated gelatin, hydrogenated vegetable oils, mixtures of polyethylene glycols of various molecular weights and fatty acid esters of polyethylene glycol.

The compounds of the invention may be presented in a liposome or other micro particulate or other nanoparticle designed to target the compound. Acceptable liposomes can be neutral, negatively, or positively charged, the charge being a function of the charge of the liposome components and pH of the liposome solution. Liposomes can be normally prepared using a mixture of phospholipids and cholesterol. Suitable phospholipids include phosphatidylcholine, phosphatidylethanolamine, phosphatidic acid, phosphotidylglycerol, phosphatidylinositol. Polyethylene glycol can be added to improve the blood circulation time of liposomes. Acceptable nanoparticles include albumin nanoparticles and gold nanoparticles.

When a compound according to this invention is administered into a human subject, the daily dosage will normally be determined by the prescribing physician with the dosage generally varying according to the age, weight, sex and response of the individual patient, as well as the severity of the patient's symptoms.

In one exemplary application, a suitable amount of compound is administered to a mammal undergoing anti HBV treatment. Administration generally occurs in an amount between about: 0.01 mg/kg of body weight to about 100 mg/kg of body weight per day, preferably between about 0.01 mg/kg of body weight to about 60 mg/kg of body weight per day, preferably between about 0.1 mg/kg of body weight to about 50 mg/kg of body weight per day, preferably between about 0.5 mg/kg of body weight to about 40 mg/kg of body weight per day.

The instant compounds are also useful in combination with known therapeutic agents for simultaneous, separate or sequential administration.

In an embodiment, the compounds of the present invention may be used in combination with at least one or more additional therapeutic agents, in particular anti-HBV agents.

The indication that compounds of the invention are for use in the treatment and/or prevention of an HBV infection indicates that the compounds are efficacious for treating, eradicating, reducing, slowing or inhibiting an HBV infection.

The therapeutic agent is any agent commonly used in the treatment and/or prevention and/or amelioration of an HBV infection or a condition related to an HBV infection. The therapeutic agent is known in the art.

The term "anti-HBV agent", or more simply "HBV antiviral(s)" also includes compounds that are therapeutic nucleic acids, antibodies or proteins either in their natural form or chemically modified and/or stabilized. Hepatitis B virus (HBV) strains, resistant to at least one anti-HBV agents are defined as drug-resistant. The term therapeutic nucleic acid includes but is not limited to nucleotides and nucleosides, oligonucleotides, polynucleotides, of which non limiting examples are antisense oligonucleotides, miRNA, siRNA, shRNA, therapeutic vectors and DNA/RNA editing components.

The term anti-HBV agent also includes compounds capable of treating HBV infection via immunomodulation, i.e. immunomodulators or immunomodulating compounds. Examples of immunomodulators are interferon-α (IFN-α), pegylated interferon-α or stimulants of the innate immune system such as Toll-like receptor 7 and/or 8 agonists and therapeutic or prophylactic vaccines. One embodiment of the present invention relates to combinations of a compound of formula (I), (I-A), (I-B), (II-A) or (II-B) or any subgroup thereof, as specified herein, with an immunomodulating compound, more specifically a Toll-like receptor 7 and/or 8 agonist.

The additional HBV antiviral(s) can be selected for example, from therapeutic vaccines; RNA interference therapeutic/antisense oligonucleotides (e.g. siRNA, ddRNA, shRNA); immunomodulators (such as TLR agonists (e.g. TLR7, TLR8 or TLR9 agonists); STING agonists; RIG-I modulators; NKT modulators; IL agonists; Interleukin or other immune active proteins, therapeutic and prophylactic vaccines and immune checkpoint modulators; HBV entry inhibitors; cccDNA modulators (such as for example direct cccDNA inhibitors, inhibitors of cccDNA formation or maintenance, cccDNA epigenetic modifiers, inhibitors of cccDNA transcription); inhibitors of HBV protein expression; agents targeting HBV RNA; capsid assembly inhibitors/modulators; core or X protein targeting agents; nucleotide analogues; nucleoside analogues; interferons or modified interferons; HBV antivirals of distinct or unknown mechanism; cyclophilin inhibitors; sAg release inhibitors; HBV polymerase inhibitors; dinucleotides; SMAC inhibitors; HDV targeting agents; viral maturation inhibitors; reverse transcriptase inhibitors and HBV RNA destabilizers and other small-molecule inhibitors of HBV protein expression.

In particular, the combination of previously known anti-HBV agents, such as interferon-α (IFN-α), pegylated interferon-α, 3TC, tenofovir, lamivudine, entecavir, telbivudine, and adefovir or a combination thereof, and a compound of formula (I), (I-A), (I-B), (II-A) or (II-B) or any subgroup thereof can be used as a medicine in a combination therapy. Additional examples of further therapeutic agents that may be combined with the compounds of the present invention include: Zidovudine, Didanosine, Zalcitabine, Stavudine, Abacavir, ddA Emtricitabine, Apricitabine, Atevirapine, ribavirin, acyclovir, valacyclovir, famciclovir, ganciclovir, valganciclovir, cidofovir, Efavirenz, Nevirapine, Delavirdine and Etravirine.

Particular examples of such HBV antiviral(s) include, but are not limited to:

RNA interference (RNAi) therapeutics: TKM-HBV (also known as ARB-1467), ARB-1740, ARC-520, ARC-521, BB—HB-331, REP-2139, ALN-HBV, ALN-PDL, LUNAR-HBV, GS3228836, and GS3389404;

HBV entry inhibitors: Myrcludex B, IVIG-Tonrol, GC-1102;

HBV capsid inhibitor/modulators, core or X protein targeting agents, direct cccDNA inhibitors, inhibitors of cccDNA formation or maintenance, or cccDNA epigenetic modifiers: BAY 41-4109, NVR 3-778, GLS-4, NZ-4 (also known as W28F), Y101, ARB-423, ARB-199, ARB-596, AB-506, JNJ-56136379, ASMB-101 (also known as AB-V102), ASMB-103, CHR-101, CC-31326, AT-130, RO7049389.

HBV polymerase inhibitors: entecavir (Baraclude, Entavir), lamivudine (3TC, Zeffix, Heptovir, Epivir, and Epivir-HBV), telbivudine (Tyzeka, Sebivo), clevudine, besifovir, adefovir (hepsera), tenofovir (in particular tenofovir disoproxil fumarate (Viread), tenofovir alafenamide fumarate (TAF)), tenofovir disoproxil orotate (also known as DA-2802), tenofovir disopropxil aspartate (also known as CKD-390), AGX-1009, and CMX157);

HBV RNA destabilizers and other small-molecule inhibitors of HBV protein expression: RG7834, AB-452;

cyclophilin inhibitors: OCB-030 (also known as NVP-018), SCY-635, SCY-575, and CPI-431-32;

dinucleotides: SB9200;

compounds of distinct or unknown mechanism, such as but not limited to AT-61 ((E)-N-(1-chloro-3-oxo-1-phenyl-3-(piperidin-1-yl)prop-1-en-2-yl)benzamide), AT130 ((E)-N-(1-bromo-1-(2-methoxyphenyl)-3-oxo-3-(piperidin-1-yl)prop-1-en-2-yl)-4-nitrobenzamide), and similar analogs; REP-9AC (also known as REP-2055), REP-9AC' (also known as REP-2139), REP-2165 and HBV-0259;

TLR agonists (TLR7, 8 and/or 9): RG7795 (also known as RO-6864018), GS-9620, SM360320 (9-benzyl-8-hydroxy-2-(2-methoxy-ethoxy)adenine) and AZD 8848 (methyl [3-({[3-(6-amino-2-butoxy-8-oxo-7,8-dihydro-9H-pyrin-9-yl)propyl][3-(4-morpholinyl)propyl]amino}methyl)phenyl]acetate); ARB-1598;

RIG-I modulators: SB-9200;

SMAC inhibitor: Birinapant

Immune Check Point inhibitors: BMS-936558 (Opdivo (nivolumab)), KEYTRUDA® (pembrolizumab);

therapeutic vaccines: HBsAG-HBIG, HB-Vac, ABX203, NASVAC, GS-4774, GX-110 (also known as HB-110E), CVI-HBV-002, RG7944 (also known as INO-1800), TG-1050, FP-02 (Hepsyn-B), AIC649, VGX-6200, KW-2, TomegaVax-HBV, ISA-204, NU-500, INX-102-00557 HBV MVA, PepTcell;

IL agonists and immune acting proteins: INO-9112; recombinant IL12;

interferons: interferon alpha (IFN-α), interferon alpha-2a, recombinant interferon alpha-2a, peginterferon alpha-2a (Pegasys), interferon alpha-2b (Intron A), recombinant interferon alpha-2b, interferon alpha-2b XL, peginterferon alpha-2b, glycosylated interferon alpha-2b, interferon alpha-2c, recombinant interferon alpha-2c, interferon beta, interferon beta-1a, peginterferon beta-1a, interferon delta, interferon lambda (IFN-λ), peginterferon lambda-1, interferon omega, interferon tau, interferon gamma (IFN-γ), interferon alfacon-1, interferon alpha-n1, interferon alpha-n3, albinterferon alpha-2b, BLX-883, DA-3021, PI 101 (also known as AOP2014), PEG-infergen, Belerofon, INTEFEN-IFN, albumin/interferon alpha 2a fusion protein, rHSA-IFN alpha 2a, rHSA-IFN alpha 2b, PEG-IFN-SA, interferon alpha biobetter; in particular, peginterferon alpha-2a, peginterferon alpha-2b, glycosylated interferon alpha-2b, peginterferon beta-1a, and peginterferon lambda-1; more in particular, peginterferon alpha-2a;

HDV targeting agent: Lonafamib.

The term "administration" and variants thereof (e.g., "administering" a compound) in reference to a compound of the invention means introducing the compound or a prodrug of the compound into the system of the animal in need of treatment. When a compound of the invention or prodrug thereof is provided in combination with one or more other active agents (e.g., a cytotoxic agent, etc.), "administration" and its variants are each understood to include concurrent and sequential introduction of the compound or prodrug thereof and other agents.

In some embodiments, pulsed administration is more effective than continuous treatment because total pulsed doses are often lower than would be expected from continuous administration of the same composition. Each pulse dose can be reduced and the total amount of drug administered over the course of treatment is minimized. Individual pulses can be delivered to the patient continuously over a period of several hours, such as about 2, 4, 6, 8, 10, 12, 14 or 16 hours, or several days, such as 2, 3, 4, 5, 6 or 7 days.

As used herein, the term "composition" is intended to encompass a product comprising the specified ingredients in the specified amounts, as well as any product which results, directly or indirectly, from combination of the specified ingredients in the specified amounts.

The term "therapeutically effective amount" as used herein means that amount of active compound or pharmaceutical agent that elicits the biological or medicinal response in a tissue, system, animal or human that is being sought by a researcher, veterinarian, medical doctor or other clinician.

The present invention will be described by means of the following non-limiting examples and biological data are presented.

Materials and Methods

Chemistry

General

Unless otherwise indicated, commercially available reagents and solvents (HPLC grade) were used without further purification.

Specifically, the following abbreviations may have been used in the descriptions of the experimental methods:

NMR: Nuclear Magnetic Resonance; $^1$H: proton; MHz: Megahertz; Hz: Hertz; CDCl3: Chloroform-d; HPLC: High Performance Liquid Chromatography; LC-MS: Liquid Chromatography Mass Spectrometry; m/z: mass-to-charge ratio; s: second(s); min: minute(s); h: hour(s); mg: milligram(s); g: gram(s); mL: millilitre(s); mmol: millimole(s); nm: nanometer(s) μM: micromolar; M: molarity or molar concentration; Rt: retention time in minutes; sat.aq.: saturated aqueous solution; MW: microwave; Boc: tert-butyloxycarbonyl protecting group; DBU: 1,8-diazabicyclo[5.4.0]undec-7-ene; DCM: dichloromethane; DMF: dimethylformamide; DIPEA: N,N-diisopropyl ethyl amine; DMSO: dim ethyl sulfoxide; EtOAc: ethyl acetate; LiHMDS: Lithium bis(trimethylsilyl)amide; NaHMDS: Sodium bis(trimethylsilyl)amide; MeOH: methanol; MeCN: Acetonitrile; PE: Petroleum Ether; PMB: p-methoxybenzyl protecting group; PyBop: Benzotriazole-1-yl-oxy-tris-pyrrolidino-phosphonium hexafluorophosphate; TFA: trifluoroacetic acid; eq.: equivalent(s); RT: room temperature; THF: tetrahydrofuran; pTSA: para-toluene sulfonic acid; TB TU: 2-(1H-Benzotriazole-1-yl)-1,1,3,3-tetramethyl aminium tetrafluoroborate. Except where indicated otherwise, all temperatures are expressed in ° C. (degrees centigrade) or K (Kelvin).

The $^1$H-NMR spectra were acquired with an Avance II 300 MHz Bruker spectrometer. The chemical shifts are expressed in parts per million (ppm, δ units). The coupling constants are expressed in Hertz (Hz) and the splitting patterns are described as s (singlet), bs (broad signal), d (doublet), t (triplet), q (quartet), quint (quintet), m (multiplet).

The LC-MS analyses were performed by means of an UPLC Acquity Waters System equipped with the SQD spectrometer, single quadrupole mass detector, and a TUV detector, using column 1: ACQUITY UPLC BEH SHIELD, $RP_{18}$ (2.1×50 mm, id=1.7 μm); column2: ACQUITY UPLC HSS T3, $RP_{18}$ (2.1×50 mm, id=1.8 μm) and column3: ACQUITY UPLC BEH SHIELD, $RP_{18}$ (2.1×100 mm, id=1.7 μm). Column temperature 40° C. Sample temperature 25° C. Phase A was composed by water (HiPerSolv Chromanorm Water VWR for HPLC-MS)+0.05% Trifluoroacetic Acid; Phase B by $CH_3CN$ (HiPerSolv Chromanorm Acetonitrile SuperGradient VWR, suitable for UPLC/UHPLC instruments)+0.05% Trifluoroacetic Acid; flow rate: 0.5 mL/min; UV detection (DIODE array) 200 nm; ESI+ and ESI− detection in the 100-1000 m/z range.

Method 1: column 1, run time: 3 minutes, run gradient: 5% B to 100% B in 2.80 min+100% B for 0.2 min, equilibration time: 0.8 min, ionization mode: $ESI^+$.

Method 2: column 2, run time: 4 minutes, run gradient: 0% B to 45% B in 3.5 min+45% B to 100% B in 0.05 min+100% B for 0.45 min, equilibration time: 0.8 min, ionization mode: $ESI^+$.

Method 3: column 3, run time: 6 minutes, run gradient: 5% B to 100% B in 5 min+100% B for 1 min, equilibration time: 2 min.

Method 4: column 3, run time: 6 minutes, run gradient: 5% B to 50% B in 5 min+50% B to 100% B in 0.2 min 100% B for 0.8 min, equilibration time: 2 min, ionization mode: $ESI^+$.

Method 5: column 1, run time: 3 minutes, run gradient: 5% B to 100% B in 2.80 min+100% B for 0.2 min, equilibration time: 0.8 min, ionization mode: $ESI^+$.

Method 6: column 2, run time: 4 minutes. run gradient: 0% B to 45% B in 3.5 min+45% B to 100% B in 0.05 min+100% B for 0.45 min. Equilibration time: 0.8 min, ionization mode: $ESI^+$.

Method 7: column 3, run time: 6 minutes, run gradient: 5% B to 100% B in 5 min+100% B for 1 min, equilibration time: 2 min, ionization mode: $ESI^+$.

Method 8: column 3, run time: 6 minutes, run gradient: 5% B to 50% B in 5 min+50% B to 100% B in 0.2 min 100% B for 0.8 min, Equilibration time: 2 min, ionization mode: $ESI^+$.

Method 9: column 1. run time: 4 minutes, column 1, run time: 4 minutes, run gradient: 5% B to 100% B in 3.00 min+100% B for 1 min, equilibration time: 0.8 min, ionization mode: $ESI^+$.

Method 10: column 1. run time: 4 minutes, run gradient: 5% B to 100% B in 3.00 min+100% B for 1 min, equilibration time: 0.8 min, Ionization Mode: $ESI^+$.

Method 11: column 1, run time: 3 minutes, run gradient: 40% B to 100% B in 2.80 min+100% B for 0.2 min, equilibration time: 0.8 min. Ionization Mode: $ESI^+$.

Method 12: column 3, run time: 6 minutes, run gradient: 25% B to 70% B in 5 min+100% B for 1 min, equilibration time: 2 min, Flow: 0.5 mL/min, ionization mode: $ESI^+$.

Method 13: column 2, run time: 4 minutes, run gradient: 0% B to 60% B in 3.5 min+60% B to 100% B in 0.05 min+100% B for 0.45 min, equilibration time: 0.8 min, ionization mode: $ESI^+$.

Method 14: column 2, run time: 4 minutes, run gradient: 0% B to 30% B in 3.5 min+30% B to 100% B in 0.05 min+100% B for 0.45 min, equilibration time: 0.8 min, ionization mode: $ESI^+$.

Method 15: column 3, run time: 10 minutes, run gradient: 5% B to 100% B in 9 min+100% B for 1 min, equilibration time: 2 min, ionization mode: $ESI^+$.

Synthesis

According to a further aspect of the invention there is provided a process for the preparation of compounds of Formula (I), Formula (I-A), Formula (I-B), Formula (II-A), Formula (II-B), Formula (III-A), Formula (III-B) or salts thereof. The following schemes are examples of synthetic schemes that may be used to synthesise the compounds of the invention. In the following schemes reactive groups can be protected with protecting groups and deprotected according to well established techniques. In the following schemes unless otherwise indicated $R_1$, $R_2$, $R_3$, $R_5$, $R_7$, $R_8$, X, Y, Y', Y", Y'", Cy, Ra, Rb, Rc, Rd are as defined herein above in each of Formula (I), Formula (I-A), Formula (I-B), Formula (II-A), Formula (II-B), Formula (III-A), Formula (III-B).

It will be understood by those skilled in the art that certain compounds of the invention can be converted into other compounds of the invention according to standard chemical methods.

Compounds of the invention may be prepared according to the general routes indicated in the following Scheme 1:

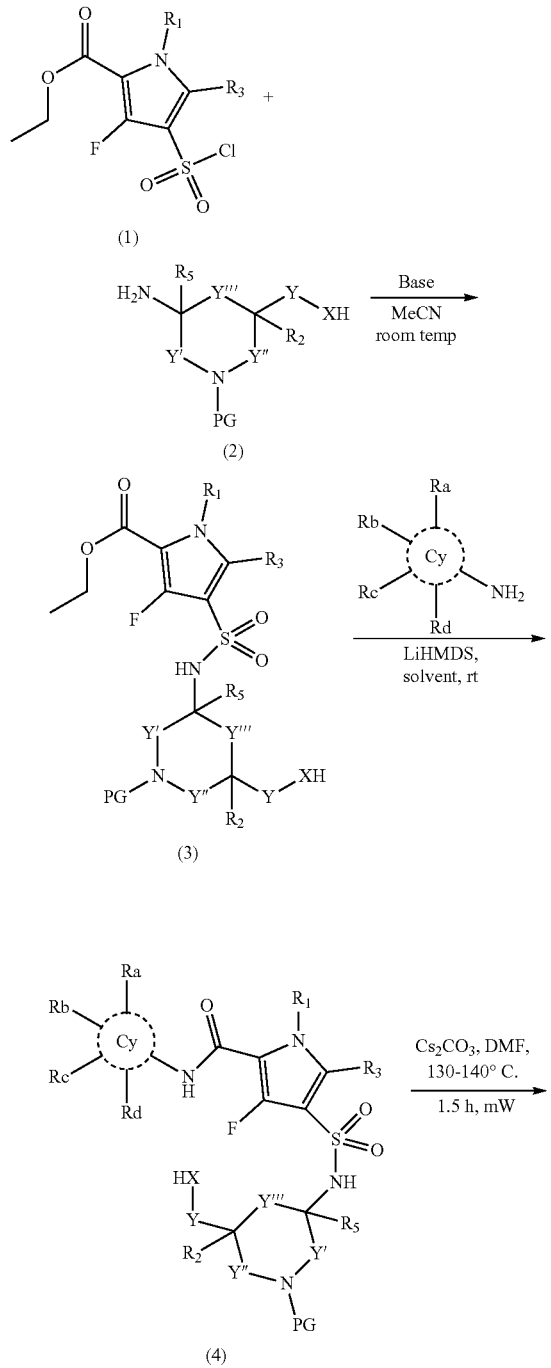

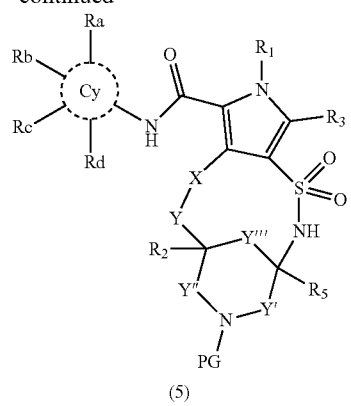

PG = Protecting Group (Boc, CBz, COOEt, ... )

Ethyl 4-(chlorosulfonyl)-3-fluoro-1-methyl-1H-pyrrole-2-carboxylate, indicated as compound (1) in Scheme 1 with $R_1$=$CH_3$ and $R_3$=H, was prepared according to the procedure described in WO2017/001655. According to Scheme 1, the primary amine derivative (2) bearing a nucleophilic —XH substituent is reacted with the compound (1) in the presence of the appropriate base to give the corresponding sulphonamide product (3). Reaction of (3) with an arylamine or heteroarylamine in the presence of a strong non-nucleophilic base, such as LiHMDS, in a solvent like tetrahydrofuran, converts the ethyl carboxylate into an arylamide derivative (4). A subsequent cyclization step through intramolecular nucleophilic attack of the XH on the fluorine gives the tricyclic core of compound (5). Depending on the specific Protecting Group (PG, as indicated in Scheme 1) in compounds (5) the product can be further elaborated through deprotection and/or further functionalization steps. In particular, when the nitrogen is as the N-Boc derivative, the Boc can be removed by acidic treatment and the resulting NH can be further converted for example into a carbamate, urea, sulphonamide, sulphonyl urea derivative or can be alkylated through, for example, reductive amination chemistry. In a particular embodiment of the invention, in a compound of general formula (5) the protected nitrogen is N-COOEt or N-PMB, wherein the Protecting Group can be cleaved through standard chemistry, such as trimethyl silyl iodide for the ethyl carbamate and hydrogenation for the p-methoxybenzyl group (PMB). In a further embodiment of the present invention, the nucleophilic group XH in the general compound (2), (3) or (4) can be further elaborated through protection and displacement with a different nucleophile. Still worth of specific note is that the specific sequence of steps indicated in Scheme 1 can be changed to optimize the efficiency of the synthetic strategy.

Upon deprotection of the compound (5) indicated in Scheme 1, the advanced intermediate of general structure (5a) is obtained and is further reacted as indicated in Scheme 2 to give the compounds of the invention.

Scheme 2

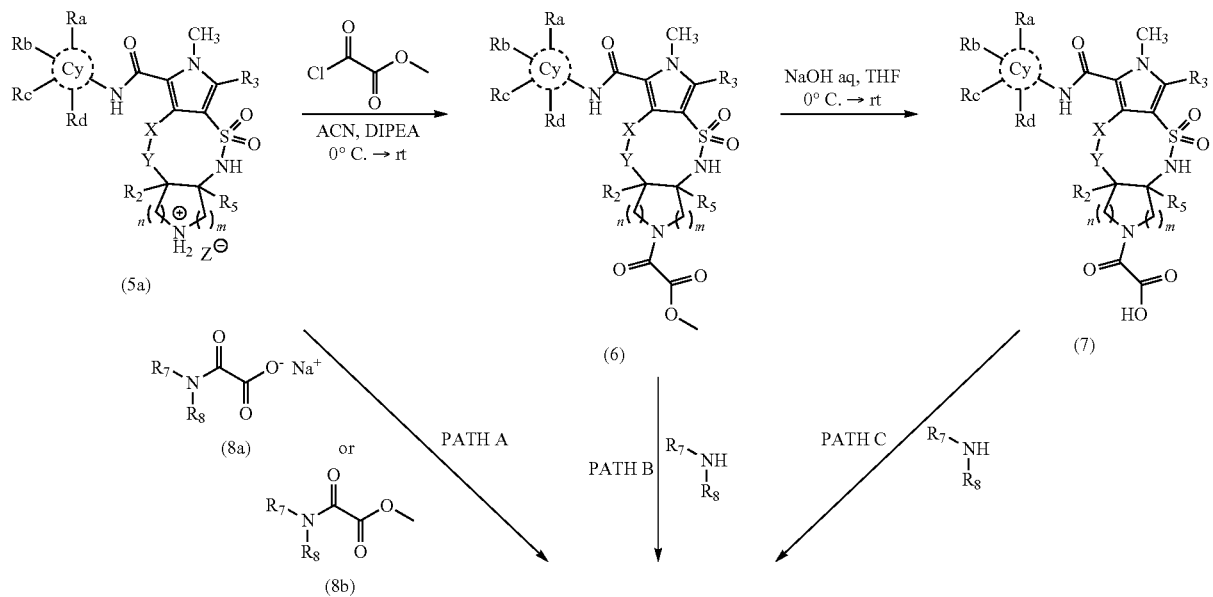

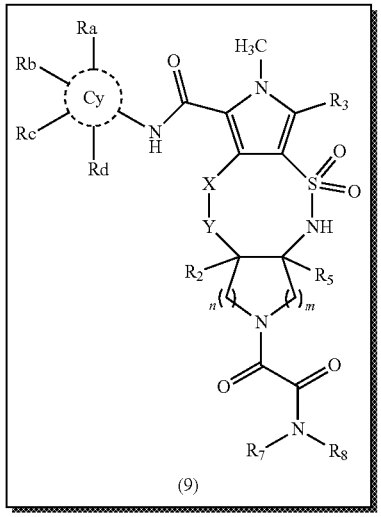

In a preferred embodiment, in compounds 5a, 6, 7 and 9, m and n are each independently 1 or 2. Compounds of formula (9) wherein $R_3$ is H can be further reacted under halogenation conditions to obtain a compound of formula (9) wherein $R_3$ is halogen. For example, reaction of a compound of formula (9) wherein $R_3$ is H with sulfuryl dichloride in dichloromethane affords the corresponding chlorinated derivative (i.e. $R_3$ is Cl).

Certain amine derivatives (2) of Scheme 1 were prepared according to the synthetic strategies outlined in Schemes 3, 4 and 5. The procedures in the schemes can be used for the synthesis of the compounds indicated below and can be used as well for the synthesis of the compounds as single diastereoisomers and/or enantiomers by choosing the starting materials with the appropriate stereochemical configuration.

Scheme 3

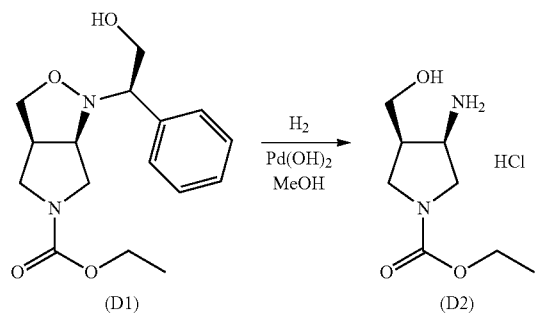

Scheme 4
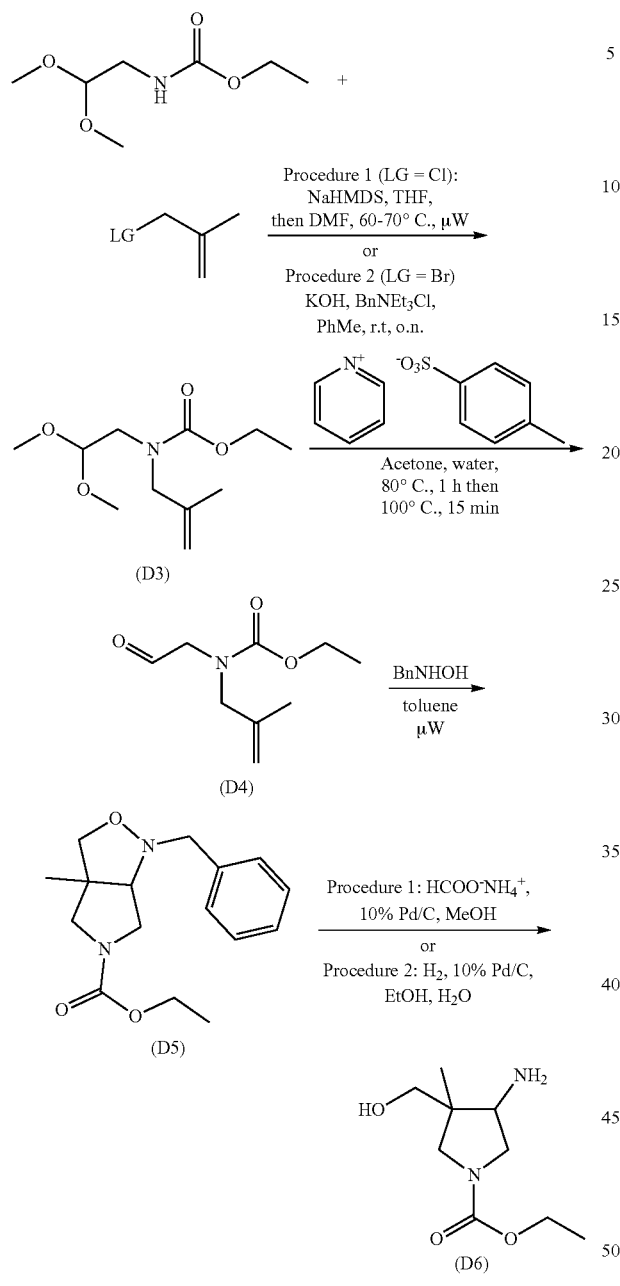
LG (Leaving Group) = Cl or Br
Scheme 5
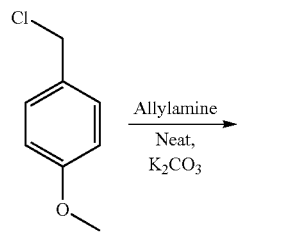
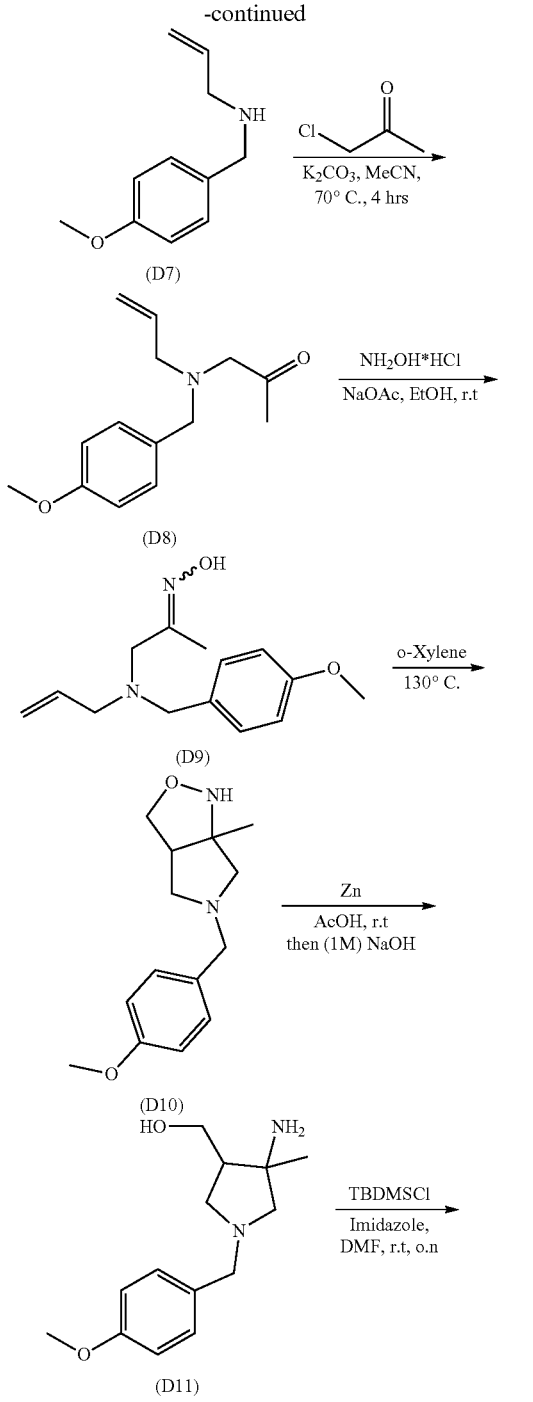
Where not otherwise indicated, starting materials and/or intermediates were obtained from commercial sources or can be obtained through synthetic procedures known in the chemistry literature. The indication of the commercial source of certain compounds in the description of the experimental procedure, when provided, is only for easy reference to skilled chemist and should not be interpreted as the indication to use only that particular commercial compound.

In the following paragraphs, the Descriptions 1 to 53 illustrate the preparation of intermediates used to make compounds of the invention and salts thereof. The Examples illustrate the preparation of the compounds of the invention and salts thereof. Where the compounds have more than one chiral center, it is understood that they might exist as mixtures of diastereoisomers or as single isomers. Both racemic and chiral compounds are within the scope of the present invention. The indicated procedures are provided merely for assistance to the skilled chemist. The starting material may not necessarily have been prepared from the batch of the Description or the Example referred to.

Description D1: Ethyl (3aR,6aR)-1-((R)-2-hydroxy-1-phenylethyl)tetrahydro-1H-pyrrolo[3,4-c]isoxazole-5(3H)-carboxylate (D1)

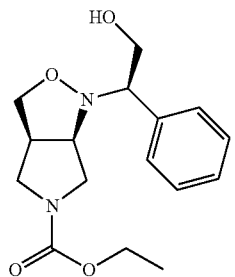 [SMILES: CCOC(=O)N1C[C@H]2CON([C@@H](CO)c3ccccc3)[C@H]2C1]

Prepared following the procedure reported in J. Org. Chem. 2003, 68, 8739-8741, starting from ethyl allyl(2-oxoethyl)carbamate (prepared as reported in US2018/0222918) and (R)-2-(hydroxyamino)-2-phenylethan-1-ol (prepared as reported in WO2010/016005). $^1$H NMR (300 MHz, CDCl$_3$) δ ppm 1.15 (t, J=7.11 Hz, 3H) 2.87 (dd, J=8.89, 4.40 Hz, 1H) 3.06-3.56 (m, 5H) 3.57-3.75 (m, 3H) 3.75-3.83 (m, 1H) 3.94-4.11 (m, 3H) 4.27 (br t, J=8.12 Hz, 1H) 7.22-7.36 (m, 5H). Method 3; Rt=2.18 min. m/z=307.32 (M+H)$^+$.

Description D2: Ethyl (3R,4R)-3-amino-4-(hydroxymethyl)pyrrolidine-1-carboxylate Hydrochloride (D2)

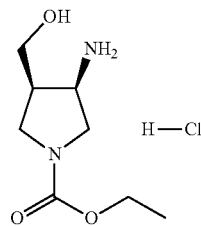

Compound D1 (2.9 g, 9.47 mmol) was dissolved in methanol (150 mL, 3.703 mol), palladium(II) hydroxide (3.06 g, 4.35 mmol) was added and the suspension was hydrogenated at 1 atm at room temperature for 16 hrs. Acetic acid (15.16 mL, 265.05 mmol) was added and the reaction stirred for 15 min then filtered over paper, washing with methanol (approx 70 mL). The solution was evaporated (30° C.), the residue treated with 1M HCl (20 mL) then further evaporated. The residue was dissolved in water (10 mL), pH was adjusted with 1M HCl (3 mL), washed with DCM and the aqueous layer was further evaporated and co-evaporated with toluene, in order to remove acetic acid traces, giving title compound D2 (1.6 g, 7.12 mmol) as off-white powder (Yield=75%). $^1$H NMR (300 MHz, DMSO-d6+TFA) δ ppm 1.18 (t, J=7.06 Hz, 3H), 2.54-2.66 (m, 1H), 3.17-3.66 (m, 6H), 3.72-3.88 (m, 1H), 3.93-4.14 (m, 2H), 8.10 (br s, 3H). Method 13; Rt=1.02 min; m/z=189.15 (M+H)$^+$.

Description D3: Ethyl (2,2-dimethoxyethyl)(2-methylallyl)carbamate (D3)

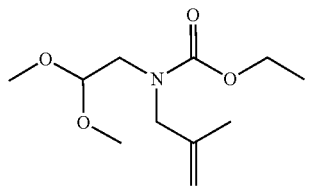 [SMILES: C=C(C)CN(CC(OC)OC)C(=O)OCC]

Procedure 1

Ethyl (2,2-dimethoxyethyl)carbamate (334125, Fluorochem, CAS: 71545-60-3) (1.73 g, 9.74 mmol) was charged in a 20 mL vial. The vial was sealed and evacuated. 1M NaHMDS in THF (13.45 mL, 13.45 mmol) was added in a single portion. The reaction was stirred at room temperature for 40 min. 3-chloro-2-methylprop-1-ene (0.47 mL, 4.64 mmol) (094695, Fluorochem, CAS: 563-47-3) was added in a single portion, the reaction was stirred at room temperature for 30-40 min then heated by microwave irradiation at 60° C. for 30 min, then at 70° C. for 4 hrs in the presence of DMF (2 mL, 0.026 mol). The reaction was diluted with water (10 mL) and extracted with diethyl ether (10 mL×3). The combined organic layers were evaporated and purified by direct flash chromatography (eluent petroleum ether/EtOAc) giving D3 (0.5 g, 2.16 mmol, yield 22%) as colourless oil.

Procedure 2

A solution of ethyl (2,2-dimethoxyethyl)carbamate (0.64 g, 3.61 mmol) (334125, Fluorochem, CAS: 71545-60-3) in toluene (4 mL) was treated with potassium hydroxide (1.04 g, 18.53 mmol) and N-benzyl-N,N-diethylethanaminium chloride (14.92 mg, 0.08 mmol) (146562, Sigma Aldrich, CAS 56-37-1). The vial was sealed and the mixture was stirred for 15 min giving a pink suspension. 3-Bromo-2-methylprop-1-ene (0.461 mL, 4.44 mmol) (067665, Fluorochem, CAS: 1458-98-6) was dissolved in toluene (0.4 mL) and added dropwise over 1 min. The reaction was stirred at room temperature overnight then filtered over paper, diluted with EtOAc, washed with brine and concentrated. The residue (0.25 g), was purified by direct flash chromatography (eluent petroleum ether/EtOAc) giving D3 (0.64 g, 2.9 mmol, yield 80%) as colourless oil. $^1$H NMR (300 MHz, DMSO-d6) δ ppm 1.18 (br d, J=6.42 Hz, 3H), 1.62 (s, 3H), 3.15-3.23 (m, 2H), 3.25-3.31 (m, 6H), 3.74-3.91 (m, 2H), 4.05 (br d, J=6.60 Hz, 2H), 4.40-4.54 (m, 1H), 4.63-4.78 (m, 1H), 4.79-4.91 (m, 1H). Method 9; Rt: 1.79-1.82 min. m/z: 254.22 (M+Na)$^+$.

Description D4: Synthesis of ethyl (2-methylallyl)(2-oxoethyl)carbamate (D4)

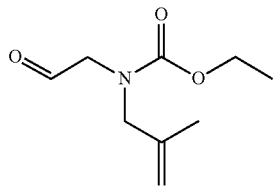

A solution of D3 (0.25 g, 1.08 mmol) in acetone (2 mL) and water (1.5 mL) was heated by microwave irradiation at 80° C. in the presence of a 1M pyridine 4-methylbenzenesulfonate in water (25 uL, 0.025 mmol). After 1 hr, 1M pyridine 4-methylbenzenesulfonate in water (100 uL, 0.1 mmol) was further added and the reaction was heated by microwave irradiation at 100° C. for 15 min (×3 runs). Acetone was removed in vacuo and the reaction mixture was extracted with DCM (4×3 mL), yielding D4 (0.158 mg, yield 79%) as colourless oil, that was used in the next step without any purification. $^1$H NMR (300 MHz, DMSO-d6) δ ppm 1.02-1.28 (m, 3H), 1.54-1.71 (m, 3H), 3.81 (s, 2H), 3.91-4.17 (m, 4H), 4.63-4.80 (m, 1H), 4.85 (s, 1H), 9.48 (d, J=4.77 Hz, 1H). Method 1; Rt: 1.04-1.54 min. m/z: 186.24 (M+H)$^+$.

Description D5: Synthesis of cis-ethyl 1-benzyl-3a-methyltetrahydro-1H-pyrrolo[3,4-c]isoxazole-5(3H)-carboxylate (D5)

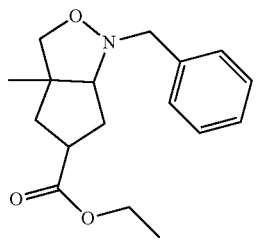 [SMILES: CCOC(=O)C1CC2N(Cc3ccccc3)OCC2(C)C1]

D4 (0.5 g, 2.7 mmol) and N-benzylhydroxylamine (0.366 g, 2.97 mmol) in toluene (5 mL) were heated under microwave irradiation for 30 min at 50° C. then additionally for 1 h at 100° C. The reaction was poured into a separating funnel, washed with an aqueous solution of 5% citric acid (3 mL) and brine (5 mL). Solvent was removed and the residue was purified by direct flash chromatography (eluent petroleum ether/EtOAc). The pure fractions were combined to afford D5 (0.2 g, 0.689 mmol, yield 25%) as yellowish oil. Method 9; Rt: 1.78. m/z: 291.31 (M+H)$^+$.

Description D6: Synthesis of cis-ethyl 4-amino-3-(hydroxymethyl)-3-methylpyrrolidine-1-carboxylate (D6)

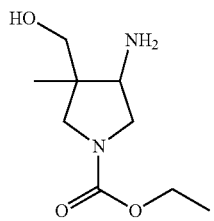

Procedure 1

A 40 mL tube was charged with a solution of D5 (0.4 g, 1.38 mmol) in methanol (24 mL), ammonium formate (0.434 g, 6.89 mmol) was added, followed by 10% Pd/C (146.6 mg). The tube was sealed, the black reaction suspension was heated at 70° C. for 1.5 h. The reaction was filtered over paper, washed with methanol and evaporated, giving D6 (230 mg, 1.137 mmol, yield 82%) used in the next step without any purification.

Procedure 2

A solution of D5 (0.176 g, 0.61 mmol) in ethanol (11.4 mL) and water (1.2 mL) was hydrogenated by H-CUBE apparatus (ThalesNano®), equipped with 10% Pd/C small type cartridge (THS01111, ThalesNano) using the following conditions: pressure Hz: 10 bar; flux: 1 mL/min at T=80° C. The solvent was removed giving D6 (0.11 g, 0.54 mmol, yield 88%) as colourless oil. The product was used in the next step without any purification. Method 9; Rt: 0.68. m/z: 203.26 (M+H)$^+$.

Description D7: N-(4-methoxybenzyl)prop-2-en-1-amine (D7)

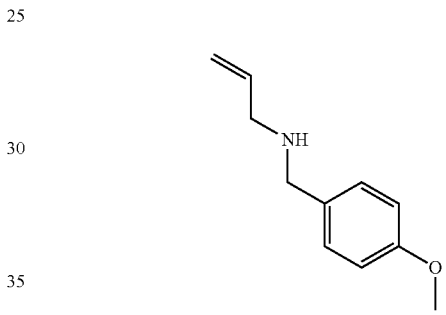

Potassium carbonate (3.2 g, 22.82 mmol) was charged in a round bottom flask (50 mL) and prop-2-en-1-amine (12 mL, 159.75 mmol) was added (the reaction was performed in neat conditions). p-anisyl chloride (2.6 mL, 19.18 mmol) (270245, Sigma Adrich, CAS: 824-94-2) was added over 50 min and the reaction mixture stirred overnight at room temperature. Allylamine was removed by evaporation, the residue dissolved in water (10 mL) and EtOAc (10 mL). The organic layer was washed with brine (10 mL), dried over anhydrous Na$_2$SO$_4$, filtered and finally evaporated, giving D7 (3.45 g, 19.47 mmol) as colourless oil (yield quantitative). Method 9; Rt: 0.90 min. m/z: 178.13 (M+H)$^+$.

Description D8: 1-(allyl(4-methoxybenzyl)amino)propan-2-one (D8)

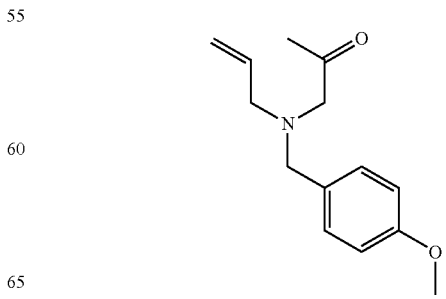

A mixture of D7 (2.27 g, 16.21 mmol) was suspended in MeCN (1 mL) and treated with chloroacetone (0.87 mL, 10.81 mmol) in a single portion. The mixture was heated in a closed vial by conventional heating at 70° C. for 4 hrs. The solvent was removed by evaporation. The residue was partitioned between water (15 mL) and EtOAc (15 mL); the organic layer was evaporated and the residue purified by direct flash chromatography (petroleum ether/EtOAc), giving D8 (1.5 g, 6.43 mmol, yield: 59%), as colourless oil. $^1$H NMR (300 MHz, CDCl$_3$) δ ppm 2.13 (s, 3H), 3.11-3.24 (m, 4H), 3.61 (s, 2H), 3.82 (s, 3H), 5.16-5.27 (m, 2H), 5.90 (ddt, J=17.02, 10.30, 6.42, 6.42 Hz, 1H), 6.88 (d, J=8.53 Hz, 2H), 7.21-7.32 (m, 3H). Method 9; Rt: 0.96 min; m/z: 234.14 (M+H)$^+$.

Description D9:
1-(allyl(4-methoxybenzyl)amino)propan-2-one Oxime (D9)

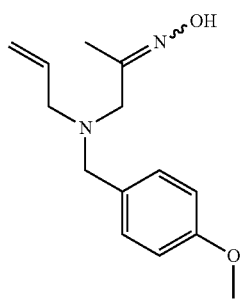 [SMILES: C=CCN(CC(C)=NO)Cc1ccc(OC)cc1]

D8 (1.5 g, 6.43 mmol) was dissolved in ethanol (50 mL) and added to a mixture of hydroxylamine chloride (0.89 g, 12.86 mmol) and sodium acetate (1.07 g, 12.86 mmol). The resulting white suspension was stirred at room temperature overnight for 3 hrs. Solvent was removed, the residue was dissolved in water (15 mL) and extracted with EtOAc (10 mL×2) dried with Na$_2$SO$_4$ (anh.), filtered and evaporated. The organic layer was evaporated and the residue was purified by direct flash chromatography (petroleum ether/EtOAc), giving D9 (1.6 g, 6.43 mmol, yield quantitative). $^1$H NMR (300 MHz, DMSO-d$_6$) δ ppm 1.68-1.98 (m, 2H), 2.13-2.40 (m, 4H), 4.05 (br d, J=7.52 Hz, 2H), 4.46 (br dd, J=13.02, 2.57 Hz, 3H), 4.82 (br d, J=14.12 Hz, 3H), 6.95 (dd, J=11.88, 0.87 Hz, 1H), 7.28 (s, 1H), 7.50 (d, J=8.53 Hz, 1H), 7.69-7.83 (m, 2H), 10.95 (br s, 1H), 11.91 (br s, 1H). Method 9; Rt: 1.01 min. m/z: 249.21 (M+H)$^+$.

Description D10: cis-5-(4-methoxybenzyl)-6a-methylhexahydro-1H-pyrrolo[3,4-c]isoxazole (D10)

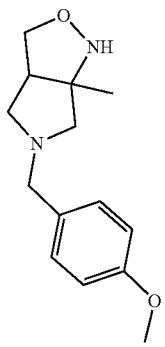 [SMILES: COc1ccc(CN2CC3CONC3(C)C2)cc1]

In a 150 mL closed vessel, D9 (1.6 g, 6.44 mmol), was dissolved in o-xylene (70 mL, 0.574 mol) and heated at 130° C. for 32 h. The solvent was removed under reduced pressure. The residue was purified by direct flash chromatography (eluent EtOAc/MeOH), giving impure title product (700 mg) that was further purified by a second direct flash chromatography (eluent DCM/MeOH), giving D10 (0.55 mg, yield 34%). Method 9; Rt: 0.81 min. m/z: 249.27 (M+H)$^+$.

Description D11: cis-(4-amino-1-(4-methoxybenzyl)-4-methylpyrrolidin-3-yl)methanol (D11)

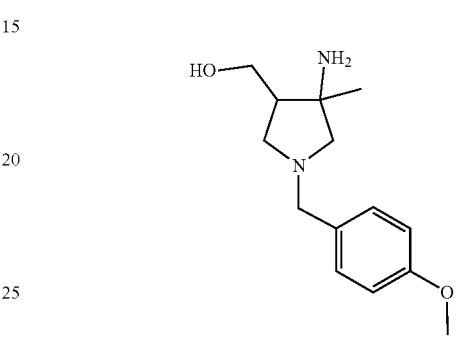

D10 (0.479 g, 1.91 mmol) was dissolved in acetic acid (10 mL), transferred into a 20 mL vial, treated with a single portion of zinc (0.505 g, 7.72 mmol). The vial was closed, the mixture stirred overnight at room temperature. The reaction was diluted with EtOAc, filtered and evaporated and stripped with toluene (3 times). The residue (0.6 g) was dissolved in a solution of NaHCO$_3$ (0.45 g) in water (6 mL). The organic layer was separated and collected. The aqueous layer was further basified with 1M NaOH (10 mL) and extracted with DCM (5 mL×3 times). The combined organic extracts were dried over Na$_2$SO$_4$ (anh.), filtered and finally evaporated giving D11 (0.479 g, 1.913 mmol) as yellowish oil. $^1$H NMR (300 MHz, DMSO-d$_6$) δ ppm 1.21 (s, 3H), 1.47-2.19 (m, 3H), 2.26-2.38 (m, 2H), 2.44 (d, J=8.80 Hz, 1H), 2.66 (t, J=8.94 Hz, 1H), 3.39-3.48 (m, 1H), 3.48-3.63 (m, 3H), 3.79 (s, 3H), 3.94-5.32 (m, 1H), 6.92 (d, J=8.62 Hz, 2H), 7.26 (d, J=8.44 Hz, 2H). Method 2; Rt: 1.40 min; m/z: 251.25 (M+H)$^+$.

Description D12: cis-4-(((tert-butyldimethylsilyl)oxy)methyl)-1-(4-methoxybenzyl)-3-methylpyrrolidin-3-amine (D12)

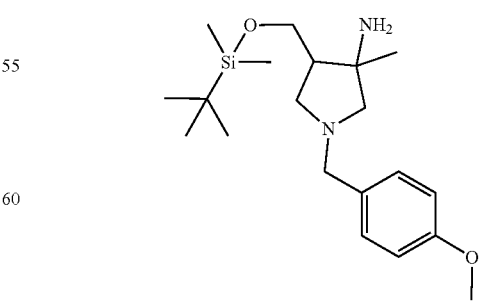

A solution of D11 (0.170 g, 0.68 mmol) in DCM (0.2 mL) and DMF (1 mL) was treated with a solution of 1H-imidazole (0.108 mg, 1.58 mmol) in DMF (1 mL). The reaction was cooled with dry ice/acetone bath then a solution of tert-butylchlorodimethylsilane (0.114 mg, 0.76 mmol) in DMF (1 mL) was added dropwise over 2 min. The cooling bath was removed and the reaction was stirred overnight at room temperature. The reaction was diluted with water (4 mL) and EtOAc (10 mL), stirred for 10 min, poured into a separating funnel and the aqueous layer extracted with EtOAc (5 mL×3). The combined organic extracts were washed with water (2 mL) and brine (2 mL), dried over anhydrous $Na_2SO_4$, filtered and finally evaporated giving a residue (200 mg). Purification was performed by direct flash chromatography (eluent EtOAc/MeOH), giving D12 (0.127 mg, yield 51%) as yellowish oil. $^1$H NMR (300 MHz, DMSO-$d_6$) δ ppm 0.08-0.04 (m, 6H), 0.76-0.88 (m, 9H), 1.07-1.24 (m, 3H), 1.52 (br s, 2H), 1.78-1.91 (m, 1H), 2.14-2.22 (m, 1H), 2.23-2.30 (m, 1H), 2.34-2.39 (m, 1H), 2.56-2.65 (m, 1H), 3.35-3.48 (m, 2H), 3.49-3.58 (m, 1H), 3.63-3.69 (m, 1H), 3.69-3.73 (m, 3H), 6.84 (d, J=8.53 Hz, 2H), 7.17 (d, J=8.44 Hz, 2H). Method 2; Rt: 1.56 min; m/z: 365.26 (M+H)$^+$.

Description D13: Ethyl (3R,4R)-3-((4-fluoro-5-((4-fluoro-3-methylphenyl)carbamoyl)-1-methyl-1H-pyrrole)-3-sulfonamido)-4-(hydroxymethyl)pyrrolidine-1-carboxylate (D13)

Compound was prepared according to the Scheme below:

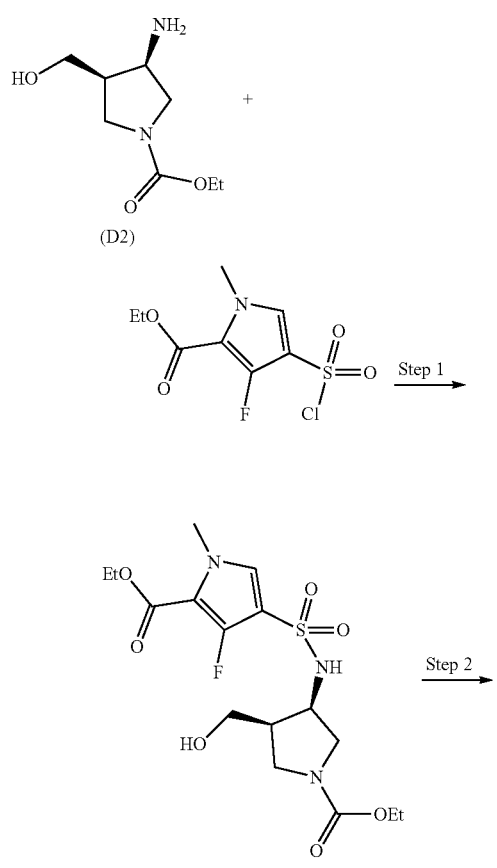

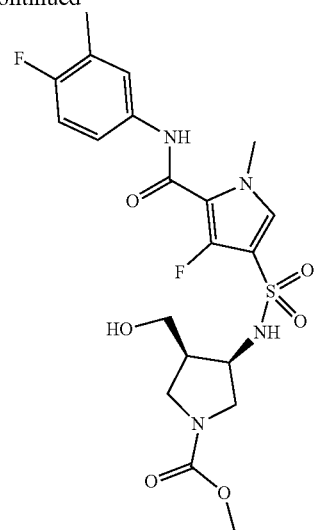

(D13)

Step 1:

To a solution of D2 (1351.61 mg, 7.18 mmol) in dry MeCN (24 mL), DIPEA (2.5 mL, 14.36 mmol) was added; then a solution of ethyl 4-(chlorosulfonyl)-3-fluoro-1-methyl-1H-pyrrole-2-carboxylate (1936.57 mg, 7.18 mmol) in dry MeCN (12 mL) was added dropwise over 10 minutes. The reaction was stirred at RT for 90 min then was concentrated under reduced pressure, diluted with EtOAc (130 mL), washed with 5% citric acid solution (40 ml) and brine (20 ml), dried over $Na_2SO_4$ (anh.), filtered and solvent removed under reduced pressure. The crude was purified by direct flash chromatography (eluent DCM/AcOEt) to afford ethyl 4-(N-((3R,4R)-1-(ethoxycarbonyl)-4-(hydroxymethyl)pyrrolidin-3-yl)sulfamoyl)-3-fluoro-1-methyl-1H-pyrrole-2-carboxylate (2.9 g, yield=91%) as a white solid. Method 1: Rt=1.44 min; m/z=422.41 (M+H)$^+$.

Step 2:

To a solution of ethyl 4-(N-((3R,4R)-1-(ethoxycarbonyl)-4-(hydroxymethyl)pyrrolidin-3-yl)sulfamoyl)-3-fluoro-1-methyl-1H-pyrrole-2-carboxylate (2.7 g, 6.43 mmol) prepared in Step 1 and 4-fluoro-3-methylaniline (0.845 g, 6.75 mmol) (006273, Fluorochem, CAS: 452-69-7) in dry THF (50 mL), lithium bis(trimethylsilyl)amide (1M in THF) (3.33 mL, 20 mmol) was added dropwise at room temperature. After 60 min the reaction was quenched with water, diluted with DCM and washed with aq 5% citric acid and brine. The organic layer was dried over $Na_2SO_4$, filtered and concentrated under reduced pressure to afford D13 as a brown foam that was used without further purification. Method 1: Rt=1.81 min; m/z=501.16 (M+H)$^+$.

Description D14: Ethyl (3R,4R)-3-((4-fluoro-5-((4-fluoro-3-methylphenyl)carbamoyl)-1-methyl-1H-pyrrole)-3-sulfonamido)-4-(((methylsulfonyl)oxy)methyl)pyrrolidine-1-carboxylate (D14)

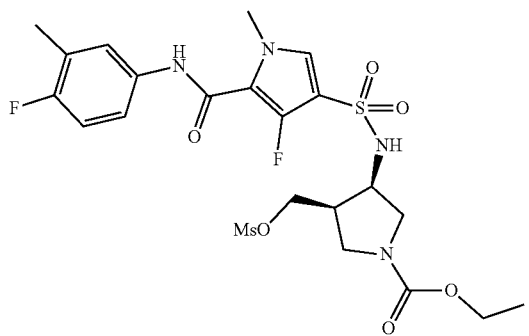 [SMILES: CCOC(=O)N1C[C@@H](COS(C)(=O)=O)[C@@H](NS(=O)(=O)c2cn(C)c(C(=O)Nc3ccc(F)c(C)c3)c2F)C1]

To a solution of D13 (623 mg, 1.24 mmol) in dry DCM (27 mL), triethylamine (0.35 mL, 2.49 mmol) and DMAP (15.2 mg, 0.12 mmol) were sequentially added. The resulting solution was cooled to 0° C. and methanesulfonyl chloride (0.13 mL, 1.62 mmol) was added dropwise. The reaction mixture was stirred for 5 min at 0° C. then 1 h at RT. The mixture was diluted with DCM and washed twice with 5% citric acid solution and brine. Organic layer was dried over $Na_2SO_4$, filtered and concentrated under reduced pressure, to obtain a crude product D14 in almost quantitative yield (721 mg), that was used in the next step without further purification. Method 1; Rt=1.98 min; m/z=579.14 $(M+H)^+$.

Description D15: Ethyl (3R,4R)-3-((acetylthio)methyl)-4-((4-fluoro-5-((4-fluoro-3-methylphenyl)carbamoyl)-1-methyl-1H-pyrrole)-3-sulfonamido)pyrrolidine-1-carboxylate (D15)

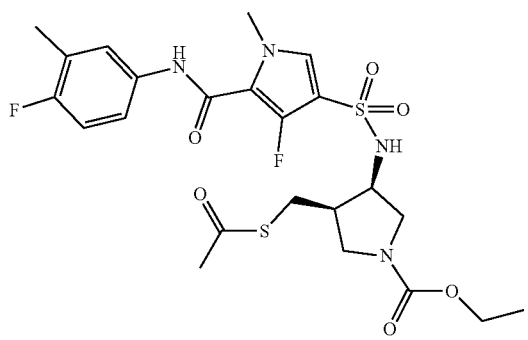 [SMILES: CCOC(=O)N1C[C@@H](CSC(C)=O)[C@@H](NS(=O)(=O)c2cn(C)c(C(=O)Nc3ccc(F)c(C)c3)c2F)C1]

To a solution of D14 (257 mg, 0.44 mmol) in dry DMF (7.6 ml) was added potassium thioacetate (634 mg, 5.55 mmol). The dark-red reaction mixture was stirred at room temperature overnight, then was diluted with EtOAc and washed with water. The organic layer was dried over $Na_2SO_4$ anhydrous, filtered and concentrated under reduced pressure. The resulting crude was purified by flash chromatography on silica (eluent petroleum ether/EtOAc) to obtain D15 (170 mg, y=68.5%) as off-white foam. $^1$H NMR (300 MHz, DMSO-$d_6$) δ ppm 1.09-1.21 (m, 4H), 2.23 (s, 3H), 2.30 (s, 3H), 2.33-2.43 (m, 1H), 2.90 (m, J=7.50 Hz, 2H), 3.03-3.16 (m, 1H), 3.16-3.26 (m, 1H), 3.35-3.48 (m, 2H), 3.81 (s, 4H), 3.93-4.05 (m, 2H), 7.11 (t, J=9.35 Hz, 1H), 7.41-7.53 (m, 2H), 7.54-7.65 (m, 1H), 8.04-8.30 (m, 1H), 9.84-10.17 (m, 1H). Method 1; Rt=2.12 min; m/z=559.18 $(M+H)^+$.

Description D16: ethyl (3R,4R)-3-((4-fluoro-5-((4-fluoro-3-methylphenyl)carbamoyl)-1-methyl-1H-pyrrole)-3-sulfonamido)-4-(mercaptomethyl)pyrrolidine-1-carboxylate (D16)

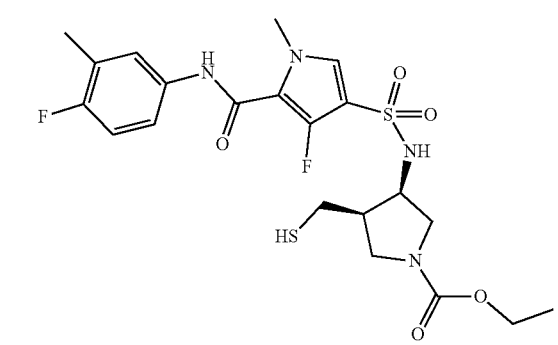 [SMILES: CCOC(=O)N1C[C@@H](CS)[C@@H](NS(=O)(=O)c2cn(C)c(C(=O)Nc3ccc(F)c(C)c3)c2F)C1]

To a solution of D15 (443 mg, 0.79 mmol) in methanol (3.7 mL) was added 1N NaOH solution (1.52 mL, 1.52 mmol), and the reaction mixture was stirred at room temperature for 40 min. The reaction was diluted with water, acidified with 1N HCl until pH=3 (a white solid precipitated), and extracted twice with EtOAc. Organic layer was dried over $Na_2SO_4$, filtered and concentrated under vacuo, to obtain 396 mg of a light-yellow foam (containing desired product and S—S dimer, ratio 1:1). The residue was dissolved in acetic acid (9 mL), zinc (1037 mg, 15.86 mmol) was added and the reaction mixture was stirred at 100° C. for 2 h. The reaction was filtered through a pad of celite, washed with DCM and concentrated under vacuo, to obtain crude D16 (431 mg) as white foam, that was used in the next step without further purification. Method 1; Rt=2.09 min; m/z=517.17 $(M+H)^+$ Description D17: Synthesis of cis-ethyl 4-((4-fluoro-5-((4-fluoro-3-methylphenyl)carbamoyl)-1-methyl-1H-pyrrole)-3-sulfonamido)-3-(hydroxymethyl)-3-methylpyrrolidine-1-carboxylate (D17)

Compound was prepared according to the Scheme below:

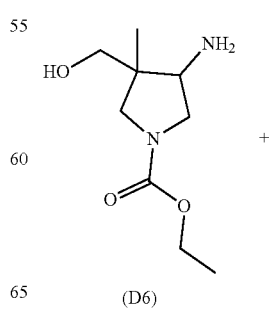

(D6)

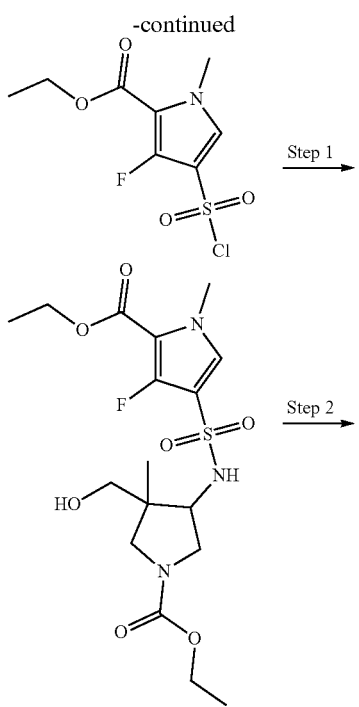

Step 1:

D6 (110 mg, 0.54 mmol) was dissolved in MeCN (2 mL), cooled to 0° C., treated with ethyl 4-(chlorosulfonyl)-3-fluoro-1-methyl-1H-pyrrole-2-carboxylate (146.7 mg, 0.54 mmol) and then with DIPEA (0.21 mL, 1.2 mmol). The reaction was stirred at room temperature overnight. Solvent was removed in vacuo. The residue was partitioned between DCM and saturated solution of NaHCO$_3$; the organic layer was evaporated and the residue purified by direct flash chromatography (direct phase, eluent petroleum ether/EtOAc) giving cis-ethyl 4-(N-(1-(ethoxycarbonyl)-4-(hydroxymethyl)-4-methyl pyrrolidin-3-yl)sulfamoyl)-3-fluoro-1-methyl-1H-pyrrole-2-carboxylate (100 mg, 0.23 mmol) as white solid. Method 1; Rt: 1.64; m/z: 436.19 (M+H)$^+$.

Step 2:

A solution of cis-ethyl 4-(N-(1-(ethoxycarbonyl)-4-(hydroxymethyl)-4-methylpyrrolidin-3-yl)sulfamoyl)-3-fluoro-1-methyl-1H-pyrrole-2-carboxylate (100 mg, 0.23 mmol), prepared in Step 1, and 4-fluoro-3-methylaniline (30.2 mg, 0.24 mmol) in THF (1.45 mL) was treated with a single portion of 1M lithium bis(trimethylsilyl)amide in THF (1.16 mL, 1.16 mmol) at room temperature. The reaction mixture was stirred at room temperature for 1 h. The reaction was poured in water and extracted with EtOAc. The organic layer was washed with 5% citric acid and dried over Na$_2$SO$_4$ (anh), filtered and finally evaporated giving a residue that was purified by Fraction-Lynx (H$_2$O/CH$_3$CN+1‰ TFA). Step 2 afforded D17 (100 mg, 0.194 mmol). $^1$H NMR (300 MHz, DMSO-d6) δ ppm 0.83-0.91 (m, 3H), 1.05-1.12 (m, 3H), 2.16 (d, J=1.28 Hz, 3H), 2.49-2.70 (m, 1H), 2.82 (br t, J=10.22 Hz, 1H), 3.05 (br s, 1H), 3.27-3.54 (m, 4H), 3.67-3.80 (m, 3H), 3.84-4.05 (m, 2H), 4.55-4.78 (m, 1H), 7.05 (t, J=9.22 Hz, 1H), 7.42 (br d, J=4.40 Hz, 2H), 7.53 (br d, J=6.69 Hz, 1H), 7.77 (br d, J=8.62 Hz, 1H), 9.96 (s, 1H). Method 9; Rt: 1.91; m/z: 515.21 (M+H)+.

Description D18: cis-ethyl 4-((4-fluoro-1-methyl-5-((3,4,5-trifluorophenyl)carbamoyl)-1H-pyrrole)-3-sulfonamido)-3-(hydroxymethyl)-3-methylpyrrolidine-1-carboxylate (D18)

Compound was prepared according to the Scheme below:

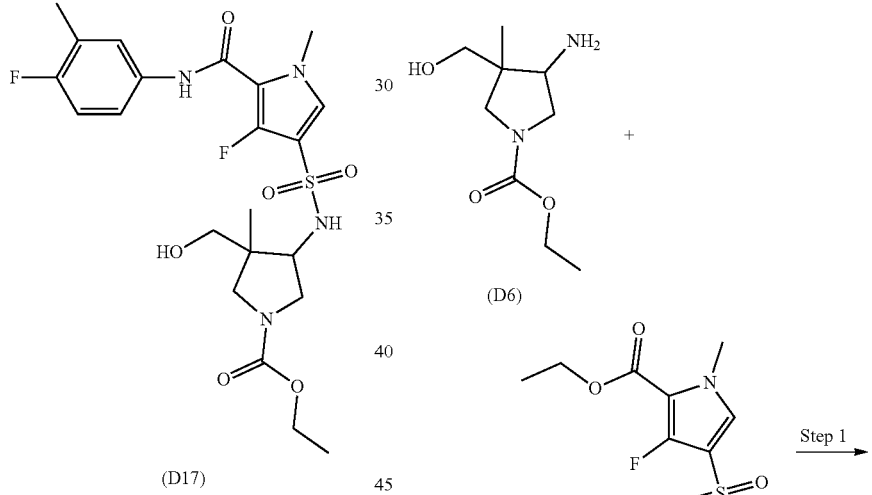

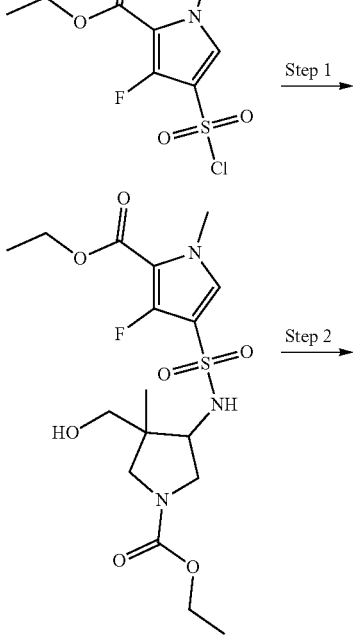

57

-continued (D18)

Step 1:

D6 (110 mg, 0.54 mmol) was dissolved in MeCN (2 mL), cooled to 0° C., treated with ethyl 4-(chlorosulfonyl)-3-fluoro-1-methyl-1H-pyrrole-2-carboxylate (146.7 mg, 0.54 mmol) and then with DIPEA (0.21 mL, 1.2 mmol). The reaction was stirred at room temperature overnight. Solvent was removed in vacuo. The residue was partitioned between DCM and NaHCO₃; the organic layer was evaporated and the residue purified by direct flash chromatography (direct phase, eluent petroleum ether/EtOAc) giving cis-ethyl 4-(N-(1-(ethoxycarbonyl)-4-(hydroxymethyl)-4-methyl pyrrolidin-3-yl)sulfamoyl)-3-fluoro-1-methyl-1H-pyrrole-2-carboxylate (100 mg, 0.23 mmol) as white solid. Method 1; Rt: 1.64; m/z: 436.19 (M+H)⁺.

Step 2:

A mixture of the intermediate compound from Step 1 (55 mg, 0.13 mmol) and 3,4,5-trifluoroaniline (20.44 mg, 0.14 mmol) (002064, Fluorochem, CAS: 163733-96-8) in THF (1 mL) was treated with a single portion of 1M lithium bis(trimethylsilyl)amide in THF (0.632 mL, 0.632 mmol) at room temperature. The resulting brown mixture was stirred at room temperature for 15 min. Solvent was removed in vacuo, the residue partitioned between water and EtOAc; the organic layer was dried over Na₂SO₄ (anh.), filtered and finally evaporated, giving D18 (30 mg, 0.056 mmol) that was used in the next step without any further purification. Method 9: Rt. 2.04; m/z; 537.36 (M+H)⁺.

Description D19: cis-3-fluoro-N-(4-fluoro-3-methylphenyl)-4-(N-(4-(hydroxymethyl)-1-(4-methoxybenzyl)-3-methylpyrrolidin-3-yl)sulfamoyl)-1-methyl-1H-pyrrole-2-carboxamide (D19)

Compound was prepared according to the Scheme below:

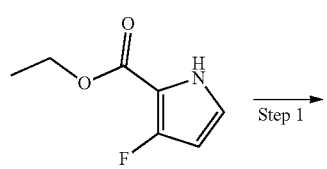

58

-continued

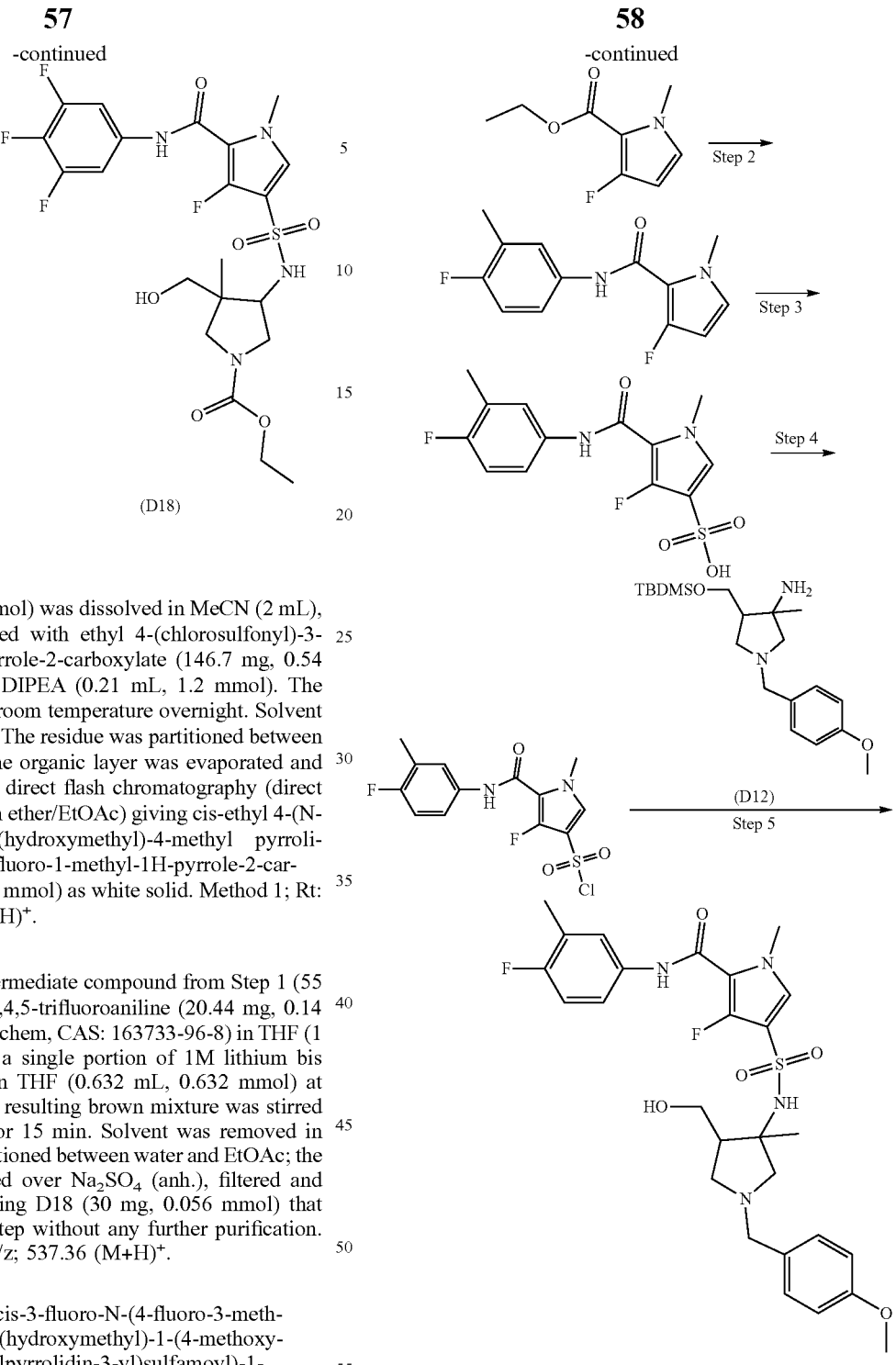

Step 1:

To a solution of ethyl 3-fluoro-1H-pyrrole-2-carboxylate (12.5 g, 79.6 mmol) (231254, Fluorochem, CAS: 168102-05-4) in dry DMF (125 mL) cooled to 0° C. under nitrogen atmosphere, sodium hydride (60% weight in mineral oil, 3.7 g, 92.5 mmol) was added portion wise over 30 min. The reaction mixture was stirred for further 20 min then iodomethane (5.8 mL, 93.2 mmol) was added dropwise over 30 min. The mixture was stirred for further 30 min at the same temperature then quenched with 2N HCl (20 mL). The reaction mixture was dumped into water (120 mL) and toluene (650 mL) and the mixture was vigorously stirred for 10 min. The two phase were separated and the organic phase washed with water (250 mL) and brine (250 mL), dried over $Na_2SO_4$ (anh.) and filtered. Ethyl 3-fluoro-1-methyl-1H-pyrrole-2-carboxylate (13.6 g) was obtained as a pale yellow oil after solvent evaporation and used without further purification. $^1$H NMR (300 MHz, DMSO-d6) δ ppm 1.27 (t, J=7.11 Hz, 3H), 3.78 (s, 3H), 4.23 (q, J=7.06 Hz, 2H), 5.99 (d, J=3.03 Hz, 1H), 7.00 (dd, J=5.27, 3.07 Hz, 1H).

Step 2:

Ethyl 3-fluoro-1-methyl-1H-pyrrole-2-carboxylate (13.6 g, 79.5 mmol), prepared in Step 1, and 4-Fluoro-3-methyl-aniline (10.3 g, 82.3 mmol) were dissolved in dry toluene (50 mL). LiHMDS (140 mL, 1 M in toluene, 140 mmol) was added dropwise over 30 min and the reaction mixture was stirred at room temperature for further 30 min. The reaction mixture was cooled at 0° C. and slowly quenched with 2N HCl (200 mL), diluted with water (200 mL) and toluene (200 mL) and stirred at RT for 20 min. The two phases were separated and the organic phase washed with sat $NaHCO_3$ (200 mL) and brine (200 mL), dried over $Na_2SO_4$ (anh.) and filtered. 3-fluoro-N-(4-fluoro-3-methylphenyl)-1-methyl-1H-pyrrole-2-carboxamide (19.8 g) was obtained as a light brown solid after solvent evaporation and used without further purification. $^1$H NMR (300 MHz, DMSO-d6) δ ppm 2.22 (s, 3H), 3.76 (s, 3H), 6.01 (d, J=3.03 Hz, 1H), 6.91 (dd, J=5.27, 3.07 Hz, 1H), 7.08 (t, J=9.22 Hz, 1H), 7.35-7.53 (m, 1H), 7.59 (dd, J=7.06, 2.20 Hz, 1H), 9.50 (br s, 1H).

Step 3:

To a solution of 3-fluoro-N-(4-fluoro-3-methylphenyl)-1-methyl-1H-pyrrole-2-carboxamide (19.8 g, 79.5 mmol), prepared in Step 2, in dry DCM (90 mL) cooled to 0° C. under nitrogen atmosphere, chlorosulfonic acid (5.7 mL, 85.6 mmol) dissolved in dry DCM (120 mL) was added dropwise over 90 min. The reaction mixture was stirred at the same temperature for further 30 min; then the formed precipitate was filtered and washed several times with $Et_2O$. 4-fluoro-5-((4-fluoro-3-methylphenyl)carbamoyl)-1-methyl-1H-pyrrole-3-sulfonic acid (23.1 g, 88% yield over three steps) obtained as a light grey solid was dried under vacuum overnight and used without further purification. $^1$H NMR (300 MHz, DMSO-d6) δ ppm 2.22 (s, 3H), 3.70 (s, 3H), 6.93 (d, J=5.04 Hz, 1H), 7.07 (t, J=9.22 Hz, 1H), 7.44-7.52 (m, 1H), 7.60 (dd, J=7.06, 2.20 Hz, 1H), 9.64 (s, 1H).

Step 4:

Dry DMF (0.35 mL, 4.51 mmol) was added to a suspension of 4-fluoro-5-((4-fluoro-3-methylphenyl)carbamoyl)-1-methyl-1H-pyrrole-3-sulfonic acid (14.9 g, 45.1 mmol), prepared in Step 3, in thionyl chloride (112 mL). The reaction mixture was heated to 75° C. and stirred at the same temperature for 45 min. The brown solution was cooled to RT, diluted with toluene (200 mL) and slowly poured into a mixture of toluene (200 mL) and ice (500 mL) under vigorous stirring. The biphasic system was stirred for 20 min, the two phases were separated and the organic phase washed with ice-water (200 mL) and brine (200 mL), dried over $Na_2SO_4$ (anh.), filtered and concentrated under reduce pressure. The residue was purified on silica (eluent Petroleum ether/AcOEt gradient) yielding 4-fluoro-5-((4-fluoro-3-methylphenyl)carbamoyl)-1-methyl-1H-pyrrole-3-sulfonyl chloride (13.9 g, 88% yield) as a beige powder. $^1$H NMR (300 MHz, CDCl3) δ ppm 2.31 (s, 3H), 4.06 (s, 3H), 7.03 (t, J=8.89 Hz, 1H), 7.26-7.36 (m, 2H), 7.39-7.46 (m, 1H), 7.72 (br d, J=8.16 Hz, 1H).

Step 5:

A solution of D12 (0.1 g, 0.27 mmol) and N-ethyl-N-isopropylpropan-2-amine (0.16 mL, 0.92 mmol) in DCM (1.29 mL) was added in a single portion to 4-fluoro-5-((4-fluoro-3-methylphenyl)carbamoyl)-1-methyl-1H-pyrrole-3-sulfonyl chloride (0.112 mg, 0.29 mmol), prepared in Step 4. The resulting solution was stirred overnight at room temperature. The reaction was diluted with DCM (2 mL), poured into a separating funnel and washed with water (2 mL).

The organic layer was evaporated and treated with 6N HCl (5 mL), MeOH (3 mL) and MeCN (2 mL). The resulting mixture was stirred at room temperature for 1 h giving a solution. The reaction was poured into a separating funnel and extracted with DCM (5 mL×3). The organic layer was washed with $NaHCO_3$(sat. solution, 10 mL), dried over $Na_2SO_4$ (anh.), filtered and finally evaporated giving a residue (0.2 g). The purification was performed by direct flash chromatography (eluent 5% MeOH/EtOAc), affording D19 (0.075 g, 0.133 mmol, yield 49%). $^1$H NMR (300 MHz, DMSO-$d_6$) δ ppm 1.36 (s, 3H), 1.84-2.06 (m, 1H), 2.23 (s, 3H), 2.27 (br dd, J=4.22, 2.29 Hz, 1H), 2.54-2.59 (m, 1H), 2.62-2.69 (m, 1H), 2.70-2.80 (m, 1H), 3.35-3.54 (m, 3H), 3.56-3.67 (m, 1H), 3.71 (s, 3H), 3.78 (s, 3H), 4.94-5.05 (m, 1H), 6.76-6.91 (m, 2H), 7.05-7.21 (m, 3H), 7.28-7.38 (m, 1H), 7.40-7.54 (m, 2H), 7.54-7.66 (m, 1H), 9.86-10.07 (m, 1H). Method 9; Rt: 1.64 min; m/z: 563.30 $(M+H)^+$.

Description D20: Ethyl (3aR,10aR)-8-((4-fluoro-3-methylphenyl)carbamoyl)-7-methyl-3a,4,10,10a-tetrahydro-1H,7H-dipyrrolo[3,4-c:3',4'-g][1,6,2]dithiazocine-2(3H)-carboxylate 5,5-dioxide (D20)

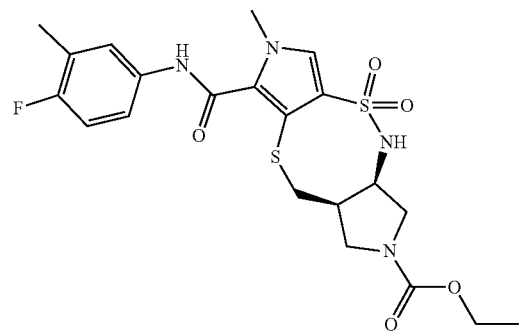 [SMILES: CCOC(=O)N1C[C@H]2CSc3c(cn(C)c3C(=O)Nc3ccc(F)c(C)c3)S(=O)(=O)N[C@H]2C1]

To a solution of crude D16 (0.793 mmol) in DMF (14.5 mL) was added cesium carbonate (646 mg, 1.98 mmol), and the reaction mixture was stirred at 135° C. for 1 h. Reaction was diluted with EtOAc and washed with water (×3). Organic layer was dried over $Na_2SO_4$ (anh.), filtered and concentrated under vacuo. The resulting crude was purified by flash chromatography on silica (eluent DCM/MeOH), then by preparative HPLC-MS ($H_2O/CH_3CN$+0.1% HCOOH) to obtain, after lyophilization, D20 (280 mg, yield=71%) as white solid. $^1$H NMR (300 MHz, DMSO-$d_6$) δ ppm 1.17 (q, J=6.82 Hz, 3H), 2.23 (s, 3H), 2.31-2.44 (m, 1H), 2.56-2.71 (m, 1H), 2.87-3.09 (m, 1H), 3.16-3.44 (m, 3H), 3.54-3.83 (m, 4H), 3.88-4.13 (m, 2H), 4.59-4.85 (m, 1H), 7.10 (t, J=9.35 Hz, 1H), 7.42-7.60 (m, 2H), 7.61-7.74 (m, 1H), 8.01-8.25 (m, 1H), 10.32 (s, 1H). Method 3; Rt=3.47 min; m/z=497.24 $(M+H)^+$.

Description D21: Ethyl (3aR,10aR)-8-((4-fluoro-3-methylphenyl)carbamoyl)-7-methyl-3a,4,10,10a-tetrahydro-1H,7H-dipyrrolo[3,4-b:3',4'-f][1,4,5]oxathiazocine-2(3H)-carboxylate 5,5-dioxide (D21)

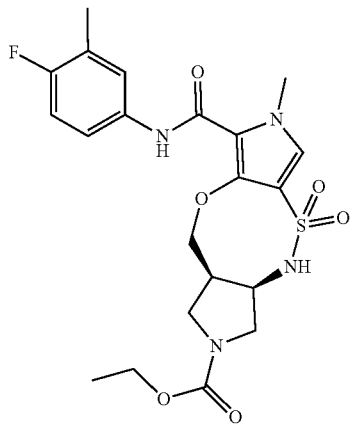 [SMILES: CCOC(=O)N1C[C@H]2COc3c(cn(C)c3C(=O)Nc3ccc(F)c(C)c3)S(=O)(=O)N[C@H]2C1]

In a pressure vessel D13 (3.13 g, 6.25 mmol) was dissolved in dry DMF (120 mL); cesium carbonate (5.3 g, 16.26 mmol) was added, the vial was sealed and mixture heated at 140° C. for 4 h. The solvent was removed under reduced pressure, the residue was taken up with EtOAc and washed with water (×3). Organic layer was dried over $Na_2SO_4$ (anh.), filtered and solvent removed under reduced pressure. The resulting light-brown foam was then treated with $Et_2O$ to remove residual solvent and obtain D21 (2.8 g, yield=93%) as light-brown solid, that was used in the next step without further purification. $^1$H NMR (300 MHz, DMSO-d6) δ ppm 1.05-1.27 (m, 3H), 2.24 (d, J=1.47 Hz, 3H), 2.92-3.16 (m, 2H), 3.41 (br d, J=10.91 Hz, 2H), 3.64-4.10 (m, 7H), 4.32-4.69 (m, 2H), 7.11 (t, J=9.22 Hz, 1H), 7.39-7.67 (m, 3H), 7.96 (s, 1H), 9.34 (s, 1H). Method 1: Rt=2.00 min; m/z=481.24 (M+H)$^+$.

Description D22: Ethyl (3aR,10aR)-8-((3-chloro-4-fluorophenyl)carbamoyl)-7-methyl-3a,4,10,10a-tetrahydro-1H,7H-dipyrrolo[3,4-b:3',4'-f][1,4,5]oxathiazocine-2(3H)-carboxylate 5,5-dioxide (D22)

The compound was prepared according to the following Scheme:

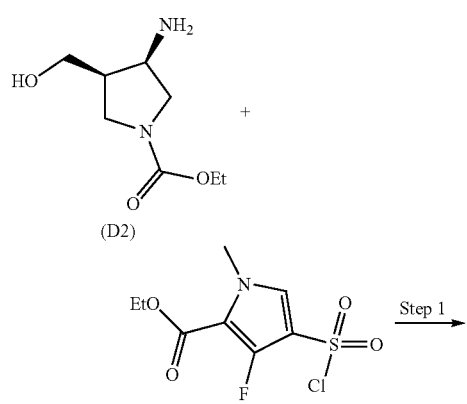

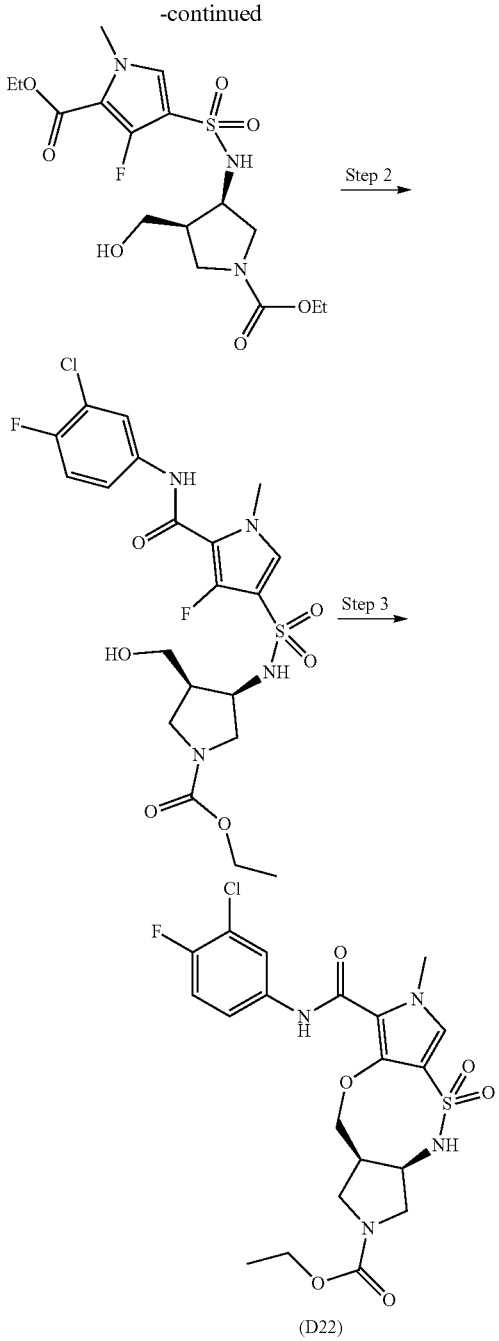

Step 1 and Step 2 were carried out according to the procedure described for the synthesis of compound D13, using in the Step 2 3-chloro-4-fluoroaniline (001682, Fluorochem, CAS: 367-21-5) instead of 4-fluoro-3-methylaniline. Step 3 was carried out as described for compound D21. Method 1: Rt=2.09 min; m/z=501.30, 503.39 (M+H)$^+$.

Description D23: ethyl (3aR,10aR)-7-methyl-8-((3,4,5-trifluorophenyl)carbamoyl)-3a,4,10,10a-tetrahydro-1H,7H-dipyrrolo[3,4-b:3',4'-f][1,4,5]oxathiazocine-2(3H)-carboxylate 5,5-dioxide (D23)

The compound was prepared according to the following Scheme:

63

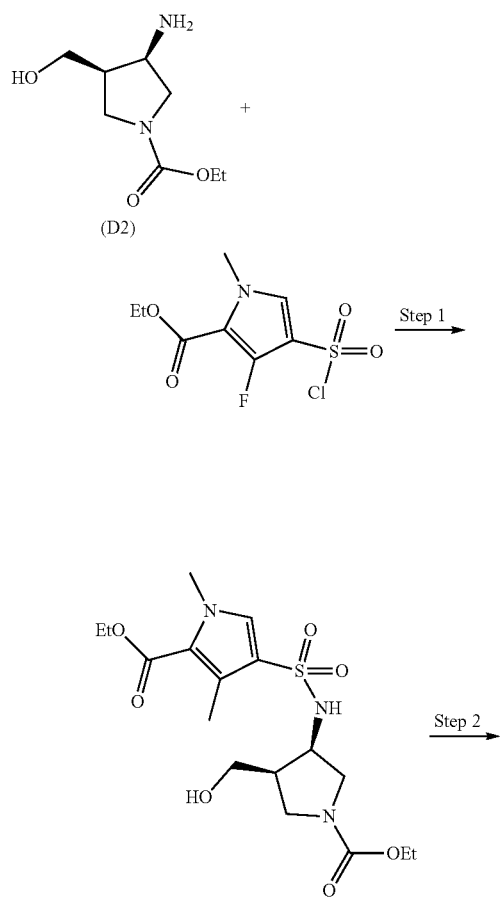

64
-continued

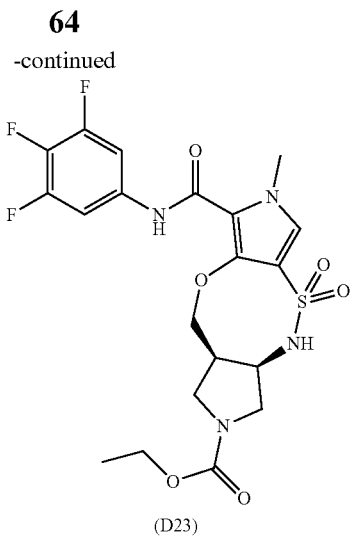

(D23)

Step 1 and Step 2 were carried out according to the procedure described for the synthesis of compound D13, using 3,4,5-trifluoroaniline instead of 4-fluoro-3-methylaniline in Step 2. Step 3 was carried out as described for compound D21 to afford D23. Method 1: Rt=2.08 min; m/z=503.19 (M+H)$^+$.

Description D24: Ethyl (3aR,10aR)-8-((3-cyano-4-fluorophenyl)carbamoyl)-7-methyl-3a,4,10,10a-tetrahydro-1H,7H-dipyrrolo[3,4-b:3',4'-f][1,4,5]oxathiazocine-2(3H)-carboxylate 5,5-dioxide (D24)

The compound was prepared according to the following Scheme:

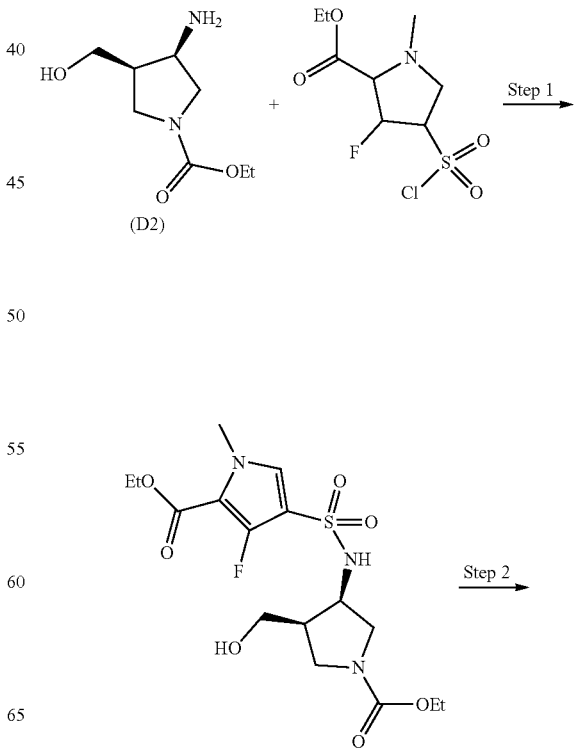

-continued

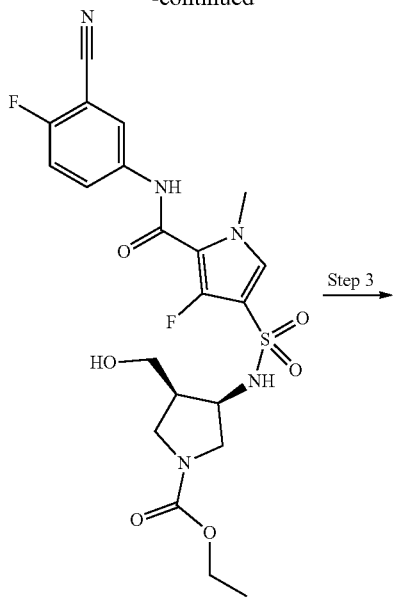

Step 3

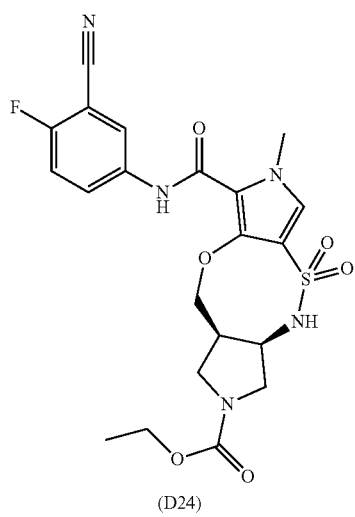
(D24)

Step 1 and Step 2 were carried out according to the procedure described for the synthesis of compound D13, using 3-cyano-4-fluoroaniline (013105, Fluorochem, CAS: 53312-81-5) instead of 4-fluoro-3-methylaniline in Step 2. Step 3 was carried out as described for compound D21 to afford D24. Method 1: Rt=1.92 min. m/z=492.45 (M+H)$^+$.

Description D25: cis-ethyl 7,10a-dimethyl-8-((3,4,5-trifluorophenyl)carbamoyl)-3a,4,10,10a-tetrahydro-1H,7H-dipyrrolo[3,4-b:3',4'-f][1,4,5]oxathiazocine-2(3H)-carboxylate 5,5-dioxide (D25)

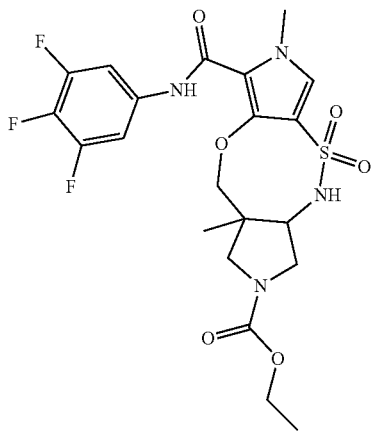 [SMILES: CCOC(=O)N1CC2NS(=O)(=O)c3cn(C)c(C(=O)Nc4cc(F)c(F)c(F)c4)c3OCC2(C)C1]

A mixture of D18 (30 mg, 0.06 mmol) and cesium carbonate (45.55 mg, 0.14 mmol) in DMF (1.4 mL) was heated by microwave irradiation at 130° C. for 5 hrs. The reaction was cooled to room temperature and evaporated. The residue was dissolved in water and EtOAc and the resulting mixture was poured into a separating funnel. The organic layer was dried over anhydrous Na$_2$SO$_4$, filtered and evaporated giving a brown residue (30 mg). The crude was purified by Fraction-Lynx (H$_2$O/CH$_3$CN+1‰ TFA) to afford D25 (10 mg, 0.019 mmol, yield 32%). $^1$H NMR (300 MHz, DMSO-d6+TFA) δ ppm 1.12-1.23 (m, 3H), 1.27 (s, 3H), 3.06 (d, J=10.55 Hz, 1H), 3.16-3.28 (m, 1H), 3.28-3.44 (m, 1H), 3.72-3.84 (m, 3H), 3.84-4.14 (m, 5H), 4.30 (br t, J=10.82 Hz, 1H), 7.49 (s, 1H), 7.54-7.71 (m, 2H), 8.38-8.54 (m, 1H), 9.67 (br s, 1H). Method 3: Rt=3.71 min; m/z=517.37 (M+H)$^+$.

Description D26: cis-ethyl 8-((4-fluoro-3-methylphenyl)carbamoyl)-7,10a-dimethyl-3a,4,10,10a-tetrahydro-1H,7H-dipyrrolo[3,4-b:3',4'-f][1,4,5]oxathiazocine-2(3H)-carboxylate 5,5-dioxide (D26)

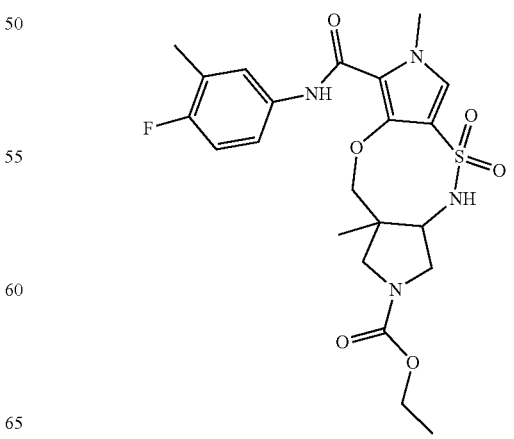

Prepared starting from D17, following the same procedure described for the synthesis of D21, to afford D26. $^1$H NMR (300 MHz, DMSO-$d_6$) δ ppm 1.15-1.25 (m, 3H) 1.27 (s, 3H) 2.24 (d, J=1.47 Hz, 3H) 3.07 (d, J=10.73 Hz, 1H) 3.16-3.28 (m, 1H) 3.36 (s, 1H) 3.72-3.84 (m, 3H) 3.84-4.16 (m, 5H) 4.31 (s, 1H) 7.12 (t, J=9.22 Hz, 1H) 7.36-7.52 (m, 2H) 7.52-7.67 (m, 1H) 8.31-8.57 (m, 1H) 9.24-9.45 (m, 1H). Method 3: Rt=3.56 min. m/z=495.35 (M+H)$^+$.

Description D27: cis-N-(4-fluoro-3-methylphenyl)-2-(4-methoxybenzyl)-3a,7-dimethyl-2,3,3a,4,10,10a-hexahydro-1H,7H-dipyrrolo[3,4-b:3',4'-f][1,4,5]oxathiazocine-8-carboxamide 5,5-dioxide (D27)

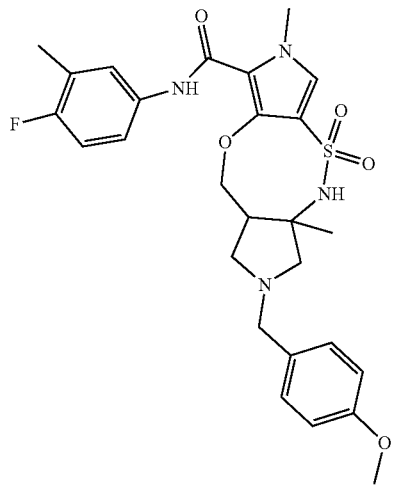 [SMILES: COc1ccc(CN2CC3COc4c(cn(C)c4C(=O)Nc4ccc(F)c(C)c4)S(=O)(=O)NC3(C)C2)cc1]

A solution of D19 (0.075 mg, 0.13 mmol) in DMF (2.68 mL) was treated with cesium carbonate (0.109 g, 0.33 mmol) and heated at 130° C. for 2 hrs by microwave irradiation. The reaction was cooled to room temperature, diluted with water (5 mL) and extracted with EtOAc (5 mL×3 times). The combined organic extracts were dried over Na$_2$SO$_4$ (anh.), filtered and finally evaporated to afford D27 (0.062 g, 0.114 mmol, yield 86%), used in the next step without any purification. Method 1; Rt: 1.55 min; m/z: 543.37 (M+H)$^+$.

Description D28: (3aR,10aR)—N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide Hydroiodide (D28)

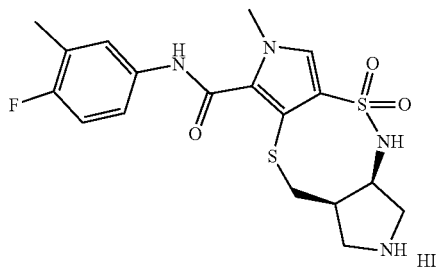

In a sealed vial D20 (54 mg, 0.11 mmol) was dissolved in dry DCM (1 mL). Trimethylsilyl iodide (0.08 mL, 0.55 mmol) was added and reaction mixture was heated at reflux (50° C.) for 3 h. Mixture was quenched by addition of methanol at 0° C., then evaporated under reduced pressure. The residue was triturated with Et$_2$O to obtain crude D28 (62 mg) as orange solid, that was used in the next step without further purification. Method 1; Rt=1.37 min; m/z=425.25 (M+H)$^+$.

Description D29: cis-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide Hydroiodide (D29)

Compound was prepared according to the scheme below:

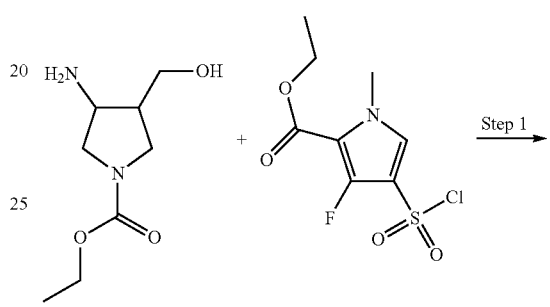

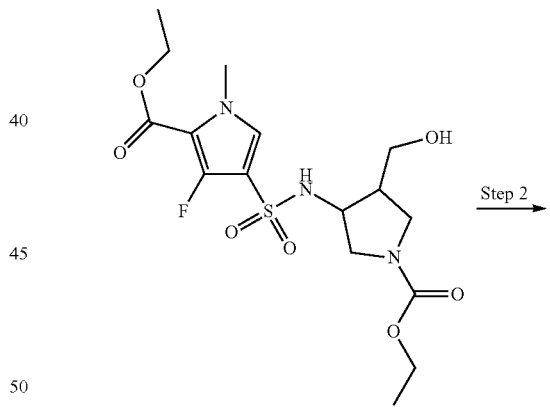

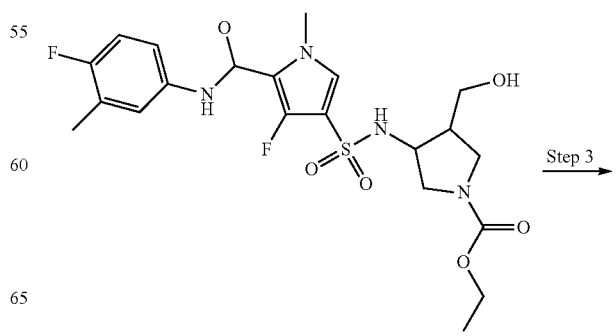

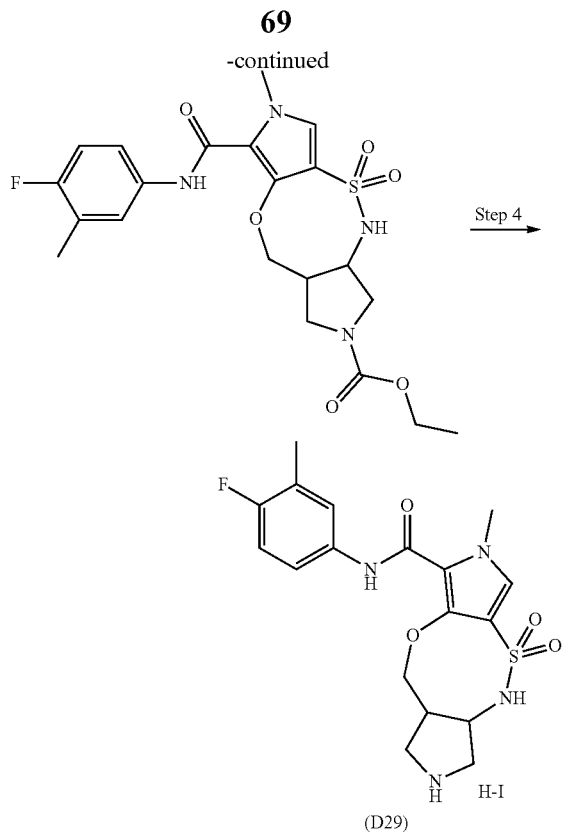

(D29)

Step 1:

To a suspension of ethyl 4-(chlorosulfonyl)-3-fluoro-1-methyl-1H-pyrrole-2-carboxylate (70 mg, 0.260 mmol) and cis-ethyl 3-amino-4-(hydroxymethyl)pyrrolidine-1-carboxylate, (Enamine, cat no EN300-754530) (56.2 mg, 0.299 mmol) in dry acetonitrile (2 mL), dry DIPEA (0.1 mL, 0.574 mmol) was added at room temperature. After 1.5 h mixture was diluted with DCM and washed with 5% citric acid solution. Organic layer was dried over $Na_2SO_4$ (anh.), filtered and solvent removed under reduced pressure to afford cis-ethyl 4-(N-(1-(ethoxycarbonyl)-4-(hydroxymethyl)pyrrolidin-3-yl)sulfamoyl)-3-fluoro-1-methyl-1H-pyrrole-2-carboxylate as a light yellow solid (162 mg). The compound is the cis racemate at the pyrrolidine ring (racemate of 3S,4S and 3R,4R). Crude was purified by flash chromatography (Petroleum ether/AcOEt) to afford a white solid (101 mg). Method 1: Rt=1.52 min, m/z=422 (M+H)$^+$.

Step 2:

To a solution of compound from Step 1 and 4-fluoro-3-methylaniline in dry THF (2 mL), lithium bis(trimethylsilyl) amide 1M in THF (5 equivalents) was added at room temperature. Upon reaction completion and standard work-up, intermediate product cis-ethyl 3-((4-fluoro-5-((4-fluoro-3-methylphenyl)carbamoyl)-1-methyl-1H-pyrrole)-3-sulfonamido)-4-(hydroxymethyl)pyrrolidine-1-carboxylate was obtained and further reacted. Method 1: Rt=1.83 min, m/z=501 (M+H)$^+$.

Step 3 was carried out as for the synthesis of compound D21. Step 4 was carried out as described for the synthesis of D28, to afford D29. Method 1: Rt=1.36 min; m/z=409.17 (M+H)$^+$.

Description D30: (3aR,10aR)-8-((4-fluoro-3-methylphenyl)carbamoyl)-7-methyl-2,3,3a,4,10,10a-hexahydro-1H,7H-dipyrrolo[3,4-b:3',4'-f][1,4,5]oxathiazocin-2-ium 5,5-dioxide Iodide (D30)

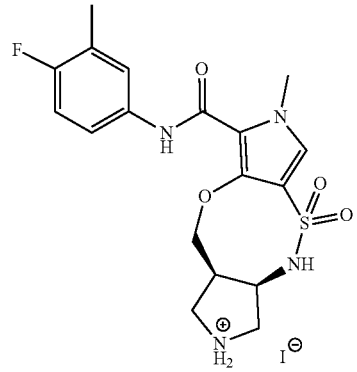 [SMILES: Cc1cc(NC(=O)c2c3c(cn2C)S(=O)(=O)N[C@H]2C[NH2+]C[C@H]2CO3)ccc1F ; [I-]]

Procedure 1

Prepared similarly as described for compound D28 starting from D21 to afford D30. Method 1: Rt=1.36 min; m/z=409.37 (M+H)$^+$.

Procedure 2

The compound was prepared according to the following Scheme:

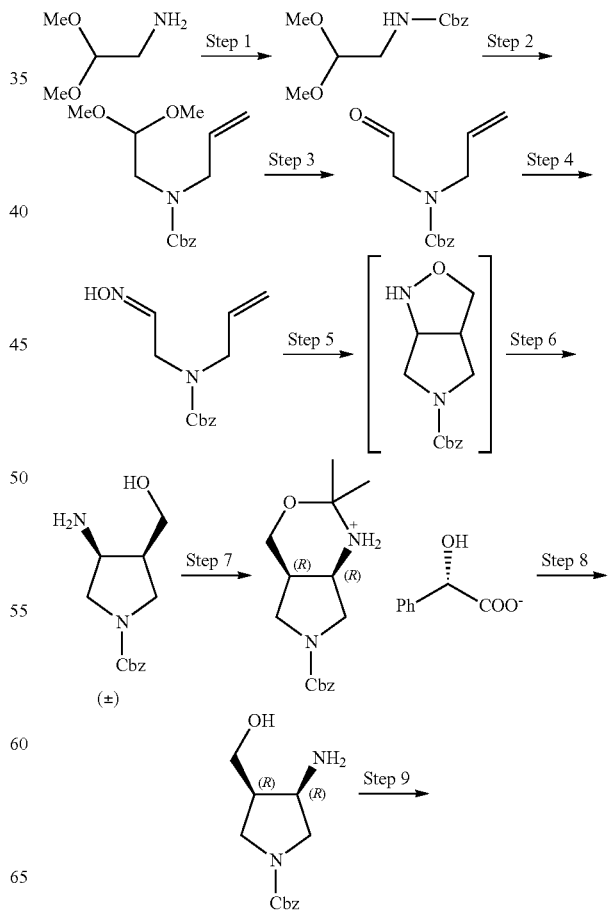

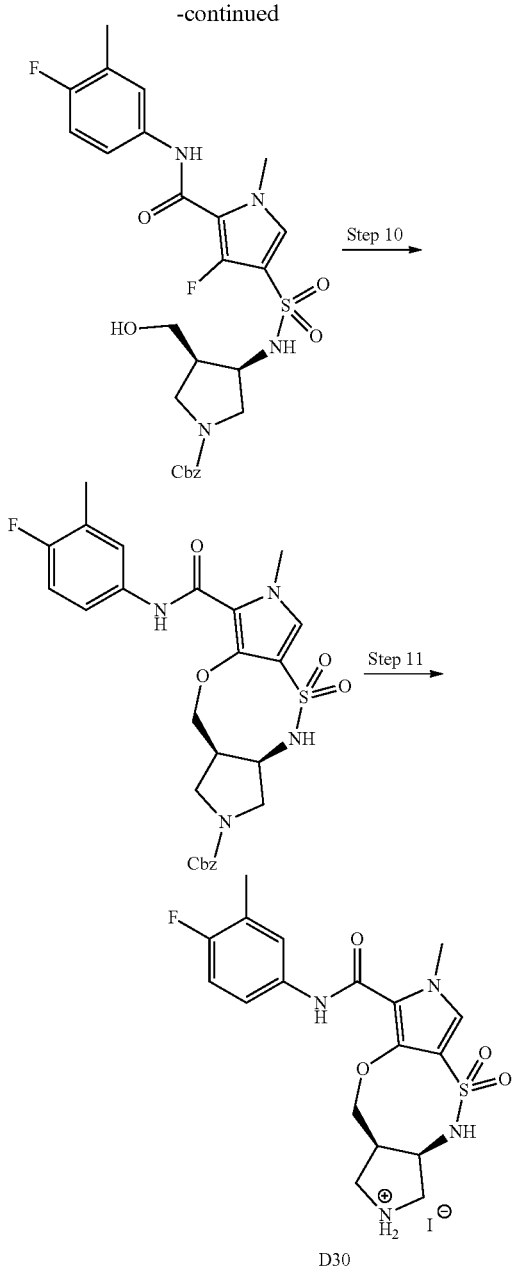

D30

Steps 1-6 were performed following the procedure reported in J. Med. Chem. 2007, 50, 5493-5508 starting from 2,2-dimethoxyethan-1-amine (094452, Fluorochem, CAS: 22483-09-6) and Benzyl chloroformate to obtain (±) benzyl 3-amino-4-(hydroxymethyl)pyrrolidine-1-carboxylate. $^1$H NMR (300 MHz, DMSO-d$_6$+TFA) δ ppm 2.55-2.68 (m, 1H) 3.27-3.38 (m, 1H) 3.43-3.67 (m, 5H) 3.84 (br s, 1H) 5.04-5.13 (m, 2H) 7.29-7.41 (m, 5H) 7.90-8.02 (br s, 2H). Method 2; Rt=1.81 min. m/z=251.25 (M+H)$^+$.

Step 7:

2-Methoxypropene (8.81 mL, 92.02 mmol) (174645, Sigma Aldrich, CAS: 116-11-0) was added to a solution of compound from step 6, (±) benzyl 3-amino-4-(hydroxymethyl)pyrrolidine-1-carboxylate (11.52 g, 46.02 mmol) in acetone (16 mL). The solution was stirred at room temperature for 1 h and subsequently concentrated under reduced pressure to remove the volatiles. The crude product (13.38 g, 46.08.05 mmol) was taken in dry acetone (115 mL) and treated with (S)-2-hydroxy-2-phenylacetic acid (7.011 g, 46.08 mmol) (046847, Fluorochem, CAS: 17199-29-0). Mixture was cooled to −5° C. and stirred for 12 h. The resulting white precipitate was filtered and washed 3 times with 60 mL of dry acetone, cooled at −5° C., yielding benzyl (4aR,7aR)-2,2-dimethylhexahydropyrrolo[3,4-d][1,3] oxazine-6(4H)-carboxylate[(S)-Mandelate] as white solid (6.2 g, y=30%).

Step 8:

Benzyl (4aR,7aR)-2,2-dimethylhexahydropyrrolo[3,4-d][1,3]oxazine-6(4H)-carboxylate[(S)-Mandelate] from step 7 (500 mg, 1.13 mmol) was dissolved in 1 ml of absolute ethanol and H$_2$SO$_4$ (5% solution, 0.5 mL). Mixture was stirred for 3 h at room temperature. The resulting mixture was treated with 2M NaOH (1 mL) solution and ethanol removed under reduced pressure. The aqueous residue was extracted with AcOEt (3×20 ml). Benzyl (3R,4R)-3-amino-4-(hydroxymethyl)pyrrolidine-1-carboxylate (245 mg, y=87%) was used in the next step without any further purification. Method 2; Rt=1.81 min. m/z=251.25 (M+H)$^+$ Step 9:

To a solution of compound coming from the step 8, benzyl (3R,4R)-3-amino-4-(hydroxymethyl)pyrrolidine-1-carboxylate (217 mg, 0.870 mmol) in 5 ml of dry MeCN, N-ethyl-N-isopropylpropan-2-amine (0.6 mL, 3.47 mmol) and 4-fluoro-5-((4-fluoro-3-methylphenyl)carbamoyl)-1-methyl-1H-pyrrole-3-sulfonyl chloride (302.36 mg, 0.870 mmol) were sequentially added. The resulting mixture was stirred at room temperature for 2.5 h. The reaction was diluted with EtOAc and washed with 5% citric acid solution and brine. Organic layer was dried over Na$_2$SO$_4$, filtered and solvent removed under reduced pressure. The resulting crude was purified by flash chromatography on silica gel (direct phase, eluent DCM/EtOAc) affording benzyl (3R,4R)-3-((4-fluoro-5-((4-fluoro-3-methyl phenyl)carbamoyl)-1-methyl-1H-pyrrole)-3-sulfonamido)-4-(hydroxymethyl) pyrrolidine-1-carboxylate (420 mg, y=86%) as white foam. $^1$H NMR (300 MHz, DMSO-d$_6$+TFA) δ ppm 2.22 (s, 3H) 2.30-2.43 (m, 1H) 3.19-3.29 (m, 1H) 3.29-3.51 (m, 4H) 3.53-3.64 (m, 1H) 3.70-3.92 (m, 4H) 5.04 (d, J=4.22 Hz, 2H) 7.10 (t, J=9.26 Hz, 1H) 7.21-7.41 (m, 5H) 7.43-7.54 (m, 2H) 7.59 (br d, J=7.00 Hz, 1H) 7.97 (d, J=6.88 Hz, 1H) 9.99 (s, 1H). Method 4; Rt=2.04 min. m/z=563 (M+H)$^+$.

The enantiomeric ratio (ee>99%) of the title compound was determined by means of chiral HPLC (HPCL conditions: DIACEL CHIRALPACK IG COLUMN; eluents: Phase A: H$_2$O ultragrade 0.05% TFA, MeCN ultragrade 0.05% TFA; flow rate, 1.0 ml/min, UV, 270 nM); retention time for (S,S), 30 min; and retention time for (R,R), 45 min.

Step 10:

To a solution of compound coming from step 9 (415 mg, 0.740 mmol) in dry DMF (2 ml), in sealed vial, cesium carbonate (604.58 mg, 1.84 mmol) was added; the resulting mixture was heated to 135° C. and stirred for 4 h. Water (10 mL) and toluene (40 mL) were added and the mixture was vigorously stirred for 5 min, the organic phase was collected, washed with water (20 mL) and brine (20 mL), dried over Na$_2$SO$_4$ and evaporated. The resulting crude benzyl (3aR, 10aR)-8-((4-fluoro-3-methylphenyl)carbamoyl)-7-methyl-3a,4,10,10a-tetrahydro-1H, 7H-dipyrrolo[3,4-b:3',4'-f][1,4,5]oxathiazocine-2(3H)-carboxylate 5,5-dioxide (397 mg, crispy off-white solid) was used without further purification. $^1$H NMR (300 MHz, DMSO-d6) δ ppm 2.24 (s, 3H) 2.87-3.22 (m, 2H) 3.37-3.57 (m, 2H) 3.66-3.86 (m, 4H) 3.86-4.02 (m, 1H) 4.36-4.52 (m, 1H) 4.52-4.66 (m, 1H) 4.98-5.20 (m, 2H) 7.11 (t, J=9.45 Hz, 1H) 7.29-7.42 (m, 5H)

7.43-7.54 (m, 2H) 7.54-7.66 (m, 1H) 8.41 (br s, 1H) 9.33 (s, 1H). Method 4; Rt=2.22 min. m/z=543.24 (M+H)+.

Step 11:

To a solution of compound coming from step 10 (960 mg, 1.77 mmol) was dissolved in dry MeCN (12 mL, 0.230 mol). Trimethylsilyl iodide (0.53 mL, 3.72 mmol) was added and the reaction was stirred at room temperature for 30 min. Then the mixture was treated by addition of methanol (1.2 mL) at 0° C., stirred for 10 min at the same temperature, then evaporated under reduced pressure. The residue was taken up with Et₂O/DCM 5:1 mixture (17 mL), then was filtered and solid washed many times with Et₂O, to obtain crude D30 (833 mg, y=87.8%) as light-yellow solid, that was used in the next step without further purification. Method 4; Rt=1.35 min. m/z=409.24.25 (M+H)+.

Description D31: (3aR,10aR)-8-((3-chloro-4-fluoro-phenyl)carbamoyl)-7-methyl-2,3,3a,4,10,10a-hexa-hydro-1H,7H-dipyrrolo[3,4-b:3',4'-f][1,4,5]oxathi-azocin-2-ium 5,5-dioxide Iodide (D31)

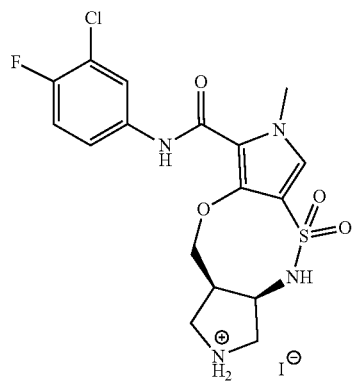 [SMILES: Cn1cc2c(c1C(=O)Nc1ccc(F)c(Cl)c1)OC[C@@H]1C[NH2+]C[C@@H]1NS2(=O)=O ; [I-]]

Prepared similarly as described for compound D28 starting from D22 to afford D31. Method 1: Rt=1.44 min; m/z=429.30, 431.39 (M+H)+.

Procedure 2

The compound was prepared according to the following Scheme:

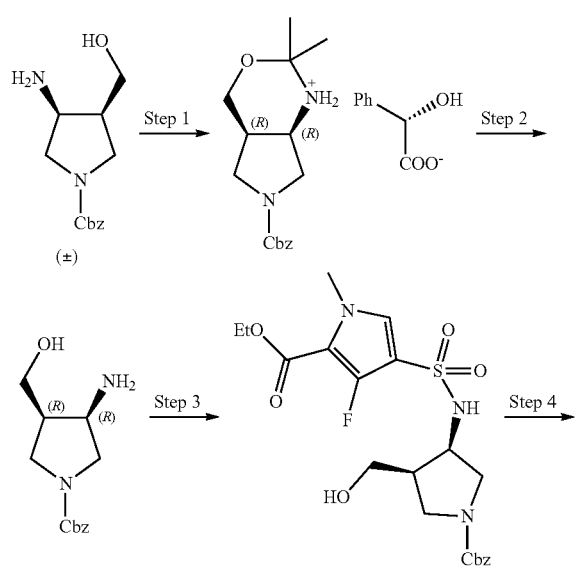

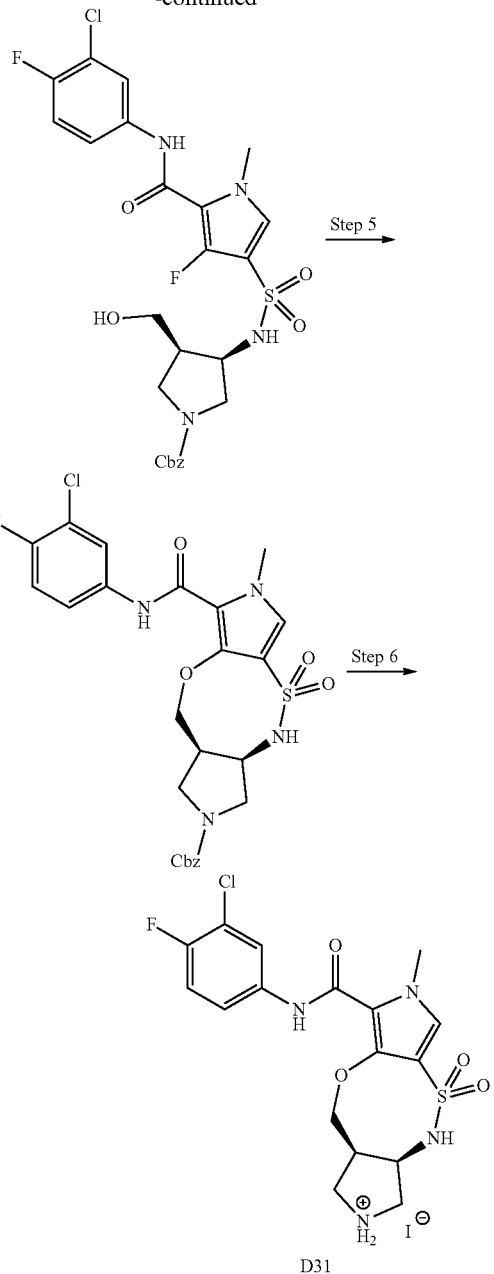

Step 1:

(±) Benzyl 3-amino-4-(hydroxymethyl)pyrrolidine-1-carboxylate was prepared following the procedure reported in J. Med. Chem. 2007, 50, 5493-5508 starting from 2,2-dimethoxyethan-1-amine (094452, Flurochem, CAS: 22483-09-6). ¹H NMR (300 MHz, DMSO-d₆+TFA) δ ppm 2.55-2.68 (m, 1H) 3.27-3.38 (m, 1H) 3.43-3.67 (m, 5H) 3.84 (br s, 1H) 5.04-5.13 (m, 2H) 7.29-7.41 (m, 5H) 7.90-8.02 (br s, 2H). Method 2; Rt=1.81 min. m/z=251.25 (M+H)+.

The compound (11.52 g, 46.02 mmol) in acetone (16 mL) was treated with 2-methoxypropene (8.81 mL, 92.02 mmol) (174645, Sigma Aldrich, CAS: 116-11-0). The solution was stirred at room temperature for 1 h and subsequently concentrated under reduced pressure to remove the volatiles. The crude product (13.38 g, 46.08.05 mmol) was taken in dry acetone (115 mL) and treated with (S)-2-hydroxy-2- phenylacetic acid (7.011 g, 46.08 mmol) (046847, Fluorochem, CAS: 17199-29-0). Mixture was cooled to −5° C. and stirred for 12 h. The resulting white precipitate was filtered and washed 3 times with 60 mL of dry acetone, cooled at −5° C., yielding benzyl (4aR,7aR)-2,2-dimethylhexahydropyrrolo[3,4-d][1,3]oxazine-6(4H)-carboxylate[(S)-mandelate] as white solid (6.2 g, y=30%).

Step 2:

Benzyl (4aR,7aR)-2,2-dimethylhexahydropyrrolo[3,4-d][1,3]oxazine-6(4H)-carboxylate[(S)-Mandelate] from step 1 (500 mg, 1.13 mmol) was dissolved in 1 ml of absolute ethanol and $H_2SO_4$ (5% solution, 0.5 mL). Mixture was stirred for 3 h at room temperature. The resulting mixture was treated with 2M NaOH (1 mL) solution and ethanol removed under reduced pressure. The aqueous residue was extracted with AcOEt (3×20 ml). Benzyl (3R,4R)-3-amino-4-(hydroxymethyl)pyrrolidine-1-carboxylate (245 mg, y=87%) was used in the next step without any further purification. Method 2; Rt=1.81 min. m/z=251.25 (M+H)$^+$ Step 3:

Ethyl 4-(chlorosulfonyl)-3-fluoro-1-methyl-1H-pyrrole-2-carboxylate (3.05 g, 11.3 mmol) was added portionwise to a suspension of benzyl (3R,4R)-3-amino-4-(hydroxymethyl)pyrrolidine-1-carboxylate (2.83 g, 11.3 mmol) and DIPEA (4 mL, 22.96 mmol) in MeCN (40 ml). The yellow solution was stirred at RT overnight. The reaction was concentrated under reduced pressure, then was diluted with EtOAc (100 mL), washed with aq 5% citric acid (×2) and s.s. $NaHCO_3$. The organic layer was dried over $Na_2SO_4$, filtered and concentrated under reduced pressure. The resulting crude was purified by flash chromatography on silica gel (eluent gradient from DCM/AcOEt: 5:5 to 100% EtoAc, to obtain ethyl 4-(N-((3R,4R)-1-((benzyloxy)carbonyl)-4-(hydroxymethyl)pyrrolidin-3-yl)sulfamoyl)-3-fluoro-1-methyl-1H-pyrrole-2-carboxylate (4.05 g, y=74%) as off-white foam. $^1$H NMR (300 MHz, DMSO-$d_6$+TFA) δ ppm 1.27 (q, J=6.60 Hz, 3H) 2.31-2.43 (m, 1H) 3.12-3.27 (m, 1H) 3.27-3.48 (m, 4H) 3.49-3.60 (m, 1H) 3.67-3.94 (m, 4H) 4.13-4.38 (m, 2H) 4.92-5.16 (m, 2H) 7.28-7.44 (m, 5H) 7.56 (d, J=4.58 Hz, 1H) 7.99 (br d, J=7.90 Hz, 1H). Method 1; Rt=1.80 min. m/z=484.4 (M+H)$^+$.

Step 4:

To a solution of ethyl 4-(N-((3R,4R)-1-((benzyloxy)carbonyl)-4-(hydroxymethyl)pyrrolidin-3-yl)sulfamoyl)-3-fluoro-1-methyl-1H-pyrrole-2-carboxylate (110 .mg, 0.230 mmol) and 3-chloro-4-fluoroaniline (0.03 mL, 0.250 mmol) in dry THF, (1.8 mL), 1N lithium bis(trimethylsilyl)amide in toluene (1.15 mL, 1.15 mmol) was added at RT for 1 h. UPLC-MS analysis indicated complete conversion. The reaction was diluted with toluene, cooled at 0° C. and quenched with 2M HCl aq, then was stirred for 10 min at RT. The two phases were separated and the organic phase was washed with 2M HCl aq and sat. $NaHCO_3$, then was dried over $Na_2SO_4$, filtered and solvent removed under reduced pressure. The resulting crude material was used in the next step without any further purification. Method 1; Rt=2.11 min. m/z=583.29 (M+H)$^+$.

Step 5:

To a solution of crude benzyl (3R,4R)-3-((5-((3-chloro-4-fluorophenyl)carbamoyl)-4-fluoro-1-methyl-1H-pyrrole)-3-sulfonamido)-4-(hydroxymethyl)pyrrolidine-1-carboxylate from Step 4 (142.92 mg, 0.250 mmol) in dry DMF (4 mL), cesium carbonate (199.68 mg, 0.610 mmol) was added; the vial was sealed, the mixture heated to 135° C. and stirred at the same temperature for 4 h. EtOAc and water were added; the organic phase was washed again with water (×2), dried over $Na_2SO_4$, filtered and evaporated. The resulting crude was purified by flash chromatography on silica gel (eluent gradient from 100% DCM to DCM/EtOAc 70/30), to obtain desired compound. Method 1; Rt=2.30 min. m/z=563.30 (M+H)$^+$.

Step 6:

Benzyl (3aR,10aR)-8-((3-chloro-4-fluorophenyl)carbamoyl)-7-methyl-3a,4,10,10a-tetrahydro-1H,7H-dipyrrolo[3,4-b:3',4'-f][1,4,5]oxathiazocine-2(3H)-carboxylate 5,5-dioxide from Step 5 (100 mg, 0.180 mmol) was dissolved in dry MeCN (2.5 mL, 0.048 mol). Trimethylsilyl iodide (80 mL, 0.370 mmol) was added and mixture was stirred at RT for 30 min. Mixture was quenched by addition of methanol (1 mL) at 0° C., stirred for 10 min at the same temperature, then evaporated under reduced pressure. The resulting crude D31 was used in the next step without further purification. Method 1: Rt=1.44 min; m/z=429.30 (M+H)$^+$.

Description D32: (3aR,10aR)-7-methyl-8-((3,4,5-trifluorophenyl)carbamoyl)-2,3,3a,4,10,10a-hexahydro-1H,7H-dipyrrolo[3,4-b:3',4'-f][1,4,5]oxathiazocin-2-ium 5,5-dioxide Iodide (D32)

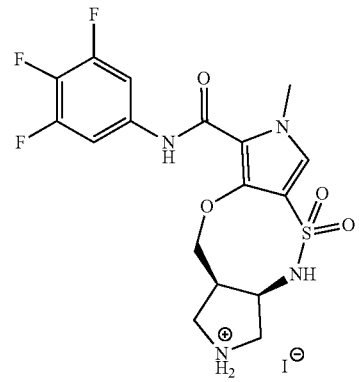 [SMILES: Cn1cc2c(c1C(=O)Nc1cc(F)c(F)c(F)c1)OC[C@@H]1C[NH2+]C[C@@H]1NS2(=O)=O ; [I-]]

Prepared similarly as described for compound D28 starting from D23 to afford D32. Method 1: Rt=1.46 min; m/z=431.39 (M+H)$^+$.

Description D33: (3aR,10aR)-8-((3-cyano-4-fluorophenyl)carbamoyl)-7-methyl-2,3,3a,4,10,10a-hexahydro-1H,7H-dipyrrolo[3,4-b:3',4'-f][1,4,5]oxathiazocin-2-ium 5,5-dioxide Iodide (D33)

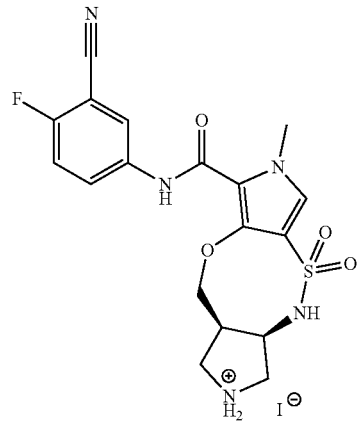 [SMILES: Cn1cc2c(c1C(=O)Nc1ccc(F)c(C#N)c1)OC[C@@H]1C[NH2+]C[C@@H]1NS2(=O)=O ; [I-]]

Prepared similarly as described for compound D28 starting from D24 to afford D33. Method 1: Rt=1.31 min; m/z=420.38 (M+H)⁺.

Description D34: cis-N-(4-fluoro-3-methylphenyl)-7,10a-dimethyl-2,3,3a,4,10,10a-hexahydro-1H,7H-dipyrrolo[3,4-b:3',4'-f][1,4,5]oxathiazocine-8-carboxamide 5,5-dioxide Hydroiodide (D34)

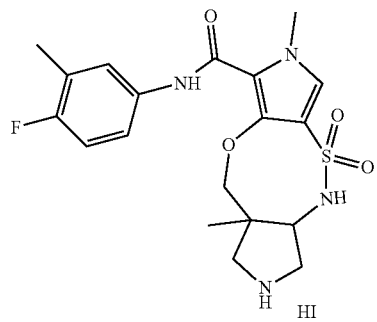

Prepared similarly as described for compound D28 starting from D26 to afford D34. ¹H NMR (300 MHz, DMSO-d6+TFA) δ ppm 1.29 (s, 3H), 2.23 (s, 3H), 2.97-3.27 (m, 3H), 3.81 (s, 3H), 3.99 (s, 2H), 4.17-4.28 (m, 1H), 4.34 (d, J=11.65 Hz, 1H), 7.12 (t, J=9.22 Hz, 1H), 7.40-7.48 (m, 1H), 7.49 (s, 1H), 7.53-7.65 (m, 1H), 8.42 (d, J=9.72 Hz, 1H), 9.15 (br s, 2H), 9.37 (s, 1H). Method 1: Rt=1.41 min; m/z=422.14 (M+H)⁺.

Description D35: cis-N-(4-fluoro-3-methylphenyl)-3a,7-dimethyl-2,3,3a,4,10,10a-hexahydro-1H,7H-dipyrrolo[3,4-b:3',4'-f][1,4,5]oxathiazocine-8-carboxamide 5,5-dioxide Hydrochloride (D35)

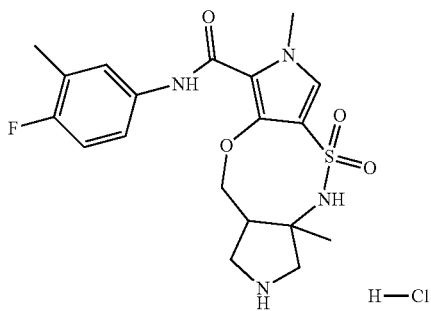 [SMILES: Cc1cc(NC(=O)c2c3c(cn2C)S(=O)(=O)NC2(C)CNCC2CO3)ccc1F ; Cl]

D27 (0.062 mg, 0.11 mmol) was dissolved in MeOH (15 mL) and hydrogenated using H-CUBE apparatus (ThalesNano®) equipped with 10% Pd/C small type cartridge (THS01111, ThalesNano) using H₂ pressure: 10 bar, flux: 0.8 mL/min at 25° C. The cartridge was washed plenty with MeOH and 0.5N HCl in MeOH. Solvent was removed by evaporation and the residue treated with 3N HCl in MeOH (3 mL). After evaporation, D35 (0.052 g, 0.113 mmol, yield quantitative). Method 1; Rt: 1.27 min; m/z: 423.22 (M+H)⁺.

Description D36: methyl 2-((3aR,10aR)-8-((4-fluoro-3-methylphenyl)carbamoyl)-7-methyl-5,5-dioxido-3a,4,10,10a-tetrahydro-1H,7H-dipyrrolo[3,4-b:3',4'-f][1,4,5]oxathiazocin-2(3H)-yl)-2-oxoacetate (D36)

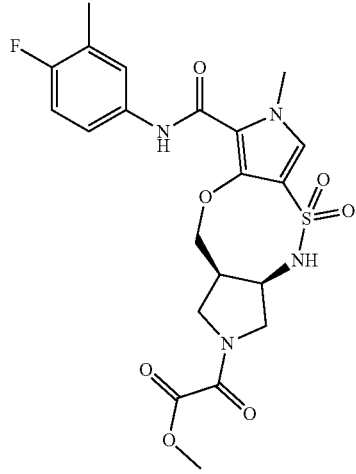

To a solution of D30 (500 mg, 0.930 mmol) in dry MeCN (10 mL), N-ethyl-N-isopropylpropan-2-amine (0.229 mL, 1.28 mmol) was added. The solution was cooled at 0° C. and methyl 2-chloro-2-oxoacetate (0.930 mmol, 0.344 mL) (151440, Sigma Aldrich, CAS: 5781-53-3), previously dissolved in dry MeCN (1 mL), was added dropwise. The reaction was stirred at the same temperature for 15 min and then was quenched by addition of 5% citric acid (1 mL), diluted with DCM and water. The organic phase was additionally washed with 1N HCl and brine. The organic phase was dried over Na₂SO₄, filtered and concentrated under reduced pressure to give a yellow oil. The crude was stripped with DCM and finally with Petroleum Ether to afford D36 (390 mg, y=85%) as a yellow solid that was used in next step without purification. ¹H NMR (300 MHz, DMSO-d6) δ 2.24 (s, 3H), 2.98-3.12 (m, 1H), 3.13-4.12 (m, 11H), 4.44-4.68 (m, 2H), 7.11 (t, J=9.08 Hz, 1H), 7.44-7.54 (m, 2H), 7.55-7.63 (m, 1H), 8.47 (br d, J=9.72 Hz, 1H), 9.35 (s, 1H). Method 1: Rt=1.85 min, m/z=495 (M+H)⁺.

Description D37: 2-((3aR,10aR)-8-((4-fluoro-3-methylphenyl)carbamoyl)-7-methyl-5,5-dioxido-3a,4,10,10a-tetrahydro-1H,7H-dipyrrolo[3,4-b:3',4'-f][1,4,5]oxathiazocin-2(3H)-yl)-2-oxoacetic Acid (D37)

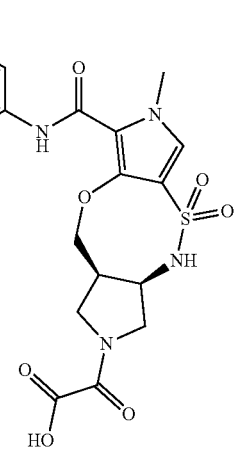

To a solution of D36 (337 mg, 0.680 mmol) in dry THF (1 mL, 0.012 mol), a previously prepared solution of sodium hydroxide (81.78 mg, 2.04 mmol) in water (1 mL, 0.056 mol), was added dropwise at room temperature. The reaction was monitored after 5 min by UPLC/MS and complete conversion was observed. The solution was cooled at 0° C. and quenched by adding HCl 4M with the formation of a white precipitate. The reaction was diluted with AcOEt and the two phases were separated. The organic phase was washed with brine, dried over $Na_2SO_4$, filtered and concentrated to afford D37 (320 mg, yield=97.7%) as a white solid that was used in the next synthetic step without further purification. $^1$H NMR (300 MHz, DMSO-d6) δ 2.24 (s, 3H), 2.96-3.10 (m, 1H), 3.11-4.11 (m, 8H), 4.43-4.69 (m, 2H), 7.11 (t, J=9.22 Hz, 1H), 7.43-7.53 (m, 2H), 7.54-7.63 (m, 1H), 8.48 (dd, J=9.81, 1.65 Hz, 1H), 9.35 (s, 1H), 14.06 (br s, 1H). Method 1: Rt=1.61 min, m/z=481.24 (M+H)$^+$.

Description D38: Methyl 2-((3-methyloxetan-3-yl)amino)-2-oxoacetate (D38)

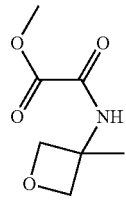

To a solution of 3-methyl-3-oxetanamine (206 mg, 2.36 mmol) (318252, Fluorochem, CAS: 874473-14-0) and N-ethyl-N-isopropylpropan-2-amine (0.41 mL, 2.36 mmol) in DCM (2 mL, 0.031 mol) was added dropwise methyl 2-chloro-2-oxoacetate (0.22 mL, 2.36 mmol) at 0° C. The reaction was stirred at the same temperature for 30 min and then was quenched with ice. The organic phase was separated with phase separator, then was washed with 1N HCl (2 mL) and brine. The organic phase was dried over $Na_2SO_4$, filtered and concentrated to afford D38 (278 mg, 1.61 mmol) as a light yellow solid that was used as such in the next synthetic step. Method 2: Rt=1.21 min, m/z=174.14 (M+H)$^+$.

Description D39: Sodium 2-((3-methyloxetan-3-yl)amino)-2-oxoacetate (D39)

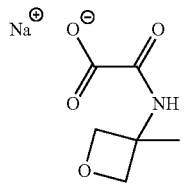

To a solution of D38 (507 mg, 2.93 mmol) in THF (2 mL, 0.025 mol) at rt was added sodium hydroxide (117.11 mg, 2.93 mmol) dissolved in water (1 mL). The reaction was stirred at rt for 1.5 hrs, with formation of a white precipitate. The reaction mixture was diluted with diethyl ether, the precipitate was filtered and washed with diethyl ether. The product was dried under vacuum pump for 1 hr to yield D39 as white powder. UPLC/MS analysis of the mother liquor indicated the presence of the title product. The mother liquor was evaporated, treated with diethyl ether and filtered, to give a second batch of the crude product D39 (300 mg, 1.66 mmol, yield=56.6%). $^1$H NMR (300 MHz, DMSO-d6) δ ppm 1.41-1.55 (m, 3H), 4.26 (d, J=6.51 Hz, 2H), 4.63 (d, J=6.24 Hz, 2H), 8.65 (br s, 1H). Method 14: Rt=0.87 min; m/z=160.06 (M+H)$^+$.

Description D40: methyl (R)-2-oxo-2-((1,1,1-trifluoropropan-2-yl)amino)acetate (D40)

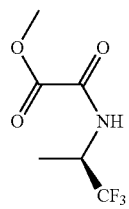

To a solution of (2R)-1,1,1-trifluoro-2-propanamine hydrochloride (1:1) (500 mg, 3.34 mmol) (U23940, Aurum-Pharmaceuticals, CAS: 177469-12-4) and N-ethyl-N-isopropylpropan-2-amine (1.16 mL, 6.69 mmol) in DCM dry (3 mL, 0.047 mol), methyl 2-chloro-2-oxoacetate (0.31 mL, 3.34 mmol) was added dropwise at 0° C. and under nitrogen atmosphere. The reaction was stirred at 0° C. for 30 min, then was quenched with ice and water. The organic phase was washed with 1N HCl (3×20 mL) and brine. The organic phase was dried over $Na_2SO_4$ (anh.), then was filtered and concentrated to yield D40 (567 mg, yield=85%) as a colorless solid, that was used in the next synthetic step as such. Method 1: Rt=1.12 min, m/z=200.15 (M+H)$^+$.

Description D41: Sodium (R)-2-oxo-2-((1,1,1-trifluoropropan-2-yl)amino)acetate (D41)

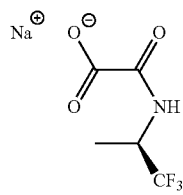

To a solution of D40 (567 mg, 2.85 mmol) in THF (2 mL, 0.025 mol), a solution of sodium hydroxide (113.89 mg, 2.85 mmol) in water (1 mL) was added at rt. The reaction was stirred at room temperature overnight, diluted with toluene (30 mL) and evaporated under reduced pressure to obtain a white powder. The product was additionally dried under vacuum pump overnight to yield D41 (562 mg, yield=95%) as a white powder. Method 13: Rt=1.25 min, m/z=130.08 (M+H)$^+$.

Description D42: methyl 2-(cyclopropylamino)-2-oxoacetate (D42)

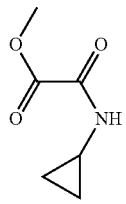

To a solution of cyclopropanamine (1.46 mL, 21 mmol) in DCM (15 mL, 0.18 mmol) and N-ethyl-N-isopropylpropan-2-amine (3.05 mL, 17.5 mmol), methyl 2-chloro-2-oxoacetate (1.61 mL, 17.5 mmol) was added dropwise at 0° C. and under nitrogen atmosphere. The reaction was stirred at 0° C. for 2 hr and then was quenched with ice. The organic phase was washed with 1N HCl (2 mL) and brine, dried over Na$_2$SO$_4$ anh, filtered and concentrated to afford methyl 2-(cyclopropylamino)-2-oxoacetate as a light yellow solid. UPLC/MS analysis of the aqueous phase indicated the presence of the title product. To recover the product from the aqueous phase, it was concentrated to dryness and extracted with ethyl acetate to afford a second batch of methyl 2-(cyclopropylamino)-2-oxoacetate. The two batches were combined to afford D42 (1.869 g, yield=73%). $^1$H NMR (300 MHz, DMSO-d6) δ 0.56-0.69 (m, 3H), 2.74 (br d, J=3.94 Hz, 1H), 3.76 (s, 3H), 8.95 (br s, 1H). Method 1: Rt=0.66 min, m/z=143.96 (M+H)$^+$.

Description D43: Sodium 2-(cyclopropylamino)-2-oxoacetate (D43)

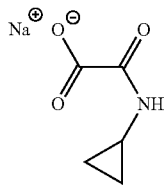

To a solution of D42 (1.21 g, 8.44 mmol) in THF (4 mL, 0.049 mol), a solution of sodium hydroxide (337.55 mg, 8.44 mmol) in water (2 mL) was added at room temperature. The reaction was stirred at the same temperature overnight, then was concentrated under reduced pressure. The solid residue was taken up, sonicated and triturated with toluene. The product was dried under vacuum pump for 1 hr to yield D43 (984 mg, 6.51 mmol) as a white powder. Method 13: Rt=0.78 min; m/z=130.11 (M+H)$^+$.

Description D44: cis-Methyl 2-(8-((4-fluoro-3-methylphenyl)carbamoyl)-7-methyl-5,5-dioxido-3a,4,10,10a-tetrahydro-1H,7H-dipyrrolo[3,4-b:3',4'-f][1,4,5]oxathiazocin-2(3H)-yl)-2-oxoacetate (D44)

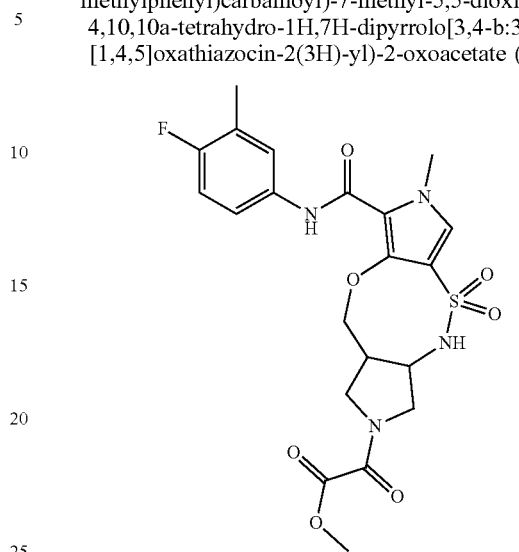

Prepared similarly as described for compound D36 starting from D29. $^1$H NMR (300 MHz, DMSO-d6) δ 2.24 (s, 3H), 2.97-3.25 (m, 2H), 3.26-4.09 (m, 10H), 4.44-4.68 (m, 2H), 7.06-7.16 (m, 1H), 7.47 (br s, 2H), 7.58 (br s, 1H), 8.47 (br d, J=9.72 Hz, 1H), 9.35 (s, 1H). Method 3: Rt=1.85 min. m/z=495.22 (M+H)$^+$.

Description D45: cis-Methyl 2-(7-methyl-5,5-dioxido-8-((3,4,5-trifluorophenyl)carbamoyl)-3a,4,10,10a-tetrahydro-1H,7H-dipyrrolo[3,4-b:3 ',4'-f][1,4,5]oxathiazocin-2(3H)-yl)-2-oxoacetate (D45)

Compound was prepared according to the scheme below:

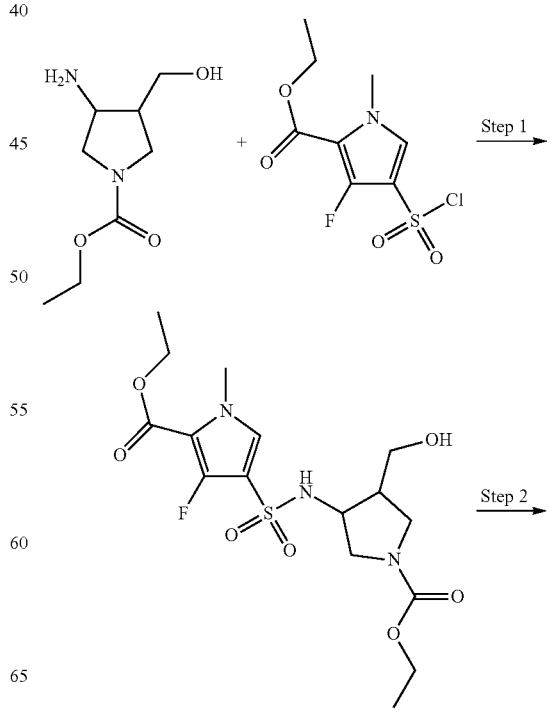

83
-continued

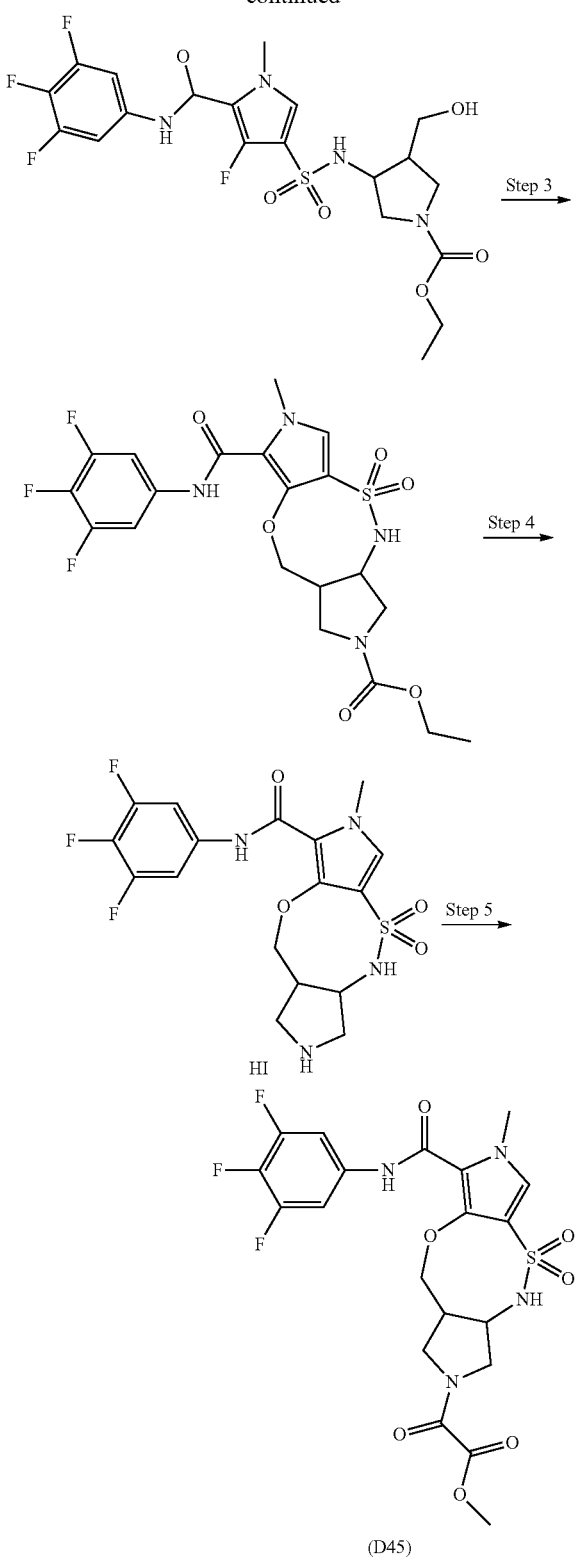

(D45)

Step 1-4:

cis-7-methyl-N-(3,4,5-trifluorophenyl)-2,3,3a,4,10,10a-hexahydro-1H,7H-dipyrrolo[3,4-b:3',4'-f][1,4,5]oxathiazocine-8-carboxamide 5,5-dioxide hydroiodide was prepared as indicated in Steps 1 and 4 of the procedure for the synthesis of D29 but using 3,4,5-trifluoroaniline instead of 4-fluoro-3-methylaniline. Method 3: Rt=1.50 min. m/z=431.39 (M+H)⁺.

Step 5:

The crude compound (237 mg, 0.420 mmol), synthesized following Step 1-4, was dissolved in 11 ml of dry MeCN and N-ethyl-N-isopropylpropan-2-amine (0.227 mL, 1.28 mmol) was added. The solution was cooled at 0° C. and methyl 2-chloro-2-oxoacetate (0.039 mL), dissolved in 2 ml of dry MeCN, was added dropwise. The reaction was stirred at 0° C. for 20 min; then was quenched by adding 5 ml of 5% citric acid, diluted with water (5 mL) and EtOAc (20 mL). The organic phase was washed with brine, dried over Na₂SO₄, filtered and concentrated to afford a pale yellow solid, which was used without any further purification. Method 3: Rt=1.95 min. m/z=517.10 (M+H)⁺.

Description D46: trans-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide Hydrochloride (D46)

Compound was prepared according to the scheme below:

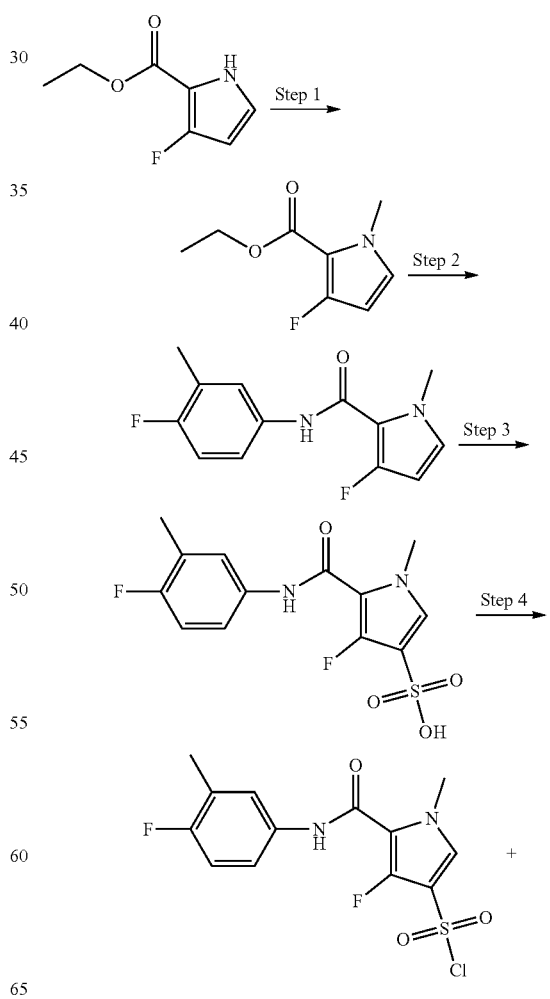

85
-continued

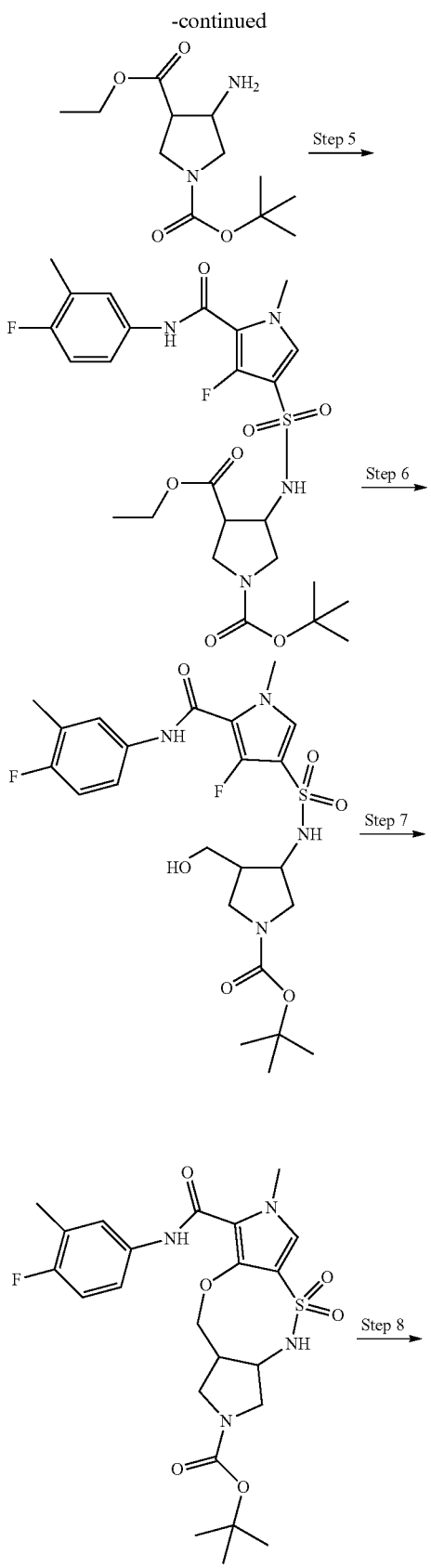

86
-continued

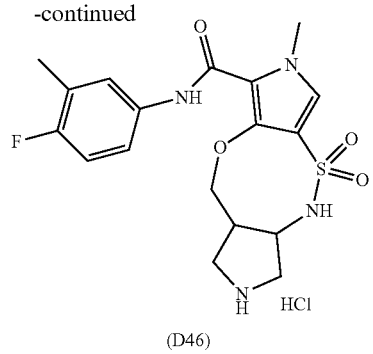

(D46)

Step 1:
To a solution of ethyl 3-fluoro-1H-pyrrole-2-carboxylate (12.5 g, 79.6 mmol) in dry DMF (125 mL) cooled to 0° C. under nitrogen atmosphere, sodium hydride (60% weight in mineral oil, 3.7 g, 92.5 mmol) was added portion wise over 30 min. The reaction mixture was stirred for further 20 min then iodomethane (5.8 mL, 93.2 mmol) was added dropwise over 30 min. The mixture was stirred for further 30 min at the same temperature then quenched with 2N HCl (20 mL). The reaction mixture was dumped into water (120 mL) and toluene (650 mL) and the mixture was vigorously stirred for 10 min. The two phase were separated and the organic phase washed with water (250 mL) and brine (250 mL), dried over $Na_2SO_4$ (anh.) and filtered. Ethyl 3-fluoro-1-methyl-1H-pyrrole-2-carboxylate (13.6 g) was obtained as a pale yellow oil after solvent evaporation and used without further purification. $^1$H NMR (300 MHz, DMSO-d6) δ ppm 1.27 (t, J=7.11 Hz, 3H), 3.78 (s, 3H), 4.23 (q, J=7.06 Hz, 2H), 5.99 (d, J=3.03 Hz, 1H), 7.00 (dd, J=5.27, 3.07 Hz, 1H).

Step 2:
Ethyl 3-fluoro-1-methyl-1H-pyrrole-2-carboxylate (13.6 g, 79.5 mmol), prepared in Step 1, and 4-fluoro-3-methylaniline (10.3 g, 82.3 mmol) were dissolved in dry toluene (50 mL). LiHMDS (140 mL, 1 M in toluene, 140 mmol) was added dropwise over 30 min and the reaction mixture was stirred at room temperature for further 30 min. The reaction mixture was cooled at 0° C. and slowly quenched with 2N HCl (200 mL), diluted with water (200 mL) and toluene (200 mL) and stirred at RT for 20 min. The two phases were separated and the organic phase washed with sat $NaHCO_3$ (200 mL) and brine (200 mL), dried over $Na_2SO_4$ (anh.) and filtered. 3-fluoro-N-(4-fluoro-3-methylphenyl)-1-methyl-1H-pyrrole-2-carboxamide (19.8 g) was obtained as a light brown solid after solvent evaporation and used without further purification. $^1$H NMR (300 MHz, DMSO-d6) δ ppm 2.22 (s, 3H), 3.76 (s, 3H), 6.01 (d, J=3.03 Hz, 1H), 6.91 (dd, J=5.27, 3.07 Hz, 1H), 7.08 (t, J=9.22 Hz, 1H), 7.35-7.53 (m, 1H), 7.59 (dd, J=7.06, 2.20 Hz, 1H), 9.50 (br s, 1H).

Step 3:
To a solution of 3-fluoro-N-(4-fluoro-3-methylphenyl)-1-methyl-1H-pyrrole-2-carboxamide (19.8 g, 79.5 mmol), prepared in Step 2, in dry DCM (90 mL) cooled to 0° C. under nitrogen atmosphere, chlorosulfonic acid (5.7 mL, 85.6 mmol) dissolved in dry DCM (120 mL) was added dropwise over 90 min. The reaction mixture was stirred at the same temperature for further 30 min; then the formed precipitate was filtered and washed several times with $Et_2O$. 4-fluoro-5-((4-fluoro-3-methylphenyl)carbamoyl)-1-methyl-1H-pyrrole-3-sulfonic acid (23.1 g, 88% yield over three steps) obtained as a light grey solid was dried under vacuum overnight and used without further purification. $^1$H NMR (300 MHz, DMSO-d6) δ ppm 2.22 (s, 3H), 3.70 (s, 3H), 6.93 (d, J=5.04 Hz, 1H), 7.07 (t, J=9.22 Hz, 1H), 7.44-7.52 (m, 1H), 7.60 (dd, J=7.06, 2.20 Hz, 1H), 9.64 (s, 1H).

Step 4:

Dry DMF (0.35 mL, 4.51 mmol) was added to a suspension of 4-fluoro-5-((4-fluoro-3-methylphenyl)carbamoyl)-1-methyl-1H-pyrrole-3-sulfonic acid (14.9 g, 45.1 mmol), prepared in Step 3, in thionyl chloride (112 mL). The reaction mixture was heated to 75° C. and stirred at the same temperature for 45 min. The brown solution was cooled to RT, diluted with toluene (200 mL) and slowly poured into a mixture of toluene (200 mL) and ice (500 mL) under vigorous stirring. The biphasic system was stirred for 20 min, the two phases were separated and the organic phase washed with ice-water (200 mL) and brine (200 mL), dried over Na$_2$SO$_4$ (anh.), filtered and concentrated under reduced pressure. The residue was purified on silica (eluent Petroleum Ether/AcOEt gradient) yielding 4-fluoro-5-((4-fluoro-3-methyl phenyl)carbamoyl)-1-methyl-1H-pyrrole-3-sulfonyl chloride (13.9 g, 88% yield) as an off-white powder. $^1$H NMR (300 MHz, CDCl3) δ ppm 2.31 (s, 3H), 4.06 (s, 3H), 7.03 (t, J=8.89 Hz, 1H), 7.26-7.36 (m, 2H), 7.39-7.46 (m, 1H), 7.72 (br d, J=8.16 Hz, 1H).

Step 5:

To a solution of trans-1-tert-butyl-3-ethyl-4-aminopyrrolidine-1,3-dicarboxylate (200 mg, 0.77 mmol) (Fluorochem, 317896, CAS: 362489-56-3) in MeCN (1 mL) was added DIPEA (0.27 mL, 1.55 mmol) followed by 4-fluoro-5-((4-fluoro-3-methylphenyl)carbamoyl)-1-methyl-1H-pyrrole-3-sulfonyl chloride (270 mg, 0.77 mmol), prepared in Step 4. The reaction was stirred overnight at room temperature. Solvent was removed in vacuo and residue was partitioned between EtOAc and 5% citric acid. The organic layer was dried over Na$_2$SO$_4$ (anh.), filtered and evaporated giving trans-1-(tert-butyl) 3-ethyl 4-((4-fluoro-5-((4-fluoro-3-methyl phenyl)carbamoyl)-1-methyl-1H-pyrrole)-3-sulfonamido)pyrrolidine-1,3-di carboxylate (450 mg, 0.789 mmol) as white solid, used in the next step without any purification. $^1$H NMR (300 MHz, DMSO-d6) δ ppm 1.05-1.23 (m, 3H), 1.38 (br s, 9H), 2.18-2.27 (m, 3H), 2.92-3.18 (m, 2H), 3.19-3.42 (m, 1H), 3.43-3.65 (m, 2H), 3.80 (s, 3H), 3.88-4.11 (m, 3H), 7.11 (t, J=9.17 Hz, 1H), 7.42-7.54 (m, 2H), 7.54-7.66 (m, 1H), 8.26 (br d, J=7.24 Hz, 1H), 10.02 (s, 1H). Method 1; Rt: 2.26 min; m/z: 571.13 (M+H)$^+$.

Step 6:

The intermediate from Step 5 (370 mg, 0.7 mmol) was dissolved in THF (5 mL) and treated with 1M LiAlH$_4$ in THF (946 uL, 0.946 mmol), added in portions of about 200 uL over 5 min. After 15 min the reaction was stopped by slow addition of water (2 mL) and stirred 10 min. A saturated solution of Rochelle's salt (potassium sodium tartrate tetrahydrate) was added (10 mL) followed by EtOAc (20 mL) and the reaction mixture was stirred for additional 20 min. The resulting mixture was poured into a separating funnel and the aqueous layer extracted one time with EtOAc. The combined organic extracts were dried over Na$_2$SO$_4$ (anh.), filtered and finally evaporated in vacuo giving trans-tert-butyl 3-((4-fluoro-5-((4-fluoro-3-methyl phenyl)carbamoyl)-1-methyl-1H-pyrrole)-3-sulfonamido)-4-(hydroxymethyl)pyrrolidine-1-carboxylate (370 mg, 0.7 mmol) as white solid. Method 1; Rt: 2.26 min; m/z: 529.19 (M+H)$^+$.

Step 7:

The intermediate obtained in Step 6 (0.13 g, 0.25 mmol) was dissolved in DMF (2.46 mL), treated with a single portion of cesium carbonate (0.24 g, 0.74 mmol) and heated by microwave irradiation at 130° C. for 2 hrs. The reaction was diluted with water and extracted with EtOAc. The organic layer was dried over anhydrous Na$_2$SO$_4$, filtered and finally evaporated. The residue was purified by flash chromatography (eluent DCM/EtOAc), and triturated in DEE/DCM, giving trans-tert-butyl 8-((4-fluoro-3-methylphenyl)carbamoyl)-7-methyl-3a,4,10,10a-tetrahydro-1H,7H-dipyrrolo[3,4-b:3',4'-f][1,4,5]oxathiazocine-2(3H)-carboxylate 5,5-dioxide (55 mg, 0.106 mmol) as white solid. $^1$H NMR (300 MHz, DMSO-d6) δ ppm 1.38 (s, 9H), 2.23 (s, 3H), 2.55-2.66 (m, 1H), 2.81-2.93 (m, 1H), 2.94-3.10 (m, 1H), 3.35-3.48 (m, 1H), 3.73-3.90 (m, 4H), 3.93-4.14 (m, 2H), 4.22 (br dd, J=11.14, 4.45 Hz, 1H), 6.88-6.89 (m, 1H), 7.11 (t, J=9.26 Hz, 1H), 7.42-7.55 (m, 2H), 7.56-7.70 (m, 2H), 9.51 (br s, 1H). Method 3: Rt=3.74 min; m/z=509.28.

Step 8:

A solution of intermediate prepared in Step 7 (44 mg, 0.08 mmol) in DCM (1 mL) was treated with a single portion of 3M HCl in MeOH (0.45 mL, 1.35 mmol) and the resulting yellow solution stirred at room temperature for 2 hrs. Then solvent was removed, giving D46 (37 mg, 0.083 mmol) in quantitative yield. $^1$H NMR (300 MHz, DMSO-d6+TFA) δ ppm 2.23 (d, J=1.01 Hz, 3H) 2.57-2.70 (m, 1H) 2.79-3.03 (m, 2H) 3.19-3.32 (m, 1H) 3.55-3.77 (m, 1H) 3.82 (s, 3H) 4.07 (br d, J=9.17 Hz, 2H) 4.12-4.33 (m, 1H) 7.11 (t, J=9.22 Hz, 1H) 7.43-7.57 (m, 3H) 7.62 (dd, J=7.06, 2.20 Hz, 1H) 8.85-9.11 (m, 2H) 9.68 (s, 1H) Method 1; Rt: 1.32 min. m/z: 409.24 (M+H)+

Description D47: methyl 2-((3aR,10aR)-8-((4-fluoro-3-methylphenyl)carbamoyl)-7-methyl-5,5-dioxido-3a,4,10,10a-tetrahydro-1H,7H-dipyrrolo[3,4-c:3',4'-g][1,6,2]dithiazocin-2(3H)-yl)-2-oxoacetate (D47)

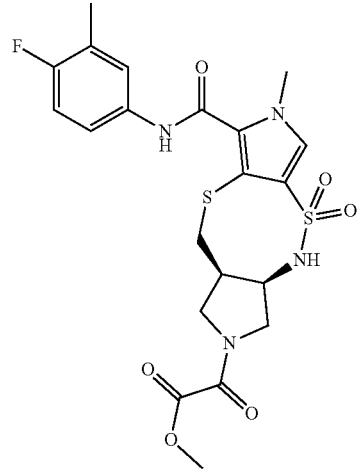

To a solution of D28 (230 mg, 0.42 mmol) in MeCN (5 mL) DIPEA (0.15 mL, 0.83 mmol) was added. The solution was cooled at 0° C. and methyl 2-chloro-2-oxoacetate (0.04 mL, 0.42 mmol) was added dropwise. The reaction was stirred at the same temperature for 30 min, then was quenched by addition of 5% citric acid solution and diluted with DCM. The organic phase was additionally washed twice with 5% citric acid solution, then was dried over Na$_2$SO$_4$, filtered and concentrated under reduced pressure to give crude D47 (197 mg), that was used in the next step without further purification. Method 1; Rt=1.87 min. m/z=511.23 (M+H)$^+$.

Description D48: 2-((3aR,10aR)-8-((4-fluoro-3-methylphenyl)carbamoyl)-7-methyl-5,5-dioxido-3a,4,10,10a-tetrahydro-1H,7H-dipyrrolo[3,4-c:3',4'-g][1,6,2]dithiazocin-2(3H)-yl)-2-oxoacetic Acid (D48)

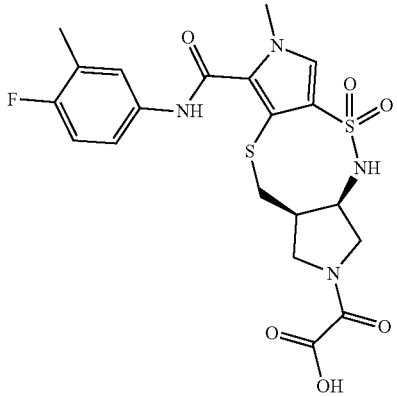 [SMILES: Cc1cc(NC(=O)c2c3c(cn2C)S(=O)(=O)N[C@H]2CN(C(=O)C(=O)O)C[C@H]2CS3)ccc1F]

To a solution of D47 (158 mg, 0.31 mmol) in THF (3 mL) 1N NaOH solution (0.77 mL, 0.77 mmol) was added, and the reaction was stirred at RT for 30 min. The reaction was diluted with water, acidified with 1N HCl solution until pH=3, and extracted twice with EtOAc. Combined organic layer was dried over Na$_2$SO$_4$, filtered and concentrated under vacuo, to obtain crude D48 (160 mg), that was used in the next step without further purification. Method 1; Rt=1.67 min. m/z=497.18 (M+H)$^+$.

Description D49: ethyl 2-(3,3-difluoroazetidin-1-yl)-2-oxoacetate (D49)

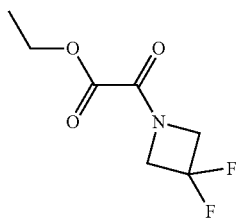

To a solution of 3,3-difluoroazetidine hydrochloride (100.2 mg, 0.77 mmol) and DIPEA (0.26 mL, 1.49 mmol) in DCM (4 mL), ethoxalyl chloride (0.08 mL, 0.70 mmol) was added dropwise at 0° C. under nitrogen atmosphere. The reaction was stirred at 0° C. for 1 h, then was quenched with ice and water and diluted with DCM. The organic phase was washed twice with 1N HCl solution. The organic phase was dried over Na$_2$SO$_4$, then was filtered and concentrated to yield D49 (113 mg) as a light orange solid, that was used in the next synthetic step as such. Method 2; Rt=2.40. m/z=194.12 (M+H)$^+$.

Description D50: ethyl (S)-2-oxo-2-((1,1,1-trifluoropropan-2-yl)amino)acetate (D50)

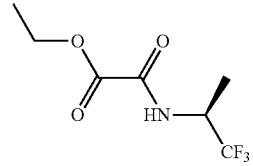

Prepared similarly as described for compound D49, using (2S)-1,1,1-trifluoro-2-propanamine hydrochloride instead of 3,3-difluoroazetidine hydrochloride to afford D50 ethyl (S)-2-oxo-2-((1,1,1-trifluoropropan-2-yl)amino)acetate as colourless oil. Method 2; Rt=2.84 min. m/z=214.34 (M+H)$^+$.

Description D51: (3aR,10aR)-8-((3,4-difluorophenyl)carbamoyl)-7-methyl-2,3,3a,4,10,10a-hexahydro-1H,7H-dipyrrolo[3,4-b:3',4'-f][1,4,5]oxathiazocin-2-ium 5,5-dioxide Iodide (D51)

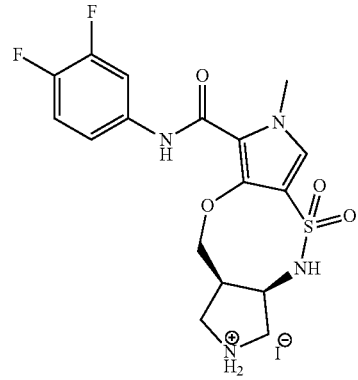 [SMILES: Cn1cc2c(c1C(=O)Nc1ccc(F)c(F)c1)OC[C@@H]1C[NH2+]C[C@@H]1NS2(=O)=O ; [I-]]

Prepared similarly as described for compound D31 (Procedure 2), using 3,4-difluoroaniline instead of 3-chloro-4-fluoroaniline, to afford D51 as dark-yellow solid, that was used in the next step without further purification. Method 1; Rt=1.34 min. m/z=413.36 (M+H)$^+$.

Description D52: (3aR,10aR)-8-((3-(difluoromethyl)-4-fluorophenyl)carbamoyl)-7-methyl-2,3,3a,4,10,10a-hexahydro-1H,7H-dipyrrolo[3,4-b:3',4'-f][1,4,5]oxathiazocin-2-ium 5,5-dioxide Iodide (D52)

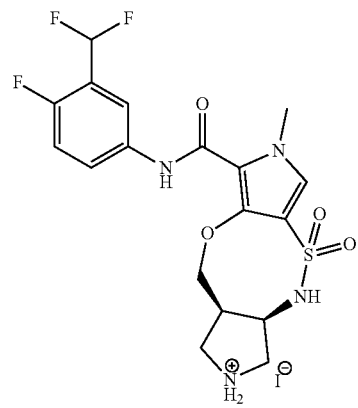 [SMILES: Cn1cc2c(c1C(=O)Nc1ccc(F)c(C(F)F)c1)OC[C@@H]1C[NH2+]C[C@@H]1NS2(=O)=O ; [I-]]

Prepared similarly as described for compound D31 (Procedure 2), using 3-(difluoromethyl)-4-fluoroaniline instead of 3-chloro-4-fluoroaniline to afford D52 as a solid that was used in the next step without further purification. Method 1; Rt=1.31 min. m/z=445.37 (M+H)⁺.

Description D53: (3aR,10aR)-8-((4-fluoro-3-(trifluoromethyl)phenyl)carbamoyl)-7-methyl-2,3,3a,4,10,10a-hexahydro-1H,7H-dipyrrolo[3,4-b:3',4'-f][1,4,5]oxathiazocin-2-ium 5,5-dioxide Iodide (D53)

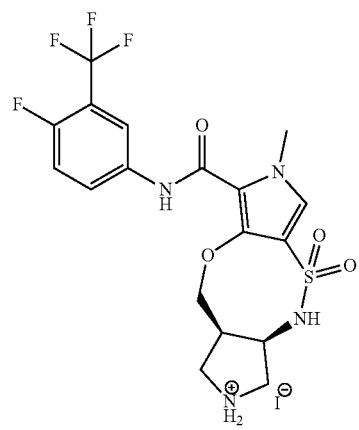 [SMILES: Cn1cc2c(c1C(=O)Nc1ccc(F)c(C(F)(F)F)c1)OC[C@@H]1C[NH2+]C[C@@H]1NS2(=O)=O ; [I-]]

Prepared similarly as described for compound D31 (Procedure 2), using 4-fluoro-3-(trifluoromethyl)aniline instead of 3-chloro-4-fluoroaniline to afford D53 as a solid that was used in the next step without further purification. Method 1; Rt=1.51 min. m/z=463.41 (M+H)⁺.

Description D54: ethyl 2-((3aR,10aR)-8-((4-fluoro-3-methylphenyl)carbamoyl)-6,7-dimethyl-5,5-dioxido-3a,4,10,10a-tetrahydro-1H,7H-dipyrrolo[3,4-b:3',4'-f][1,4,5]oxathiazocin-2(3H)-yl)-2-oxoacetate (D54)

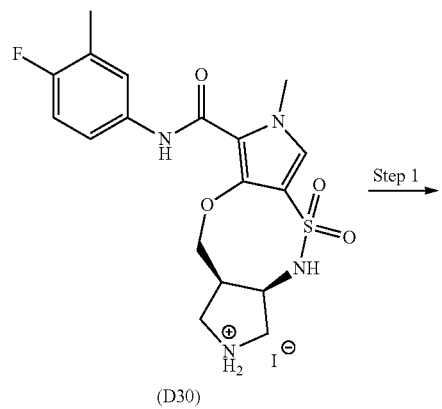

(D30)

-continued

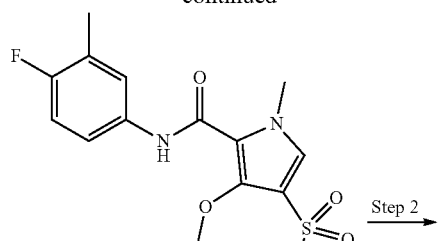

Step 2

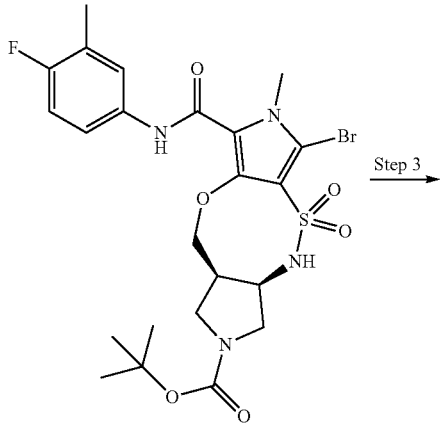

Step 3

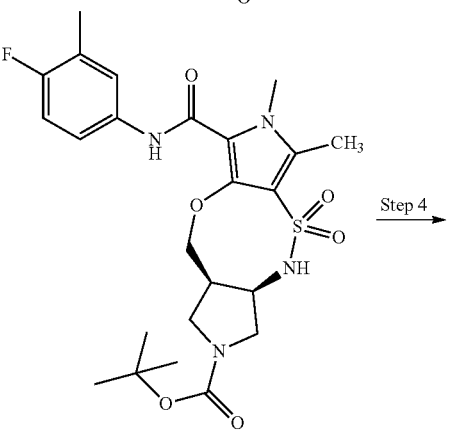

Step 4

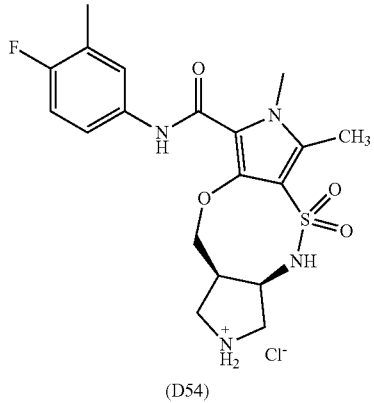

(D54)

Step 1:

Di-tert-butyl dicarbonate (270 .mg, 1.24 mmol) dissolved in 5 ml of DCM was added to a suspension of D30 (509 .mg, 0.950 mmol) and triethylamine (0.32 mL, 2.28 mmol) in DCM (5 ml). The pale yellow solution was stirred at RT for 12 h (white precipitate was formed). The reaction was diluted with DCM (30 ml) and washed with 0.5M HCl (20 ml), water (20 ml) and brine (20 ml). The organic layers was dried over $Na_2SO_4$ filtered and concentrated to afford tert-butyl (3aR,10aR)-8-((4-fluoro-3-methylphenyl)carbamoyl)-7-methyl-3a,4,10,10a-tetrahydro-1H, 7H-dipyrrolo[3,4-b:3',4'-f][1,4,5]oxathiazocine-2(3H)-carboxylate 5,5-dioxide as a white foam used without further purification. Method 1; Rt=2.19 min. m/z=509 (M+H)$^+$.

Step 2:

N-Bromosuccinimide (189.0 mg, 1.06 mmol) was added to a solution of intermediate from Step 1 (450 mg, 0.880 mmol) in a mixture of DCM/MeCN 8:1 (18 ml); the orange solution was stirred at RT for 4 h until it became pale yellow then was diluted with DCM (20 ml) and saturated solution of $NaHCO_3$ (30 ml) and stirred at RT for 30 min. The two phases were separated and the organic layer was washed with brine, dried over $Na_2SO_4$ filtered and concentrated. The resulting crude was purified by flash chromatography on silica, eluent gradient from DCM/EtOAc 9:1 to 8:2. Pure fractions were combined and concentrated to afford tert-butyl (3aR,10aR)-6-bromo-8-((4-fluoro-3-methylphenyl)carbamoyl)-7-methyl-3a,4,10,10a-tetrahydro-1H,7H-dipyrrolo[3,4-b:3',4'-f][1,4,5]oxathiazocine-2(3H)-carboxylate 5,5-dioxide as a white foam. Method 1; Rt=2.28 min. m/z=587.4 (M+H)$^+$. $^1$H NMR (300 MHz, DMSO-d6) δ ppm 1.44 (s, 9H) 2.21-2.28 (m, 3H) 2.72-2.99 (m, 1H) 3.06 (q, J=9.17 Hz, 1H) 3.34-3.41 (m, 2H) 3.54-3.77 (m, 1H) 3.80 (s, 3H) 3.99 (br t, J=10.73 Hz, 1H) 4.27-4.43 (m, 2H) 0.00 (t, J=8.99 Hz, 1H) 7.44-7.54 (m, 1H) 7.54-7.66 (m, 1H) 8.55 (br s, 1H) 9.62 (br s, 1H).

Step 3:

Intermediate from Step 2 (100 mg, 0.170 mmol), Palladium-tetrakis(triphenylphosphine), (29.5 mg, 0.030 mmol) and cesium carbonate (195.3 mg, 0.600 mmol) were weighted in a vial and sealed under nitrogen atmosphere for 5 min. Then dioxane (3 mL), water (0.3 mL) and 2,4,6-trimethyl-1,3,5,2,4,6-trioxatriborinane (0.1 mL, 0.680 mmol) were added and the mixture was stirred at 130° C. for 3 hrs. The reaction was diluted with toluene (30 ml) and saturated solution of $NaHCO_3$ (20 ml) and stirred for 30 min. The two phases were separated and the organic layer was dried over $Na_2SO_4$, filtered and concentrated. The crude was purified by flash chromatography on silica gel with eluent starting from DCM/EtOAc 9:1 to 6:4. Pure fractions were combined and concentrated to afford tert-butyl (3aR,10aR)-8-((4-fluoro-3-methylphenyl)carbamoyl)-6,7-dimethyl-3a,4,10,10a-tetrahydro-1H,7H-dipyrrolo[3,4-b:3',4'-f][1,4,5]oxathiazocine-2(3H)-carboxylate 5,5-dioxide as a colourless oil. Method 1; Rt=2.22 min. m/z=523.31 (M+H)$^+$.

Step 4:

3N HCl in MeOH (0.8 mL, 2.42 mmol) was slowly added to a solution of intermediate from step 3 (63.35 mg, 0.120 mmol) in DCM (3 mL) at RT. The pale yellow solution was stirred at RT for 3 hrs until less than 4% of SM was detected; then the solution was concentrated under reduced pressure to afford D54 as a pale yellow solid. Method 1; Rt=1.38 min. m/z=423 (M+H)$^+$.

Description D55: Sodium 2-(3,3-difluoroazetidin-1-yl)-2-oxoacetate (D55)

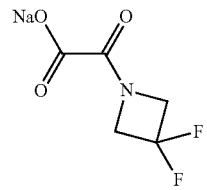

Prepared similarly as described for compound D43 starting from D49. Method 6; Rt=0.92 min.

Description D56: Sodium (S)-2-oxo-2-((1,1,1-trifluoropropan-2-yl)amino)acetate (D56)

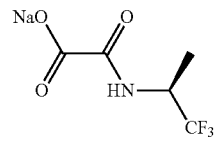

Prepared similarly as described for compound D43 starting from D50. Method 6; Rt=1.34 min.

Description D57: ethyl 2-oxo-2-((2,2,2-trifluoroethyl)amino)acetate (D57)

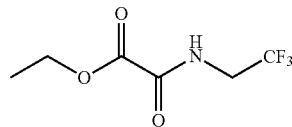

Prepared similarly as described for compound D42, using 2,2,2-trifluoroethylamine hydrochloride instead of cyclopropanamine to afford ethyl 2-oxo-2-((2,2,2-trifluoroethyl)amino)acetate D57 as a white solid, that was used in the next synthetic step as such. $^1$H NMR (300 MHz, DMSO-d6) δ ppm 1.29 (t, J=7.11 Hz, 3H) 3.83-4.08 (m, 2H) 4.27 (q, J=7.12 Hz, 2H) 9.35-9.70 (m, 1H). Method 6; Rt=2.32 min. m/z=200.2 (M+H)$^+$.

Description D58: sodium 2-oxo-2-((2,2,2-trifluoroethyl)amino)acetate (D58)

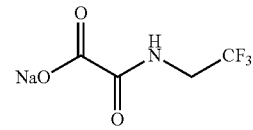

Prepared similarly as described for compound D43 starting from D57. Method 6; Rt=1.22 min. m/z=172.1 (M+H)$^+$.

Description D59: ethyl 2-oxo-2-((1,1,1-trifluoro-2-methylpropan-2-yl)amino)acetate (D59)

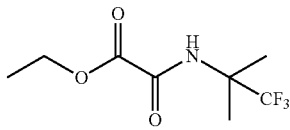

Prepared similarly as described for compound D42, using 2,2,2-trifluoro-1,1-dimethyl-ethylamine hydrochloride instead of cyclopropanamine to afford ethyl 2-oxo-2-((1,1,1-trifluoro-2-methylpropan-2-yl)amino)acetate D59 as colourless oil, that was used in the next synthetic step as such. Method 6; Rt=3.54 min. m/z=228.13 (M+H)$^+$.

Description D60: sodium 2-oxo-2-((1,1,1-trifluoro-2-methylpropan-2-yl)amino)acetate (D60)

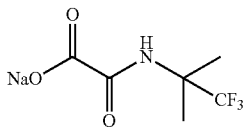

Prepared similarly as described for compound D43 starting from D59. Method 6; Rt=1.07 min. m/z=200.15 (M+H)$^+$.

Description D61: tert-butyl (3R,4R)-1-benzyl-4-(benzyl((S)-1-phenylethyl)amino)-3-methylpyrrolidine-3-carboxylate (D61)

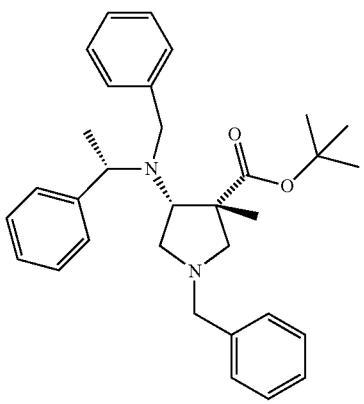 [SMILES: C[C@@H](c1ccccc1)N(Cc1ccccc1)[C@H]1CN(Cc2ccccc2)C[C@@]1(C)C(=O)OC(C)(C)C]

A 2 necked round bottom flask (100 mL) equipped with magnetic stirrer and thermometer was evacuated by nitrogen and charged with (S)-(−)—N-benzyl-1-phenylethylamine (0.64 mL, 3.07 mmol). THF (25 mL, 0.308 mol) was added at room temperature, under nitrogen atmosphere, and the resulting solution stirred at room temperature for 5 min. The yellow solution was cooled to −78° C. using dry ice/acetone bath. n-Butyllithium (1.9 mL, 3.04 mmol) was added over 30 min, keeping the temperature below −70° C. The purple solution was stirred at −78° C. for 1 h and 15 min. A preformed solution of tert-butyl 1-(phenylmethyl)-2,5-dihydropyrrole-3-carboxylate (Org. Biom. Chem., 2004, 2, 2763-2776) (500 mg, 1.93 mmol) in THF (5 mL, 0.062 mol) was added over 2 h, keeping the internal temperature below −73° C. The resulting orange solution was stirred for 3 h at this temperature. A solution of iodomethane (187.24 uL, 3.01 mmol) in THF (1 mL) was added over 15 min, the internal temperature was below −70° C. After 10 min the cooling bath was removed and the reaction was warmed to −30° C. in about 20 min then stopped by NH$_4$Cl (sat. sol.), dried over Na$_2$SO$_4$ anh., filtered and evaporated giving a crude residue (about 500 mg). Purification by silica gel chromatography (EtOAc/petroleum ether) gave D61 (500 mg, 1.0316 mmol). Method 15; Rt=6.58 min. m/z=485.19 (M+H)$^+$ Description D62: di-tert-butyl (3R,4R)-4-amino-3-methylpyrrolidine-1,3-dicarboxylate (D62)

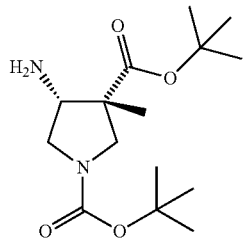 [SMILES: CC(C)(C)OC(=O)N1C[C@H](N)[C@](C)(C(=O)OC(C)(C)C)C1]

A mixture of tert-butyl (3R,4R)-3-methyl-4-[[(1 S)-1-phenyl ethyl]-(phenylmethyl)amino]-1-(phenylmethyl)pyrrolidine-3-carboxylate (D61, 377 mg, 0.780 mmol) and di-tert-butyl dicarbonate (169.76 mg, 0.780 mmol) in methanol (40 mL, 0.987 mol) was hydrogenated by H-CUBE apparatus (cartridge small tip 10% Pd/C, 5 bar, flux 0.7 mL/min, T=25° C.). Working at 10 atm, complete deprotection is very slow. Solvent was removed and the instrument was washed with ethanol. The substrate was dissolved in 9/1 EtOH/H$_2$O (40 mL) and further hydrogenated at 50° C. at 10 atm until complete by UPLC (about 3 run) to afford compound D62 (200 mg, 0.67 mmol). $^1$H NMR (300 MHz, DMSO-d$_{6+TFA}$) δ ppm 1.19 (s, 3H) 1.27 (s, 9H) 1.31 (s, 9H) 2.85-3.11 (m, 1H) 3.30 (br s, 1H) 3.41-3.73 (m, 3H) 8.12 (br s, 2H) 11.28 (br s, 3H)

Description D63: (3aR,10aR)—N-(4-fluoro-3-methylphenyl)-7,10a-dimethyl-2,3,3a,4,10,10a-hexahydro-1H,7H-dipyrrolo[3,4-b:3',4'-f][1,4,5]oxathiazocine-8-carboxamide 5,5-dioxide Hydrochloride (D63)

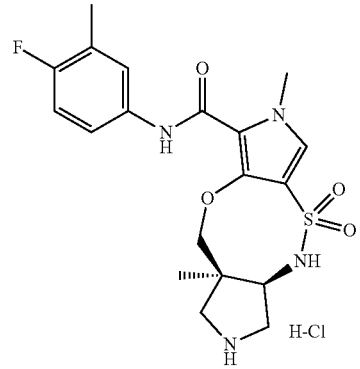

Obtained as reported for intermediate D46, using in Step 5 intermediate D62 instead of trans-1-tert-butyl-3-ethyl-4-aminopyrrolidine-1,3-dicarboxylate. Method 10; Rt=1.35 min. m/z=423.42 (M+H)+

Description D64: tert-butyl (3S,4S)-1-benzyl-4-(benzyl((S)-1-phenylethyl)amino)-3-fluoropyrrolidine-3-carboxylat-fluoropyrrolidine-3-carboxylate (D64)

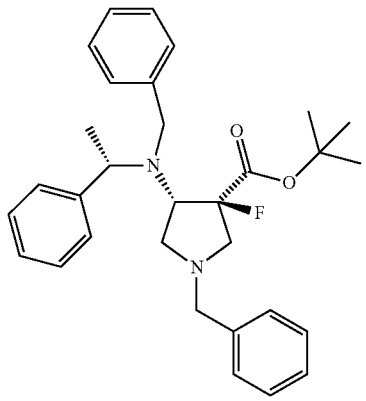 [SMILES: C[C@@H](c1ccccc1)N(Cc1ccccc1)[C@H]1CN(Cc2ccccc2)C[C@@]1(F)C(=O)OC(C)(C)C]

Synthesized as reported for D61 starting from tert-butyl 1-(phenylmethyl)-2,5-dihydropyrrole-3-carboxylate (Org. Biom. Chem., 2004, 2, 2763-2776; 500 mg, 1.928 mmol) using a solution of N-fluoro-N-(phenylsulfonyl)benzenesulfonimide (Sigma Aldrich, cat. No. 392715; 960 mg, 3.0 mmol) in THF (7.9 mL) instead methyl iodide, to obtain D64 (250 mg, 0.512 mmol. $^1$H NMR (300 MHz, CHLOROFORM-d) δ ppm 1.29 (d, J=6.97 Hz, 3H) 1.50 (s, 9H) 2.32 (t, J=9.54 Hz, 1H) 2.72 (br t, J=7.70 Hz, 1H) 2.80-3.15 (m, 2H) 3.21-3.54 (m, 3H) 3.77 (ddd, J=25.03, 10.18, 6.51 Hz, 1H) 3.92 (d, J=15.31 Hz, 1H) 4.19 (q, J=6.82 Hz, 1H) 7.08-7.36 (m, 15H). $^{19}$F NMR (300 MHz, CHLOROFORM-d) δ ppm −142 (s, 1° F.). Method 1; Rt=2.07 min. m/z=489.61 (M+H)+.

Description D65: di-tert-butyl (3S,4S)-4-amino-3-fluoropyrrolidine-1,3-dicarboxylate (D65)

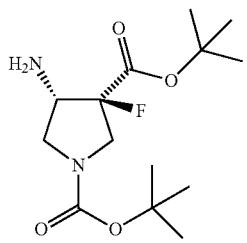 [SMILES: CC(C)(C)OC(=O)N1C[C@H](N)[C@](F)(C(=O)OC(C)(C)C)C1]

Synthesized as reported for D62 starting from D64 (480 mg, 0.982 mmol), to afford D65 (140 mg, 0.460 mmol). Method 1; Rt=1.33 min. m/z=305.28 (M+H)+.

Description D66: (3aS,10aS)—N-(4-fluoro-3-methylphenyl)-10a-hydroxy-7-methyl-2,3,3a,4,10,10a-hexahydro-1H,7H-dipyrrolo[3,4-b:3',4'-f][1,4,5]oxathiazocine-8-carboxamide 5,5-dioxide Hydrochloride (D66)

Synthesized as reported for D46 using in Step 5 D65 (179 mg, 0.29 mmol) instead of trans-1-tert-butyl-3-ethyl-4-aminopyrrolidine-1,3-di carboxylate. Reaction afforded D66 (17.5 mg, 0.038 mmol). Method 1; Rt=1.32 min. m/z=447.33 (M+Na)+

Example E1: cis-2-(2-(dimethylamino)-2-oxoacetyl)-7-methyl-N-(3,4,5-trifluorophenyl)-2,3,3a,4,10,10a-hexahydro-1H,7H-dipyrrolo[3,4-b:3',4'-f][1,4,5]oxathiazocine-8-carboxamide 5,5-dioxide (E1)

cis-7-methyl-N-(3,4,5-trifluorophenyl)-2,3,3a,4,10,10a-hexahydro-1H,7H-dipyrrolo[3,4-b:3',4'-f][1,4,5]oxathiazocine-8-carboxamide 5,5-dioxide hydroiodide (25 mg, 0.054 mmol), N,N-Dimethyloxamic acid (7.0 mg, 0.060 mmol) (Fluorochem, cat no 023520) and HATU (22.5 mg, 0.059 mmol) were dissolved in dry DMF (0.5 mL). Dry DIPEA (0.025 mL, 0.144 mmol) was added and the reaction was stirred at room temperature for 18 h. Mixture was evaporated under reduced pressure to afford a brown solid that was purified with preparative HPLC-MS (H$_2$O/CH$_3$CN+0.1%

TFA) (13.02 mg). ¹H NMR (300 MHz, DMSO-d6+TFA) δ ppm 2.83-2.96 (m, 6H), 2.99-3.25 (m, 2H), 3.33-3.55 (m, 2H), 3.76-4.00 (m, 5H), 4.45-4.69 (m, 2H), 7.50 (s, 1H), 7.59-7.76 (m, 2H), 8.47-8.59 (m, 1H), 9.63-9.69 (m, 1H). Method 3: Rt=3.09 min; m/z=530.47 (M+H)⁺.

Example E2: cis-N-(4-fluoro-3-methylphenyl)-7-methyl-2-(2-((3-methyloxetan-3-yl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide (E2)

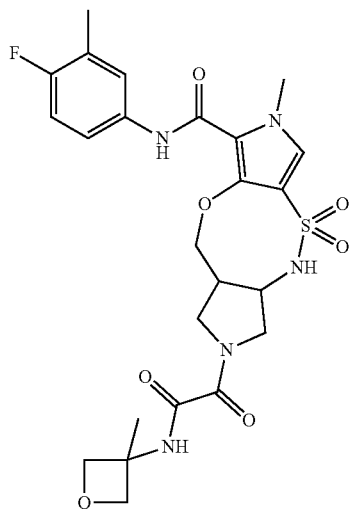 [SMILES: Cc1cc(NC(=O)c2c3c(cn2C)S(=O)(=O)NC2CN(C(=O)C(=O)NC4(C)COC4)CC2CO3)ccc1F]

To a mixture of D29 (29 mg, 0.050 mmol), 2-(2,3-dihydro-1H-benzo[d][1,2,3]triazol-1-yl)-1,1,3,3-tetramethylisouronium hexafluorophosphate(V) (20.56 mg, 0.050 mmol) and D39 (14.69 mg, 0.080 mmol) in DMF (1.5 mL, 0.019 mol) was added dropwise N-ethyl-N-isopropylpropan-2-amine (0.03 mL, 0.160 mmol) at rt and under nitrogen atmosphere. The reaction was stirred at the same temperature for 1 h. Then it was diluted with ethyl acetate, washed with small amounts of water (7×5 mL), 5% citric acid (2×15 mL) and brine. The organic phase was dried over Na₂SO₄ (anh.), then was filtered and concentrated under reduced pressure. The product was purified with preparative HPLC-MS (H₂O/CH₃CN+0.1% HCOOH) to yield E2 (2.03 mg, 0.004 mmol). ¹H NMR (300 MHz, DMSO-d6) δ 1.52 (d, J=6.14 Hz, 3H), 2.24 (s, 3H), 2.91-3.13 (m, 1H), 3.14-3.66 (m, 2H), 3.74-4.14 (s, 6H), 4.23-4.39 (m, 2H), 4.42-4.56 (m, 1H), 4.57-4.73 (m, 3H), 7.11 (t, J=9.26 Hz, 1H), 7.45-7.54 (m, 2H), 7.56-7.64 (m, 1H), 8.41 (br s, 1H), 9.23 (br d, J=8.07 Hz, 1H), 9.35 (br d, J=5.23 Hz, 1H). Method 3: Rt=3.03 min; m/z=550.40 (M+H)⁺.

Example E3: (3aR,10aR)—N-(4-fluoro-3-methylphenyl)-7-methyl-2-(2-((3-methyloxetan-3-yl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide (E3)

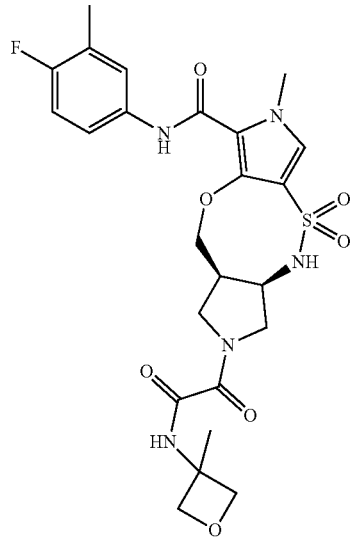 [SMILES: Cc1cc(NC(=O)c2c3c(cn2C)S(=O)(=O)N[C@H]2CN(C(=O)C(=O)NC4(C)COC4)C[C@H]2CO3)ccc1F]

Prepared similarly as described for compound E2 starting from D30 and D39. The crude was purified by Fraction-Lynx (H₂O/CH₃CN+1‰ HCOOH) to afford E3 (92.16 mg). ¹H NMR (300 MHz, DMSO-d₆) δ ppm 1.52 (d, J=6.24 Hz, 3H), 2.24 (s, 3H), 2.89-3.13 (m, 1H), 3.20 (br t, J=11.10 Hz, 1H), 3.42-3.66 (m, 2H), 3.74-4.14 (m, 6H), 4.25-4.36 (m, 2H), 4.41-4.55 (m, 1H), 4.57-4.68 (m, 3H), 7.11 (t, J=9.17 Hz, 1H), 7.46-7.55 (m, 2H), 7.55-7.62 (m, 1H), 8.41 (br s, 1H), 9.22 (d, J=8.34 Hz, 1H), 9.35 (d, J=5.04 Hz, 1H). Method 3: Rt=3.03 min; m/z=550.40 (M+H)⁺.

Example E4: (3aR,10aR)-7-methyl-2-(2-((3-methyloxetan-3-yl)amino)-2-oxoacetyl)-N-(3,4,5-trifluorophenyl)-2,3,3a,4,10,10a-hexahydro-1H,7H-dipyrrolo[3,4-b:3',4'-f][1,4,5]oxathiazocine-8-carboxamide 5,5-dioxide (E4)

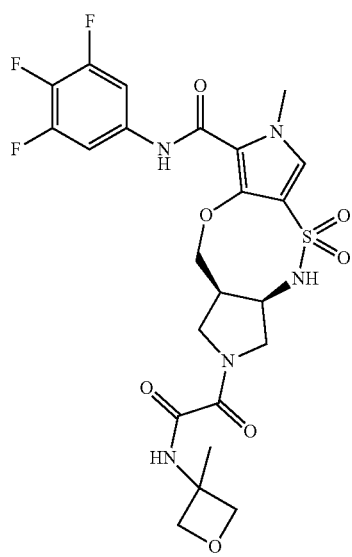 [SMILES: Cn1cc2c(c1C(=O)Nc1cc(F)c(F)c(F)c1)OC[C@@H]1CN(C(=O)C(=O)NC3(C)COC3)C[C@@H]1NS2(=O)=O]

Prepared similarly as described for compound E2 starting from D32 and D39. The crude was purified by Fraction-Lynx (H₂O/CH₃CN+1‰ HCOOH) to afford E4 (22 mg) as white solid. ¹H NMR (300 MHz, DMSO-d6) δ ppm 1.52 (d, J=6.33 Hz, 3H), 2.88-3.13 (m, 1H), 3.14-3.68 (m, 2H), 3.81 (s, 3H), 3.83-4.15 (m, 3H), 4.22-4.37 (m, 2H), 4.41-4.55 (m, 1H), 4.56-4.74 (m, 3H), 7.52 (s, 1H), 7.60-7.83 (m, 2H), 8.34-8.53 (m, 1H), 9.23 (d, J=7.70 Hz, 1H), 9.67 (d, J=3.58 Hz, 1H). Method 3; Rt=3.20 min; m/z=572.35 (M+H)⁺.

Example E5: (3aR,10aR)—N-(3-chloro-4-fluorophenyl)-7-methyl-2-(2-((3-methyloxetan-3-yl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide (E5)

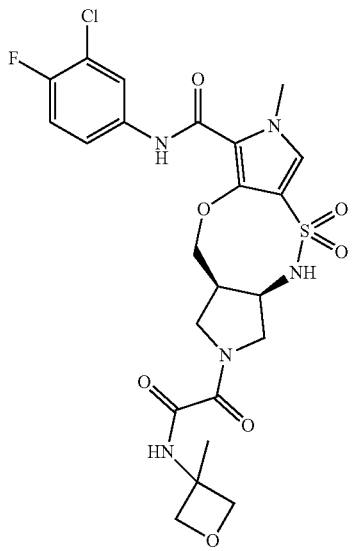 [SMILES: Cn1cc2c(c1C(=O)Nc1ccc(F)c(Cl)c1)OC[C@@H]1CN(C(=O)C(=O)NC3(C)COC3)C[C@@H]1NS2(=O)=O]

Prepared similarly as described for compound E2 starting from D31 and D39. The crude was purified by Fraction-Lynx (H₂O/CH₃CN+1‰ HCOOH) to afford E5 as an off white solid. ¹H NMR (300 MHz, DMSO-d6) δ ppm 1.52 (d, J=6.42 Hz, 3H), 2.84-3.13 (m, 1H), 3.41-3.68 (m, 2H), 3.72-4.19 (m, 6H), 4.24-4.37 (m, 2H), 4.41-4.55 (m, 1H), 4.56-4.71 (m, 3H), 7.36-7.46 (m, 1H), 7.49 (s, 1H), 7.56-7.77 (m, 1H), 7.89-8.06 (m, 1H), 8.29-8.64 (m, 1H), 9.23 (d, J=7.24 Hz, 1H), 9.57 (d, J=4.77 Hz, 1H). Method 3: Rt=3.17 min; m/z=570.39; 572.35 (M+H)⁺.

Example E6: (3aR,10aR)—N-(3-cyano-4-fluorophenyl)-7-methyl-2-(2-((3-methyloxetan-3-yl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide (E6)

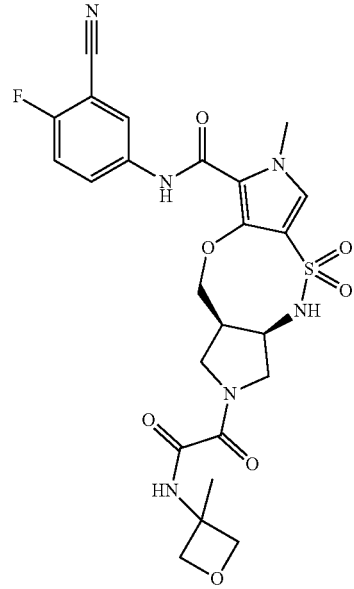 [SMILES: Cn1cc2c(c1C(=O)Nc1ccc(F)c(C#N)c1)OC[C@@H]1CN(C(=O)C(=O)NC3(C)COC3)C[C@@H]1NS2(=O)=O]

Prepared similarly as described for compound E2 starting from D33 and D39. The crude was purified by Fraction-Lynx (H₂O/CH₃CN+1‰ HCOOH) to afford E6 as an off white solid. ¹H NMR (300 MHz, DMSO-d6) δ ppm 1.52 (d, J=6.42 Hz, 3H), 2.86-3.13 (m, 1H), 3.15-3.69 (m, 1H), 3.48 (br s, 2H), 3.72-4.18 (m, 7H), 4.23-4.38 (m, 2H), 4.41-4.56 (m, 1H), 4.56-4.74 (m, 3H), 7.46-7.63 (m, 2H), 7.95-8.11 (m, 1H), 8.19 (ddd, J=5.64, 4.54, 2.75 Hz, 1H), 8.27-8.59 (m, 1H), 9.23 (d, J=7.06 Hz, 1H), 9.68 (d, J=4.13 Hz, 1H). Method 3: Rt=2.88 min; m/z=561.34 (M+H)⁺.

Example E7: (3aR,10aR)-2-(2-(tert-butylamino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide (E7)

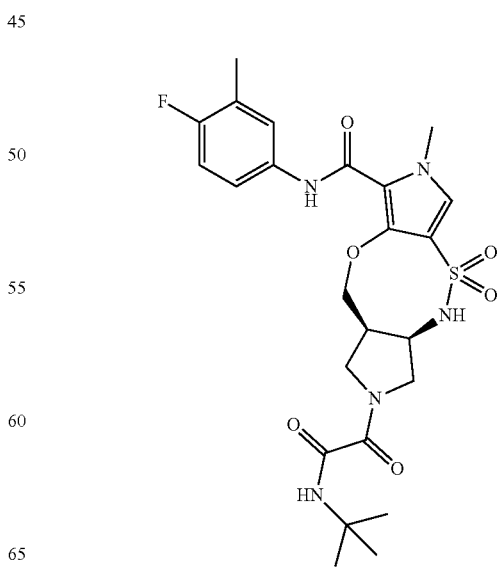

103

To a solution of D37 (30 mg, 0.060 mmol), benzotriazol-1-yloxytris(dimethylamino)phosphonium hexafluorophosphate (30.38 mg, 0.070 mmol), DIPEA (25 uL, 0.140 mmol) in dry DMF (2.5 mL, 0.032 mol), tert-butylamine (0.02 mL, 0.190 mmol) was added at room temperature and reaction mixture stirred in the same conditions for 4 hrs. The reaction mixture was diluted with EtOAc (25 mL) and 20 ml of water+1 ml of 1N HCl. After phase separation the organic layers were washed with brine. The organic portion was dried over $Na_2SO_4$ (anh.), filtered and concentrated under reduced pressure. The residue purified by Fraction-Lynx ($H_2O/CH_3CN$+1‰ HCOOH) to afford E7 as an off white solid. $^1$H NMR (300 MHz, DMSO-d6) δ ppm 1.31 (d, J=7.70 Hz, 9H), 2.24 (s, 3H), 2.91-3.09 (m, 1H), 3.12-3.65 (m, 2H), 3.71-4.08 (m, 6H), 4.43-4.56 (m, 1H), 4.61 (br dd, J=11.10, 3.85 Hz, 1H), 7.11 (t, J=9.20 Hz, 1H), 7.42-7.55 (m, 2H), 7.59 (br s, 1H), 7.97 (d, J=14.12 Hz, 1H), 8.37-8.49 (m, 1H), 9.34 (d, J=5.41 Hz, 1H). Method 3: Rt=3.44 min; m/z=536.42 $(M+H)^+$.

Example E8: (3aR,10aR)-2-(2-(cyclopropylamino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide (E8)

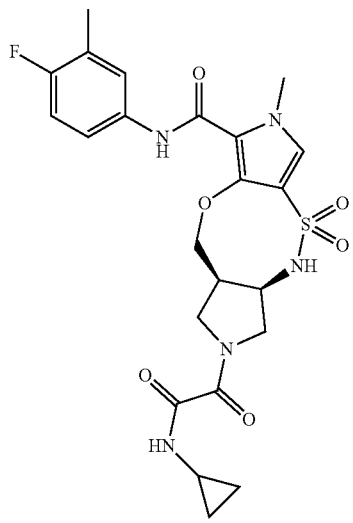 [SMILES: Cc1cc(NC(=O)c2c3c(cn2C)S(=O)(=O)N[C@H]2CN(C(=O)C(=O)NC4CC4)C[C@H]2CO3)ccc1F]

Prepared similarly as described for compound E7 using cyclopropanamine instead of tert-Butylamine to give E8. The crude was purified by Fraction-Lynx ($H_2O/CH_3CN$+1‰ HCOOH) to afford 15.69 mg of an off white solid. $^1$H NMR (300 MHz, DMSO-d6) δ ppm 0.51-0.70 (m, 4H), 2.21-2.27 (m, 3H), 2.66-2.83 (m, 1H), 2.91-3.11 (m, 1H), 3.14-3.64 (m, 2H), 3.73-4.13 (m, 6H), 4.41-4.55 (m, 1H), 4.55-4.67 (m, 1H), 7.11 (t, J=9.17 Hz, 1H), 7.45-7.54 (m, 2H), 7.56-7.62 (m, 1H), 8.41 (dd, J=9.90, 2.66 Hz, 1H), 8.70 (dd, J=9.90, 4.95 Hz, 1H), 9.34 (d, J=3.94 Hz, 1H). Method 3: Rt=3.12 min; m/z=520.26 $(M+H)^+$.

104

Example E9: (3aR,10aR)—N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E9)

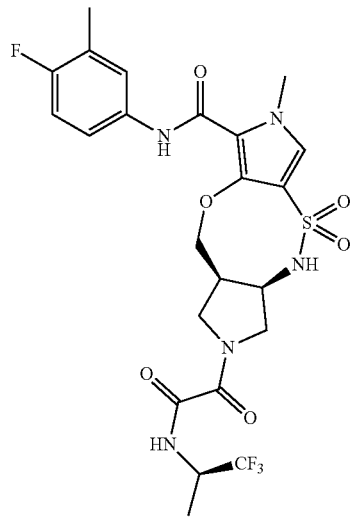 [SMILES: Cc1cc(NC(=O)c2c3c(cn2C)S(=O)(=O)N[C@H]2CN(C(=O)C(=O)N[C@H](C)C(F)(F)F)C[C@H]2CO3)ccc1F]

Prepared similarly as described for compound E7 using (2R)-1,1,1-trifluoro-2-propanamine hydrochloride (Fluorochem, cat no 093835) instead of tert-butylamine. The crude was purified by Fraction-Lynx ($H_2O/CH_3CN$+1‰ HCOOH) to afford E9. $^1$H NMR (300 MHz, DMSO-d6) δ ppm 1.31 (t, J=6.88 Hz, 3H), 2.24 (s, 3H), 2.92-3.13 (m, 1H), 3.15-3.68 (m, 2H), 3.78-4.09 (m, 6H), 4.43-4.56 (m, 1H), 4.55-4.73 (m, 2H), 7.11 (t, J=9.17 Hz, 1H), 7.43-7.55 (m, 2H), 7.54-7.64 (m, 1H), 8.37-8.53 (m, 1H), 9.21-9.31 (m, 1H), 9.31-9.39 (m, 1H). Method 3: Rt=3.48 min; m/z=576.33 $(M+H)^+$.

Example E10: cis N-(4-fluoro-3-methylphenyl)-7-methyl-2-(2-(methylamino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide (E10)

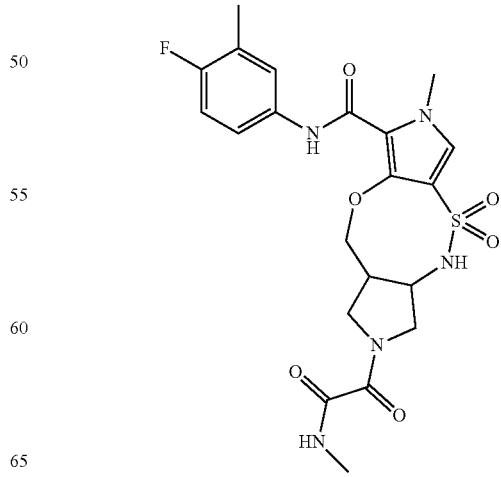

A mixture of D44 (50 mg, 0.1 mmol) and methanamine 2M in THF (0.76 mL, 1.52 mmol) was stirred at 50° C. for 30 min. The solvent was removed under reduced pressure and crude product was purified by Fraction-Lynx (H₂O/CH₃CN+1‰ HCOOH) to afford E10. ¹H NMR (300 MHz, DMSO-d6) δ ppm 2.24 (s, 3H), 2.57-2.75 (m, 3H), 2.91-3.08 (m, 1H), 3.20-3.65 (m, 2H), 3.75-4.11 (m, 6H), 4.42-4.53 (m, 1H), 4.54-4.68 (m, 1H), 7.11 (t, J=9.20 Hz, 1H), 7.43-7.52 (m, 2H), 7.56-7.63 (m, 1H), 8.41 (s, 1H), 8.61 (br s, 1H), 9.34 (d, J=3.40 Hz, 1H). Method 3: Rt=2.94 min; m/z=494.21 (M+H)⁺.

Example E11: cis-2-(2-amino-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide (E11)

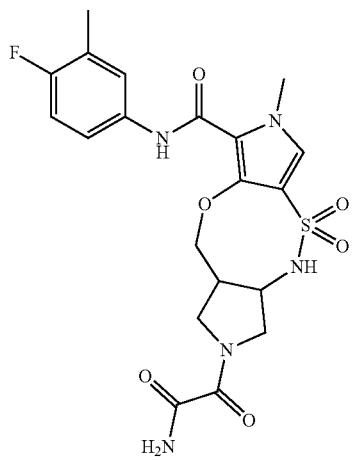 [SMILES: Cc1cc(NC(=O)c2c3c(cn2C)S(=O)(=O)NC2CN(C(=O)C(N)=O)CC2CO3)ccc1F]

Prepared similarly as described for compound E10 using NH₃ (solution 7 N in MeOH) instead of methanamine. The crude was purified by Fraction-Lynx (H₂O/CH₃CN+1‰ HCOOH) to afford E11. ¹H NMR (300 MHz, DMSO-d6) δ ppm 2.24 (s, 3H) 2.92-3.10 (m, 1H) 3.19-3.63 (m, 2H) 3.76-4.11 (m, 6H) 4.42-4.54 (m, 1H) 4.55-4.66 (m, 1H) 7.11 (t, J=9.17 Hz, 1H) 7.45-7.55 (m, 2H) 7.55-7.62 (m, 1H) 7.69 (br d, J=11.00 Hz, 1H) 7.97 (br d, J=5.14 Hz, 1H) 8.42 (br s, 1H) 9.34 (d, J=3.58 Hz, 1H). Method 3: Rt=2.81 min. m/z=480.29 (M+H)+.

Example E12: cis-7-methyl-2-(2-(methylamino)-2-oxoacetyl)-N-(3,4,5-trifluorophenyl)-2,3,3a,4,10,10a-hexahydro-1H,7H-dipyrrolo oxathiazocine-8-carboxamide 5,5-dioxide (E12)

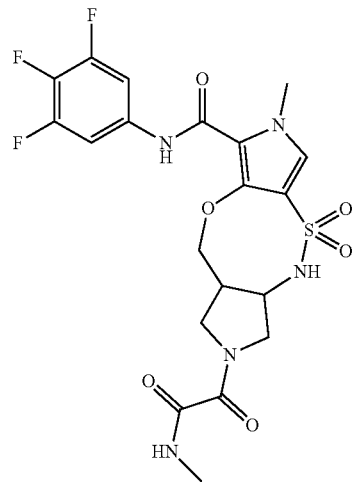 [SMILES: CNC(=O)C(=O)N1CC2COc3c(cn(C)c3C(=O)Nc3cc(F)c(F)c(F)c3)S(=O)(=O)NC2C1]

Prepared similarly as described for compound E10 starting from D45 and using methanamine 2M in THF. The crude was purified by Fraction-Lynx (H₂O/CH₃CN+1‰ HCOOH) to afford E12. ¹H NMR (300 MHz, DMSO-d6) δ ppm 2.65 (dd, J=7.11, 4.91 Hz, 3H), 2.92-3.10 (m, 1H), 3.19-3.67 (m, 2H), 3.79-4.08 (m, 6H), 4.41-4.54 (m, 1H), 4.56-4.68 (m, 1H), 7.51 (s, 1H), 7.64-7.74 (m, 2H), 8.42 (br s, 1H), 8.61 (br t, J=5.55 Hz, 1H), 9.64-9.69 (m, 1H). Method 3: Rt=3.14 min; m/z=516.09 (M+H)⁺.

Example E13: cis-2-(2-amino-2-oxoacetyl)-7-methyl-N-(3,4,5-trifluorophenyl)-2,3,3a,4,10,10a-hexahydro-1H,7H-dipyrrolo oxathiazocine-8-carboxamide 5,5-dioxide (E13)

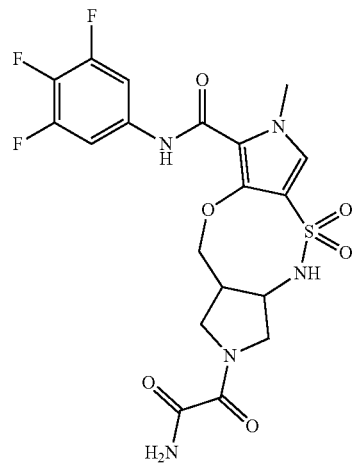 [SMILES: Cn1cc2c(c1C(=O)Nc1cc(F)c(F)c(F)c1)OCC1CN(C(=O)C(N)=O)CC1NS2(=O)=O]

Prepared similarly as described for compound E10 starting from D45 and using NH₃ (solution 7N in MeOH). The crude was purified by Fraction-Lynx (H₂O/CH₃CN+1‰ HCOOH) to afford E13. ¹H NMR (300 MHz, DMSO-d6) δ ppm 2.94-3.07 (m, 1H), 3.18-3.61 (m, 2H), 3.79-4.11 (m, 6H), 4.49 (m, 1H), 4.55-4.67 (m, 1H), 7.51 (s, 1H), 7.63-7.75 (m, 3H), 7.97 (br d, J=5.14 Hz, 1H), 8.44 (br s, 1H), 9.67 (s, 1H). Method 3: Rt=3.01 min; m/z=502.18 (M+H)+.

Example E14: (3aR,10aR)-2-(2-((3,3-difluorocyclobutyl)amino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide (E14)

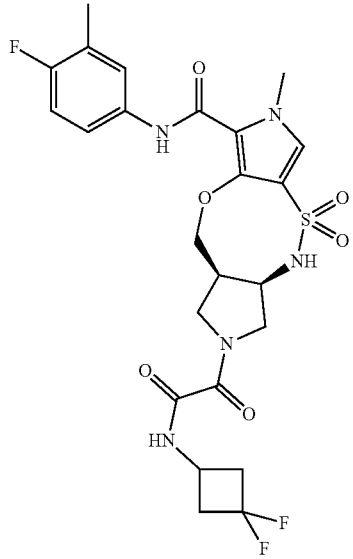 [SMILES: Cc1cc(NC(=O)c2c3c(cn2C)S(=O)(=O)N[C@H]2CN(C(=O)C(=O)NC4CC(F)(F)C4)C[C@H]2CO3)ccc1F]

Prepared similarly as described for compound E7 using 3,3-difluorocyclobutanamine hydrochloride (Fluorochem, cat no 091836) instead of tert-butylamine. The crude was purified by Fraction-Lynx (H2O/CH3CN+1‰ HCOOH) to afford E14. 1H NMR (300 MHz, DMSO-d6) δ ppm 2.22-2.28 (m, 3H), 2.63-3.12 (m, 6H), 3.15-3.70 (m, 2H), 3.73-4.21 (m, 6H), 4.40-4.70 (m, 2H), 7.11 (t, J=9.22 Hz, 1H), 7.43-7.55 (m, 2H), 7.59 (dt, J=6.74, 3.32 Hz, 1H), 8.40 (m, 1H), 9.23 (t, J=6.65 Hz, 1H), 9.35 (d, J=4.77 Hz, 1H). Method 3: Rt=3.41 min; m/z=570.25 (M+H)+.

Example E15: (3aR,10aR)—N-(4-fluoro-3-methylphenyl)-7-methyl-2-(2-oxo-2-(((S)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E15)

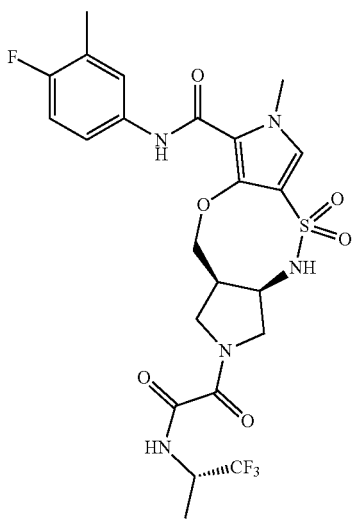 [SMILES: Cc1cc(NC(=O)c2c3c(cn2C)S(=O)(=O)N[C@H]2CN(C(=O)C(=O)N[C@@H](C)C(F)(F)F)C[C@H]2CO3)ccc1F]

Prepared similarly as described for compound E7 using (2S)-1,1,1-trifluoro-2-propanamine hydrochloride (Fluorochem, cat no 093836) instead of tert-butylamine. The crude was purified by Fraction-Lynx (H2O/CH3CN+1‰ HCOOH) to afford E15. 1H NMR (300 MHz, DMSO-d6) δ ppm 1.31 (t, J=5.59 Hz, 3H), 2.24 (s, 3H), 2.95-3.13 (m, 1H), 3.16-3.68 (m, 2H), 3.78-4.13 (m, 6H), 4.62 (m, 3H), 7.11 (t, J=9.12 Hz, 1H), 7.45-7.54 (m, 2H), 7.56-7.62 (m, 1H), 8.44 (br s, 1H), 9.21-9.32 (m, 1H), 9.32-9.38 (m, 1H). Method 3: Rt=3.51 min; m/z=576.13 (M+H)+.

Example E16: (3aR,10aR)—N-(4-fluoro-3-methylphenyl)-2-(2-(isobutylamino)-2-oxoacetyl)-7-methyl-2,3,3a,4,10,10a-hexahydro-1H,7H-dipyrrolo[3,4-b:3',4'-f][1,4,5]oxathiazocine-8-carboxamide 5,5-dioxide (E16)

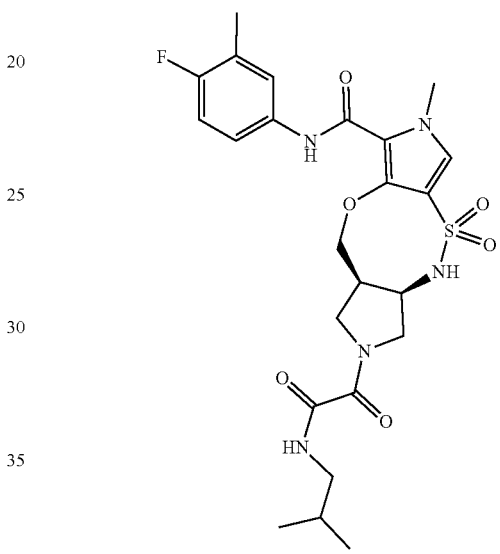

Prepared similarly as described for compound E7 using 2-methylpropan-1-amine instead of tert-butylamine. The crude was purified by Fraction-Lynx (H2O/CH3CN+1‰ HCOOH) to afford E16. 1H NMR (300 MHz, DMSO-d6) δ ppm 0.84 (t, J=6.56 Hz, 6H), 1.77 (dd, J=13.75, 6.88 Hz, 1H), 2.24 (s, 3H), 2.95 (br d, J=7.89 Hz, 3H), 3.20-3.67 (m, 2H), 3.76-3.83 (m, 3H), 3.83-4.13 (m, 3H), 4.49 (br s, 1H), 4.56-4.70 (m, 1H), 7.11 (t, J=9.22 Hz, 1H), 7.43-7.55 (m, 2H), 7.59 (dt, J=6.79, 3.39 Hz, 1H), 8.32-8.55 (m, 1H), 8.64 (dt, J=9.40, 6.17 Hz, 1H), 9.34 (d, J=7.15 Hz, 1H). Method 3: Rt=3.45 min; m/z=536.21 (M+H)+.

Example E17: (3aR,10aR)—N-(4-fluoro-3-methylphenyl)-7-methyl-2-(2-oxo-2-((2,2,2-trifluoroethyl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E17)

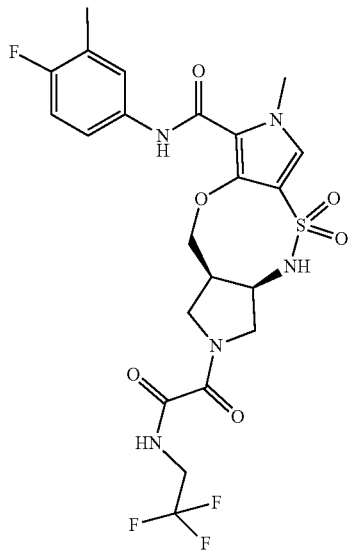 [SMILES: Cc1cc(NC(=O)c2c3c(cn2C)S(=O)(=O)N[C@H]2CN(C(=O)C(=O)NCC(F)(F)F)C[C@H]2CO3)ccc1F]

Prepared similarly as described for compound E7 using 2,2,2-trifluoroethan-1-amine hydrochloride (180386, Sigma Aldrich, CAS: 373-88-6) instead of tert-butylamine. The crude was purified by Fraction-Lynx (H$_2$O/CH$_3$CN+1‰ HCOOH) to afford E17. $^1$H NMR (300 MHz, DMSO-d6) δ ppm 2.18-2.27 (m, 3H), 2.90-3.15 (m, 1H), 3.20-3.65 (m, 2H), 3.81 (s, 3H), 3.83-4.16 (m, 5H), 4.36-4.78 (m, 2H), 7.11 (t, J=9.17 Hz, 1H), 7.43-7.55 (m, 2H), 7.55-7.64 (m, 1H), 8.43 (br s, 1H), 9.13-9.50 (m, 2H). Method 3: Rt=3.41 min. m/z=562.15 (M+H)+.

Example E18: (3aR,10aR)—N-(4-fluoro-3-methylphenyl)-7-methyl-2-(2-((1-methylcyclopropyl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide (E18)

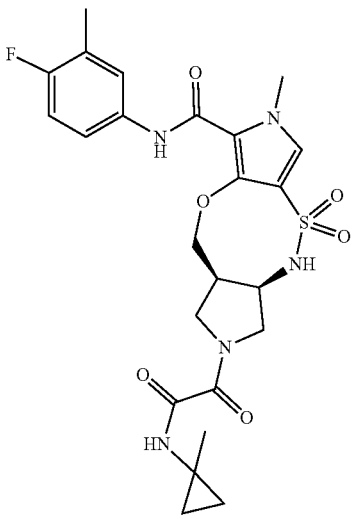 [SMILES: Cc1cc(NC(=O)c2c3c(cn2C)S(=O)(=O)N[C@H]2CN(C(=O)C(=O)NC4(C)CC4)C[C@H]2CO3)ccc1F]

Prepared similarly as described for compound E7 using 1-methylcyclopropanamine hydrochloride (092116, Sigma Aldrich, CAS: 88887-87-0) instead of tert-butylamine. The crude was purified by Fraction-Lynx (H$_2$O/CH$_3$CN+1‰ HCOOH) to afford E18. $^1$H NMR (300 MHz, DMSO-d$_6$) δ ppm 0.52-0.73 (m, 4H), 1.29 (d, J=7.06 Hz, 3H), 2.24 (s, 3H), 2.89-3.09 (m, 1H), 3.16-3.60 (m, 2H), 3.74-4.09 (m, 6H), 4.42-4.55 (m, 1H), 4.57-4.66 (m, 1H), 7.11 (t, J=9.22 Hz, 1H), 7.45-7.53 (m, 2H), 7.54-7.62 (m, 1H), 8.40 (br s, 1H), 8.80 (d, J=14.86 Hz, 1H), 9.34 (d, J=4.68 Hz, 1H). Method 3; Rt=3.25 min; m/z=534.26 (M+H)$^+$.

Example E19: (3aR,10aR)—N-(4-fluoro-3-methylphenyl)-7-methyl-2-(2-oxo-2-((1-(trifluoromethyl)cyclopropyl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E19)

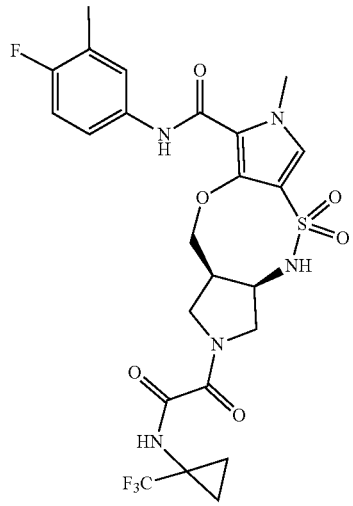 [SMILES: Cc1cc(NC(=O)c2c3c(cn2C)S(=O)(=O)N[C@H]2CN(C(=O)C(=O)NC4(C(F)(F)F)CC4)C[C@H]2CO3)ccc1F]

Prepared similarly as described for compound E7 using 1-trifluoromethyl-cyclopropylamine hydrochloride (093841, Sigma Aldrich, CAS: 112738-67-7) instead of tert-butylamine. The crude was purified by Fraction-Lynx (H$_2$O/CH$_3$CN+1‰ HCOOH) to afford E19. $^1$H NMR (300 MHz, DMSO-d6) δ ppm 0.94-1.19 (m, 2H), 1.19-1.34 (m, 2H), 2.24 (s, 3H), 2.86-3.10 (m, 1H), 3.11-3.65 (m, 2H), 3.81 (s, 3H), 3.83-4.13 (m, 3H), 4.40-4.55 (m, 1H), 4.56-4.74 (m, 1H), 7.11 (t, J=9.26 Hz, 1H), 7.42-7.55 (m, 2H), 7.55-7.65 (m, 1H), 8.31-8.49 (m, 1H), 9.34 (d, J=7.34 Hz, 1H), 9.47 (d, J=13.57 Hz, 1H). Method 3: Rt=3.51 min; m/z=588.19 (M+H)$^+$.

Example E20: (3aR,10aR)-2-(2-((cyclopropylmethyl)amino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide (E20)

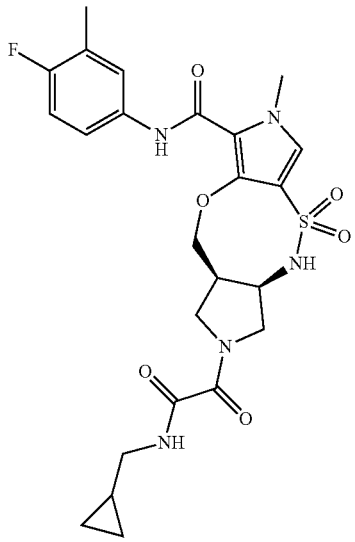 [SMILES: Cc1cc(NC(=O)c2c3c(cn2C)S(=O)(=O)N[C@H]2CN(C(=O)C(=O)NCC4CC4)C[C@H]2CO3)ccc1F]

Prepared similarly as described for compound E7 using cyclopropanemethylamine (Sigma Aldrich, cat no 08460) instead of tert-butylamine. The crude was purified by Fraction-Lynx (H₂O/CH₃CN+1‰ HCOOH) to afford E20. $^1$H NMR (300 MHz, DMSO-d6) δ ppm 0.18 (br t, J=4.81 Hz, 2H), 0.39 (br t, J=6.05 Hz, 2H), 0.89-1.05 (m, 1H), 2.23 (s, 3H), 2.99 (q, J=6.85 Hz, 3H), 3.12-3.66 (m, 2H), 3.76-4.16 (m, 6H), 4.48 (br d, J=5.32 Hz, 1H), 4.61 (dt, J=11.55, 5.59 Hz, 1H), 7.10 (t, J=9.17 Hz, 1H), 7.43-7.54 (m, 2H), 7.55-7.62 (m, 1H), 8.41 (br d, J=6.05 Hz, 1H), 8.67-8.77 (m, 1H), 9.34 (d, J=5.69 Hz, 1H). Method 3: Rt=3.34 min; m/z=534.26 (M+H)⁺.

Example E21: (3aR,10aR)—N-(4-fluoro-3-methylphenyl)-2-(2-(isopropylamino)-2-oxoacetyl)-7-methyl-2,3,3a,4,10,10a-hexahydro-1H,7H-dipyrrolo[3,4-b:3',4'-f][1,4,5]oxathiazocine-8-carboxamide 5,5-dioxide (E21)

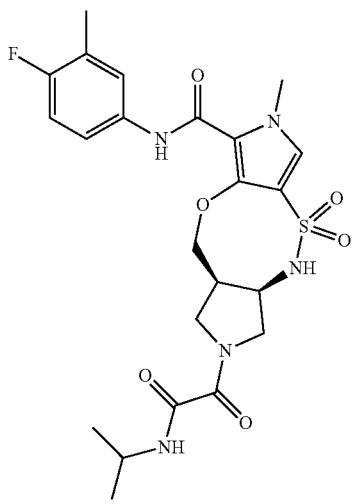 [SMILES: Cc1cc(NC(=O)c2c3c(cn2C)S(=O)(=O)N[C@H]2CN(C(=O)C(=O)NC(C)C)C[C@H]2CO3)ccc1F]

Prepared similarly as described for compound E7 using isopropylamine (Sigma Aldrich, cat no 471291) instead of tert-butylamine. The crude was purified by Fraction-Lynx (H₂O/CH₃CN+1‰ HCOOH) to afford E21. $^1$H NMR (300 MHz, DMSO-d₆) δ ppm 1.10 (t, J=6.65 Hz, 6H), 2.24 (s, 3H), 2.91-3.10 (m, 1H), 3.18-3.63 (m, 2H), 3.78-4.09 (m, 7H), 4.49 (m, 1H), 4.54-4.66 (m, 1H), 7.11 (t, J=9.22 Hz, 1H), 7.46-7.54 (m, 2H), 7.54-7.62 (m, 1H), 8.38-8.51 (m, 2H), 9.34 (d, J=5.69 Hz, 1H). Method 3: Rt=3.25 min; m/z=522.23 (M+H)⁺.

Example E22: (3aR,10aR)-2-(2-(cyclobutylamino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide (E22)

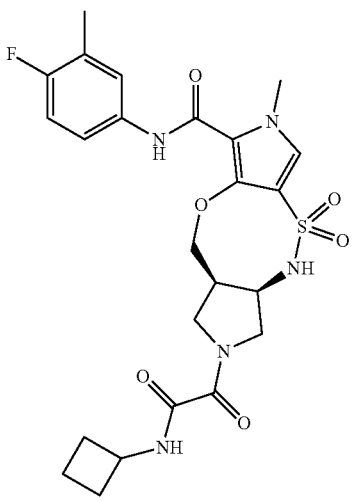 [SMILES: Cc1cc(NC(=O)c2c3c(cn2C)S(=O)(=O)N[C@H]2CN(C(=O)C(=O)NC4CCC4)C[C@H]2CO3)ccc1F]

Prepared similarly as described for compound E7 using cyclobutylamine hydrochloride (Sigma Aldrich, cat no 59271) instead of tert-butylamine. The crude was purified by Fraction-Lynx (H₂O/CH₃CN+1‰ HCOOH) to afford E22. $^1$H NMR (300 MHz, DMSO-d₆) δ ppm 1.55-1.70 (m, 2H), 1.99-2.19 (m, 4H), 2.20-2.28 (m, 3H), 2.89-3.11 (m, 1H), 3.19-3.75 (m, 2H), 3.77-4.08 (m, 6H), 4.23 (dt, J=16.99, 8.42 Hz, 1H), 4.42-4.53 (m, 1H), 4.53-4.66 (m, 1H), 7.11 (t, J=9.22 Hz, 1H), 7.45-7.54 (m, 1H), 7.55-7.63 (m, 1H), 8.41 (br s, 1H), 8.89 (t, J=8.30 Hz, 1H), 9.34 (d, J=5.50 Hz, 1H). Method 3: Rt=3.37 min; m/z=534.26 (M+H)⁺.

Example E23: (3aR,10aR)-2-(2-(cyclopropylamino)-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide (E23)

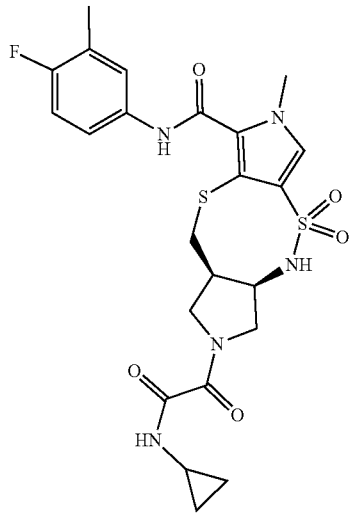 [SMILES: Cc1cc(NC(=O)c2c3c(cn2C)S(=O)(=O)N[C@H]2CN(C(=O)C(=O)NC4CC4)C[C@H]2CS3)ccc1F]

Prepared similarly as described for compound E2 starting from D28 and D43. The crude was purified by FractionLynx (H₂O/CH₃CN+1‰ HCOOH) to afford E23 as white solid. ¹H NMR (300 MHz, DMSO-d₆+TFA) δ ppm 0.46-0.59 (m, 2H), 0.59-0.70 (m, 2H), 2.23 (s, 3H), 2.30-2.43 (m, 1H), 2.57-2.81 (m, 2H), 2.95-3.61 (m, 3H), 3.72 (s, 3H), 3.75-4.09 (m, 2H), 4.68-4.88 (m, 1H), 7.11 (t, J=9.22 Hz, 1H), 7.44-7.60 (m, 2H), 7.66 (br d, J=6.42 Hz, 1H), 8.08-8.24 (m, 1H), 8.67 (dd, J=15.50, 4.95 Hz, 1H), 10.33 (d, J=2.38 Hz, 1H). Method 3; Rt=3.17 min; m/z=536.18 (M+H)⁺.

Example E24: (3aR,10aR)—N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-c:3',4'-g][1,6,2]dithiazocine-8-carboxamide 5,5-dioxide (E24)

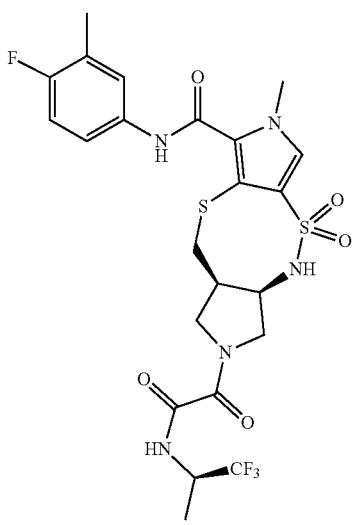 [SMILES: Cc1cc(NC(=O)c2c3c(cn2C)S(=O)(=O)N[C@H]2CN(C(=O)C(=O)N[C@H](C)C(F)(F)F)C[C@H]2CS3)ccc1F]

Prepared similarly as described for compound E2 starting from D28 and D41. The crude was purified by FractionLynx (H₂O/CH₃CN+1‰ HCOOH) to afford E24 as white solid. ¹H NMR (300 MHz, DMSO-d₆+TFA) δ ppm 1.30 (t, J=6.74 Hz, 3H), 2.23 (s, 3H), 2.29-2.44 (m, 1H), 2.60-2.79 (m, 1H), 3.02-3.44 (m, 2H), 3.46-3.65 (m, 1H), 3.72 (s, 3H), 3.75-4.09 (m, 2H), 4.47-4.71 (m, 1H), 4.71-4.87 (m, 1H), 7.11 (t, J=9.12 Hz, 1H), 7.46-7.61 (m, 2H), 7.66 (br d, J=6.79 Hz, 1H), 8.11-8.30 (m, 1H), 9.24 (t, J=9.81 Hz, 1H), 10.33 (d, J=4.49 Hz, 1H). Method 3; Rt=3.59 min; m/z=592.13 (M+H)⁺.

Example E25: cis-2-(2-(cyclopropylamino)-2-oxoacetyl)-N-(4-fluoro-3-methylphenyl)-7,10a-dimethyl-2,3,3a,4,10,10a-hexahydro-1H,7H-dipyrrolo[3,4-b:3',4'-f][1,4,5]oxathiazocine-8-carboxamide 5,5-dioxide (E25)

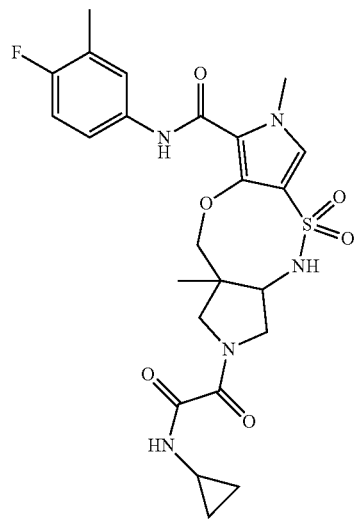 [SMILES: Cc1cc(NC(=O)c2c3c(cn2C)S(=O)(=O)NC2CN(C(=O)C(=O)NC4CC4)CC2(C)CO3)ccc1F]

Prepared similarly as described for compound E2 starting from D34 and D43. The crude was purified by FractionLynx (H₂O/CH₃CN+1‰ HCOOH) to afford E25. ¹H NMR (300 MHz, DMSO-d6+TFA) δ ppm 0.48-0.74 (m, 4H), 1.27 (d, J=4.95 Hz, 3H), 2.24 (s, 3H), 2.65-2.84 (m, 1H), 3.27 (br d, J=7.52 Hz, 1H), 3.49-4.30 (m, 8H), 4.36 (d, J=11.37 Hz, 1H), 7.11 (t, J=9.22 Hz, 1H), 7.36-7.50 (m, 2H), 7.52-7.65 (m, 1H), 8.46 (dd, J=9.49, 3.71 Hz, 1H), 8.71 (t, J=4.40 Hz, 1H), 9.33 (d, J=4.86 Hz, 1H). Method 3; Rt=3.30 min; m/z=534.23 (M+H)⁺.

Example E26: Cis-N-(4-fluoro-3-methylphenyl)-7,
10a-dimethyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E26)

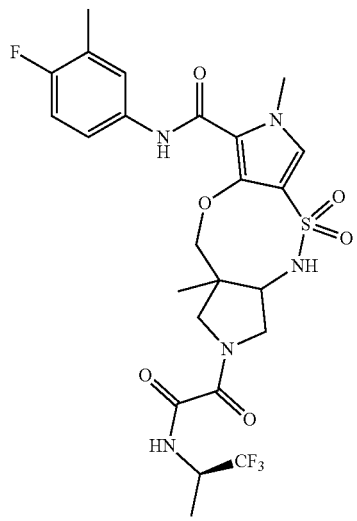 [SMILES: Cc1cc(NC(=O)c2c3c(cn2C)S(=O)(=O)NC2CN(C(=O)C(=O)N[C@H](C)C(F)(F)F)CC2(C)CO3)ccc1F]

Prepared similarly as described for compound E2 starting from D34 and D41. The crude was purified by Fraction-Lynx (H₂O/CH₃CN+1‰ HCOOH) to afford E26. ¹H NMR (300 MHz, DMSO-d6+TFA) δ ppm 1.19-1.40 (m, 6H), 2.24 (s, 3H), 3.18-3.41 (m, 1H), 3.42-3.88 (m, 5H), 3.91-4.31 (m, 3H), 4.37 (br d, J=11.55 Hz, 1H), 4.48-4.80 (m, 1H), 7.12 (t, J=9.22 Hz, 1H), 7.36-7.51 (m, 2H), 7.51-7.68 (m, 1H), 8.35-8.64 (m, 1H), 9.08-9.50 (m, 2H). Method 3: Rt=3.68 min. m/z=590.19. (M+H)⁺.

Example E27: Cis-N-(4-fluoro-3-methylphenyl)-3a,
7-dimethyl-2-(2-oxo-2-(((R)-1,1,1-trifluoropropan-2-yl)amino)acetyl)-2,3,3a,4,10,10a-hexahydro-1H,7H-dipyrrolo[3,4-b:3 ',4'-f][1,4,5]oxathiazocine-8-carboxamide 5,5-dioxide (E27)

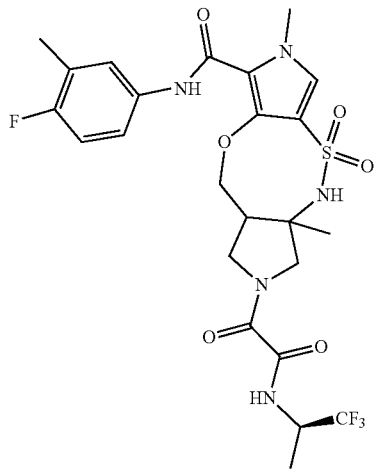 [SMILES: Cc1cc(NC(=O)c2c3c(cn2C)S(=O)(=O)NC2(C)CN(C(=O)C(=O)N[C@H](C)C(F)(F)F)CC2CO3)ccc1F]

Prepared similarly as described for compound E2 starting from D35 and D41. The crude was purified by Fraction-Lynx (H₂O/CH₃CN+1‰ HCOOH) to afford E27. ¹H NMR (300 MHz, DMSO-d6+TFA) δ ppm 1.09-1.34 (m, 4H), 1.35-1.58 (m, 3H), 2.24 (s, 3H), 3.17-3.74 (m, 3H), 3.75-4.00 (m, 4H), 4.16-4.75 (m, 3H), 7.10 (t, J=9.08 Hz, 1H), 7.41-7.67 (m, 3H), 8.03-8.21 (m, 1H), 9.17-9.28 (m, 1H), 9.28-9.41 (m, 1H). Method 3: Rt=3.58 min; m/z=590.19 (M+H)⁺.

Example E28: cis-2-(2-(cyclopropylamino)-2-oxoacetyl)-N-(4-fluoro-3-methylphenyl)-3a,7-dimethyl-2,3,3a,4,10,10a-hexahydro-1H,7H-dipyrrolo[3,4-b:3',4'-f][1,4,5]oxathiazocine-8-carboxamide 5,5-dioxide (E28)

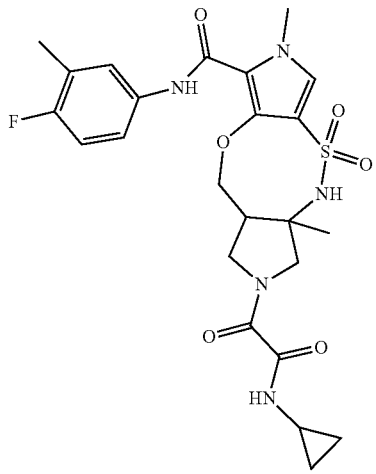 [SMILES: Cc1cc(NC(=O)c2c3c(cn2C)S(=O)(=O)NC2(C)CN(C(=O)C(=O)NC4CC4)CC2CO3)ccc1F]

Prepared similarly as described for compound E2 starting from D35 and D43. The crude was purified by Fraction-Lynx (H₂O/CH₃CN+1‰ HCOOH) to afford E28. ¹H NMR (300 MHz, DMSO-d6) δ ppm 0.43-0.71 (m, 4H), 1.08-1.30 (m, 1H), 1.33-1.49 (m, 3H), 2.17-2.26 (m, 3H), 2.63-2.71 (m, 1H), 3.17-3.51 (m, 1H), 3.54-3.78 (m, 2H), 3.78-3.87 (m, 3H), 3.87-4.00 (m, 1H), 4.13-4.65 (m, 2H), 7.09 (t, J=9.22 Hz, 1H), 7.44-7.54 (m, 2H), 7.54-7.65 (m, 1H), 8.10 (d, J=2.48 Hz, 1H), 8.65 (t, J=4.36 Hz, 1H), 9.31 (d, J=4.86 Hz, 1H). Method 3; Rt=3.18 min; m/z=534.23.

Example E29: (3aR,10aR)-2-(2-(3,3-difluoroazetidin-1-yl)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide (E29)

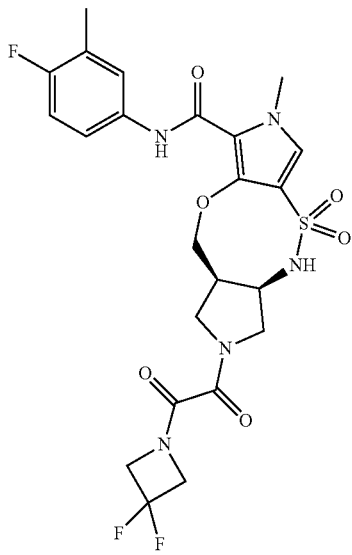 [SMILES: Cc1cc(NC(=O)c2c3c(cn2C)S(=O)(=O)N[C@H]2CN(C(=O)C(=O)N4CC(F)(F)C4)C[C@H]2CO3)ccc1F]

Prepared similarly as described for compound E7 using 3,3-difluoroazetidine hydrochloride (Fluorochem, cat no 013896) instead of tert-butylamine to give E29. $^1$H NMR (300 MHz, DMSO-d6+TFA) δ ppm 2.23 (s, 3H), 2.91-3.10 (m, 1H), 3.13-3.64 (m, 2H), 3.74-4.08 (m, 6H), 4.36-4.54 (m, 3H), 4.56-4.80 (m, 3H), 7.08 (t, J=9.12 Hz, 1H), 7.44-7.53 (m, 2H), 7.57 (br d, J=6.60 Hz, 1H), 8.37 (br d, J=9.54 Hz, 1H), 9.32 (s, 1H). Method 3; Rt=3.31 min; m/z=556.20 (M+H)$^+$.

Example E30: trans-N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E30)

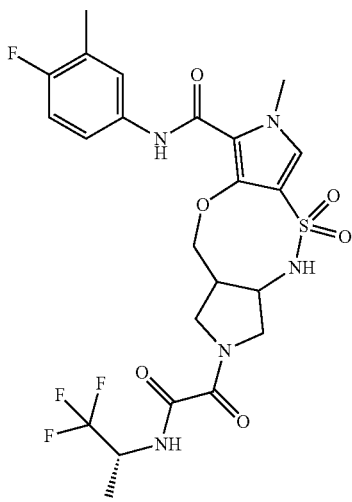 [SMILES: Cc1cc(NC(=O)c2c3c(cn2C)S(=O)(=O)NC2CN(C(=O)C(=O)N[C@H](C)C(F)(F)F)CC2CO3)ccc1F]

A mixture of D46 (21.5 mg, 0.050 mmol) and D41 (15.01 mg, 0.07 mmol) in DMF (1 mL) was treated with a single portion of N-ethyl-N-isopropylpropan-2-amine (25.25 uL, 0.14 mmol), giving a brown solution. PyBop (37.72 mg, 0.07 mmol) was added in a single portion and the reaction mixture was stirred at room temperature for 1.5 hrs. The reaction was diluted with water (5 mL) and extracted with EtOAc (3 mL×3). The combined organic extracts were washed with brine and 5% citric acid (acq. solution), dried over Na$_2$SO$_4$, filtered and evaporated. The residue was purified purified by Fraction-Lynx (H$_2$O/CH$_3$CN+1‰ TFA). $^1$H NMR (300 MHz, DMSO-d6+TFA) δ ppm 1.09-1.42 (m, 4H) 2.23 (s, 3H) 2.57-2.71 (m, 1H) 2.98-3.30 (m, 1H) 3.33-3.70 (m, 1H) 3.74-3.92 (m, 3H) 3.94-4.39 (m, 4H) 4.41-4.77 (m, 1H) 7.01-7.16 (m, 1H) 7.43-7.55 (m, 2H) 7.55-7.65 (m, 1H) 7.66-7.82 (m, 1H) 9.25 (br dd, J=9.03, 2.80 Hz, 1H) 9.51 (br d, J=9.63 Hz, 1H). Method 3; Rt: 3.46 min. m/z: 576.33 (M+H)+.

Example E31: trans-2-(2-(cyclopropylamino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide (E31)

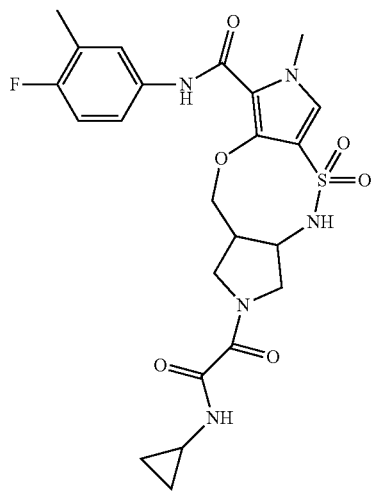 [SMILES: Cc1cc(NC(=O)c2c3c(cn2C)S(=O)(=O)NC2CN(C(=O)C(=O)NC4CC4)CC2CO3)ccc1F]

A mixture of D46 (21.5 mg, 0.050 mmol) and D43 (10.95 mg, 0.070 mmol) in DMF (1 mL, 0.013 mol) was treated with a single portion of N-ethyl-N-isopropylpropan-2-amine (25.25 uL, 0.140 mmol), giving a brown solution. PyBop (37.72 mg, 0.070 mmol) was added in a single portion and the reaction mixture was stirred at room temperature for 1.5 hrs. The reaction was diluted with water (5 mL) and extracted with EtOAc (3 mL×3). The combined organic extracts were washed with brine and 5% citric acid (acq. solution), dried over Na$_2$SO$_4$ (anh.), filtered and evaporated. The residue was purified by Fraction-Lynx (H$_2$O/CH$_3$CN+1‰ TFA). $^1$H NMR (300 MHz, DMSO-d6) δ ppm 0.37-0.77 (m, 4H) 2.24 (d, J=0.92 Hz, 3H) 2.63-2.77 (m, 1H) 2.97-3.67 (m, 3H) 3.83 (s, 3H) 3.88-4.40 (m, 5H) 7.11 (t, J=9.22 Hz, 1H) 7.44-7.55 (m, 2H) 7.56-7.78 (m, 2H) 8.68 (dd, J=7.06, 5.14 Hz, 1H) 9.51 (d, J=8.53 Hz, 1H). Method 3; Rt: 3.06 min. m/z: 520.21 (M+H)+.

Example E32: (3aR,10aR)—N-(4-fluoro-3-methylphenyl)-7-methyl-2-(2-oxo-2-((1,1,1-trifluoro-2-methylpropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E32)

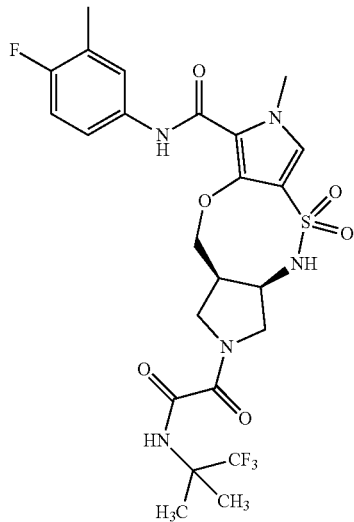 [SMILES: Cc1cc(NC(=O)c2c3c(cn2C)S(=O)(=O)N[C@H]2CN(C(=O)C(=O)NC(C)(C)C(F)(F)F)C[C@H]2CO3)ccc1F]

Prepared similarly as described for compound E7 using 2,2,2-trifluoro-1,1-dimethyl-ethylamine hydrochloride (Fluorochem, cat no 033026) instead of tert-butylamine. The crude was purified by Fraction-Lynx (H$_2$O/CH$_3$CN+1‰ HCOOH) to afford E32 as white powder. $^1$H NMR (300 MHz, DMSO-d6+TFA) δ ppm 1.53 (br d, J=6.14 Hz, 6H) 2.22 (s, 3H) 2.89-3.65 (m, 3H) 3.69-4.12 (m, 6H) 4.41-4.73 (m, 2H) 7.08 (br t, J=9.40 Hz, 1H) 7.38-7.68 (m, 3H) 8.35-8.54 (m, 2H) 9.32 (br d, J=8.25 Hz, 1H). Method 3; Rt=3.67 min. m/z=590.31 (M+H)$^+$.

Example E33: (3aR,10aR)—N-(4-fluoro-3-methylphenyl)-7-methyl-2-(2-oxo-2-((1-(trifluoromethyl)cyclobutyl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E33)

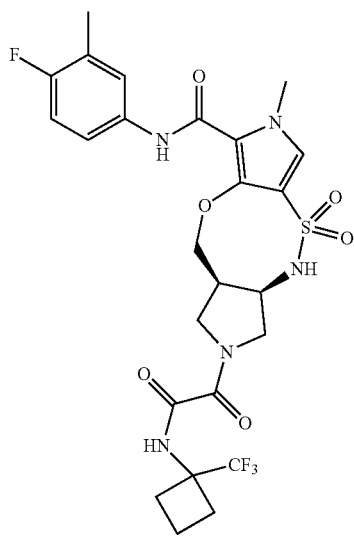 [SMILES: Cc1cc(NC(=O)c2c3c(cn2C)S(=O)(=O)N[C@H]2CN(C(=O)C(=O)NC4(C(F)(F)F)CCC4)C[C@H]2CO3)ccc1F]

Prepared similarly as described for compound E7 using 1-trifluoromethyl-cyclobutylamine (Fluorochem, cat no 075973) instead of tert-butylamine. The crude was purified by Fraction-Lynx (H$_2$O/CH$_3$CN+1‰ HCOOH) to afford E33 as white powder. $^1$H NMR (300 MHz, DMSO-d6+TFA) δ ppm 1.77-1.99 (m, 2H) 2.20 (s, 3H) 2.34-2.51 (m, 4H) 2.89-3.12 (m, 1H) 3.13-3.67 (m, 2H) 3.73-4.10 (m, 6H) 4.41-4.69 (m, 2H) 6.97-7.08 (m, 1H) 7.40 (s, 1H) 7.42-7.58 (m, 2H) 8.41 (br t, J=10.18 Hz, 1H) 9.22 (br d, J=12.29 Hz, 1H) 9.35 (br d, J=8.16 Hz, 1H). Method 3; Rt=3.67 min. m/z=602.20 (M+H)+.

Example E34: (3aR,10aR)-2-(2-amino-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide (E34)

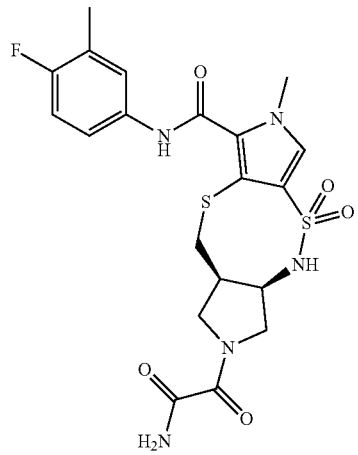 [SMILES: Cc1cc(NC(=O)c2c3c(cn2C)S(=O)(=O)N[C@H]2CN(C(=O)C(N)=O)C[C@H]2CS3)ccc1F]

A mixture of crude D47 (21.1 mg, 0.04 mmol) and 7N NH$_3$ in MeOH (1 mL, 7.0 mmol) was stirred at 50° C. for 1 h. Solvent was removed under reduced pressure and the resulting crude was purified by preparative HPLC (H$_2$O/CH$_3$CN+0.1% HCOOH), to obtain after lyophilization E34 (15 mg) as white solid. $^1$H NMR (300 MHz, DMSO-d$_6$+TFA) δ ppm 2.23 (s, 3H) 2.30-2.44 (m, 1H) 2.56-2.71 (m, 1H) 2.98-3.41 (m, 2H) 3.42-3.60 (m, 1H) 3.72 (s, 3H) 3.74-4.09 (m, 2H) 4.68-4.88 (m, 1H) 7.10 (t, J=9.08 Hz, 1H) 7.45-7.60 (m, 2H) 7.60-7.76 (m, 2H) 7.95 (d, J=11.92 Hz, 1H) 8.19 (q, J=4.77 Hz, 1H) 10.21-10.45 (m, 1H). Method 3; Rt=2.88 min. m/z=496.30 (M+H)$^+$.

Example E35: (3aR,10aR)—N-(4-fluoro-3-methylphenyl)-7-methyl-2-(2-(methylamino)-2-oxoacetyl)-2,3,3a,4,10,10a-hexahydro-1H,7H-dipyrrolo[3,4-c:3',4'-g][1,6,2]dithiazocine-8-carboxamide 5,5-dioxide (E35)

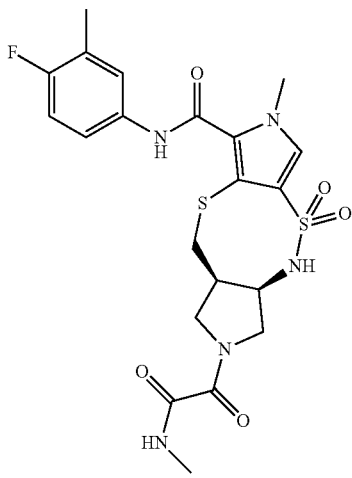 [SMILES: CNC(=O)C(=O)N1C[C@H]2CSc3c(cn(C)c3C(=O)Nc3ccc(F)c(C)c3)S(=O)(=O)N[C@H]2C1]

Prepared similarly as described for E34 starting from D47 and using 2M NH$_2$CH$_3$ in THF instead of 7N NH$_3$ in MeOH. The crude was purified by preparative HPLC (H$_2$O/CH$_3$CN+0.1% HCOOH) to afford E35 (13 mg) as white solid. $^1$H NMR (300 MHz, DMSO-d$_6$+TFA) δ ppm 2.23 (s, 3H) 2.29-2.43 (m, 1H) 2.55-2.70 (m, 4H) 2.98-3.61 (m, 3H) 3.71 (s, 3H) 3.73-4.09 (m, 2H) 4.65-4.88 (m, 1H) 7.10 (t, J=9.35 Hz, 1H) 7.43-7.61 (m, 2H) 7.62-7.73 (m, 1H) 8.18 (d, J=10.09 Hz, 1H) 8.46-8.72 (m, 1H) 10.21-10.45 (m, 1H). Method 3; Rt=3.00 min. m/z=510.14 (M+H)$^+$.

Example E36: (3aR,10aR)-2-(2-(3,3-difluoroazetidin-1-yl)-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide (E36)

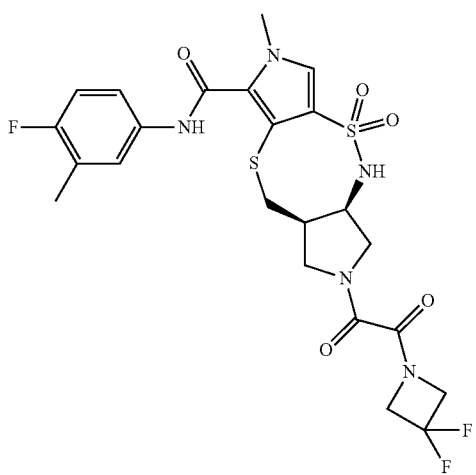 [SMILES: Cc1cc(NC(=O)c2c3c(cn2C)S(=O)(=O)N[C@H]2CN(C(=O)C(=O)N4CC(F)(F)C4)C[C@H]2CS3)ccc1F]

To a suspension of D28 (35 mg, 0.06 mmol) and D49 (14.8 mg, 0.08 mmol) in ethanol (1 mL), DBU (0.02 mL, 0.13 mmol) was added and the resulting solution was stirred at RT for 1 h. 1N HCl solution was added to the reaction mixture until a white solid precipitated. EtOAc was then added, and the phases were separated. Aqueous layer was extracted again with EtOAc, and the combined organic layer was dried over Na$_2$SO$_4$, filtered and concentrated under vacuo. The resulting crude was purified by preparative HPLC (H$_2$O/CH$_3$CN+0.1% HCOOH) to obtain, after lyophilization, E36 as white solid. $^1$H NMR (300 MHz, DMSO-d$_6$+TFA) δ ppm 2.23 (s, 3H) 2.28-2.46 (m, 1H) 2.58-2.71 (m, 1H) 2.99-3.39 (m, 2H) 3.41-3.57 (m, 1H) 3.72 (s, 3H) 3.74-4.07 (m, 2H) 4.43 (q, J=12.29 Hz, 2H) 4.56-4.87 (m, 3H) 7.11 (t, J=9.08 Hz, 1H) 7.44-7.61 (m, 2H) 7.66 (br d, J=6.33 Hz, 1H) 8.05-8.30 (m, 1H) 10.33 (s, 1H). Method 3; Rt=3.35 min. m/z=572.21 (M+H)$^+$.

Example E37: (3aR,10aR)—N-(4-fluoro-3-methylphenyl)-7-methyl-2-(2-oxo-2-(((S)-1,1,1-trifluoropropan-2-yl)amino)acetyl)-2,3,3a,4,10,10a-hexahydro-1H,7H-dipyrrolo[3,4-c:3',4'-g][1,6,2]dithiazocine-8-carboxamide 5,5-dioxide (E37)

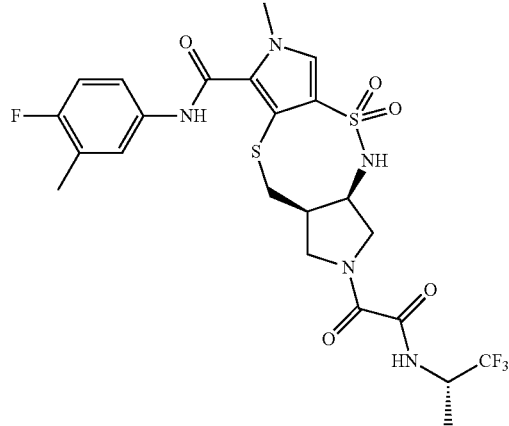 [SMILES: Cc1cc(NC(=O)c2c3c(cn2C)S(=O)(=O)N[C@H]2CN(C(=O)C(=O)N[C@@H](C)C(F)(F)F)C[C@H]2CS3)ccc1F]

Prepared similarly as described for compound E36, using D50 instead of ethyl 2-(3,3-difluoroazetidin-1-yl)-2-oxoacetate. The crude was purified by preparative HPLC (H$_2$O/CH$_3$CN+0.1% HCOOH) to afford E36 (35 mg) as white solid. $^1$H NMR (300 MHz, DMSO-d$_6$+TFA) δ ppm 1.21-1.39 (m, 3H) 2.23 (s, 3H) 2.27-2.45 (m, 1H) 2.59-2.82 (m, 1H) 3.04-3.42 (m, 2H) 3.43-3.61 (m, 1H) 3.72 (s, 3H) 3.75-4.08 (m, 2H) 4.46-4.72 (m, 1H) 4.73-4.91 (m, 1H) 7.11 (t, J=9.00 Hz, 1H) 7.45-7.61 (m, 2H) 7.66 (br d, J=6.69 Hz, 1H) 8.22 (d, J=9.10 Hz, 1H) 9.25 (dd, J=25.40, 8.89 Hz, 1H) 10.33 (br s, 1H). Method 3; Rt=3.57 min. m/z=592.27 (M+H)$^+$.

Example E38: (3aR,10aR)—N-(4-fluoro-3-methylphenyl)-7-methyl-2-(2-oxo-2-((2,2,2-trifluoroethyl)amino)acetyl)-2,3,3a,4,10,10a-hexahydro-1H,7H-dipyrrolo[3',4'-g][1,6,2]dithiazocine-8-carboxamide 5,5-dioxide (E38)

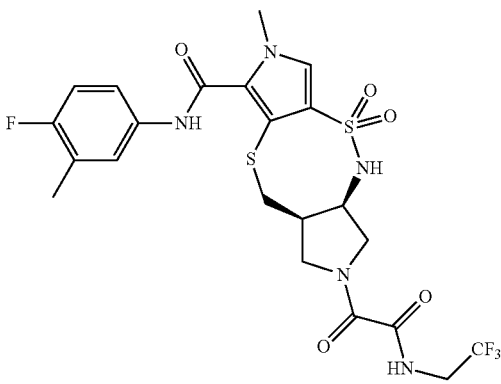 [SMILES: Cc1cc(NC(=O)c2c3c(cn2C)S(=O)(=O)N[C@H]2CN(C(=O)C(=O)NCC(F)(F)F)C[C@H]2CS3)ccc1F]

To a solution of D48 (30 mg, 0.060 mmol) in dry DMF (0.8 mL), 2,2,2-trifluoroethylamine hydrochloride (12.3 mg, 0.09 mmol) was added followed by dry DIPEA (0.05 mL, 0.30 mmol) under $N_2$ atmosphere. To the stirring solution benzotriazol-1-yloxytris(dimethylamino)phosphonium hexafluorophosphate (40 mg, 0.09 mmol) was added, and the reaction mixture was stirred at RT for 2 h. Water and EtOAc were added, then the organic layer was washed with 5% aq citric acid (×2) and water. The organic phase was dried over $Na_2SO_4$, filtered and concentrated under vacuo. The resulting crude was E38 (19 mg) as white solid. $^1$H NMR (300 MHz, DMSO-$d_6$+TFA) δ ppm 2.23 (s, 3H) 2.30-2.44 (m, 1H) 2.60-2.73 (m, 1H) 3.02-3.41 (m, 2H) 3.42-3.65 (m, 1H) 3.72 (s, 3H) 3.75-4.15 (m, 4H) 4.68-4.90 (m, 1H) 7.10 (t, J=9.17 Hz, 1H) 7.43-7.61 (m, 2H) 7.62-7.74 (m, 1H) 8.20 (dd, J=9.63, 6.42 Hz, 1H) 9.11-9.45 (m, 1H) 10.32 (d, J=4.58 Hz, 1H). Method 3; Rt=3.47 min. m/z=578.22 (M+H)$^+$.

Example E39: (3aR,10aR)-2-(2-((cyclopropylmethyl)amino)-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide (E39)

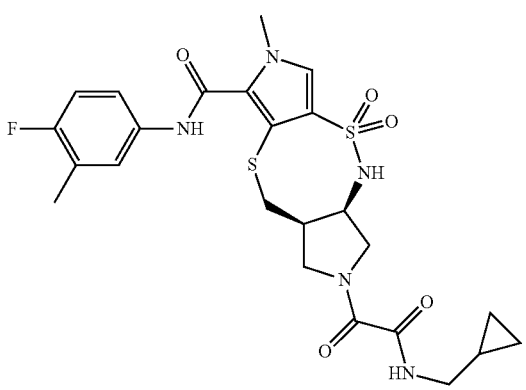 [SMILES: Cc1cc(NC(=O)c2c3c(cn2C)S(=O)(=O)N[C@H]2CN(C(=O)C(=O)NCC4CC4)C[C@H]2CS3)ccc1F]

Prepared similarly as described for compound E38, using cyclopropanemethylamine instead of 2,2,2-trifluoroethylamine hydrochloride. The crude was purified by preparative HPLC ($H_2O/CH_3CN$+0.1% HCOOH) to afford E39 (26 mg) as white solid. $^1$H NMR (300 MHz, DMSO-$d_6$+TFA) δ ppm 0.05-0.26 (m, 2H) 0.29-0.46 (m, 2H) 0.82-1.06 (m, 1H) 2.22 (s, 3H) 2.29-2.42 (m, 1H) 2.57-2.70 (m, 1H) 2.85-3.02 (m, 2H) 3.04-3.39 (m, 2H) 3.41-3.61 (m, 1H) 3.71 (s, 3H) 3.74-4.08 (m, 2H) 4.67-4.92 (m, 1H) 7.09 (t, J=9.17 Hz, 1H) 7.40-7.60 (m, 2H) 7.60-7.76 (m, 1H) 8.18 (dd, J=9.90, 5.96 Hz, 1H) 8.54-8.80 (m, 1H) 10.32 (d, J=3.39 Hz, 1H). Method 3; Rt=3.39 min. m/z=550.19 (M+H)$^+$.

Example E40: (3aR,10aR)—N-(4-fluoro-3-methylphenyl)-7-methyl-2-(2-((1-methylcyclopropyl)amino)-2-oxoacetyl)-2,3,3a,4,10,10a-hexahydro-1H,7H-dipyrrolo[3,4-c:3',4'-g][1,6,2]dithiazocine-8-carboxamide 5,5-dioxide (E40)

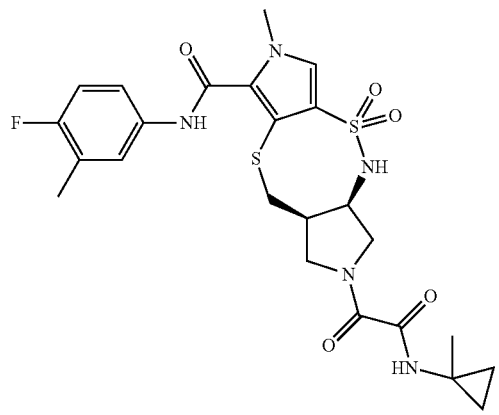 [SMILES: Cc1cc(NC(=O)c2c3c(cn2C)S(=O)(=O)N[C@H]2CN(C(=O)C(=O)NC4(C)CC4)C[C@H]2CS3)ccc1F]

Prepared similarly as described for compound E38, using 1-methylcyclopropanamine hydrochloride instead of 2,2,2-trifluoroethylamine hydrochloride. The crude was purified by preparative HPLC ($H_2O/CH_3CN$+0.1% HCOOH) to afford E40 (28 mg) as white solid. $^1$H NMR (300 MHz, DMSO-$d_6$+TFA) δ ppm 0.42-0.59 (m, 2H) 0.61-0.76 (m, 2H) 1.28 (d, J=7.61 Hz, 3H) 2.23 (s, 3H) 2.30-2.44 (m, 1H) 2.56-2.71 (m, 1H) 3.20 (s, 2H) 3.39-3.59 (m, 1H) 3.62-4.05 (m, 5H) 4.58-4.89 (m, 1H) 7.10 (t, J=9.35 Hz, 1H) 7.43-7.60 (m, 2H) 7.62-7.74 (m, 1H) 8.17 (t, J=9.54 Hz, 1H) 8.77 (d, J=21.37 Hz, 1H) 10.32 (d, J=3.03 Hz, 1H). Method 3; Rt=3.31 min. m/z=550.26 (M+H)$^+$.

Example E41: (3aR,10aR)-2-(2-(((3,3-difluorocyclobutyl)amino)-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide (E41)

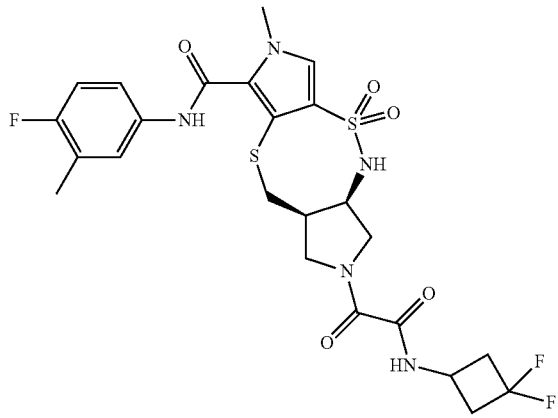 [SMILES: Cc1cc(NC(=O)c2c3c(cn2C)S(=O)(=O)N[C@H]2CN(C(=O)C(=O)NC4CC(F)(F)C4)C[C@H]2CS3)ccc1F]

Prepared similarly as described for compound E38, using 3,3-difluorocyclobutanamine hydrochloride instead of 2,2,2-Trifluoroethylamine hydrochloride. The crude was purified by preparative HPLC (H₂O/CH₃CN+0.1% HCOOH) to afford E41 (24 mg) as white solid. $^1$H NMR (300 MHz, DMSO-d$_6$+TFA) δ ppm 2.23 (s, 3H) 2.30-2.44 (m, 1H) 2.62-2.98 (m, 5H) 3.02-3.43 (m, 2H) 3.44-3.62 (m, 1H) 3.72 (s, 3H) 3.75-4.22 (m, 3H) 4.62-4.89 (m, 1H) 7.10 (t, J=9.12 Hz, 1H) 7.46-7.61 (m, 2H) 7.66 (br d, J=6.42 Hz, 1H) 8.14-8.23 (m, 1H) 9.21 (dd, J=12.01, 7.34 Hz, 1H) 10.32 (d, J=2.84 Hz, 1H). Method 3; Rt=3.46 min. m/z=586.33 (M+H)⁺.

Example E42: (3aR,10aR)—N-(4-fluoro-3-methylphenyl)-7-methyl-2-(2-(((3-methyloxetan-3-yl)amino)-2-oxoacetyl)-2,3,3a,4,10,10a-hexahydro-1H,7H-dipyrrolo[3,4-c:3',4'-g][1,6,2]dithiazocine-8-carboxamide 5,5-dioxide (E42)

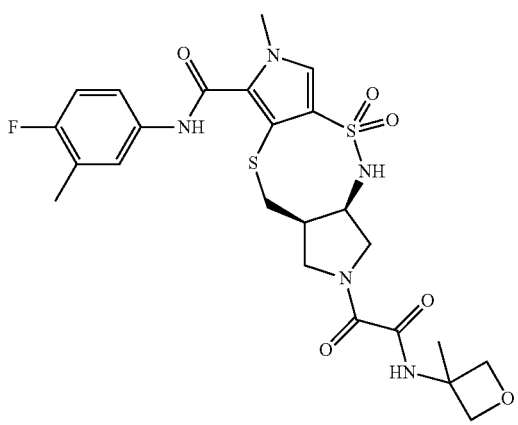 [SMILES: Cc1cc(NC(=O)c2c3c(cn2C)S(=O)(=O)N[C@H]2CN(C(=O)C(=O)NC4(C)COC4)C[C@H]2CS3)ccc1F]

Prepared similarly as described for compound E38, using 3-methyl-3-oxetanamine instead of 2,2,2-trifluoroethylamine hydrochloride. The crude was purified by preparative HPLC (H₂O/CH₃CN+0.1% HCOOH) to afford E42. Method 1; Rt=1.79 min. m/z=566.13 (M+H)⁺.

Example E43: (3aR,10aR)—N-(3-chloro-4-fluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E43)

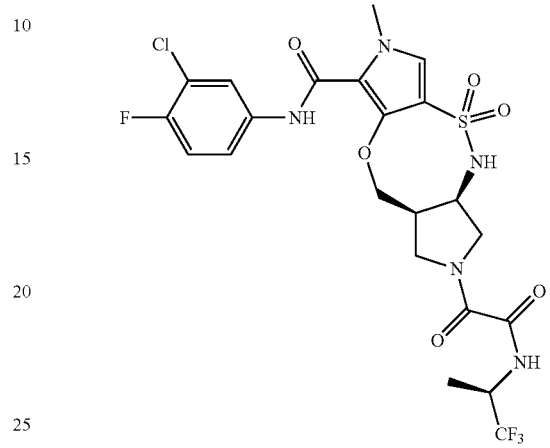

To a solution of crude D31 (71.68 mg, 0.130 mmol) and D40 (33.2 mg, 0.160 mmol) in ethanol (2 mL), DBU (0.03 mL, 0.190 mmol) was added and the resulting yellow solution was stirred at RT for 1 h. Solvent was removed under reduced pressure, and the resulting crude was purified by preparative HPLC (H₂O/CH₃CN+0.1% HCOOH) to afford E43. $^1$H NMR (300 MHz, DMSO-d6) δ ppm 1.31 (t, J=6.97 Hz, 3H) 2.93-3.13 (m, 1H) 3.20 (br t, J=11.46 Hz, 1H) 3.36-3.67 (m, 2H) 3.81-4.09 (m, 5H) 4.44-4.70 (m, 3H) 7.41 (t, J=9.03 Hz, 1H) 7.50 (s, 1H) 7.61-7.69 (m, 1H) 7.99 (ddd, J=6.79, 4.03, 2.66 Hz, 1H) 8.49 (br d, J=8.80 Hz, 1H) 9.28 (br d, J=7.43 Hz, 1H) 9.57 (d, J=10.18 Hz, 1H). Method 3; Rt=3.67 min. m/z=596.39 (M+H)⁺.

Example E44: (3aR,10aR)—N-(3,4-difluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E44)

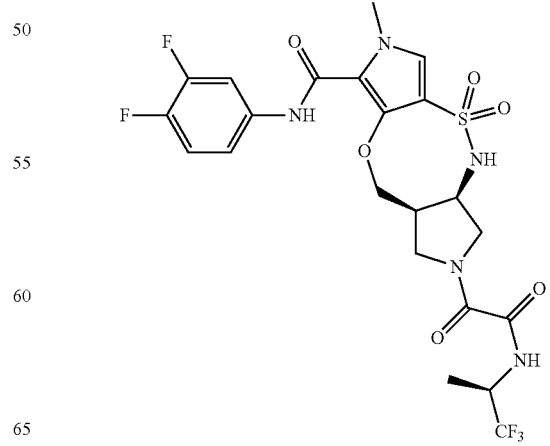

Prepared similarly as described for compound E43 starting from D51 instead of D31. The crude was purified by preparative HPLC (H₂O/CH₃CN+0.1% HCOOH) to afford E44. ¹H NMR (300 MHz, DMSO-d6+TFA) δ ppm 1.30 (t, J=6.97 Hz, 3H) 2.86-3.12 (m, 1H) 3.14-3.68 (m, 2H) 3.81 (s, 3H) 3.82-4.12 (m, 3H) 4.42-4.55 (m, 1H) 4.57-4.72 (m, 2H) 7.30-7.47 (m, 2H) 7.48 (s, 1H) 7.75-7.95 (m, 1H) 8.35-8.56 (m, 1H) 9.16-9.33 (m, 1H) 9.56 (d, J=9.72 Hz, 1H). Method 3; Rt=3.51 min. m/z=580.29 (M+H)+.

Example E45: (3aR,10aR)—N-(3-(difluoromethyl)-4-fluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E45)

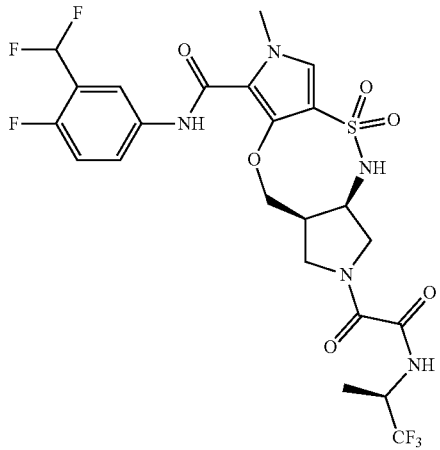 [SMILES: C[C@@H](NC(=O)C(=O)N1C[C@H]2COc3c(cn(C)c3C(=O)Nc3ccc(F)c(C(F)F)c3)S(=O)(=O)N[C@H]2C1)C(F)(F)F]

Prepared similarly as described for compound E43 starting from D52 instead of D31. The crude was purified by preparative HPLC (H₂O/CH₃CN+0.1% HCOOH) to afford E45. ¹H NMR (300 MHz, DMSO-d6) δ ppm 1.30 (t, J=7.06 Hz, 3H) 2.90-3.13 (m, 1H) 3.15-3.70 (m, 2H) 3.78-4.09 (m, 6H) 4.44-4.68 (m, 3H) 6.97-7.40 (m, 2H) 7.47 (s, 1H) 7.79 (br dd, J=7.70, 3.58 Hz, 1H) 8.02-8.09 (m, 1H) 8.45 (dd, J=16.87, 9.90 Hz, 1H) 9.18-9.30 (m, 1H) 9.60 (d, J=9.63 Hz, 1H). Method 3; Rt=3.51 min. m/z=612.39 (M+H)+.

Example E46: (3aR,10aR)—N-(4-fluoro-3-(trifluoromethyl)phenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E46)

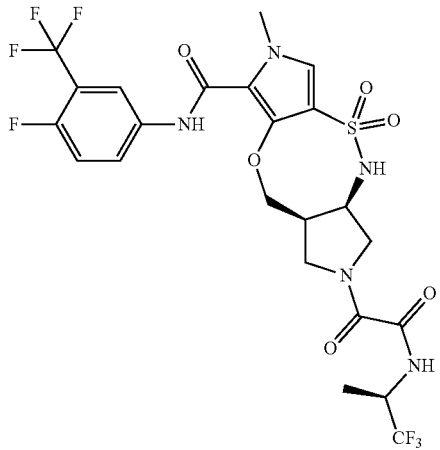 [SMILES: C[C@@H](NC(=O)C(=O)N1C[C@H]2COc3c(cn(C)c3C(=O)Nc3ccc(F)c(C(F)(F)F)c3)S(=O)(=O)N[C@H]2C1)C(F)(F)F]

Prepared similarly as described for compound E43 starting from D53 instead of D31. The crude was purified by preparative HPLC (H₂O/CH₃CN+0.1% HCOOH) to afford E46. ¹H NMR (300 MHz, DMSO-d6+TFA) δ ppm 1.30 (t, J=7.11 Hz, 3H) 2.88-3.14 (m, 1H) 3.14-3.70 (m, 2H) 3.81 (s, 3H) 3.82-4.11 (m, 3H) 4.43-4.55 (m, 1H) 4.56-4.73 (m, 2H) 7.36-7.62 (m, 2H) 7.87-8.00 (m, 1H) 8.14-8.25 (m, 1H) 8.35-8.56 (m, 1H) 9.17-9.32 (m, 1H) 9.71 (d, J=9.45 Hz, 1H). Method 3; Rt=3.75 min. m/z=630.33 (M+H)+.

Example E47: (3aR,10aR)-6-chloro-N-(3-chloro-4-fluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E47)

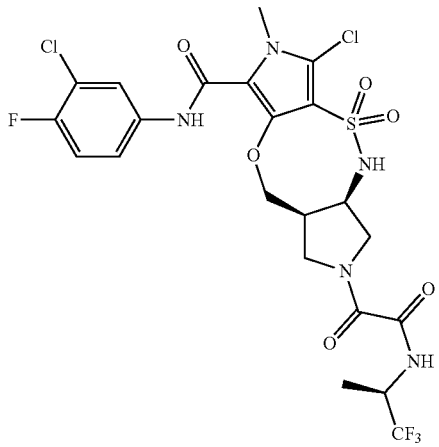 [SMILES: C[C@@H](NC(=O)C(=O)N1C[C@H]2COc3c(c(Cl)n(C)c3C(=O)Nc3ccc(F)c(Cl)c3)S(=O)(=O)N[C@H]2C1)C(F)(F)F]

To a solution of E43 (15 mg, 0.030 mmol) in DCM (2.1 mL), cooled to 0° C., sulfuryl dichloride (2.3 μL, 0.030 mmol) previously dissolved in DCM (0.4 mL), was added portionwise over 1 min at 0° C. The reaction was left to RT and stirred for 3 h. UPLC/MS indicated less than 50% conversion. Further sulfuryl dichloride (2 μL) dissolved in DCM (0.4 mL) was added and the reaction was stirred at RT for further 2 hrs. The reaction was quenched with water (0.5 mL), then was concentrated under reduced pressure and was directly purified by preparative HPLC (H₂O/CH₃CN+0.1% HCOOH) to afford E47. ¹H NMR (300 MHz, DMSO-d₆) δ ppm 1.24-1.40 (m, 3H) 2.84-3.06 (m, 1H) 3.17-3.70 (m, 2H) 3.73-4.16 (m, 6H) 4.26-4.50 (m, 2H) 4.52-4.74 (m, 1H) 7.42 (s, 1H) 7.58-7.74 (m, 1H) 7.88-8.10 (m, 1H) 8.48-8.92 (m, 1H) 9.11-9.54 (m, 1H) 9.71-9.99 (m, 1H). Method 3; Rt: 3.82. m/z: 630.63 (M+H)⁺.

Example E48: (3aR,10aR)-6-chloro-N-(3,4-difluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E48)

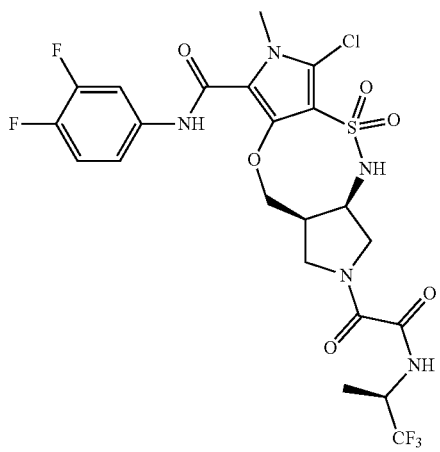 [SMILES: C[C@@H](NC(=O)C(=O)N1C[C@H]2COc3c(c(Cl)n(C)c3C(=O)Nc3ccc(F)c(F)c3)S(=O)(=O)N[C@H]2C1)C(F)(F)F]

Prepared similarly as described for compound E47 starting from E44. The crude was purified by preparative HPLC (H$_2$O/CH$_3$CN+0.1% HCOOH) to afford E48. $^1$H NMR (300 MHz, DMSO-d6) δ ppm 1.26-1.38 (m, 3H) 2.81-3.05 (m, 1H) 3.33 (m, 2H) 3.71-4.14 (m, 6H) 4.33-4.51 (m, 2H) 4.52-4.76 (m, 1H) 7.27-7.58 (m, 2H) 7.68-7.96 (m, 1H) 8.32-8.91 (m, 1H) 9.27 (br s, 1H) 9.82 (d, J=7.70 Hz, 1H). Method 3; Rt: 3.67. m/z: 614.42 (M+H)$^+$.

Example E49: (3aR,10aR)-6-chloro-N-(3-(difluoromethyl)-4-fluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E49)

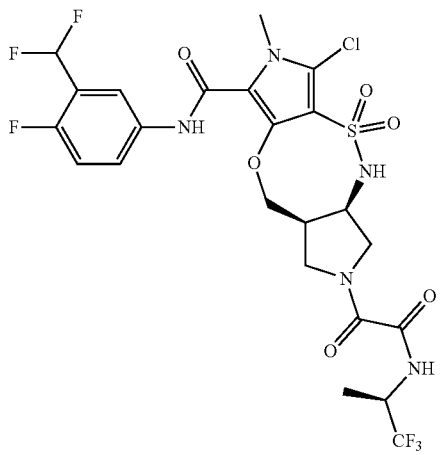 [SMILES: C[C@@H](NC(=O)C(=O)N1C[C@H]2COc3c(c(Cl)n(C)c3C(=O)Nc3ccc(F)c(C(F)F)c3)S(=O)(=O)N[C@H]2C1)C(F)(F)F]

Prepared similarly as described for compound E47 starting from E45. The crude was purified by preparative HPLC (H$_2$O/CH$_3$CN+0.1% HCOOH) to afford E49. $^1$H NMR (300 MHz, DMSO-d$_6$+TFA) δ ppm 1.30 (t, J=7.20 Hz, 3H) 2.79-3.08 (m, 1H) 3.14-3.72 (m, 2H) 3.72-4.17 (m, 6H) 4.34-4.51 (m, 2H) 4.51-4.75 (m, 1H) 6.91-7.49 (m, 2H) 7.80 (br dd, J=7.93, 3.81 Hz, 1H) 8.03 (br s, 1H) 8.67 (dd, J=18.75, 9.86 Hz, 1H) 9.24 (t, J=8.53 Hz, 1H) 9.86 (d, J=8.25 Hz, 1H). Method 3; Rt: 3.66. m/z: 646.43 (M+H)$^+$.

Example E50: (3aR,10aR)-6-chloro-N-(4-fluoro-3-(trifluoromethyl)phenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E50)

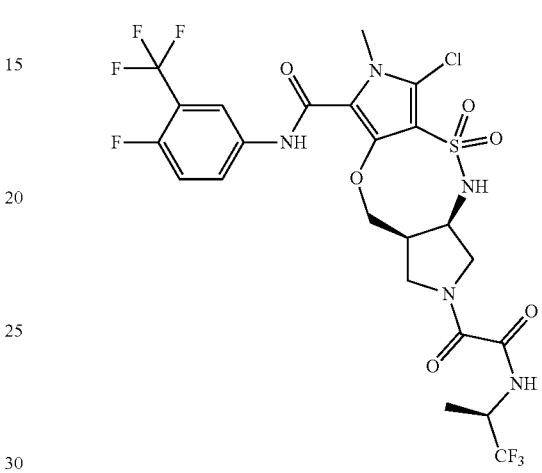

Prepared similarly as described for compound E47 starting from E46. The crude was purified by preparative HPLC (H$_2$O/CH$_3$CN+0.1% HCOOH) to afford E50. $^1$H NMR (300 MHz, DMSO-d$_6$) δ ppm 1.22-1.40 (m, 3H) 2.85-3.03 (m, 1H) 3.17-3.67 (m, 2H) 3.69-4.13 (m, 6H) 4.34-4.53 (m, 2H) 4.53-4.75 (m, 1H) 7.49-7.57 (m, 1H) 7.89-8.03 (m, 1H) 8.13-8.26 (m, 1H) 8.49-8.88 (m, 1H) 9.19-9.41 (m, 1H) 9.91-10.06 (m, 1H). Method 3; Rt: 3.89. m/z: 664.46 (M+H)$^+$.

Example E51: (3aR,10aR)-6-chloro-N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E51)

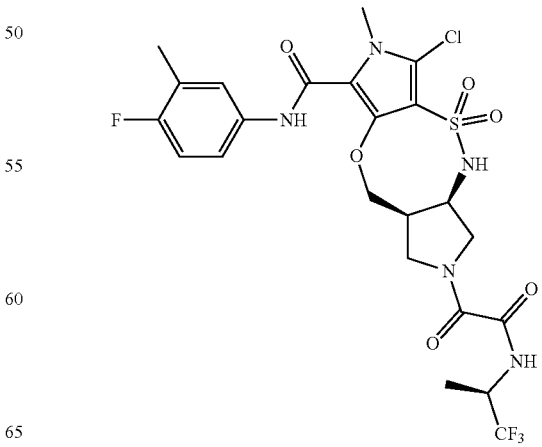

Prepared similarly as described for compound E47 starting from E9. The crude was purified by preparative HPLC (H₂O/CH₃CN+0.1% HCOOH) to afford E51. ¹H NMR (300 MHz, DMSO-d₆) δ ppm 1.36-1.48 (m, 3H) 2.33-2.38 (m, 3H) 2.94-3.15 (m, 1H) 3.29-3.77 (m, 2H) 3.87-4.19 (m, 6H) 4.47-4.62 (m, 2H) 4.64-4.85 (m, 1H) 7.23 (t, J=9.17 Hz, 1H) 7.57-7.72 (m, 2H) 8.67 (s, 1H) 9.32-9.48 (m, 1H) 9.65-9.77 (m, 1H). Method 3; Rt: 3.69. m/z: 610.44 (M+H)⁺.

Example E52: (3aR,10aR)-6-bromo-N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E52)

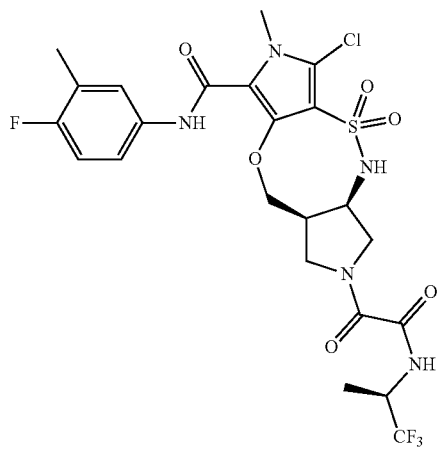 [SMILES: Cc1cc(NC(=O)c2c3c(c(Cl)n2C)S(=O)(=O)N[C@H]2CN(C(=O)C(=O)N[C@H](C)C(F)(F)F)C[C@H]2CO3)ccc1F]

N-Bromosuccinimide (32.11 mg, 0.180 mmol) was added to a solution of E9 (97 mg, 0.170 mmol) in CHCl₃ (3.2 ml); the colourless solution was stirred at RT overnight. Crude was diluted with DCM (20 ml) and a saturated solution of NaHCO₃ (20 ml) and stirred at RT for 30 min. The two phases were separated and the organic layer was washed with brine, dried over Na₂SO₄ (dry) filtered and concentrated. The crude was purified by preparative HPLC (H₂O/CH₃CN+0.1% HCOOH) to afford E52. ¹H NMR (300 MHz, DMSO-d6) δ ppm 1.31 (t, J=7.06 Hz, 3H) 2.24 (s, 3H) 2.90 (td, J=9.28, 5.09 Hz, 1H) 3.19-3.69 (m, 2H) 3.79-3.91 (m, 4H) 3.96-4.12 (m, 2H) 4.30-4.51 (m, 2H) 4.52-4.71 (m, 1H) 7.12 (t, J=9.22 Hz, 1H) 7.45-7.54 (m, 1H) 7.54-7.63 (m, 1H) 8.61 (br dd, J=18.94, 9.40 Hz, 1H) 9.26 (br t, J=8.16 Hz, 1H) 9.61 (d, J=7.52 Hz, 1H). Method 3; Rt: 3.71. m/z: 656.4 (M+H)⁺.

Example E53: (3aR,10aR)—N-(4-fluoro-3-methylphenyl)-6,7-dimethyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E53)

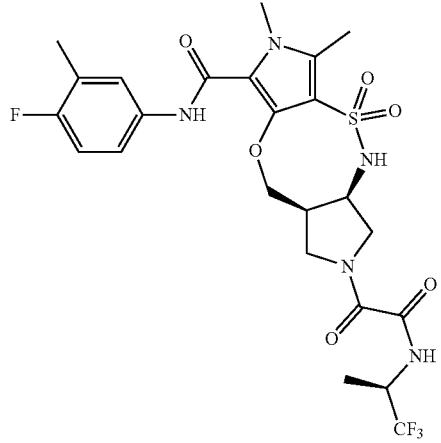 [SMILES: Cc1cc(NC(=O)c2c3c(c(C)n2C)S(=O)(=O)N[C@H]2CN(C(=O)C(=O)N[C@H](C)C(F)(F)F)C[C@H]2CO3)ccc1F]

Prepared similarly as described for compound E43 starting from D54 instead of D31. The crude was purified by preparative HPLC (H₂O/CH₃CN+0.1% HCOOH) to afford E53. ¹H NMR (300 MHz, DMSO-d₆) δ ppm 1.31 (t, J=7.34 Hz, 3H) 2.24 (s, 3H) 2.43 (s, 3H) 2.84-3.05 (m, 1H) 3.14-3.63 (m, 2H) 3.67-3.76 (m, 3H) 3.78-4.09 (m, 3H) 4.37-4.54 (m, 2H) 4.63 (br s, 1H) 7.11 (t, J=9.17 Hz, 1H) 7.40-7.53 (m, 1H) 7.54-7.65 (m, 1H) 8.36-8.60 (m, 1H) 9.19-9.36 (m, 1H) 9.36-9.47 (m, 1H). Method 3; Rt: 3.58. m/z: 590.4 (M+H)⁺.

Example E54: Trans-8-(2-(cyclopropylamino)-2-oxoacetyl)-N-(4-fluoro-3-methylphenyl)-2-methyl-5,5a,6,7,8,9,9a,10-octahydro-2H-pyrido[4,3-f]pyrrolo[3,4-b][1,4,5]oxathiazocine-1-carboxamide 4,4-dioxide (E54)

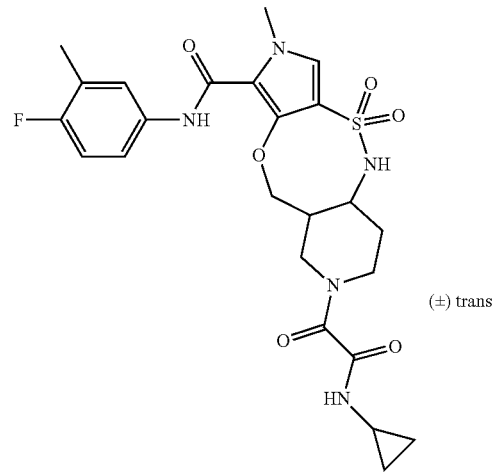 [SMILES: Cc1cc(NC(=O)c2c3c(cn2C)S(=O)(=O)NC2CCN(C(=O)C(=O)NC4CC4)CC2CO3)ccc1F]

(Benzotriazol-1-yloxy)tris(dimethylamino)phosphonium hexafluorophosphate (Sigma Aldrich, cat. No. 226084; 37.6 mg, 0.080 mmol) was added to a solution of trans-N-(4-fluoro-3-methylphenyl)-2-methyl-5,5a,6,7,8,9,9a,10-octahydro-2H-pyrido[4,3-f]pyrrolo[3,4-b][1,4,5]oxathiazocine-1-carboxamide 4,4-dioxide hydrochloride (prepared as described in WO2020030781; 30 mg, 0.070 mmol), D43 (10.97 mg, 0.080 mmol) and DIPEA (34.2 uL, 0.200 mmol) in dry DMF (0.5 mL). The dark yellow solution was stirred at RT for 90 min and monitored by UPLC/MS. The reaction mixture was diluted with water (400 uL), acidified with formic acid (50 uL) and purified by Fraction-Lynx (H₂O/CH₃CN+1‰ HCOOH) to afford E54 (21.6 mg, 0.04 mmol). ¹H NMR (300 MHz, DMSO-d6) δ ppm 0.43-0.56 (m, 2H) 0.58-0.72 (m, 2H) 1.40-1.66 (m, 1H) 1.76-2.01 (m, 2H) 2.25 (s, 3H) 2.64-2.79 (m, 2H) 3.04-3.20 (m, 1H) 3.69-3.82 (m, 2H) 3.82-3.88 (m, 3H) 4.20-4.46 (m, 3H) 7.12 (t, J=9.22 Hz, 1H) 7.45-7.52 (m, 2H) 7.54-7.62 (m, 1H) 8.05 (br t, J=8.90 Hz, 1H) 8.76 (d, J=4.40 Hz, 1H) 9.27 (d, J=9.63 Hz, 1H). Method 3; Rt: 3.01 min. m/z: 534 (M+H)⁺.

Example E55: Trans-8-(2-(3,3-difluoroazetidin-1-yl)-2-oxoacetyl)-N-(4-fluoro-3-methylphenyl)-2-methyl-5,5a,6,7,8,9,9a,10-octahydro-2H-pyrido[4,3-f]pyrrolo[3,4-b][1,4,5]oxathiazocine-1-carboxamide 4,4-dioxide (E55)

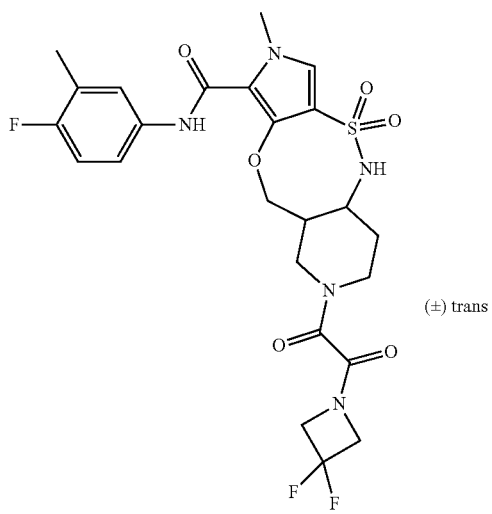 [SMILES: Cc1cc(NC(=O)c2c3c(cn2C)S(=O)(=O)NC2CCN(C(=O)C(=O)N4CC(F)(F)C4)CC2CO3)ccc1F]

Prepared similarly as described for compound E54 using D55 instead of D43. The crude was purified by preparative HPLC (H₂O/CH₃CN+0.1% HCOOH) to afford E55. ¹H NMR (300 MHz, DMSO-d6) δ ppm 1.42-1.68 (m, 1H) 1.80-2.03 (m, 2H) 2.25 (s, 3H) 2.63-2.91 (m, 1H) 3.08-3.25 (m, 1H) 3.69-3.96 (m, 5H) 4.20-4.72 (m, 7H) 7.12 (t, J=9.17 Hz, 1H) 7.42-7.53 (m, 2H) 7.54-7.66 (m, 1H) 8.03 (br s, 1H) 9.20-9.42 (m, 1H). Method 3; Rt: 3.27 min. m/z: 570 (M+H)⁺.

Example E56: Trans-N-(4-fluoro-3-methylphenyl)-2-methyl-8-(2-oxo-2-(((S)-1,1,1-trifluoropropan-2-yl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide (E56)

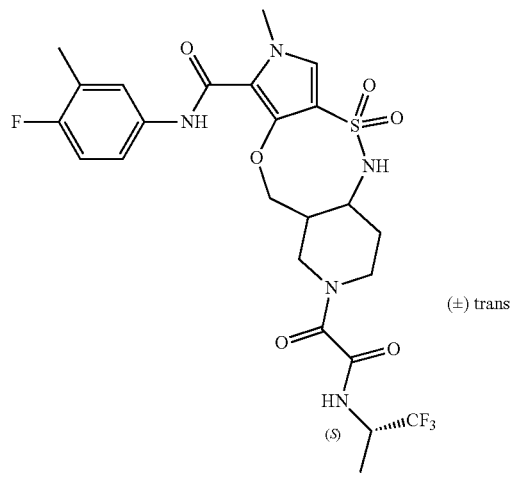

Prepared similarly as described for compound E54 using D56 instead of D43. The crude was purified by preparative HPLC (H₂O/CH₃CN+0.1% HCOOH) to afford E56. ¹H NMR (300 MHz, DMSO-d6) δ ppm 1.28 (t, J=6.90 Hz, 3H) 1.46-1.68 (m, 1H) 1.79-2.04 (m, 2H) 2.24 (br d, J=6.24 Hz, 3H) 2.72 (s, 1H) 3.11-3.25 (m, 1H) 3.60-3.79 (m, 2H) 3.80-3.87 (m, 3H) 4.18-4.26 (m, 1H) 4.26-4.47 (m, 2H) 4.65 (br s, 1H) 7.06-7.16 (m, 1H) 7.42-7.68 (m, 3H) 8.07 (br s, 1H) 9.23-9.31 (m, 1H) 9.36-9.47 (m, 1H). Method 3; Rt: 3.38 min. m/z: 590 (M+H)⁺.

Example E57: Trans-N-(4-fluoro-3-methylphenyl)-2-methyl-8-(2-oxo-2-((2,2,2-trifluoroethyl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide (E57)

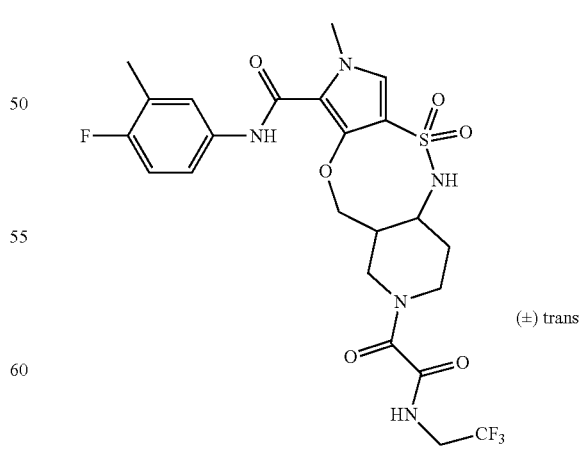

Prepared similarly as described for compound E54 using D58 instead of D43. The crude was purified by preparative HPLC (H₂O/CH₃CN+0.1% HCOOH) to afford E57. ¹H NMR (300 MHz, DMSO-d6) δ ppm 1.45-1.70 (m, 1H) 1.78-2.06 (m, 2H) 2.24 (br d, J=5.04 Hz, 3H) 2.68-2.89 (m, 1H) 3.17 (q, J=12.81 Hz, 1H) 3.66-3.86 (m, 5H) 3.94-4.09 (m, 2H) 4.19-4.46 (m, 3H) 7.11 (td, J=9.10, 6.46 Hz, 1H) 7.42-7.66 (m, 3H) 8.07 (br s, 1H) 9.27 (d, J=7.60 Hz, 1H) 9.42-9.55 (m, 1H). Method 3; Rt: 3.28. m/z: 576 (M+H)+.

Example E58: Trans-N-(4-fluoro-3-methylphenyl)-2-methyl-8-(2-oxo-2-((1,1,1-trifluoro-2-methylpropan-2-yl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide (E58)

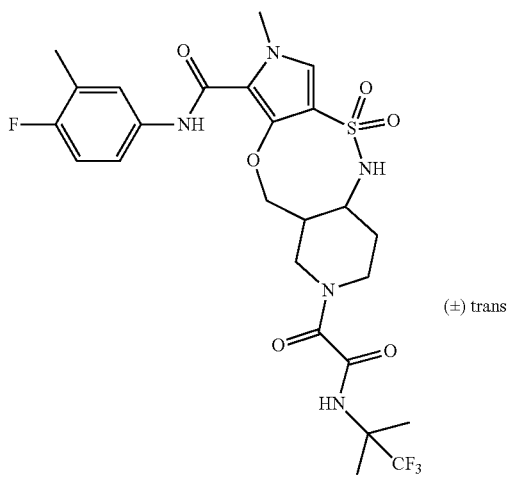 [SMILES: Cc1cc(NC(=O)c2c3c(cn2C)S(=O)(=O)NC2CCN(C(=O)C(=O)NC(C)(C)C(F)(F)F)CC2CO3)ccc1F]

Prepared similarly as described for compound E54 using D60 instead of D43. The crude was purified by preparative HPLC (H2O/CH3CN+0.1% HCOOH) to afford E58. 1H NMR (300 MHz, DMSO-d6) δ ppm 1.49-1.68 (m, 7H) 1.84-2.06 (m, 2H) 2.23 (d, J=7.43 Hz, 3H) 2.63-2.84 (m, 1H) 3.11-3.24 (m, 1H) 3.52-3.66 (m, 1H) 3.70-3.79 (m, 1H) 3.83 (s, 3H) 4.18-4.52 (m, 3H) 7.03-7.18 (m, 1H) 7.44-7.64 (m, 3H) 8.08 (br s, 1H) 8.82-8.92 (m, 1H) 9.24-9.31 (m, 1H). Method 3; Rt: 3.49. m/z: 604 (M+H)+.

Example E59: Trans-N-(4-fluoro-3-methylphenyl)-2-methyl-8-(2-oxo-2-(((R)-1,1,1-trifluoropropan-2-yl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide (E59)

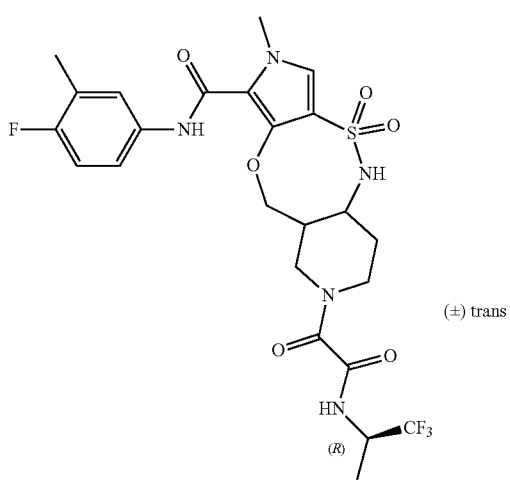

Prepared similarly as described for compound E54 using D41 instead of D43. The crude was purified by preparative HPLC (H2O/CH3CN+0.1% HCOOH) to afford E59. 1H NMR (300 MHz, DMSO-d6) δ ppm 1.22-1.34 (m, 3H) 1.46-1.68 (m, 1H) 1.81-2.05 (m, 2H) 2.24 (br d, J=6.24 Hz, 3H) 2.66-2.86 (m, 1H) 3.07-3.25 (m, 1H) 3.59-3.79 (m, 2H) 3.83 (d, J=2.66 Hz, 3H) 4.22 (br s, 3H) 4.58-4.75 (m, 1H) 7.06-7.16 (m, 1H) 7.42-7.64 (m, 3H) 8.07 (br s, 1H) 9.21-9.33 (m, 1H) 9.36-9.49 (m, 1H). Method 3; Rt: 3.38. m/z: 590 (M+H)+.

Example E60: Cis-N-(4-fluoro-3-methylphenyl)-2-methyl-7-(2-oxo-2-(((R)-1,1,1-trifluoropropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide (E60)

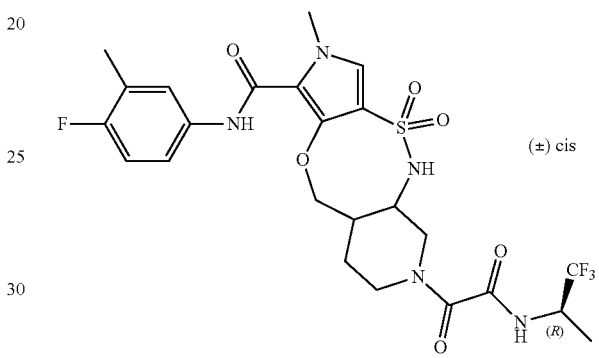

(Benzotriazol-1-yloxy)tris(dimethylamino)phosphonium hexafluorophosphate (Sigma Aldrich, cat. No. 226084; 41.34 mg, 0.09 mmol) was added to a solution of cis-N-(4-fluoro-3-methylphenyl)-2-methyl-5,5a,6,7,8,9,9a,10-octahydro-2H-pyrido[3,4-f]pyrrolo[3,4-b][1,4,5]oxathiazocine-1-carboxamide 4,4-dioxide hydrochloride (prepared as described in WO2020030781) (33 .mg, 0.07 mmol), D41 (19.36 mg, 0.090 mmol) and DIPEA (37.57 uL, 0.22 mmol) in dry DMF (0.7 mL). The resulting solution was stirred at RT for 1 hr and monitored by UPLC/MS. The reaction mixture was diluted with EtOAc and water; organic layer was washed with 5% citric acid solution (×2) and water. The organic portion was dried over Na2SO4, filtered and concentrated under reduced pressure, then the residue purified by preparative HPLC (H2O/CH3CN+1‰ HCOOH) to afford E60 (31 mg, 0.052 mmol). 1H NMR (300 MHz, DMSO-d6) δ ppm 1.21-1.39 (m, 3H) 1.39-1.68 (m, 2H) 2.24 (s, 3H) 2.54-2.79 (m, 1H) 2.97-3.16 (m, 1H) 3.43-3.80 (m, 3H) 3.81 (s, 3H) 4.05-4.26 (m, 1H) 4.26-4.56 (m, 2H) 4.57-4.85 (m, 1H) 7.11 (t, J=9.17 Hz, 1H) 7.39-7.47 (m, 1H) 7.47-7.55 (m, 1H) 7.55-7.63 (m, 1H) 7.86-8.15 (m, 1H) 8.90-9.26 (m, 1H) 9.27-9.44 (m, 1H). Method 3; Rt: 3.47. m/z: 590.4 (M+H)+.

Example E61: Cis-N-(4-fluoro-3-methylphenyl)-2-methyl-7-(2-oxo-2-((2,2,2-trifluoroethyl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide (E61)

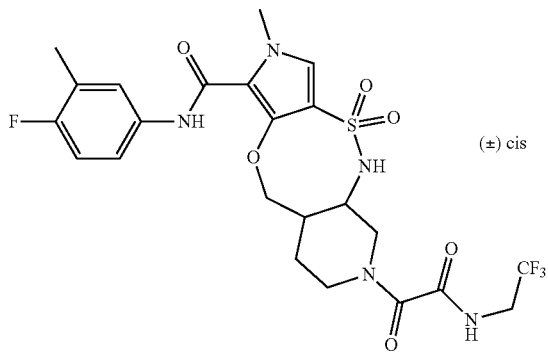 [SMILES: Cc1cc(NC(=O)c2c3c(cn2C)S(=O)(=O)NC2CN(C(=O)C(=O)NCC(F)(F)F)CCC2CO3)ccc1F]

Prepared similarly as described for compound E60 using D58 instead of D41. The crude was purified by preparative HPLC (H$_2$O/CH$_3$CN+0.1% HCOOH) to afford E61. $^1$H NMR (300 MHz, DMSO-d$_6$) δ ppm 1.36-1.66 (m, 2H) 2.24 (s, 3H) 2.54-2.72 (m, 1H) 3.01-3.14 (m, 1H) 3.47-3.77 (m, 2H) 3.81 (s, 3H) 3.86-4.27 (m, 4H) 4.27-4.60 (m, 2H) 7.11 (t, J=9.17 Hz, 1H) 7.39-7.47 (m, 1H) 7.48-7.55 (m, 1H) 7.55-7.63 (m, 1H) 7.90-8.19 (m, 1H) 9.07-9.28 (m, 1H) 9.34 (s, 1H). Method 3; Rt=3.37 min. m/z=576.4 (M+H)$^+$.

Example E62: Cis-N-(4-fluoro-3-methylphenyl)-2-methyl-7-(2-oxo-2-((1,1,1-trifluoro-2-methylpropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide (E62)

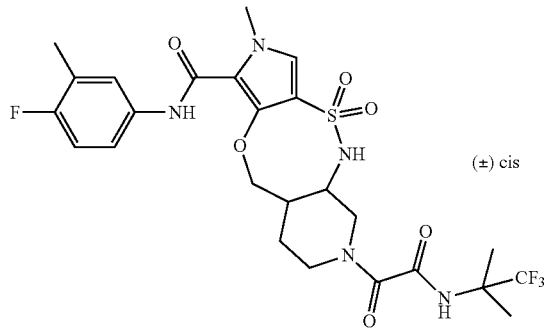 [SMILES: Cc1cc(NC(=O)c2c3c(cn2C)S(=O)(=O)NC2CN(C(=O)C(=O)NC(C)(C)C(F)(F)F)CCC2CO3)ccc1F]

Prepared similarly as described for compound E60 using D60 instead of D41. The crude was purified by preparative HPLC (H$_2$O/CH$_3$CN+0.1% HCOOH) to afford E62. $^1$H NMR (300 MHz, DMSO-d6) δ ppm 1.24-1.52 (m, 2H) 1.52-1.68 (m, 6H) 2.24 (s, 3H) 2.54-2.79 (m, 1H) 2.99-3.14 (m, 1H) 3.46-3.79 (m, 3H) 3.81 (s, 3H) 4.06-4.24 (m, 1H) 4.25-4.41 (m, 1H) 4.41-4.57 (m, 1H) 7.11 (t, J=9.26 Hz, 1H) 7.45 (d, J=5.78 Hz, 1H) 7.47-7.55 (m, 1H) 7.55-7.65 (m, 1H) 7.80-8.15 (m, 1H) 8.26-8.68 (m, 1H) 9.34 (s, 1H). Method 3; Rt=3.57 min. m/z=604.4 (M+H)$^+$.

Example E63: Cis-7-(2-(3,3-difluoroazetidin-1-yl)-2-oxoacetyl)-N-(4-fluoro-3-methylphenyl)-2-methyl-5,5a,6,7,8,9,9a,10-octahydro-2H-pyrido[3,4-f]pyrrolo[3,4-b][1,4,5]oxathiazocine-1-carboxamide 4,4-dioxide (E63)

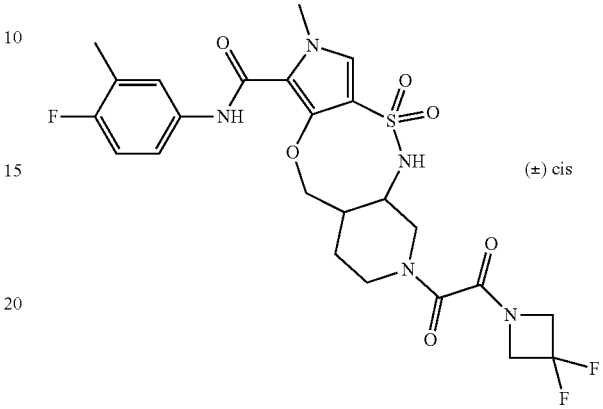

Prepared similarly as described for compound E60 using D55 instead of D41. The crude was purified by preparative HPLC (H$_2$O/CH$_3$CN+0.1% HCOOH) to afford E63. $^1$H NMR (300 MHz, DMSO-d6) δ ppm 1.31-1.65 (m, 2H) 2.24 (s, 3H) 2.63-2.80 (m, 1H) 3.02-3.13 (m, 1H) 3.47-3.73 (m, 2H) 3.75-3.91 (m, 4H) 4.10-4.42 (m, 2H) 4.43-4.59 (m, 3H) 4.60-4.69 (m, 1H) 4.70-4.95 (m, 1H) 7.11 (t, J=9.26 Hz, 1H) 7.44-7.55 (m, 2H) 7.56-7.63 (m, 1H) 7.86-8.22 (m, 1H) 9.35 (s, 1H). Method 3; Rt=3.31 min. m/z=570.45 (M+H)$^+$.

Example E64: Cis-7-(2-(cyclopropylamino)-2-oxoacetyl)-N-(4-fluoro-3-methylphenyl)-2-methyl-5,5a,6,7,8,9,9a,10-octahydro-2H-pyrido[3,4-f]pyrrolo[3,4-b][1,4,5]oxathiazocine-1-carboxamide 4,4-dioxide (E64)

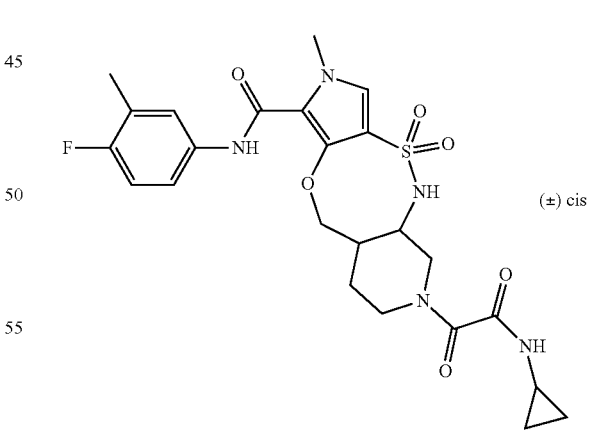

Prepared similarly as described for compound E60 using D43 instead of D41. The crude was purified by preparative HPLC (H$_2$O/CH$_3$CN+0.1% HCOOH) to afford E64. $^1$H NMR (300 MHz, DMSO-d6) δ ppm 0.45-0.54 (m, 1H) 0.54-0.78 (m, 3H) 1.24-1.66 (m, 2H) 2.24 (s, 3H) 2.55-2.78 (m, 2H) 2.95-3.12 (m, 1H) 3.35-3.56 (m, 1H) 3.59-3.73 (m, 1H) 3.74-3.96 (m, 4H) 4.01-4.21 (m, 1H) 4.24-4.43 (m, 1H)

4.43-4.58 (m, 1H) 7.11 (t, J=9.08 Hz, 1H) 7.38-7.47 (m, 1H) 7.47-7.55 (m, 1H) 7.55-7.63 (m, 1H) 7.82-8.14 (m, 1H) 8.23-8.69 (m, 1H) 9.33 (s, 1H). Method 3; Rt=3.10 min. m/z=534.39 (M+H)+ Exact mass: 533.17

Example E65: Cis-N-(4-fluoro-3-methylphenyl)-2-methyl-7-(2-oxo-2-(((S)-1,1,1-trifluoropropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide (E65)

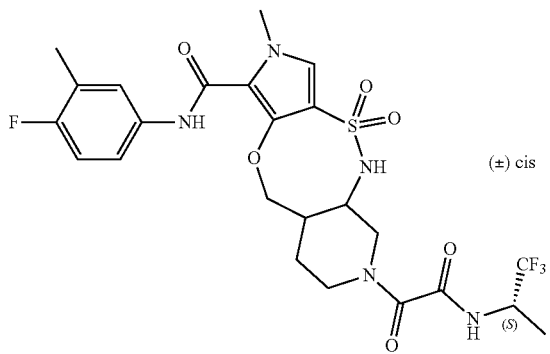

Prepared similarly as described for compound E60 using D56 instead of D41. The crude was purified by preparative HPLC (H₂O/CH₃CN+0.1% HCOOH) to afford E65. ¹H NMR (300 MHz, DMSO-d6) δ ppm 1.22-1.38 (m, 3H) 1.39-1.70 (m, 2H) 2.24 (s, 3H) 2.55-2.78 (m, 1H) 3.02-3.18 (m, 1H) 3.38-3.78 (m, 3H) 3.81 (s, 3H) 4.07-4.25 (m, 1H) 4.27-4.55 (m, 2H) 4.56-4.81 (m, 1H) 7.11 (t, J=9.22 Hz, 1H) 7.40-7.47 (m, 1H) 7.47-7.55 (m, 1H) 7.55-7.63 (m, 1H) 7.85-8.27 (m, 1H) 8.92-9.26 (m, 1H) 9.34 (br s, 1H). Method 3; Rt=3.47 min. m/z=590.38 (M+H)⁺.

Example E66: Trans-N-(4-fluoro-3-methylphenyl)-2-methyl-7-(2-oxo-2-(((R)-1,1,1-trifluoropropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide (E66)

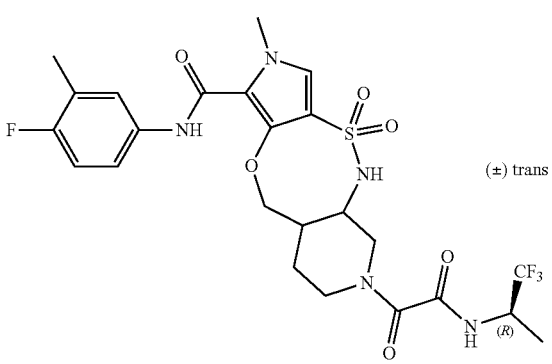

(Benzotriazol-1-yloxy)tris(dimethylamino)phosphonium hexafluorophosphate (Sigma Aldrich, cat. No. 226084; 38 mg, 0.086 mmol) was added to a solution of trans-N-(4-fluoro-3-methylphenyl)-2-methyl-5,5a,6,7,8,9,9a,10-octahydro-2H-pyrido[3,4-f]pyrrolo[3,4-b][1,4,5]oxathiazocine-1-carboxamide 4,4-dioxide hydrochloride (prepared as described in WO2020030781; 30 mg, 0.065 mmol), D41 (19.36 mg, 0.09 mmol) and DIPEA (0.035 mL, 0.20 mmol) in dry DMF (0.7 mL). The resulting solution was stirred at RT for 1 hr and monitored by UPLC/MS. The reaction mixture was diluted with EtOAc and water; organic layer was washed with 5% citric acid solution (×2) and water. The organic portion was dried over Na₂SO₄, filtered and concentrated under reduced pressure, then the residue purified by preparative HPLC (H₂O/CH₃CN+1‰ HCOOH) to afford E66. ¹H NMR (300 MHz, DMSO-d6) δ ppm 1.21-1.59 (m, 4H) 1.70-1.87 (m, 1H) 1.99-2.17 (m, 1H) 2.18-2.28 (m, 3H) 2.60-2.77 (m, 1H) 2.99-3.19 (m, 1H) 3.38-3.73 (m, 2H) 3.73-3.91 (m, 3H) 4.01-4.16 (m, 1H) 4.24-4.44 (m, 2H) 4.55-4.76 (m, 1H) 7.09 (t, J=9.12 Hz, 1H) 7.42-7.52 (m, 2H) 7.52-7.61 (m, 1H) 8.03-8.22 (m, 1H) 9.22-9.44 (m, 2H). Method 3; Rt=3.41 min. m/z=590.4 (M+H)⁺.

Example E67: Trans-7-(2-(cyclopropylamino)-2-oxoacetyl)-N-(4-fluoro-3-methylphenyl)-2-methyl-5,5a,6,7,8,9,9a,10-octahydro-2H-pyrido[3,4-f]pyrrolo[3,4-b][1,4,5]oxathiazocine-1-carboxamide 4,4-dioxide (E67)

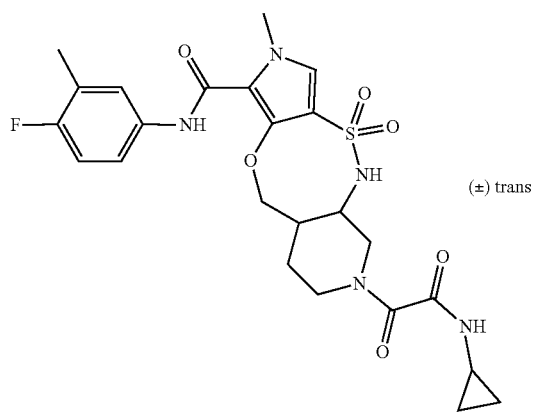 [SMILES: Cc1cc(NC(=O)c2c3c(cn2C)S(=O)(=O)NC2CN(C(=O)C(=O)NC4CC4)CCC2CO3)ccc1F]

Prepared similarly as described for compound E66 using D43 instead of D41. The crude was purified by preparative HPLC (H₂O/CH₃CN+0.1% HCOOH) to afford E67. ¹H NMR (300 MHz, DMSO-d6) δ ppm 0.43-0.58 (m, 2H) 0.59-0.70 (m, 2H) 1.47 (br d, J=3.85 Hz, 1H) 1.76 (br d, J=11.55 Hz, 1H) 2.06 (br d, J=5.78 Hz, 1H) 2.23 (s, 3H) 2.57-2.75 (m, 2H) 2.97-3.11 (m, 1H) 3.45 (br t, J=10.36 Hz, 1H) 3.66-3.88 (m, 4H) 4.01-4.14 (m, 1H) 4.22-4.40 (m, 2H) 7.08 (t, J=9.17 Hz, 1H) 7.43-7.52 (m, 2H) 7.56 (br d, J=6.79 Hz, 1H) 8.09-8.20 (m, 1H) 8.73 (dd, J=7.47, 4.45 Hz, 1H) 9.27 (s, 1H). Method 3; Rt=3.04 min. m/z=534.4 (M+H)⁺.

Example E68: Trans-N-(4-fluoro-3-methylphenyl)-2-methyl-7-(2-oxo-2-((2,2,2-trifluoroethyl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide (E68)

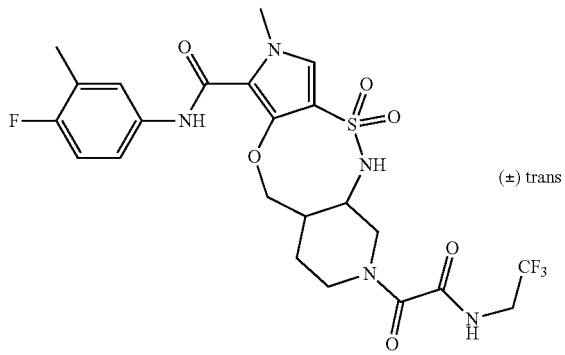 [SMILES: Cc1cc(NC(=O)c2c3c(cn2C)S(=O)(=O)NC2CN(C(=O)C(=O)NCC(F)(F)F)CCC2CO3)ccc1F]

(±) trans

Prepared similarly as described for compound E66 using D58 instead of D41. The crude was purified by preparative HPLC (H$_2$O/CH$_3$CN+0.1% HCOOH) to afford E68. $^1$H NMR (300 MHz, DMSO-d6) δ ppm 1.28-1.58 (m, 1H) 1.77 (br d, J=10.73 Hz, 1H) 2.07 (br d, J=6.14 Hz, 1H) 2.23 (s, 3H) 2.67 (br t, J=11.92 Hz, 1H) 3.08 (br d, J=12.38 Hz, 1H) 3.40-3.71 (m, 2H) 3.82 (s, 3H) 3.91-4.14 (m, 3H) 4.25-4.41 (m, 2H) 7.09 (t, J=9.22 Hz, 1H) 7.43-7.59 (m, 3H) 8.06-8.23 (m, 1H) 9.28 (s, 1H) 9.37-9.48 (m, 1H). Method 3; Rt=3.32 min. m/z=576.4 (M+H)$^+$.

Example E69: Trans-N-(4-fluoro-3-methylphenyl)-2-methyl-7-(2-oxo-2-((1,1,1-trifluoro-2-methylpropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide (E69)

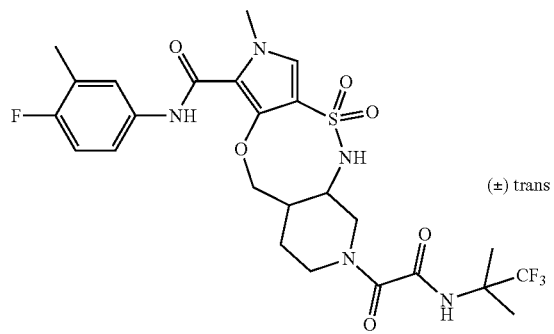 [SMILES: Cc1cc(NC(=O)c2c3c(cn2C)S(=O)(=O)NC2CN(C(=O)C(=O)NC(C)(C)C(F)(F)F)CCC2CO3)ccc1F]

(±) trans

Prepared similarly as described for compound E66 using D60 instead of D41. The crude was purified by preparative HPLC (H$_2$O/CH$_3$CN+0.1% HCOOH) to afford E69. $^1$H NMR (300 MHz, DMSO-d6) δ ppm 1.32-1.61 (m, 7H) 1.75 (br d, J=12.75 Hz, 1H) 2.06 (br d, J=8.44 Hz, 1H) 2.23 (s, 3H) 2.55-2.71 (m, 1H) 3.06 (q, J=12.23 Hz, 1H) 3.43-3.71 (m, 2H) 3.82 (s, 3H) 4.00-4.11 (m, 1H) 4.21-4.39 (m, 2H) 7.08 (t, J=9.12 Hz, 1H) 7.43-7.52 (m, 2H) 7.52-7.58 (m, 1H) 8.08-8.20 (m, 1H) 8.77-8.85 (m, 1H) 9.28 (d, J=3.94 Hz, 1H). Method 3; Rt=3.54 min. m/z=604.5 (M+H)$^+$.

Example E70: Trans-7-(2-(3,3-difluoroazetidin-1-yl)-2-oxoacetyl)-N-(4-fluoro-3-methylphenyl)-2-methyl-5,5a,6,7,8,9,9a,10-octahydro-2H-pyrido[3,4-f]pyrrolo[3,4-b][1,4,5]oxathiazocine-1-carboxamide 4,4-dioxide (E70)

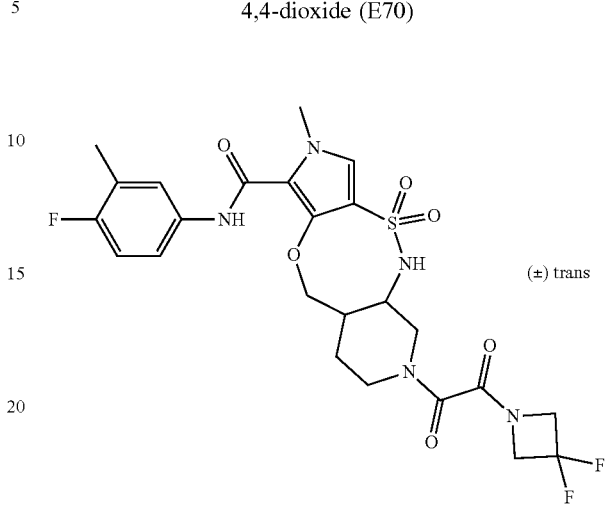

(±) trans

Prepared similarly as described for compound E66 using D55 instead of D41. The crude was purified by preparative HPLC (H$_2$O/CH$_3$CN+0.1% HCOOH) to afford E70. $^1$H NMR (300 MHz, DMSO-d6) δ ppm 1.19-1.57 (m, 1H) 1.71-1.87 (m, 1H) 1.98-2.16 (m, 1H) 2.22 (s, 3H) 2.60-2.79 (m, 1H) 2.98-3.20 (m, 1H) 3.34-3.59 (m, 1H) 3.76-3.98 (m, 4H) 4.13 (br d, J=5.41 Hz, 1H) 4.20-4.71 (m, 6H) 7.07 (t, J=9.17 Hz, 1H) 7.43-7.53 (m, 2H) 7.55 (br d, J=6.97 Hz, 1H) 8.18 (br d, J=8.80 Hz, 1H) 9.28 (s, 1H). Method 3; Rt=3.29 min. m/z=570.3 (M+H)$^+$.

Example E71: Trans-N-(4-fluoro-3-methylphenyl)-2-methyl-7-(2-oxo-2-(((S)-1,1,1-trifluoropropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide (E71)

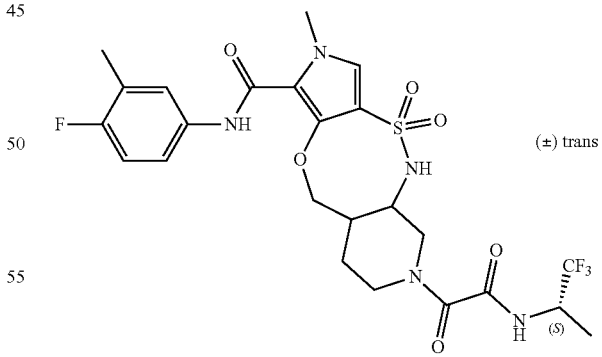

(±) trans

Prepared similarly as described for compound E66 using D56 instead of D41. The crude was purified by preparative HPLC (H$_2$O/CH$_3$CN+0.1% HCOOH) to afford E71. $^1$H NMR (300 MHz, DMSO-d6) δ ppm 1.22-1.52 (m, 4H) 1.77 (br d, J=11.74 Hz, 1H) 2.06 (br d, J=8.07 Hz, 1H) 2.23 (s, 3H) 2.66 (br t, J=11.78 Hz, 1H) 3.00-3.16 (m, 1H) 3.42-3.71 (m, 2H) 3.82 (s, 3H) 4.02-4.15 (m, 1H) 4.25-4.42 (m, 2H) 4.56-4.72 (m, 1H) 7.08 (t, J=9.17 Hz, 1H) 7.43-7.52 (m, 2H)

7.52-7.59 (m, 1H) 8.05-8.22 (m, 1H) 9.26-9.40 (m, 2H). Method 3; Rt=3.42 min. m/z=590.4 (M+H)⁺.

Example E72: Cis-N-(4-fluoro-3-methylphenyl)-2-methyl-8-(2-oxo-2-(((R)-1,1,1-trifluoropropan-2-yl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide (E72)

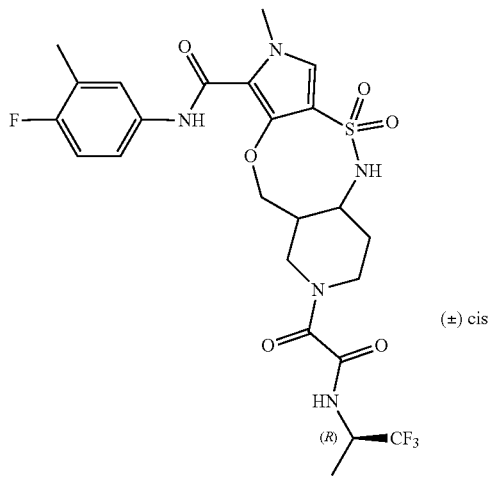

(Benzotriazol-1-yloxy)tris(dimethylamino)phosphonium hexafluorophosphate (Sigma Aldrich, cat. No. 226084; 20.05 mg, 0.050 mmol) was added to a solution of cis-N-(4-fluoro-3-methylphenyl)-2-methyl-5,5a,6,7,8,9,9a,10-octahydro-2H-pyrido[4,3-f]pyrrolo[3,4-b][1,4,5]oxathiazocine-1-carboxamide 4,4-dioxide hydrochloride (prepared as described in WO2020030781; 16 mg, 0.03 mmol), D41 (9.39 mg, 0.050 mmol) and DIPEA (18 uL, 0.10 mmol) in dry DMF (0.5 mL). The reaction mixture was stirred at rt for 4 hr and then diluted with water (400 uL), acidified with formic acid (50 uL) and purified by Fraction-Lynx (H₂O/CH₃CN+1‰ HCOOH). The organic portion was dried over Na₂SO₄, filtered and concentrated under reduced pressure, then the residue purified by preparative HPLC (H₂O/CH₃CN+1‰ HCOOH) to afford E72. ¹H NMR (300 MHz, DMSO-d6) δ ppm 1.15-1.34 (m, 3H) 1.71-2.02 (m, 2H) 2.23 (br d, J=3.76 Hz, 3H) 2.35-2.46 (m, 1H) 2.86-3.61 (m, 3H) 3.78-4.07 (m, 5H) 4.15-4.75 (m, 3H) 7.04-7.14 (m, 1H) 7.45-7.60 (m, 3H) 8.28-8.37 (m, 1H) 9.24-9.30 (m, 1H) 9.32-9.42 (m, 1H). Method 3; Rt: 3.41 m/z: 590.45 (M+H)⁺.

Example E73: Cis-N-(4-fluoro-3-methylphenyl)-2-methyl-8-(2-oxo-2-((2,2,2-trifluoroethyl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide (E73)

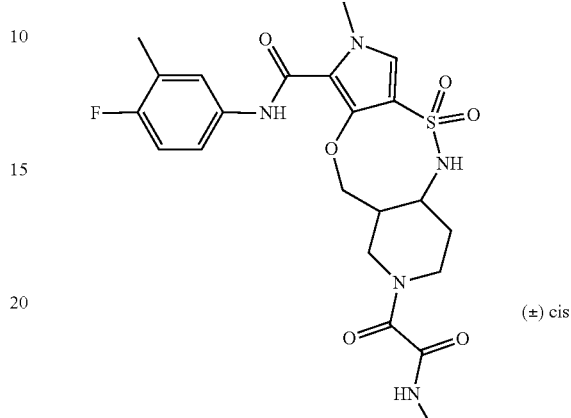

Prepared similarly as described for compound E72 using D58 instead of D41. The crude was purified by preparative HPLC (H₂O/CH₃CN+0.1% HCOOH) to afford E73. ¹H NMR (300 MHz, DMSO-d6) δ ppm 1.69-2.31 (m, 4H) 2.36-2.51 (m, 5H) 2.82-3.67 (m, 3H) 3.77-4.54 (m, 6H) 7.07 (td, J=9.26, 5.59 Hz, 1H) 7.42-7.60 (m, 2H) 8.34 (br d, J=9.45 Hz, 1H) 9.04-9.38 (m, 2H) 9.38-9.49 (m, 1H). Method 3; Rt: 3.31 m/z: 576.40 (M+H)⁺.

Example E74: (3aR,10aR)—N-(4-fluoro-3-methylphenyl)-7,10a-dimethyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E74)

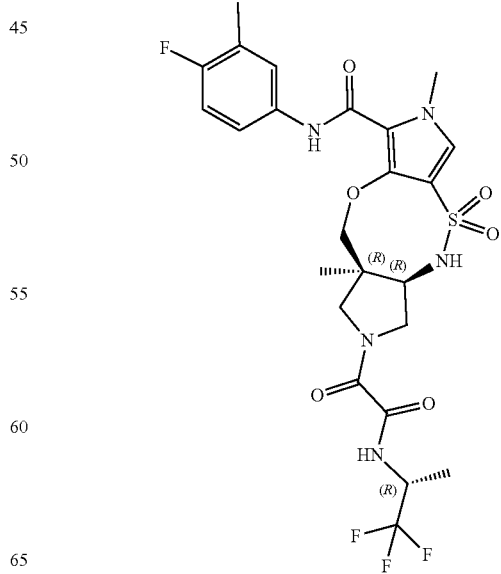

Prepared similarly as described for compound E72 using D63 instead of cis-N-(4-fluoro-3-methylphenyl)-2-methyl-5,5a,6,7,8,9,9a,10-octahydro-2H-pyrido[4,3-f]pyrrolo[3,4-b][1,4,5]oxathiazocine-1-carboxamide 4,4-dioxide hydrochloride. The crude was purified by preparative HPLC ($H_2O/CH_3CN$+0.1% HCOOH) to afford E74. Method 3: Rt=3.68 min. m/z=590.2 (M+H)$^+$.

Example E75: (3aS,10aS)—N-(4-fluoro-3-methylphenyl)-10a-hydroxy-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide (E75)

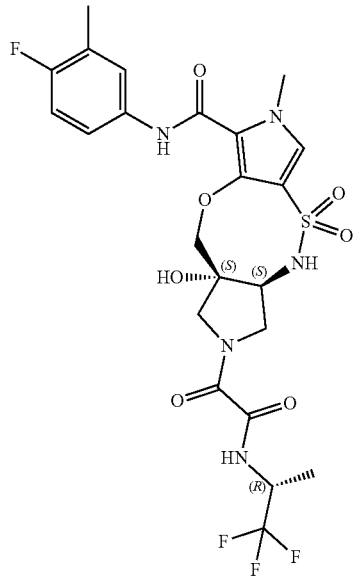

Prepared similarly as described for compound E72 using from D66 instead of cis-N-(4-fluoro-3-methylphenyl)-2-methyl-5,5a,6,7,8,9,9a,10-octahydro-2H-pyrido[4,3-f]pyrrolo[3,4-b][1,4,5]oxathiazocine-1-carb oxamide 4,4-dioxide hydrochloride. The crude was purified by preparative HPLC ($H_2O/CH_3CN$+0.1% HCOOH) to afford E75. $^1$H NMR (300 MHz, DMSO-d6) δ ppm 1.27-1.38 (m, 3H) 2.24 (d, J=1.47 Hz, 3H) 3.41-4.06 (m, 9H) 4.18-4.96 (m, 6H) 5.94 (br dd, J=16.23, 3.76 Hz, 1H) 7.11 (t, J=9.17 Hz, 1H) 7.41-7.67 (m, 3H) 8.02-8.59 (m, 1H) 9.18 (d, J=2.20 Hz, 1H) 9.34 (br dd, J=17.65, 9.03 Hz, 1H). Method 3; Rt=3.41 min; m/z=592.34. (M+H)$^+$.

Biology

Assay
Cells and Culture Conditions
HepAD38 cell line (Ladner et al., Antimicrob Agents Chemother, 1997, 41, 1715-20) was used for HBV inhibition assays. HepAD38 is a subclone, derived from hepatoblastoma cell line HepG2 (ATCC® Number: HB-8065), that expresses HBV genome (genotype D subtype ayw) under the transcriptional control of a tetracycline-responsive promoter in a TET-OFF system: addition of doxycycline, an antibiotic belonging to the class of tetracycline, suppresses HBV replication, while its removal switches on the process allowing HBV viral particles release in the cell supernatant. HepAD38 cell line is maintained in DMEM/F12, supplemented with 10% of fetal bovine serum, 1% of glutamine, 1% of penicillin/streptomycin, 0.4 mg/ml G418 and 0.3 ug/ml tetracycline. For the HBV inhibition assay, doxycycline-free medium is used in order to allow virion production.

HepG2 cell line was used for HBV genotypes and core variants inhibition assays. HepG2 cell line is maintained in DMEM supplemented with 10% of fetal bovine serum, 1% of glutamine and 1% of penicillin/streptomycin.

Anti-HBV Activity In Vitro

HBV inhibition activity in vitro was performed in 96 multiwell plates. During the initial (primary) screening, compounds were first tested in triplicates at concentrations of 0.02 µM, 0.1 µM, 0.5 µM and 1 µM. For selected compounds, an 8-point dose-response curve was obtained using 1:2 serial dilutions (starting from 0.01 µM, 0.1 µM, 0.4 µM or 5 µM, depending on the degree of inhibition observed during the primary screening). From the dose-response curves, half maximal effective concentration ($EC_{50}$) could be calculated (see also below).

In more detail, compounds—typically dissolved in DMSO stock solutions—were diluted to 2× the final desired concentration in 100 µl of the above medium (without doxycycline) and plated in three replicates in the 96-well plates.

Simultaneously, HepAD38 cells—extensively prewashed in doxycycline-free medium in order to induce HBV production—were suspended at 2*10$^4$ cells in 100 µl of doxycycline-free medium and added to each well of the plate, to yield a final assay volume of 200 µl.

DMSO, used for stock solutions and compounds dilutions, was always present in the assays at a final concentration of 0.5%.

Plates were then incubated 96 hours at 37° C. and then subjected to cell viability assays and extracellular HBV quantification, in order to evaluate both the cytotoxic potential and the antiviral activity of compounds.

Cytotoxicity was assessed by a commercial fluorescence assay that measures the metabolic activity of cells, directly related to cell viability (Cell Titer Blue, Promega). For each compound, cytotoxicity was evaluated at the same concentration employed to evaluate its anti-HBV activity. Anti-HBV activity was evaluated by quantification of extracellular HBV DNA with direct qPCR. In particular, supernatant was collected and centrifuged for cell debris clarification, viral DNA was extracted from virions by addition of lysis buffer (1 mM 1,4-dithiothreitol, 0.2% sodium dodecyl sulphate) and incubated at 95° C. for 10 min. Samples were then diluted 1:40 and real time PCR amplification was performed with SYBR green assay (Power SYBR™ Green PCR Master Mix-Thermo Fisher Scientific) and specific HBV primer (HBV-DF:5'-ATTTGTTCAGTGGTTCGTAGGG-3' (SEQ ID No. 1), HBV-DR:5'-CGGTAAAAAGGGACTCAAGATG-3' (SEQ ID No. 2)).

Antiviral activity data for each compound are reported as $EC_{50}$ value (see Table 1 legend). Excel and Graphpad Prism programs are typically used for data elaboration and $EC_{50}$ calculation.

Antiviral Effect on HBV A-E Genotypes

For antiviral effect on HBV A-E genotypes, HepG2 cell line and DNA plasmids expressing HBV genome of different genotypes, from A to E, were used. HepG2 were transiently transfected with plasmid DNA harboring 1.1-mer-overlength genomic sequences of each HBV genotypes A to E isolates cloned into the pcDNA3.1/Zeo(-) vector as described in J Virol. 2010, 84, 3879-88 (https://doi.org/

10.1128/JVI.02528-09). Each plasmid contains the 1.1× HBV genome under the control of a CMV promoter. The list of plasmid used is the following: pcDNA3.1-HBV1.1-A2 (HBV genotype A2), pcDNA3.1-HBV1.1—B2 (HBV genotype B2), pcDNA3.1-HBV1.1—C2 (HBV genotype C2), pcDNA3.1-HBV1.1-D (described as p26 in the above reference, HBV genotype D), pcDNA3.1-HBV1.1-E (HBV genotype E). Methods of generating plasmids are well know in the art (as for example in Viruses 2020, 12, 353, doi: 10.3390/v12030353; Antiviral Research 144 (2017) 205-215, http://dx.doi.org/10.1016/j.antiviral.2017.06.016) and the selection of a suitable method is not a limitation on the present invention.

HepG2 cells were seeded in polylysine coated 96 multi-well plates at a density of $2*10^4$ cells/well and incubated overnight at 37° C. The following day cells were transfected with the HBV plasmids (100 ng/well) using the Lipofectamine 3000 Reagent (Thermo Fisher Scientific) and following manufacturer instructions. After 5 h transfection mixtures were removed and cells were treated with serially diluted compounds in 0.5% DMSO at 8-point dose-response as previously described. After 96 hours of incubation at 37° C. with compound the supernatants were collected, centrifuged for cell debris clarification and incubated with DNase I amplification grade 1 Unit/50 µl (Sigma) for 1 h at 37° C. to allow plasmid input digestion. Quantification of extracellular HBV DNA with direct qPCR was performed as previously described. To avoid unspecific detection of HBV plasmid and to confirm plasmid digestion, specific primers designed across plasmid backbone and HBV sequence were added as controls (HBV-CNT-gt-F:5'-AACTCCGCCCCAT-TGACGCAAA-3' (SEQ ID No. 3), HBV-CNT-gt-R:5'-AAAGCCACCCAAGGCACAGCTT-3'(SEQ ID No. 4)). Antiviral activity data for each genotype are reported as $EC_{50}$ mean value. Moreover the $EC_{50}$ shift value is indicated, corresponding to the ratio between the observed $EC_{50}$ and the $EC_{50}$ for genotype D, which is used as reference genotype (see RESULTS, Table 2 legend). Excel and Graphpad Prism programs are typically used for data elaboration and $EC_{50}$ calculation.

Antiviral Effect Against Naturally Occurring Core Variants

The experimental procedure for antiviral effect against HBV core protein variants was similar to the one previously described for antiviral effect on HBV A-E Genotypes. Different core point mutations (F23Y, F110I, I105T, L37Q, T33N, T33P, T128I, V124G, Y118F) were selected based on their ability to reduce potency of CAMs currently in development (literature data) and introduced in the plasmids containing the HBV genome of genotype D (pcDNA3.1-HBV1.1-D, described above). The following list of plasmids was generated by site-directed mutagenesis of the parent plasmid pcDNA3.1-HBV1.1-D (p26 in J Virol. 2010, 84, 3879-88): pcDNA3.1-HBV1.1-D-CoreF23Y, pcDNA3.1-HBV1.1-D-CoreF110I, pcDNA3.1-HBV1.1-D-Core 1105 T, pcDNA3.1-HBV1.1-D-CoreL37Q, pcDNA3.1-HBV1.1-D-CoreT33N, pcDNA3.1-HBV1.1-D-CoreT33P, pcDNA3.1-HBV1.1-D-CoreT128I, pcDNA3.1-HBV1.1-D-CoreV124G, pcDNA3.1-HBV1.1-D-CoreY118F (point mutations in the nucleotide codon relative to the indicated core aminoacid substitution are the followings: TTC/TAC for F23Y, TTT/ATT for F110I, ATT/ACT for I105T, CTG/CAG for L37Q, ACC/AAC for T33N, ACC/CCC for T33P, ACT/ATT for T128I, GTG/GGG for V124G, TAT/TTT for Y118F). Antiviral activity data for each variant are reported as $EC_{50}$ mean value and $EC_{50}$ shift compared to wild type (see RESULTS, Table 4 legend). Excel and Graphpad Prism programs are typically used for data elaboration and $EC_{50}$ calculation.

Results

The exemplified compounds described herein were tested in the assays described above. All the compounds displayed no significant cytotoxicity at all concentrations of the dose-response curve (maximum tested dose of 0.01 µM, 0.1 µM, 0.4 µM or 5 depending on the compound potency). Results for HBV inhibition are reported in the following Table 1.

TABLE 1

HBV inhibition, legend: A = $EC_{50}$ less than 0.5 µM; B = $EC_{50}$ greater than 0.5 µM.

| Example | Compound Name | HBV inh $EC_{50}$ (µM) |
|---|---|---|
| E1 | cis- 2-(2-(dimethylamino)-2-oxoacetyl)-7-methyl-N-(3,4,5-trifluorophenyl)-2,3,3a,4,10,10a-hexahydro-1H,7H-dipyrrolo[3,4-b:3',4'-f][1,4,5]oxathiazocine-8-carboxamide 5,5-dioxide | A |
| E2 | cis-N-(4-fluoro-3-methylphenyl)-7-methyl-2-(2-((3-methyloxetan-3-yl)amino)-2-oxoacetyl)-2,3,3a,4,10,10a-hexahydro-1H,7H-dipyrrolo[3,4-b:3',4'-f][1,4,5] oxathiazocine-8-carboxamide 5,5-dioxide | A |
| E3 | (3aR,10aR)-N-(4-fluoro-3-methylphenyl)-7-methyl-2-(2-((3-methyloxetan-3-yl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide | A |
| E4 | (3aR,10aR)-7-methyl-2-(2-((3-methyloxetan-3-yl)amino)-2-oxoacetyl)-N-(3,4,5-trifluorophenyl)-2,3,3a,4,10,10a-hexahydro-1H,7H-dipyrrolo[3,4-b:3',4'-f][1,4,5]oxathiazocine-8-carboxamide 5,5-dioxide | A |
| E5 | (3aR,10aR)-N-(3-chloro-4-fluorophenyl)-7-methyl-2-(2-((3-methyloxetan-3-yl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide | A |
| E6 | (3aR,10aR)-N-(3-cyano-4-fluorophenyl)-7-methyl-2-(2-((3-methyloxetan-3-yl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide | B |
| E7 | (3aR,10aR)-2-(2-(tert-butylamino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide | A |
| E8 | (3aR,10aR)-2-(2-(cyclopropylamino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide | A |
| E9 | (3aR,10aR)-N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |

TABLE 1-continued

HBV inhibition, legend: A = EC$_{50}$ less than 0.5 μM; B = EC$_{50}$ greater than 0.5 μM.

| Example | Compound Name | HBV inh EC$_{50}$ (μM) |
|---|---|---|
| E10 | cis N-(4-fluoro-3-methylphenyl)-7-methyl-2-(2-(methylamino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide | A |
| E11 | cis-(2-amino-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide | A |
| E12 | cis-7-methyl-2-(2-(methylamino)-2-oxoacetyl)-N-(3,4,5-trifluorophenyl)-2,3,3a,4,10,10a-hexahydro-1H,7H-dipyrrolo[3,4-b:3',4'-f][1,4,5]oxathiazocine-8-carboxamide 5,5-dioxide | A |
| E13 | cis-2-(2-amino-2-oxoacetyl)-7-methyl-N-(3,4,5-trifluorophenyl)-2,3,3a,4,10,10a-hexahydro-1H,7H-dipyrrolo[3,4-b:3',4'-f][1,4,5]oxathiazocine-8-carboxamide 5,5-dioxide | A |
| E14 | (3aR,10aR)-2-(2-((3,3-difluorocyclobutyl)amino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide | A |
| E15 | (3aR,10aR)-N-(4-fluoro-3-methylphenyl)-7-methyl-2-(2-oxo-2-(((S)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E16 | (3aR,10aR)-N-(4-fluoro-3-methylphenyl)-2-(2-(isobutylamino)-2-oxoacetyl)-7-methyl-2,3,3a,4,10,10a-hexahydro-1H,7H-dipyrrolo[3,4-b:3',4'-f][1,4,5]oxathiazocine-8-carboxamide 5,5-dioxide | A |
| E17 | (3aR,10aR)-N-(4-fluoro-3-methylphenyl)-7-methyl-2-(2-oxo-2-((2,2,2-trifluoroethyl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E18 | (3aR,10aR)-N-(4-fluoro-3-methylphenyl)-7-methyl-2-(2-((1-methylcyclopropyl)amino)-2,3,3a,4,10,10a-hexahydro-1H,7H-dipyrrolo[3,4-b:3',4'-f][1,4,5]oxathiazocine-8-carboxamide 5,5-dioxide | A |
| E19 | (3aR,10aR)-N-(4-fluoro-3-methylphenyl)-7-methyl-2-(2-oxo-2-((1-(trifluoromethyl)cyclopropyl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E20 | (3aR,10aR)-2-(2-((cyclopropylmethyl)amino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide | A |
| E21 | (3aR,10aR)-N-(4-fluoro-3-methylphenyl)-2-(2-(isopropylamino)-2-oxoacetyl)-7-methyl-2,3,3a,4,10,10a-hexahydro-1H,7H-dipyrrolo[3,4-b:3',4'-f][1,4,5]oxathiazocine-8-carboxamide 5,5-dioxide | A |
| E22 | (3aR,10aR)-2-(2-(cyclobutylamino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide | A |
| E23 | (3aR,10aR)-2-(2-(cyclopropylamino)-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide | A |
| E24 | (3aR,10aR)-N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-c:3',4'-g][1,6,2]dithiazocine-8-carboxamide 5,5-dioxide | A |
| E25 | Cis-2-(2-(cyclopropylamino)-2-oxoacetyl)-N-(4-fluoro-3-methylphenyl)-7,10a-dimethyl-2,3,3a,4,10,10a-hexahydro-1H,7H-dipyrrolo[3,4-b:3',4'-f][1,4,5]oxathiazocine-8-carboxamide 5,5-dioxide | A |
| E26 | Cis-N-(4-fluoro-3-methylphenyl)-7,10a-dimethyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E27 | Cis-N-(4-fluoro-3-methylphenyl)-3a,7-dimethyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E28 | Cis-2-(2-(cyclopropylamino)-2-oxoacetyl)-N-(4-fluoro-3-methylphenyl)-3a,7-dimethyl-2,3,3a,4,10,10a-hexahydro-1H,7H-dipyrrolo[3,4-b:3',4'-f][1,4,5]oxathiazocine-8-carboxamide 5,5-dioxide | A |
| E29 | (3aR,10aR)-2-(2-(3,3-difluoroazetidin-1-yl)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide | A |
| E30 | trans-N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f] [1,4,5]oxathiazocine-8-carboxamide 5,5-dioxide | A |
| E31 | Trans-2-(2-(cyclopropylamino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide | A |
| E32 | (3aR,10aR)-N-(4-fluoro-3-methylphenyl)-7-methyl-2-(2-oxo-2-((1,1,1-trifluoro-2-methylpropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |

TABLE 1-continued

HBV inhibition, legend: A = EC$_{50}$ less than 0.5 µM; B = EC$_{50}$ greater than 0.5 µM.

| Example | Compound Name | HBV inh EC$_{50}$ (µM) |
|---|---|---|
| E33 | (3aR,10aR)-N-(4-fluoro-3-methylphenyl)-7-methyl-2-(2-oxo-2-((1-(trifluoromethyl)cyclobutyl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E34 | (3aR,10aR)-2-(2-amino-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide | A |
| E35 | (3aR,10aR)-N-(4-fluoro-3-methylphenyl)-7-methyl-2-(2-(methylamino)-2-oxoacetyl)-2,3,3a,4,10,10a-hexahydro-1H,7H-dipyrrolo[3,4-c:3',4'-g][1,6,2]dithiazocine-8-carboxamide 5,5-dioxide | A |
| E36 | (3aR,10aR)-2-(2-(3,3-difluoroazetidin-1-yl)-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide | A |
| E37 | (3aR,10aR)-N-(4-fluoro-3-methylphenyl)-7-methyl-2-(2-oxo-2-(((S)-1,1,1-trifluoropropan-2-yl)amino)acetyl)-2,3,3a,4,10,10a-hexahydro-1H,7H-dipyrrolo[3,4-c:3',4'-g][1,6,2]dithiazocine-8-carboxamide 5,5-dioxide | A |
| E38 | (3aR,10aR)-N-(4-fluoro-3-methylphenyl)-7-methyl-2-(2-oxo-2-((2,2,2-trifluoroethyl)amino)acetyl)-2,3,3a,4,10,10a-hexahydro-1H,7H-dipyrrolo[3,4-c:3',4'-g][1,6,2]dithiazocine-8-carboxamide 5,5-dioxide | A |
| E39 | (3aR,10aR)-2-(2-((cyclopropylmethyl)amino)-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide | A |
| E40 | (3aR,10aR)-N-(4-fluoro-3-methylphenyl)-7-methyl-2-(2-((1-methylcyclopropyl)amino)-2-oxoacetyl)-2,3,3a,4,10,10a-hexahydro-1H,7H-dipyrrolo[3,4-c:3',4'-g][1,6,2]dithiazocine-8-carboxamide 5,5-dioxide | A |
| E41 | (3aR,10aR)-2-(2-((3,3-difluorocyclobutyl)amino)-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide | A |
| E42 | (3aR,10aR)-N-(4-fluoro-3-methylphenyl)-7-methyl-2-(2-((3-methyloxetan-3-yl)amino)-2-oxoacetyl)-2,3,3a,4,10,10a-hexahydro-1H,7H-dipyrrolo[3,4-c:3',4'-g][1,6,2]dithiazocine-8-carboxamide 5,5-dioxide | A |
| E43 | (3aR,10aR)-N-(3-chloro-4-fluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E44 | (3aR,10aR)-N-(3,4-difluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E45 | (3aR,10aR)-N-(3-(difluoromethyl)-4-fluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E46 | (3aR,10aR)-N-(4-fluoro-3-(trifluoromethyl)phenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E47 | (3aR,10aR)-6-chloro-N-(3-chloro-4-fluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E48 | (3aR,10aR)-6-chloro-N-(3,4-difluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E49 | (3aR,10aR)-6-chloro-N-(3-(difluoromethyl)-4-fluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E50 | (3aR,10aR)-6-chloro-N-(4-fluoro-3-(trifluoromethyl)phenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E51 | (3aR,10aR)-6-chloro-N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E52 | (3aR,10aR)-6-bromo-N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |

TABLE 1-continued

HBV inhibition, legend: A = $EC_{50}$ less than 0.5 µM; B = $EC_{50}$ greater than 0.5 µM.

| Example | Compound Name | HBV inh $EC_{50}$ (µM) |
|---|---|---|
| E53 | (3aR,10aR)-N-(4-fluoro-3-methylphenyl)-6,7-dimethyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E54 | trans- 8-(2-(cyclopropylamino)-2-oxoacetyl)-N-(4-fluoro-3-methylphenyl)-2-methyl-5,5a,6,7,8,9,9a,10-octahydro-2H-pyrido[4,3-f]pyrrolo[3,4-b][1,4,5]oxathiazocine-1-carboxamide 4,4-dioxide | A |
| E55 | trans-8-(2-(3,3-difluoroazetidin-1-yl)-2-oxoacetyl)-N-(4-fluoro-3-methylphenyl)-2-methyl-5,5a,6,7,8,9,9a,10-octahydro-2H-pyrido[4,3-f]pyrrolo[3,4-b][1,4,5]oxathiazocine-1-carboxamide 4,4-dioxide | A |
| E56 | trans- N-(4-fluoro-3-methylphenyl)-2-methyl-8-(2-oxo-2-(((S)-1,1,1-trifluoropropan-2-yl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide | A |
| E57 | trans- N-(4-fluoro-3-methylphenyl)-2-methyl-8-(2-oxo-2-((2,2,2-trifluoroethyl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide | A |
| E58 | trans - N-(4-fluoro-3-methylphenyl)-2-methyl-8-(2-oxo-2-((1,1,1-trifluoro-2-methylpropan-2-yl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide | A |
| E59 | trans - N-(4-fluoro-3-methylphenyl)-2-methyl-8-(2-oxo-2-(((R)-1,1,1-trifluoropropan-2-yl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide | A |
| E60 | cis- N-(4-fluoro-3-methylphenyl)-2-methyl-7-(2-oxo-2-(((R)-1,1,1-trifluoropropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide | A |
| E61 | cis - N-(4-fluoro-3-methylphenyl)-2-methyl-7-(2-oxo-2-((2,2,2-trifluoroethyl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide | A |
| E62 | cis - N-(4-fluoro-3-methylphenyl)-2-methyl-7-(2-oxo-2-((1,1,1-trifluoro-2-methylpropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide | A |
| E63 | cis -7-(2-(3,3-difluoroazetidin-1-yl)-2-oxoacetyl)-N-(4-fluoro-3-methylphenyl)-2-methyl-5,5a,6,7,8,9,9a,10-octahydro-2H-pyrido[3,4-f]pyrrolo[3,4-b][1,4,5]oxathiazocine-1-carboxamide 4,4-dioxide | A |
| E64 | cis -7-(2-(cyclopropylamino)-2-oxoacetyl)-N-(4-fluoro-3-methylphenyl)-2-methyl-5,5a,6,7,8,9,9a,10-octahydro-2H-pyrido[3,4-f]pyrrolo[3,4-b][1,4,5]oxathiazocine-1-carboxamide 4,4-dioxide | A |
| E65 | cis -N-(4-fluoro-3-methylphenyl)-2-methyl-7-(2-oxo-2-(((S)-1,1,1-trifluoropropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide | A |
| E66 | trans -N-(4-fluoro-3-methylphenyl)-2-methyl-7-(2-oxo-2-(((R)-1,1,1-trifluoropropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide | A |
| E67 | trans-7-(2-(cyclopropylamino)-2-oxoacetyl)-N-(4-fluoro-3-methylphenyl)-2-methyl-5,5a,6,7,8,9,9a,10-octahydro-2H-pyrido[3,4-f]pyrrolo[3,4-b][1,4,5]oxathiazocine-1-carboxamide 4,4-dioxide | A |
| E68 | trans- N-(4-fluoro-3-methylphenyl)-2-methyl-7-(2-oxo-2-((2,2,2-trifluoroethyl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide | A |
| E69 | trans- N-(4-fluoro-3-methylphenyl)-2-methyl-7-(2-oxo-2-((1,1,1-trifluoro-2-methylpropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide | A |
| E70 | trans- 7-(2-(3,3-difluoroazetidin-1-yl)-2-oxoacetyl)-N-(4-fluoro-3-methylphenyl)-2-methyl-5,5a,6,7,8,9,9a,10-octahydro-2H-pyrido[3,4-f]pyrrolo[3,4-b][1,4,5]oxathiazocine-1-carboxamide 4,4-dioxide | A |
| E71 | trans- N-(4-fluoro-3-methylphenyl)-2-methyl-7-(2-oxo-2-(((S)-1,1,1-trifluoropropan-2-yl)amino)acetyl)-5,5a,6,7,8,9,9a,10-octahydro-2H-pyrido[3,4-f]pyrrolo[3,4-b][1,4,5]oxathiazocine-1-carboxamide 4,4-dioxide | A |
| E72 | cis - N-(4-fluoro-3-methylphenyl)-2-methyl-8-(2-oxo-2-(((R)-1,1,1-trifluoropropan-2-yl)amino)acetyl)-5,5a,6,7,8,9,9a,10-octahydro-2H-pyrido[4,3-b]pyrrolo [3,4-f][1,4,5]oxathiazocine-1-carboxamide 4,4-dioxide | A |
| E73 | cis - N-(4-fluoro-3-methylphenyl)-2-methyl-8-(2-oxo-2-((2,2,2-trifluoroethyl)amino)acetyl)-5,5a,6,7,8,9,9a,10-octahydro-2H-pyrido[4,3-f]pyrrolo[3,4-b][1,4,5]oxathiazocine-1-carboxamide 4,4-dioxide | A |
| E74 | (3aR,10aR)-N-(4-fluoro-3-methylphenyl)-7,10a-dimethyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |
| E75 | (3aS,10aS)-N-(4-fluoro-3-methylphenyl)-10a-hydroxy-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide | A |

Data in Table 1 demonstrate that the compounds of the invention are all very potent inhibitors of HBV replication, with $EC_{50}$ values constantly in the nanomolar range.

Antiviral Effect on HBV A-E Genotypes

Compound E15 was selected as a representative compound to assess the antiviral activity of the class of compounds of the invention against the HBV A-E genotypes. Antiviral activity data for each genotype are reported as $EC_{50}$ mean value and $EC_{50}$ shift compared to genotype D. Transient transfections of HepG2 cells with plasmids harboring different HBV genotypes showed that compound E15 behaved as a pan-genotype (A through E) anti-HBV agent. Minimal variation in anti-HBV activity has been observed across genotypes A-E, as indicated by the $EC_{50}$ values and the relative $EC_{50}$ shift from genotype D in the table below (Table 2).

TABLE 2

Antiviral activity data for each genotype are reported as $EC_{50}$ mean value and $EC_{50}$ shift compared to genotype D

| HBV Genotype | Compound E15 $EC_{50}$ ± StD (nM) | Compound E15 $EC_{50}$ shift |
|---|---|---|
| A | 2.14 ± 0.43 | 2.27 |
| B | 1.58 ± 0.70 | 1.67 |
| C | 0.72 ± 0.55 | 0.76 |
| D | 0.94 ± 0.49 | −1 |
| E | 1.79 ± 1.08 | 1.90 |

Antiviral Effect Against Naturally Occurring Core Variants

Representative compound E15 was tested against a panel of 9 variants of the HBV core protein showing $EC_{50}$ shift ≥2 against known CAMs (literature data). The compound of the present invention displayed a low/medium nanomolar $EC_{50}$ against each mutant, including the most resistant variant T33N (associated with high potency shift with other CAMs). All HBV variants remained sensitive to inhibition by E15 with mean $EC_{50}$ fold changes that ranged from 0.7 to 29.5-fold as compared to that obtained from wild type (genotype D). These data demonstrate that the compounds of the invention have a broad spectrum of activity, being active against wild-type HBV and against several variants that may be resistant to other CAMs. Results, indicating the $EC_{50}$ values and the relative $EC_{50}$ shift with respect to wild type, are included in Table 3.

TABLE 3

Antiviral activity data for each variant are reported as $EC_{50}$ mean value and $EC_{50}$ shift compared to wild type

| Mutation | Compound E15 $EC_{50}$ ± StD (nM) | Compound E15 $EC_{50}$ shift |
|---|---|---|
| F23Y | 6.33 ± 0.94 | 3.82 |
| F110I | 1.12 ± 0.30 | 0.71 |
| I105T | 3.22 ± 1.45 | 1.84 |
| L37Q | 8.72 ± 3.76 | 5.48 |
| T33N | 46.88 ± 21.10 | 29.52 |
| T33P | 1.68 ± 0.37 | 1.03 |
| T128I | 8.91 ± 5.85 | 5.64 |
| V124G | 6.8 ± 2.08 | 3.97 |
| Y118F | 6.37 ± 1.84 | 4.0 |

---

The invention claimed is:

1. A compound of general formula (I):

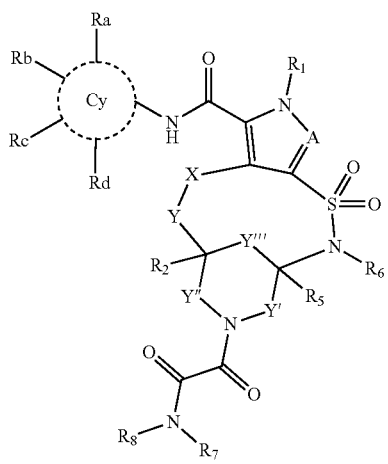

(I)

wherein:
Cy is aryl or heteroaryl;
A is C—$R_3$;
X is O or S;
Y, Y', Y" are each methanediyl;
Y''' is absent;
$R_1$ is H or $C_{1-6}$ alkyl;
$R_2$ is selected from H, OH, halogen and $C_{1-6}$ alkyl;
$R_3$ is selected from H, $C_{1-6}$ alkyl, $C_{3-8}$ cycloalkyl, halo$C_{1-6}$ alkyl and halogen;
$R_5$ is H or $C_{1-6}$ alkyl;
$R_6$ is selected from H, $C_{1-6}$ alkyl, $C_{3-8}$ cycloalkyl, $C_{3-8}$ heterocycloalkyl, $C_{1-6}$ alkylaryl, $C_{1-6}$ alkylheteroaryl and $C_{1-6}$ alkyl-$C_{3-8}$ cycloalkyl wherein each of said $C_{1-6}$ alkyl, $C_{3-8}$ cycloalkyl, $C_{3-8}$ heterocycloalkyl, $C_{1-6}$ alkylaryl, $C_{1-6}$ alkylheteroaryl or $C_{1-6}$ alkyl-$C_{3-8}$ cycloalkyl is optionally substituted with one or more substituents each independently selected from: OH, halogen, halo-$C_{1-6}$ alkyl, cyano and $NH_2$;
each of $R_7$ and $R_8$ are independently selected from:
hydrogen;
$C_{1-12}$ alkyl optionally substituted with one or more substituents each independently selected from the group consisting of: OH, halogen, CN, $NH_2$, $NH(R_9)$, $N(R_9)_2$, halo$C_{1-6}$alkyl, aryl, heteroaryl, 3-7 membered saturated ring and 5-7 membered partially saturated ring, each of said saturated or partially saturated ring optionally containing one or more heteroatoms selected from the group consisting of O, N and S and each of said aryl, heteroaryl, 3-7 membered saturated ring or 5-7 membered partially saturated ring being optionally substituted with one or more substituents each independently selected from: OH, halogen, $C_{1-6}$ alkyl, halo$C_{1-6}$ alkyl, CN, halo$C_{1-6}$ alkoxy and $C_{1-6}$ alkoxy;
aryl or heteroaryl, each of said aryl or heteroaryl being optionally substituted with one or more substituents each independently selected from: OH, halogen, halo$C_{1-6}$ alkyl, CN, halo$C_{1-6}$ alkoxy and $C_{1-6}$ alkoxy; and
a 3-8 membered saturated or partially saturated cyclic or bicyclic ring optionally containing one or more heteroatoms each independently selected from the group consisting of: O, S and N, the 3-8 membered saturated or partially saturated cyclic or bicyclic ring being optionally substituted with one, two or more substituents each independently selected from the group consisting of: OH, halogen, CN, $C_{1-6}$ alkyl, hydroxy$C_{1-6}$ alkyl, C(O)O$R_9$, C(O)$R_9$, halo-$C_{1-6}$ alkyl, halo$C_{1-6}$ alkoxy and $C_{1-6}$ alkoxy;
or $R_7$ and $R_8$ form together with the nitrogen atom to which they are attached a cyclic amine selected from: aziridine, azetidine, pyrrolidine, piperidine, azepane, morpholine, thiomorpholine and piperazine each of said cyclic amine being optionally substituted with one or more substituents each independently selected from the group consisting of: OH, halogen, CN, $C_{1-6}$ alkyl, hydroxy$C_{1-6}$ alkyl, halo$C_{1-6}$ alkyl, halo$C_{1-6}$ alkoxy and $C_{1-6}$ alkoxy;
Ra, Rb, Rc and Rd are each independently selected from the group consisting of: hydrogen, halogen, CN, $C_{1-6}$ alkyl, $C_{1-6}$ alkoxy, halo$C_{1-6}$ alkyl, halo$C_{1-6}$ alkoxy, C(O)O$R_9$, C(O)$R_9$, $NH_2$, NH($R_9$), N($R_9$)$_2$;
each $R_9$ is independently selected from $C_{1-6}$ alkyl, halo$C_{1-6}$ alkyl, $C_{1-6}$ alkylaryl, $C_{1-6}$ alkylheteroaryl and $C_{1-6}$ alkyl-$C_{3-8}$cycloalkyl;
or a pharmaceutically acceptable salt, tautomer, solvate or stereoisomer thereof.

2. The compound according to claim 1, wherein:
Cy is aryl;
or a pharmaceutically acceptable salt, tautomer, solvate or stereoisomer thereof.

3. The compound according to claim 1, wherein:
$R_2$ is H, $C_{1-6}$alkyl or OH; and
$R_3$ is H, $C_{1-6}$alkyl or halogen;
or a pharmaceutically acceptable salt, tautomer, solvate or stereoisomer thereof.

4. The compound or the pharmaceutically acceptable salt, tautomer, solvate or stereoisomer thereof according to claim 1 wherein Cy is phenyl, $R_1$ is $CH_3$, $R_3$ is H, methyl, chlorine or bromine, $R_5$ is hydrogen or methyl and $R_6$ is hydrogen.

5. The compound or the pharmaceutically acceptable salt, tautomer, solvate or stereoisomer thereof according to claim 1 wherein:

R$_7$ is selected from the group consisting of hydrogen, methyl, ethyl, isopropyl, tert-butyl, cyclopropyl, cyclobutyl,

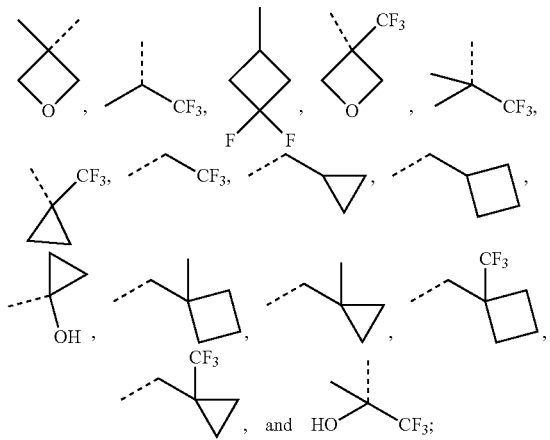

and/or

R$_8$ is selected from the group consisting of hydrogen, methyl, ethyl, isopropyl, tert-butyl, cyclopropyl, cyclobutyl,

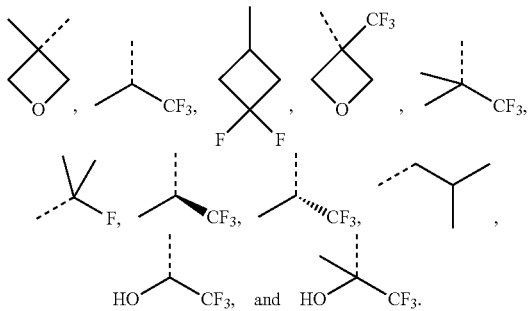

6. The compound of general formula (I) according to claim 1 being selected from the group consisting of:

cis-2-(2-(dimethylamino)-2-oxoacetyl)-7-methyl-N-(3,4,5-trifluorophenyl)-2,3,3a,4,10,10a-hexahydro-1H,7H-dipyrrolo[3,4-b:3',4'-f][1,4,5]oxathiazocine-8-carboxamide 5,5-dioxide;

cis-N-(4-fluoro-3-methylphenyl)-7-methyl-2-(2-((3-methyloxetan-3-yl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-7-methyl-2-(2-((3-methyloxetan-3-yl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-7-methyl-2-(2-((3-methyloxetan-3-yl)amino)-2-oxoacetyl)-N-(3,4,5-trifluorophenyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(3-chloro-4-fluorophenyl)-7-methyl-2-(2-((3-methyloxetan-3-yl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(3-cyano-4-fluorophenyl)-7-methyl-2-(2-((3-methyloxetan-3-yl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-2-(2-(tert-butylamino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-2-(2-(cyclopropylamino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

cis N-(4-fluoro-3-methylphenyl)-7-methyl-2-(2-(methylamino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide;

cis-2-(2-amino-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide;

cis-7-methyl-2-(2-(methylamino)-2-oxoacetyl)-N-(3,4,5-trifluorophenyl)-2,3,3a,4,10,10a-hexahydro-1H,7H-dipyrrolo[3,4-b:3',4'-f][1,4,5]oxathiazocine-8-carboxamide 5,5-dioxide;

cis-2-(2-amino-2-oxoacetyl)-7-methyl-N-(3,4,5-trifluorophenyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-2-(2-((3,3-difluorocyclobutyl)amino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-7-methyl-2-(2-oxo-2-(((S)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-2-(2-(isobutylamino)-2-oxoacetyl)-7-methyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-7-methyl-2-(2-oxo-2-((2,2,2-trifluoroethyl)amino) acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-7-methyl-2-(2-((1-methylcyclopropyl)amino)-2-oxoacetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-7-methyl-2-(2-oxo-2-((1-(trifluoromethyl) cyclopropyl)amino)acetyl)-2,3,3a,4,10,10a-hexahydro-1H,7H-dipyrrolo[3,4-b: 3',4'-f][1,4,5]oxathiazocine-8-carboxamide 5,5-dioxide;

(3aR,10aR)-2-(2-((cyclopropylmethyl)amino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-2-(2-(isopropylamino)-2-oxoacetyl)-7-methyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-2-(2-(cyclobutylamino)-2-oxoacetyl)-N-(4-fluoro-3-methylphenyl)-7-methyl-2,3,3a,4,10,10a- hexahydro-1H,7H-dipyrrolo[3,4-b:3',4'-f][1,4,5]oxathiazocine-8-carboxamide 5,5-dioxide;

(3aR,10aR)-2-(2-(cyclopropylamino)-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide;

(3aR,10aR)—N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-c:3',4'-g][1,6,2]dithiazocine-8-carboxamide 5,5-dioxide;

cis-2-(2-(cyclopropylamino)-2-oxoacetyl)-N-(4-fluoro-3-methylphenyl)-7,10a-dimethyl-2,3,3a,4,10,10a-hexahydro-1H,7H-dipyrrolo[3,4-b:3',4'-f][1,4,5]oxathiazocine-8-carboxamide 5,5-dioxide;

cis-N-(4-fluoro-3-methylphenyl)-7,10a-dimethyl-2-(2-oxo-2-(((R)-1,1,1-trifluoropropan-2-yl)amino) acetyl)-2,3,3a,4,10,10a-hexahydro-1H,7H-dipyrrolo[3,4-b:3',4'-f][1,4,5]oxathiazocine-8-carboxamide 5,5-dioxide;

cis-N-(4-fluoro-3-methylphenyl)-3a,7-dimethyl-2-(2-oxo-2-(((R)-1,1,1-trifluoropropan-2-yl)amino) acetyl)-2,3,3a,4,10,10a-hexahydro-1H,7H-dipyrrolo[3,4-b:3',4'-f][1,4,5]oxathiazocine-8-carboxamide 5,5-dioxide;

cis-2-(2-(cyclopropylamino)-2-oxoacetyl)-N-(4-fluoro-3-methylphenyl)-3a,7-dimethyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-2-(2-(3,3-difluoroazetidin-1-yl)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide;

Trans-N-(4-fluoro-3-methylphenyl)-7-methyl-2-(2-oxo-2-(((R)-1,1,1-trifluoropropan-2-yl)amino) acetyl)-2,3,3a,4,10,10a-hexahydro-1H,7H-dipyrrolo[3,4-b:3',4'-f][1,4,5]oxathiazocine-8-carboxamide 5,5-dioxide;

Trans-2-(2-(cyclopropylamino)-2-oxoacetyl)-N-(4-fluoro-3-methylphenyl)-7-methyl-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-7-methyl-2-(2-oxo-2-((1,1,1-trifluoro-2-methylpropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-methylphenyl)-7-methyl-2-(2-oxo-2-((1-(trifluoromethyl)cyclobutyl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-2-(2-amino-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide;

(3aR,10aR)—N-(4-fluoro-3-methylphenyl)-7-methyl-2-(2-(methylamino)-2-oxoacetyl)-2,3,3a,4,10,10a-hexahydro-1H,7H-dipyrrolo[3,4-c:3',4'-g][1,6,2]dithiazocine-8-carboxamide 5,5-dioxide;

(3aR,10aR)-2-(2-(3,3-difluoroazetidin-1-yl)-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide;

(3aR,10aR)—N-(4-fluoro-3-methylphenyl)-7-methyl-2-(2-oxo-2-(((S)-1,1,1-trifluoropropan-2-yl)amino)acetyl)-2,3,3a,4,10,10a-hexahydro-1H,7H-dipyrrolo[3,4-c:3',4'-g][1,6,2]dithiazocine-8-carboxamide 5,5-dioxide;

(3aR,10aR)—N-(4-fluoro-3-methylphenyl)-7-methyl-2-(2-oxo-2-((2,2,2-trifluoroethyl)amino) acetyl)-2,3,3a,4,10,10a-hexahydro-1H,7H-dipyrrolo[3,4-c:3',4'-g][1,6,2]dithiazocine-8-carboxamide 5,5-dioxide;

(3aR,10aR)-2-(2-((cyclopropylmethyl)amino)-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide;

(3aR,10aR)—N-(4-fluoro-3-methylphenyl)-7-methyl-2-(2-((1-methylcyclopropyl)amino)-2-oxoacetyl)-2,3,3a,4,10,10a-hexahydro-1H,7H-dipyrrolo[3,4-c:3',4'-g][1,6,2]dithiazocine-8-carboxamide 5,5-dioxide;

(3aR,10aR)-2-(2-((3,3-difluorocyclobutyl)amino)-2-oxoacetyl)-N-(4-fluoro-3-methylphenyl)-7-methyl-2,3,3a,4,10,10a-hexahydro-1H,7H-dipyrrolo[3,4-c:3',4'-g][1,6,2]dithiazocine-8-carboxamide 5,5-dioxide;

(3aR,10aR)—N-(4-fluoro-3-methylphenyl)-7-methyl-2-(2-((3-methyloxetan-3-yl)amino)-2-oxoacetyl)-2,3,3a,4,10,10a-hexahydro-1H,7H-dipyrrolo[3,4-c:3',4'-g][1,6,2]dithiazocine-8-carboxamide 5,5-dioxide;

(3aR,10aR)—N-(3-chloro-4-fluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(3,4-difluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(3-(difluoromethyl)-4-fluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)—N-(4-fluoro-3-(trifluoromethyl)phenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-6-chloro-N-(3-chloro-4-fluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-6-chloro-N-(3,4-difluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-6-chloro-N-(3-(difluoromethyl)-4-fluorophenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-6-chloro-N-(4-fluoro-3-(trifluoromethyl)phenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-6-chloro-N-(4-fluoro-3-methylphenyl)-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

(3aR,10aR)-6-bromo-N-(4-fluoro-3-methylphenyl)-7-methyl-2-(2-oxo-2-(((R)-1,1,1-trifluoropropan-2-yl)

amino)acetyl)-2,3,3a,4,10,10a-hexahydro-1H,7H-dipyrrolo[3,4-b:3',4'-f][1,4,5]oxathiazocine-8-carboxamide 5,5-dioxide;
(3aR,10aR)—N-(4-fluoro-3-methylphenyl)-6,7-dimethyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;
(3aR,10aR)—N-(4-fluoro-3-methylphenyl)-7,10a-dimethyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide; and
(3aS,10aS)—N-(4-fluoro-3-methylphenyl)-10a-hydroxy-7-methyl-2-(2-oxo-2-(((R)-1,1,1-trifluoropropan-2-yl)amino)acetyl)-2,3,3a,4,10,10a-hexahydro-1H,7H-dipyrrolo[3,4-b:3',4'-f][1,4,5]oxathiazocine-8-carboxamide 5,5-dioxide;

or a pharmaceutically acceptable salt, tautomer, solvate, or stereoisomer thereof.

7. A pharmaceutical composition comprising the compound or the pharmaceutically acceptable salt, tautomer, solvate, or stereoisomer thereof of claim 1, alone or in combination with a further therapeutic agent, and a pharmaceutically acceptable excipient.

* * * * *